United States Patent [19]
Tata et al.

[11] Patent Number: 5,596,504
[45] Date of Patent: Jan. 21, 1997

[54] APPARATUS AND METHOD FOR LAYERED MODELING OF INTENDED OBJECTS REPRESENTED IN STL FORMAT AND ADAPTIVE SLICING THEREOF

[75] Inventors: Kamesh Tata, Schaumburg, Ill.; Amit Bagchi, Seneca; Nadim M. Aziz, Clemson, both of S.C.

[73] Assignee: Clemson University, Clemson, S.C.

[21] Appl. No.: 419,711

[22] Filed: Apr. 10, 1995

[51] Int. Cl.[6] .......................... G06F 19/00; G06F 17/50; G06T 17/10
[52] U.S. Cl. .................. 364/468.27; 364/468.04; 395/120; 395/326
[58] Field of Search ..................... 364/468, 474.05, 364/474.24, 476, 468.25, 468.26, 468.27, 468.04; 395/119, 120, 123, 155, 161; 264/401

[56] References Cited

U.S. PATENT DOCUMENTS

| | | |
|---|---|---|
| 4,618,924 | 10/1986 | Hinds . |
| 4,752,352 | 6/1988 | Feygin . |
| 4,789,931 | 12/1988 | Kuragano et al. . |
| 4,837,703 | 6/1989 | Kakazu et al. . |
| 4,863,538 | 9/1989 | Deckard . |
| 4,866,631 | 9/1989 | Kuragano et al. . |
| 4,907,164 | 3/1990 | Guyder . |
| 4,938,816 | 7/1990 | Beaman et al. . |
| 4,944,817 | 7/1990 | Bourell et al. . |
| 4,949,270 | 8/1990 | Shima et al. . |
| 4,961,041 | 10/1990 | Seki et al. . |
| 4,996,010 | 2/1991 | Modrek . |
| 5,017,753 | 5/1991 | Deckard . |
| 5,053,090 | 10/1991 | Beaman et al. . |
| 5,432,704 | 7/1995 | Vouzelano et al. ............... 364/468 X |

OTHER PUBLICATIONS

Vouzelaud et al, "Solid Freeform Fabrication Proceedings", Dec. 1992 pp. 291–300.
Dolenc et al, "Slicing Procedures for Layered Manufacturing Techniques," Mar. 1993, pp. 1–13.

*Primary Examiner*—Joseph Ruggiero
*Attorney, Agent, or Firm*—Dority & Manning

[57] ABSTRACT

A device for automating operation of a stereolithography apparatus uses an STL file as an input and includes a programmable computer, a facet processor that sorts the facets of the STL file according to a predetermined slice axis. The facet processor also groups the sorted facets according to those having common minimum vertex values with respect to the slice axis. The facet processor also subgroups the grouped facet file according to facets having common maximum vertex values with respect to the slice axis. A key characteristic identifier identifies key characteristics of the STL file. A thickness calculator determines the thickness of each layer of the model according to a geometrical error of preselected magnitude. A slicer calculates the intersection of each sliced plane by the calculated thickness. A directional ordering device insures uniformity with the direction of each other contour that defines the intersection. A model generator uses the layer thickness and intersection information to generate a portion of a model. An interface device controls the operation of the machine based on the model that is generated.

22 Claims, 20 Drawing Sheets

1450 FACETS

450 FACETS

67 FACETS

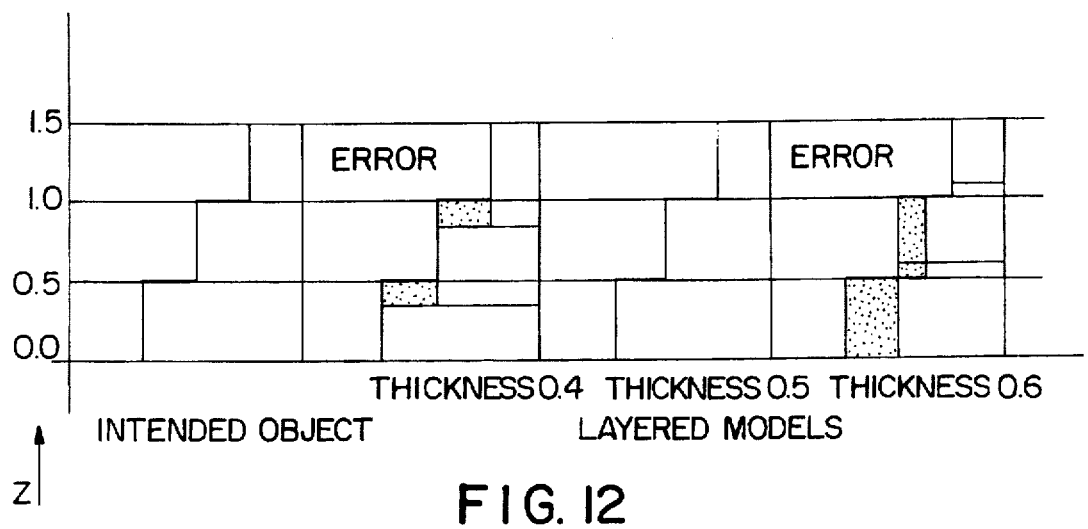
FIG. 12
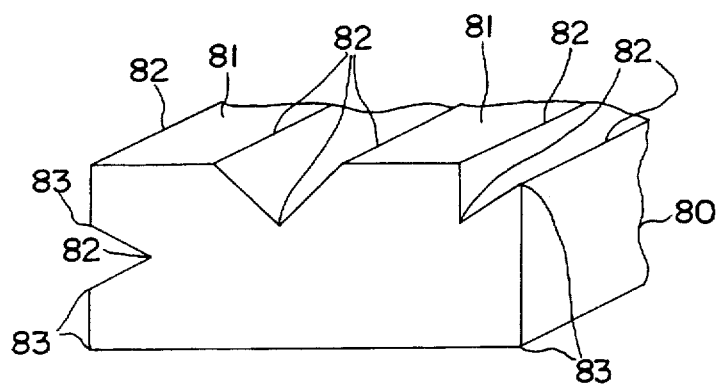
FIG. 13
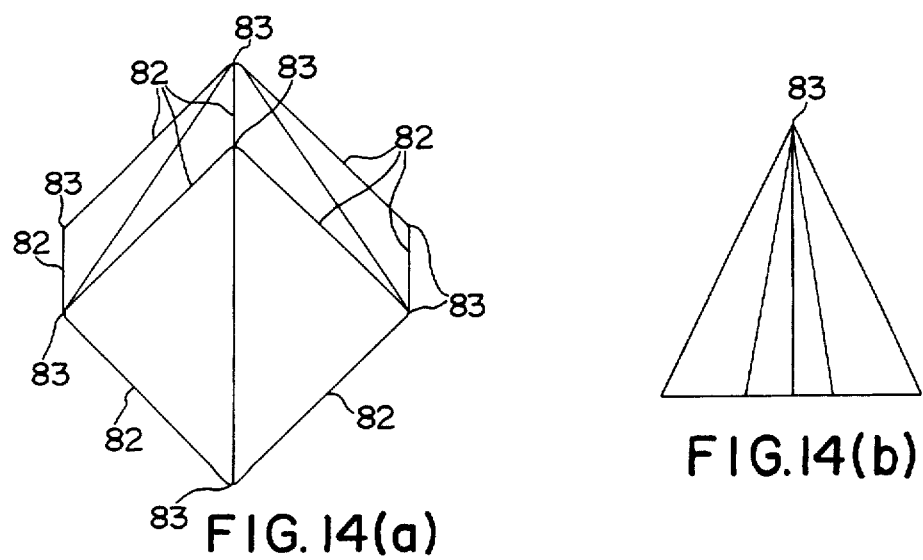
FIG. 14(a)
FIG. 14(b)

APPARATUS AND METHOD FOR LAYERED MODELING OF INTENDED OBJECTS REPRESENTED IN STL FORMAT AND ADAPTIVE SLICING THEREOF

BACKGROUND OF THE INVENTION

The present invention relates to a method of modeling an intended object's three-dimensional surface and more particularly to a method of generating and employing a two-dimensional slice from a cross-section of a three-dimensional tesselated model of the intended object's three-dimensional surface.

The advent of Solid Freeform Fabrication (SFF) technologies (a.k.a. Rapid Prototyping technologies) has reduced the cycle time for prototyping. Typically, an SFF process starts with a solid model of an intended object, such as a part to be machined for example, in a Computer-Aided Design (CAD) system. The model of the intended object in the CAD system is then converted into a computer file in the stereolithographic (STL) format. The STL file defines the three-dimensional exterior surface of the intended object in a tesselated form as: (1) a plurality of flat planar sections known as facets and (2) the outward pointing normals to these planar sections.

In general, a "facet model" represents a three-dimensional surface of an intended object by spatial boundaries, which are defined by a set of planar faces. The facet model is a special case of the more general boundary representation, which does not require the boundaries of the object to be planar. The term "facet" can be considered to denote a planar region being used to define a model boundary wherein the outline of the planar region is defined by any polygonal shape. However, in the Solid Freeform Fabrication (SFF) community, the term "facet" is typically understood to have an outline shaped as a triangle, and that is the understanding followed in the present application.

In a typical Rapid Prototyping (RP) application for an STL file, the faceted representation of the intended object is processed by a so-called "slicing engine," which produces a two dimensional representation of the cross-section of the intended object. The slicing engine provides the two-dimensional representation in the form of 2-D layers (a.k.a. slices). Each layer is bounded top and bottom by a so-called "slicing plane," and the edge of the layer disposed between the top and bottom slicing planes represents to a varying degree of accuracy, the commensurate cross-section of the surface of the intended object. The intended object is then "built" by stacking these layers one on top of the other layer-by-layer from bottom to top. Some slicing engines have difficulty dealing with certain key characteristics in the surface of the intended object and sudden changes in the complexity of the surface of the intended object. Moreover, providing the slicing engine with a data file in the Stereolithographic format (an STL file) as the input, negatively impacts the performance of the slicing engine in rapid prototyping systems.

As shown in FIGS. 1A–1C, a typical CAD software package (e.g., 3-D Systems, 1988) models a solid object, such as a sphere, as a set of triangular facets. Unfortunately, the typical CAD package independently stores the data representing each of these facets, as if each facet were created and tossed into a bucket with no particular ordering and without information relating a given facet to any other facet in the bucket.

In stereolithography, about 60% of the total time spent preparing the model is devoted to generating the slice data, i.e., slicing. Moreover, far more of the time devoted to slicing is consumed by searching for the facets that will have an intersection with a particular slice plane, than is consumed in performing the plane-facet intersection calculations required to generate the slice data.

To reduce the time required to generate the slice data, sorting of triangles is recommended by 3-D Systems. However, this does not fully alleviate the problem because triangle sorting is uni-directional, either descending or ascending. The benefits of sorting are often diminished because of the sheer complexity of the model and because there are too many variations in the sizes of triangles.

Moreover, under certain circumstances such as shown in an E-shaped block in FIG. 2, sorting may even increase the computation time. Ignoring the front and rear faces of the block for the sake of convenience, each of the 12 faces $F_1$ through $F_{12}$ of the block will be represented in the STL format by at least two triangular facets. When the faces of the block are sorted in ascending order, with the minimum Z coordinate (Z-min) of each facet $F_j$ as the sorting criterion, faces of the block will be ordered in the following First Sequence: $F_1, F_2, F_3, F_4, F_5, F_6, F_7, F_8, F_9, F_{10}, F_{11}, F_{12}$. In this FIG. 2 example, only faces $F_2$ and $F_{11}$ intersect the slice plane A—A. Since these two faces are separated by eight other faces (assuming that each face is composed of two facets in the STL format), sixteen failed searches will occur before the correct facets that intersect the slice plane A—A can be found. If the sorting criterion is changed to the maximum Z coordinate (Z-max) of each facet, then this Second Sequence will be given by: $F_1, F_3, F_4, F_5, F_6, F_7, F_8, F_9, F_{10}, F_{11}, F_2, F_{12}$. The Second Sequence is the same as the First Sequence except for the new position of $F_2$. Since slice plane B—B intersects only facets $F_2$ and $F_3$ in the FIG. 2 example, there will be again sixteen failed searches. As is evident from this example, as the complexity of the STL model increases, the computational cost of searching for facets that intersect the slice plane, quickly becomes prohibitive.

In addition, STL files contain a significant amount of redundant information, which can waste processing time. For example, vertex coordinates are stated explicitly for each facet. Since a vertex is always shared by a minimum of three facets, this results in each vertex being stored in the STL file data at least three times.

As shown in FIGS. 1A–1C, another of the limitations of an STL file is its inability to represent curved surfaces accurately. This results from the unavoidable error that arises whenever a three-dimensional surface of an object featuring curved surfaces is approximated by planar triangular facets. As illustrated in FIG. 1, choosing smaller and smaller triangles can reduce the error, but cannot eliminate the error.

In a 1991 article, Chalasani et al, have proposed two approaches for layered modeling of 3-D objects. In the first approach, each of the slice planes defining the layers is determined as the geometric intersection between the intended object and a plane horizontal to the platform of a stereolithography apparatus. Each facet that intersects the slice plane will form a directed line segment (vector) on the slice plane. Since intersections are not found in any particular order, the vectors must be sorted in head-to-tail fashion in order to derive a closed contour on that slice plane. This makes the process slow and inefficient.

Chalasani et al's second approach uses a scan-line-type search to find an intersection between the slice plane and a facet, and the search starts at the global origin. When the search point reaches the boundary of the faceted intended object for the first time since the search began, the first intersection is recorded. This first intersection will trigger a contour-tracing procedure in which the "search point becomes a draw point" and follows the plane of the facet until it reaches another edge. An adjacency list is consulted for the facet that shares this second edge of the first facet. Then the draw point will move along the plane of this facet. The process is repeated until the draw point comes back to the first intersection.

However, because Chalasani et al's methods produce many failed searches before an intersection (match) is found, it is slow. It is not clear how Chalasani et al's search point is incremented. Also, apart from stating that the layer thickness should be varied according to the local curvature of the object, Chalasani et al fails to demonstrate or suggest how this can be achieved.

In a December 1992 article, Vouzelaud and Bagchi reported their use of slices to obtain 2-D contours from a 3-D CAD model in a way that varies the slice thickness to better represent the surface of the intended object. A user defined "Quality Index," $R$, which is the maximum peak to valley height of the profile in the assessment length, was used by Loney and Ozsoy (1987) to calculate the side step or step size for parametric cubic patches and therefore yield a constant surface attribute. However, by obtaining the 2-D contours from the CAD systems themselves, Vouzelaud and Bagchi eliminated the need to have an STL file and the limitations associated with the STL file. Also, unlike the contours obtained from the tesselated model represented by the STL file, the contours obtained from the CAD system are more accurate representations of the original model. Despite their limitations, STL files are widely used by the Rapid Prototyping industry because of the easy availability of STL translators and the simplicity of the STL format.

In a 1993 article, Dolenc and Makela suggested implementing back-tracking as part of a procedure for varying the thickness of the layers used to represent different portions of the surface of the intended object. However, the details of their implementation are not known, and the robustness of their back-tracking procedure is suspect.

OBJECTS AND SUMMARY OF THE INVENTION

It is a principal aim of the present invention to reduce the time needed to employ an STL file in any process employing a profile or cross-section of the boundary of an intended object wherein such profile is decomposed by incremental parallel planes of intersection.

It is another principal aim of the present invention to increase the accuracy in any process employing an STL file that must be decomposed by incremental parallel planes of intersection.

It is a further principal aim of the present invention to reduce the time needed to employ an STL file in any process employing a profile or cross-section of the boundary of an intended object wherein the profile is decomposed by incremental parallel planes of intersection without losing key characteristics in the surface of the intended object.

It is still another principal aim of the present invention to employ an STL file in any process employing a profile or cross-section of the boundary an intended object wherein the profile includes multiple shapes that are simultaneously decomposed by incremental parallel planes of intersection separated by thicknesses determined by the most complex shape of the profile of the boundary of the intended object.

It is an additional principal aim of the present invention to reduce the time needed to employ an STL file in any process employing a profile or cross-section of the boundary of an intended object wherein though the profile includes sudden changes in the complexity of the boundary of the intended object, the profile is decomposed by incremental parallel planes of intersection without losing accuracy in modeling the boundary of the intended object.

It is yet another principal aim of the present invention to provide a method of modeling the boundary of an intended object from an STL file that must be decomposed into a plurality of layers stacked atop one another wherein the thickness of the layers is uniform except in portions of the model where the thickness of each layer is adapted by being increased or decreased by an amount that depends on the knowledge of the local geometry and the constraint of keeping the geometrical error between the object and the model from exceeding a predetermined value.

It is a further principal aim of the present invention to reduce the time needed to employ an STL file in any process employing a profile or cross-section of the boundary of an intended object wherein the profile is decomposed by incremental parallel planes of intersection separated by thicknesses falling within a range of thicknesses between a maximum and minimum which can be selected by the operator.

It is another principal aim of the present invention to employ an STL file in any process employing a profile or cross-section that is decomposed by incremental parallel planes of intersection to produce a model that can be viewed by the operator either before or after being subjected by the operator to various transformations such as scaling and rotation.

Additional aims and advantages of the invention will be set forth in part in the description which follows, and in part will be obvious from the description, or may be learned by practice of the invention. The aims and advantages of the invention may be realized and attained by means of the instrumentalities and combinations particularly pointed out in the appended claims.

To achieve the aims and in accordance with the purpose of the invention, as embodied and broadly described herein, an apparatus and method is provided for effecting automatic operation of a machine with respect to an intended object having a desired profile characterized by at least one key characteristic and at least two local complexity levels, wherein the operation of the machine is controlled based on a two-dimensional sliced model of the local profile of the cross-section of the intended object with each slice plane disposed transversely with respect to and along a slice axis of the intended object, which is represented by a tesselated model of the intended object and provided as an input to the apparatus in the form of an STL file specifying triangular facets obeying the vertex-to-vertex rule. The present invention can include a slicing engine, either alone or in combination with a model generating means and an interface means as well as a variety of machines being controlled with respect to a boundary of an intended object.

In accordance with the present invention, the slicing engine of the present invention can include four main constituents: (1) a facet processor means, (2) a key characteristic identifier (KCI) means, (3) a thickness calculator means, and (4) a slicer means.

The facet processor means can include a facet sorting means, a facet grouping means and in a preferred embodiment, a facet subgrouping means. The facet sorting means is configured to produce a sorted facet file by sorting the facets of the STL file according to the slice axis. The facet grouping means is configured to produce a grouped facet file by grouping the facets of the sorted facet file according to facets having one of the following characteristics: common minimum vertex values with respect to the slice axis and common maximum vertex values with respect to the slice axis. The facet subgrouping means is configured to produce a subgrouped facet file by subgrouping the facets of the grouped facet file according to facets having the other of the following characteristics: common minimum vertex values with respect to the slice axis and common maximum vertex values with respect to the slice axis.

The key characteristic identifier (KCI) means is provided to ensure retention of the intended object's asymmetries and to deal more effectively with the complexities of the surface of the intended object. The key characteristic identifier means is configured to identify key characteristics of the profile represented by the STL file and to produce a key characteristic data file from the key characteristics of the profile represented by the STL file.

The thickness calculator means computes the thickness of the slice (a.k.a. layer) between adjacent slice planes according to a user defined criterion relating to the complexity in the shape of the boundary defining the model. Examples of the user defined criterion include the volumetric error per unit of perimeter, the maximum deviation, the chord length, and the cusp height. The thickness calculator means can include a simple back tracking means for determining the thickness of the next layer while retaining a single change in complexity level in the local profile. The thickness calculator means can include a repeated back tracking means for determining the thickness of the next layer while retaining more than a single change in the complexity level of the local profile.

The user supplies to the slicing engine the maximum and minimum values of the layer thickness. The thickness calculator means of the present invention is configured so that it automatically sets the layer thickness to this maximum value when warranted by the complexity of the shape of the boundary of the intended object. For a typical intended object, this results in a shorter build time with the same level of accuracy as would be obtained were the layer thickness set at the minimum value dictated by the application. The thickness calculator means of the present invention varies the layer thickness between the maximum and minimum values in relation to the complexity of the shape of the boundary of the intended object. For a typical intended object, this results in improved accuracy for the same build time as would be obtained were the layer thickness set at a uniform arbitrary value for the entire intended object.

The thickness calculator means employs the following technique to vary the thickness of each layer. The thickness calculator means chooses as the initial slice plane the slice plane that passes through the bottom-most point along the slice axis. To calculate the height along the slice axis of the next slice plane above the initial slice plane, the thickness calculator means pursues the following strategy. First, the thickness calculator means determines the controlling normal by considering all the facets that have at least one vertex through which the initial slice plane passes. The grouping of facets done earlier by the facet processor means greatly facilitates this process. However, all facets which lie in the initial slice plane are ignored. Once the controlling normal has been identified, the thickness calculator means calculates the layer thickness by applying a constraint equation that relates the geometrical error between the desired profile of the boundary of the intended object and the model profile of each layer having such layer thickness, and the height ($Z_{tmp}$) of the next Possible Slice Plane is then computed by applying this constraint equation.

As noted above, the geometrical error can be expressed in the constraint equation using a number of alternative parameters, including: (1) cusp height, (2) maximum deviation, (3) chord length, and (4) volumetric error per unit of perimeter length. Expressing the geometrical error in terms of volumetric error per unit of perimeter length is particularly useful in applications concerned with minimizing the volume or mass of manufactured parts used in space vehicles. Other expressions of geometrical error can be devised to suit the particular needs of the application.

It is important to note that the Possible Slice Plane (at height $Z_{tmp}$) need not become the next slice plane (at height $Z_{next}$). The Possible Slice Plane becomes the next slice plane only in the absence of a new group (or groups) of facets between the current slice plane and the Possible Slice Plane. However, when the thickness calculator means encounters a new group of facets in this location, the thickness calculator means is configured to calculate the new slice thickness by obtaining the controlling normal from the new group of facets. If the "sum" of the Z-min of the new group and the layer thickness is less than the height of the Possible Slice Plane, then the thickness calculator means is configured to use the value of this "sum" as the height of the Possible Slice Plane. Then this process is repeated until either: (1) no new group of facets lies between the current slice plane and the Possible Slice Plane or (2) the "sum" is not less than the height of the Possible Slice Plane. At the end of this calculation loop performed by the thickness calculator means, the height of the Possible Slice Plane becomes the height of the Next Slice Plane, and the thickness calculator means is configured to place this information into a layer thickness data file to be used by the slicer means for computing the points of intersection for such Next Slice Plane.

Because of the configuration of the thickness calculator means of the present invention, two important observations can be made. First, if the controlling normal of a facet is perpendicular to the slice plane (indicating that the facet is parallel to the slice plane), then the thickness of the layer becomes zero and the slice plane is forced to passes through all three vertices of the facet. This result ensures that important features like horizontal walls (overhangs) are never missed. Moreover, this remains true regardless of the maximum layer thickness defined by the user. Second, if the controlling normal is parallel to the slice plane, then the thickness of the layer is set to the maximum value defined by user. This ensures that wherever there is a vertical wall, the thickness of the layer is set to a maximum value, thus reducing the number of layers. Moreover, multiple objects can be sliced together. In such cases, the thickness calculator means considers the most complex shape encountered for each slice plane when selecting the thickness of the next layer.

The slicer means generates two dimensional contours of the intended model. The slicer means is configured to operate on the sorted facet file, the grouped facet file, and the layer thickness data file to produce a slice plane intersection data file by calculating the intersection of each slice plane disposed at a height above the previous slice plane by the thickness calculated for each layer of the model of the intended profile represented by the STL file.

The slicer means desirably is configured to include a marching means that orders at least the grouped facet file (and desirably also any subgrouped facet file that is generated by the facet processor means) to produce a geometrically ordered facet file in the form of a continuous chain of facets wherein each facet in this continuous chain intersects one of the slice planes. Moreover, the marching means is configured to generate an adjacency list for each facet that is intersected by the one slice plane.

Once the thickness calculator means determines the height of the slice plane, the slicer means computes the points of intersection between the slice plane and the facets defining the model of the intended object. In accordance with the present invention, the slicer means optimizes the speed of this computation of the intersection. The slicer means is configured so that initially it forms a new group of facets by merging (if necessary) relevant existing groups. A relevant group is one which contains facets that potentially intersect the slice plane. The slicer means is configured so that the slicer means tests each facet in the new group for intersection with the slice plane as follows.

In the case involving the intersection of the slice plane through a vertex of a facet, any facet or vertex intersecting with the slice plane is deemed "active." The slicer means records the intersection point (which is the co-ordinates of the vertex), and the "active facet" containing this "active vertex" is identified and stored so that it will not be checked again on this layer. For the next intersection, the slicer means checks the first facet encountered that shares the "active vertex" for intersection. This first-encountered facet must have one other vertex or an edge through which the slice plane passes. Otherwise, this first-encountered vertex is recorded and discarded and will not be checked by the slicer means for an intersection with the current slice plane again. The slicer means is configured to repeat this process until the facet array is exhausted. This logic works for the tip of a cone or any other similar geometry where a number of facets share the same vertex.

In the case involving the intersection of the slice plane through an edge of a facet, the slicer means deems any facet or edge intersecting with the slice plane to be "active." If the slice plane is passing through an edge of a facet ("active edge" and "active facet"), the slicer means records the intersection point. The slicer means also records the "active facet" so that the active facet will not be checked again for an intersection with the current slice plane. There will be only one facet which shares the "active edge" and the slicer means identifies this facet by a simple comparison. This facet sharing the "active edge" will have at least one more edge or vertex through which the current slice plane passes. The slicer means computes the new intersection and repeates the process until all facets in the new group are exhausted. If there are no more facets which share the "active vertex" or "active edge" and still the facet array is not exhausted, this is a clear indication that there is a protrusion or a depression. In such case, the slicer means restarts this checking procedure for the facets left over in the facet array. This process is repeated until the facet array is exhausted.

The present invention also can include a model generating means for using the layer thickness data file and the slice plane intersection data file to generate at least a portion of a model of the intended object. This portion of the model of the intended object includes a plurality of successive layers. The cross-section of each layer in a plane of view is defined by the intersection with this plane of view, of a pair of parallel planes and a model profile connecting these parallel planes. For each layer, the minimum distance separating its pair of parallel planes defines the thickness of this layer.

The present invention also can include an interface means for providing the generated portion of the model of the intended object to operate the machine in successive steps with respect to at least a corresponding portion of the intended object. Each of the successive steps is based on a separate one of the layers of the generated portion of the model of the intended object.

In accordance with the method of the present invention, the steps of the method include the permitted sequences of functions performed by the programmable computer, the facet processor means, the facet sorting means, the facet grouping means, the facet subgrouping means, the key characteristic identifier means, the thickness calculator means, the simple back tracking means, the repeated back tracking means, the slicer means, the marching means, the model generating means, and the interface means.

The accompanying drawings, which are incorporated in and constitute a part of this specification, illustrate several embodiments of the invention and, together with the description, serve to explain the principles of the invention.

BRIEF DESCRIPTION OF THE DRAWINGS

FIG. 12 is a schematic representation of a comparison between the error obtained at different layer thicknesses;

FIG. 13 is an elevated perspective view of a block with pointed edges;

FIG. 14(a) is an elevated perspective view of a rectilinear box having pointed ends, and FIG. 14(b) is a front plan view of a triangular face with pointed ends;

FIG. 19(A) illustrates three examples of regular surfaces, while

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 3:
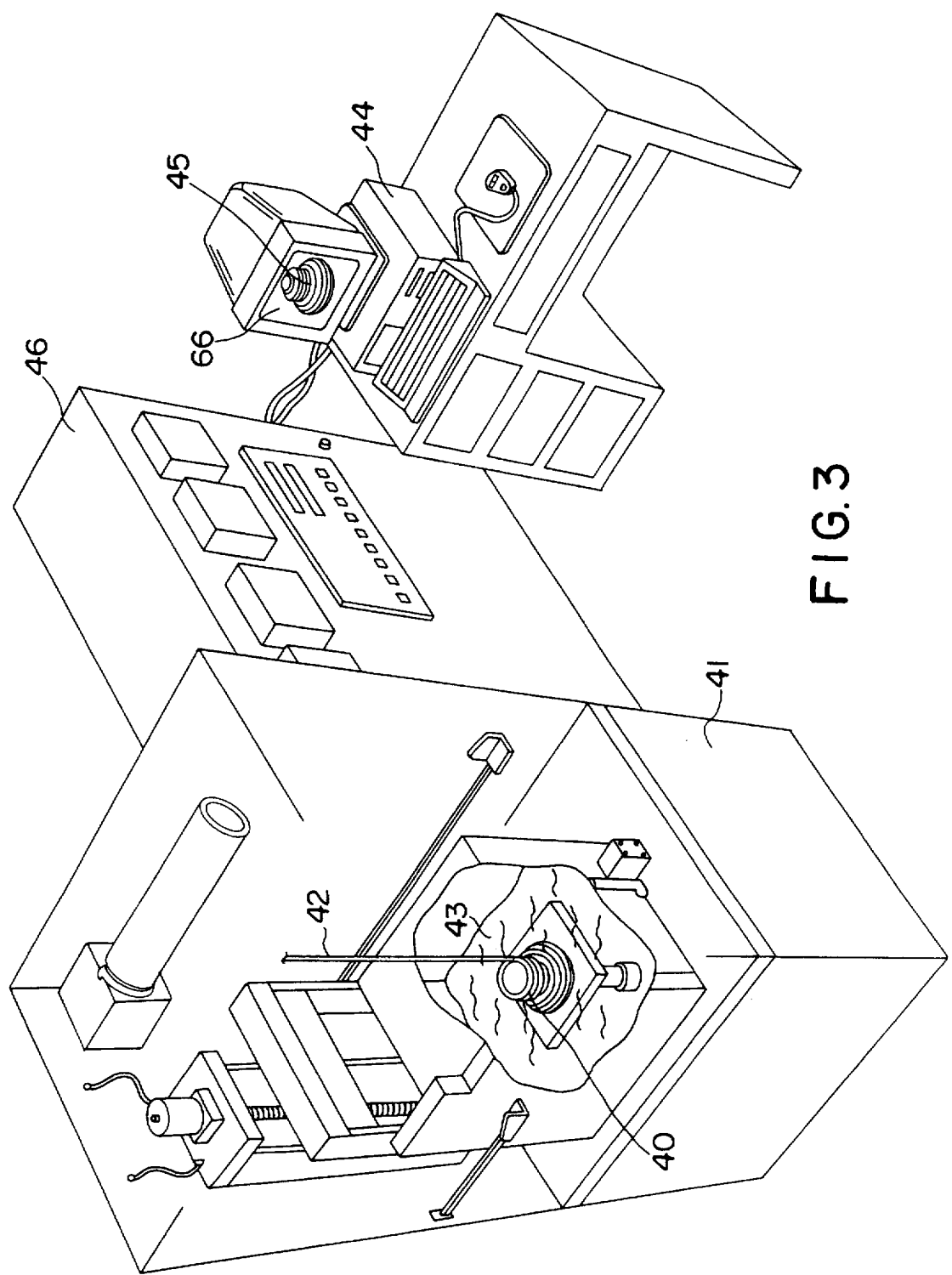
FIG. 3 is an elevated perspective view of a preferred embodiment of apparatus in accordance with the present invention as applied to a rapid prototyping process using a stereolithography apparatus.

The present invention operates with respect to the boundary of a model of an intended object, which can be two-dimensional or three-dimensional, as can the boundary of the model. As shown in FIG. 3, an example of an intended object could include an exemplar 40 of a three-dimensional object to be built by a stereolithography apparatus (SLA) 41 with a laser beam 42 incident on the surface of a bath composed of liquid polymer 43 under the control of a computer 44, which generates a layered model 45 of an STL file representative of the intended object that the SLA is building. Another example of an intended object in a scanning profile context such as shown in U.S. application Ser. No. 08/156,321, now U.S. Pat. No. 5,432,704, could include a patient's cancerous tumor that is to be subjected to irradiation. Yet another example of an intended object could include a part to be machined, such as shown in U.S. application Ser. No. 08/156,321, now U.S. Pat. No. 5,432,705. Thus, the present invention can be practiced in any application requiring a machine to be controlled with respect to a target, whether such target be expressed as a one-dimensional path, a two-dimensional perimeter or a three-dimensional surface of an intended object. Other examples of intended targets or objects are disclosed in U.S. application Ser. No. 08/156,321, now U.S. Pat. No. 5,432,704, which is incorporated herein in its entirety by this reference.

To facilitate understanding the present invention, the discussion herein will concern itself primarily with examples wherein the operation of the machine is controlled based on a two-dimensional sliced (a.k.a. layered) model of the profile of the cross-section of the intended object along a slice axis of the intended object. In particular, the present invention operates with respect to the model of the intended object wherein the model of the intended object is expressed in a computer file in the stereolithographic (STL) format.

In accordance with the present invention, one can begin with a three-dimensional model of the intended object. Such three-dimensional model of the intended object can be generated in a Computer-Aided Design (CAD) system such as the ARIES® CAD system available from ARIES Technology, Inc. As is the case with most available CAD systems, the ARIES® CAD system from ARIES Technology, Inc. converts the model of the intended object in the CAD system into a computer file in the stereolithographic (STL) format. The STL file defines the exterior surface of the intended object in a tesselated form as: (1) a plurality of flat planar sections known as facets and (2) the outward pointing normals to these planar sections. Before a process, including a process carried out by a machine operating under some form of automatic control in accordance with the present invention, can be performed with respect to the model of the intended object, this data in the STL file format must be transformed into an input that is useable by the process in question. At the heart of the present invention is a so-called slicing engine that is configured so as to effect this transformation by generating a two-dimensional sliced model of the profile of the cross-section of the intended object in a particular plane of view. The particular plane of view is chosen so as to take advantage of the symmetry of the intended object.

The basic function of the slicing engine of the present invention is to generate two-dimensional slices from a three-dimensional tesselated model, which typically is provided by CAD software in the form of an STL file. Thus, the output of a slicing engine is a two-dimensional representation of the STL model of the intended solid object. The slicing engine of the present invention differs from the existing similar software systems in two ways. First, there is a smaller number of slices in the output of the slicing engine of the present invention than in the output obtain from conventional slicing engine. Second, the quality of the two-dimensional representation comprising the output of the slicing engine of the present invention is superior to the quality of the output obtained from conventional slicing engines. In other words, the error between the desired profile of the cross-section of the intended object and the two-dimensional representation forming the output of the slicing engine is less in the output of the slicing engine of the present invention than in the output obtained from the conventional slicing engine. The slice data that is the output of the slicing engine of the present invention, when used to obtain the intended object, results in low build times because of the fewer number of slices and results in surfaces of the intended object that are high in quality because the slice representation is improved over that obtainable with a conventional slicing engine.

The slicing engine of the present invention includes four main constituents: (1) a facet processor means, (2) a key characteristic identifier (KCI) means, (3) a thickness calculator means, and (4) a slicer means. The basic function of each of the four means of the slicing engine of the present invention is briefly described as follows. The facet processor means is provided to improve the speed of the slicing operation. The key characteristic identifier (KCI) means is provided to ensure retention of the intended object's asymmetries and to deal more effectively with the complexities of the surface of the intended object. The thickness calculator means computes the thickness of the slice (a.k.a. layer) between adjacent slice planes according to a user defined criterion relating to the complexity in the shape of the boundary defining the model. The slicer means generates two dimensional contours of the intended model.

Figure 4:
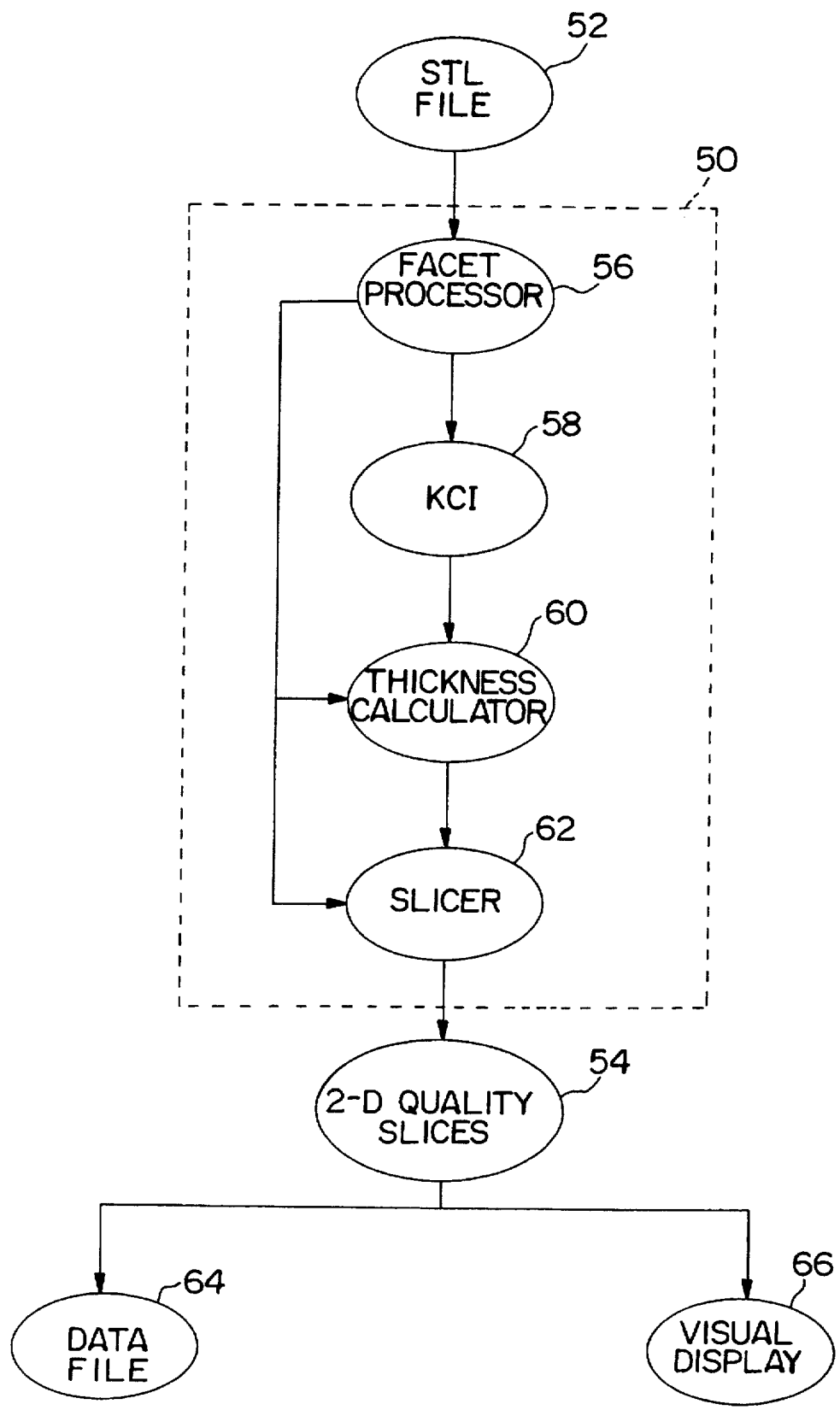
FIG. 4 is a schematic representation of the slicing engine of the present invention used in the apparatus of FIG. 3 for operating on an STL file to produce a sliced two-dimensional representation that provides both a data file and can be used for generating a visual display of the 2-D representation of the intended object.

A preferred embodiment of the slicing engine in accordance with the present invention is schematically shown in the block diagram in FIG. 4 as the elements surrounded by the dashed-line rectangle and is represented generally by the numeral 50. Information flow between the various elements of the slicing engine moves in the direction indicated from the tail to the pointed head of each arrow in FIG. 4. Input to the slicing engine is an STL file 52, while the output from the slicing engine is two dimensional slice data 54. As schematically shown in FIG. 4, a facet processor means 56 receives the input data in the form of STL file 52, processes STL file 52 in the manner described below, and then feeds the processed STL file to the other three elements of slicing engine 50. The KCI means 58 operates on the processed STL file received from the facet processor means and sends the output of KCI 58 to a thickness calculator means 60. The thickness calculator means operates on the output received from KCI means 58 and on the processed STL file received from facet processor means 56 and sends the results of this operation to a slicer means 62. The slicer means operates on the output received from thickness calculator means 60 and on the processed STL file received from facet processor means 56 to generate two dimensional slice data 54 and presents this data 54 in the form of a data file 64, which must be converted by an interface means so that the information in data file 64 can be used by the machine being controlled (such as SLA 41). An example of an interface means is a machine controller 46 shown in FIG. 3.

The interface means desirably includes a computer that is programmed with software that converts the STL data file 64 output into a format compatible with the machine to be controlled. For example, to convert data file 64 so that it can be used by a SLA device such as SLA 41 in FIG. 3, a presently preferred embodiment of such component of the interface means program is contained in pages 96–175 of the Appendix which forms a part of this patent application. The data thus created can be used by any process employing a profile or cross-section that is decomposed by incremental parallel planes of intersection. For example, as shown in FIG. 3, the data 54 can be used by any layered manufacturing technique to realize the physical model 40.

As shown in FIGS. 3 and 4, two dimensional slice data 54 also can be outputted and presented in the form of a visual display 66. The interface means also can include a computer that is programmed with software that converts the STL data file 64 output into a format compatible with the output device generating the visual display 66. A presently preferred embodiment of such component of the interface means program is contained in pages 47–95 of the Appendix which forms a part of this patent application.

The properties of an STL file are taken into account in building an efficient slicing engine in accordance with the present invention. The configuration of a preferred embodiment of the slicing engine of the present invention assumes that the STL format conforms to the following criteria, which are typical of STL formats employed by the major computer-aided design (CAD) systems.

Figure 5:
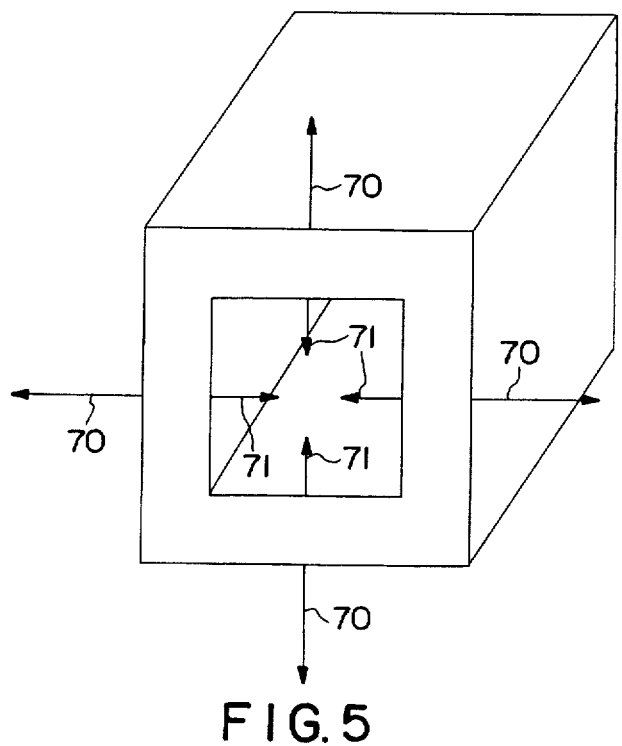
FIG. 5 is an elevated perspective view of a block with a square hole wherein four outward normals (arrows 70) and four inward normals (arrows 71) are shown.

The first assumed criterion for the STL file is that each facet is represented by four coordinates. The first coordinate defines the unit normal to the plane of the facet. Each of the remaining three coordinates defines the location of a different one of the three vertices of the facet. The second assumed criterion for the STL file is that the facet unit normal information and the triangle vertex order are arranged so that they are used to properly distinguish the interior from the exterior of the intended object. Specifically, as shown in FIG. 5, each facet must have a corresponding unit normal vector 70, 71 pointing away from the solid object. In addition to the facet normal, the "right hand rule" is also used to specify the interior of the object. The right hand rule states that the vertices of each facet must be ordered so that when the fingers of the right hand pass from vertex one through vertex two to vertex three, with the thumb pointing in the direction of the normal, the normal will point away from the solid object.

Figure 6A:
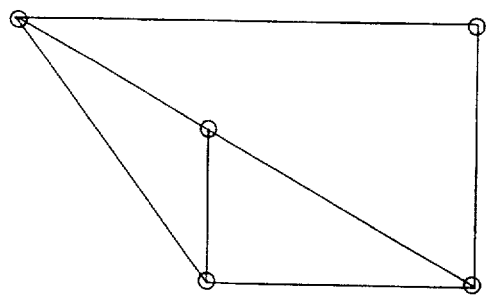
FIG. 6(a) is a schematic representation of facets failing to satisfy the vertex-to-vertex rule.
Figure 6B:
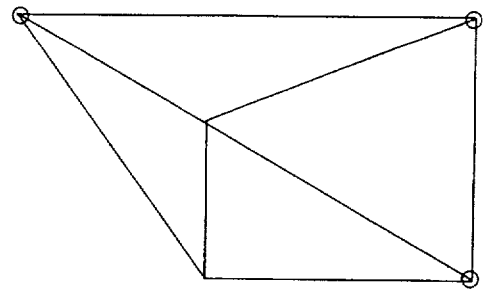
FIG. 6(b) is a schematic representation satisfying the vertex-to-vertex rule.

The third assumed criterion for the STL file is that the actual data may be in any units, but negative and zero co-ordinates are not used in specifying this data. This makes it necessary to place the original model of the intended object in positive CAD space before the model of the intended object is tesselated. The fourth assumed criterion for the STL file is the so-called Vertex-to-vertex Rule, which states that each triangle must meet all adjacent triangles along a common edge. In no case may a triangle vertex intersect with the side of an adjacent triangle. FIG. 6(a) shows an example of a facet model which does not follow the Vertex-to-vertex Rule. FIG. 6(b) shows an example of a facet model that obeys the Vertex-to-vertex Rule. The reader should note that this Vertex-to-vertex Rule requires each edge to be shared by only two triangles and no more, and therefore each triangle has three and only three adjacent triangles. As explained hereafter, the Vertex-to-vertex Rule permits the specification and use of an adjacency list for each facet in the model of the intended object.

Figure 7:
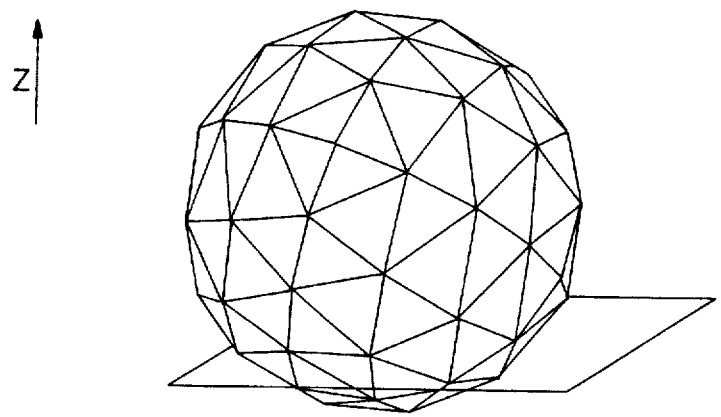
FIG. 7 is an elevated perspective view of a tesselated representation of a sphere intersected with a slice plane near the bottom of the sphere with the Z direction indicated as the vertical direction perpendicular to the slice plane.

As shown in FIG. 7, about 90% or more of the facets will not intersect with the slice plane near the bottom of a tesselated sphere. Thus, considerable computation time can be saved merely by identifying and focusing on only those triangles which intersect with a proposed slice plane. The function of the facet processor means of the present invention is to bring order to the otherwise unordered collection of triangular facets of the STL file 52 that is inputted to the facet processor means 56.

In accordance with the present invention, the size and orientation of a facet are of less importance to the slicing engine than the facet's location relative to the slicing plane. Thus, sorting the facets according to their size or their unit normals was considered unavailing. Accordingly, a more coherent approach than a simple sorting was required. In accordance with the present invention, the objective of such a more coherent approach must be to arrange all of the facets used to specify the tesselated model of the intended object (the facets "thrown in the bucket" so to speak) according to the geometry of the object that the facets represent. Furthermore, in the general case, this "coherent" arrangement must be achieved without prior knowledge of the geometry of the intended object in question.

In accordance with the present invention, generally speaking the facets "in the bucket" are sorted, grouped, and subgrouped. In more particular accordance with the present invention, a facet processor means is provided for operating on the STL file input to produce a processed facet file. Desirably, a computer is programmed to function as the facet processor means. Suitable computers on which the facet processor means can be programmed include an IBM® personal computer, so-called IBM® clone brand personal computers, or an Apple® brand computer. Alternatively, the facet processor means can be programmed on an EPROM for example. As embodied herein, the facet processor means is programmed in C language on a Sun Microsystem® work station. A presently preferred embodiment of such facet processor means program is contained in pages 15–18 and 30–31 of the Appendix which forms a part of this patent application. In the Appendix, the computer file containing the C language code was edited to fit the text into the format used to print the patent application.

In further accordance with the present invention, the facet processor means includes a facet sorting means for sorting the three vertices of each facet in the STL file and then sorting the facets themselves to produce a sorted facet file. The facet sorting means is configured to sort the facets of the STL file according to the slice axis to produce the sorted facet file. As noted above, a computer desirably is programmed to function as the facet sorting means. The facet sorting means desirably is programmed on the same computer on which the rest of the facet processor means is programmed.

The program embodying the facet sorting means is configured to sort the three vertices of each facet with reference to the slice axis, and such sorting usually is performed by the facet sorting means in ascending or descending order. For purposes of simplifying the example used to explain the operation of the facet sorting means, the slice axis has been chosen to be the Z-axis, which is assumed to be the vertical axis of the intended object in the three-dimensional Cartesian set of coordinates. Thus, for example, for each facet of the STL file of the tesselated model of the intended object, the facet sorting means orders the vertex with the smallest Z value into the first position, the vertex with the largest Z value into the third position, and the remaining vertex into the second position. After the facet sorting means has operated on the STL file, the output is a sorted STL file that is ordered as explained above. As embodied herein, the facet sorting means is programmed in C language on a Sun Microsystem® work station. A presently preferred embodiment of such facet sorting means program is contained in pages 15–16 of the Appendix which forms a part of this patent application.

In still further accordance with the present invention, the facet processor means includes a facet grouping means for grouping the facets in the sorted facet file produced by operation of the facet sorting means. The facet grouping means is configured to group the facets of the sorted facet file into separate groups of facets to produce or compose a grouped facet file 72 shown schematically in FIG. 8. Desirably, a computer is programmed to function as the facet grouping means. The facet grouping means is programmed conveniently on the same computer on which the facet sorting means and the rest of the facet processor means is programmed. As embodied herein, the facet grouping means is programmed in C language on a Sun Microsystem® work station. A presently preferred embodiment of such facet grouping means program is contained in pages 16–18 and 30–31 of the Appendix which forms a part of this patent application.

The strategy adopted by the facet grouping means is fairly simple. Each group composing the grouped facet file has either the same minimum Z-axis coordinate value (Z-min) or the same maximum Z-coordinate value (Z-max). In the example used herein, the program embodying the facet grouping means is configured to group the facets in the sorted facet file with reference to the Z-min values of the vertices of each facet. Since the vertices of each facet in the STL file provided as an input to the grouping means are already sorted by the facet sorting means, the first vertex will always contain the minimum Z-coordinate value for that facet. Thus, for example, each facet in one group of facets in the grouped facet file has the smallest Z-min value, while each facet in a second group of facets in the grouped facet file has the next smallest Z-min value, until in the last group of the grouped facet file each facet has a vertex with the largest Z-min.

Figure 8:
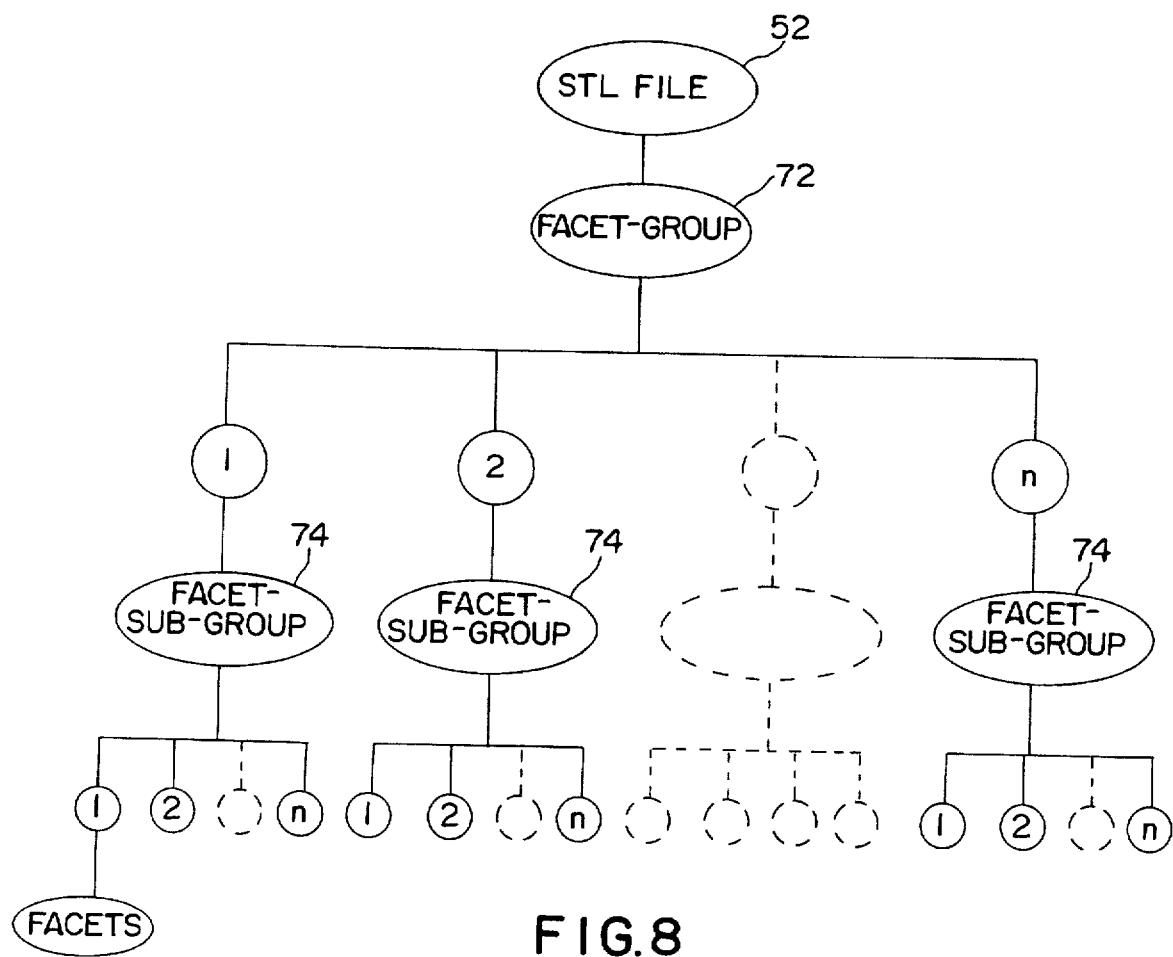
FIG. 8 is a schematic representation illustrating the relationship between facet groups, facet sub-groups and individual facets constituting the STL file.

As schematically shown in FIG. 8, all facets having exactly the same Z-min are stored as one group called a facet group 72. As embodied herein and schematically shown in FIG. 9 for example, triangles designated $T_1$ through $T_{12}$ form the facets of a tesselated cube 78. Facets $T_1$ and $T_2$, which are not shown in FIG. 9, form the bottom face of cube 78. The top left corner of cube 78 has coordinates X=1.0, Y=1.0 and Z=2.0. The lower left corner of cube 78 has coordinates X=1.0, Y=1.0 and Z=1.0. As schematically shown in FIG. 10 for cube 78 of FIG. 9, facet group will include facets $T_1$ through $T_{10}$, since all these facets have the same Z-min value of 1.0. Facet group2 will have facets $T_{11}$ and $T_{12}$ forming the top face of cube 78, since these are the only facets with the same Z-min value of 2.0.

In yet further accordance with the present invention, the facet processor means can include a facet subgrouping means for subgrouping the facets in the grouped facet file, which has been produced by operation of the facet grouping means. In this way, as schematically shown in FIG. 8, the groups and subgroups have been arranged in a tree structure in which the facets in each group are further divided into subgroups called facet subgroups 74. The facet subgrouping means is configured to subgroup the facets of the grouped facet file into separate subgroups of facets to produce or compose a subgrouped facet file. Desirably, a computer is programmed to function as the facet subgrouping means. The facet subgrouping means is programmed conveniently on the same computer on which the facet grouping means and the rest of the facet processor means is programmed. As embodied herein, the facet subgrouping means is programmed in C language on a Sun Microsystem® work station.

Since grouping is based on the Z-min in the example given, subgrouping is done based on the maximum Z-coordinate value (Z-Max). Thus, each subgroup composing the subgrouped facet file has the same Z-max coordinate. The program embodying the facet subgrouping means is configured to subgroup the facets in the grouped facet file with reference to the Z-max values of the vertices of each facet in each group of facets. Thus, for example, each facet in one subgroup of facets in the subgrouped facet file has the smallest Z-max value, while each facet in a second subgroup of facets in the subgrouped facet file has the next smallest Z-max value, until in the last subgroup of the subgrouped facet file each facet has a vertex with the largest Z-max. While the program in the Appendix does not devote a separate section of code to a facet subgrouping means, such code would be the same as that shown for the facet grouping means on pages 16–18 and 30–31 of the Appendix, except that the facet subgrouping means would subgroup based on Z-max instead of the Z-min that the code in the Appendix uses for grouping.

The number of facet groups and the number of facet subgroups within a facet group depend solely on the complexity of the model of the intended object. However, the number of individual facets in each group or subgroup depends on the overall facet count.

Figure 9:
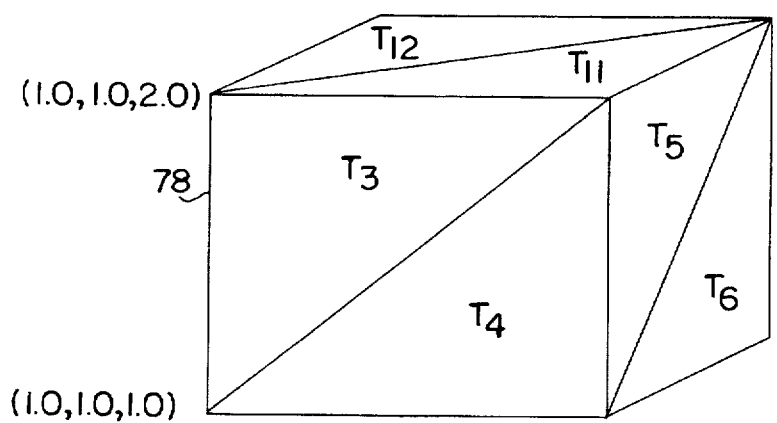
FIG. 9 is an elevated perspective view of a tesselated cube wherein the Z direction is indicated as the vertical direction and the coordinates of two corners are shown within parentheses adjacent to each corner.
Figure 11:
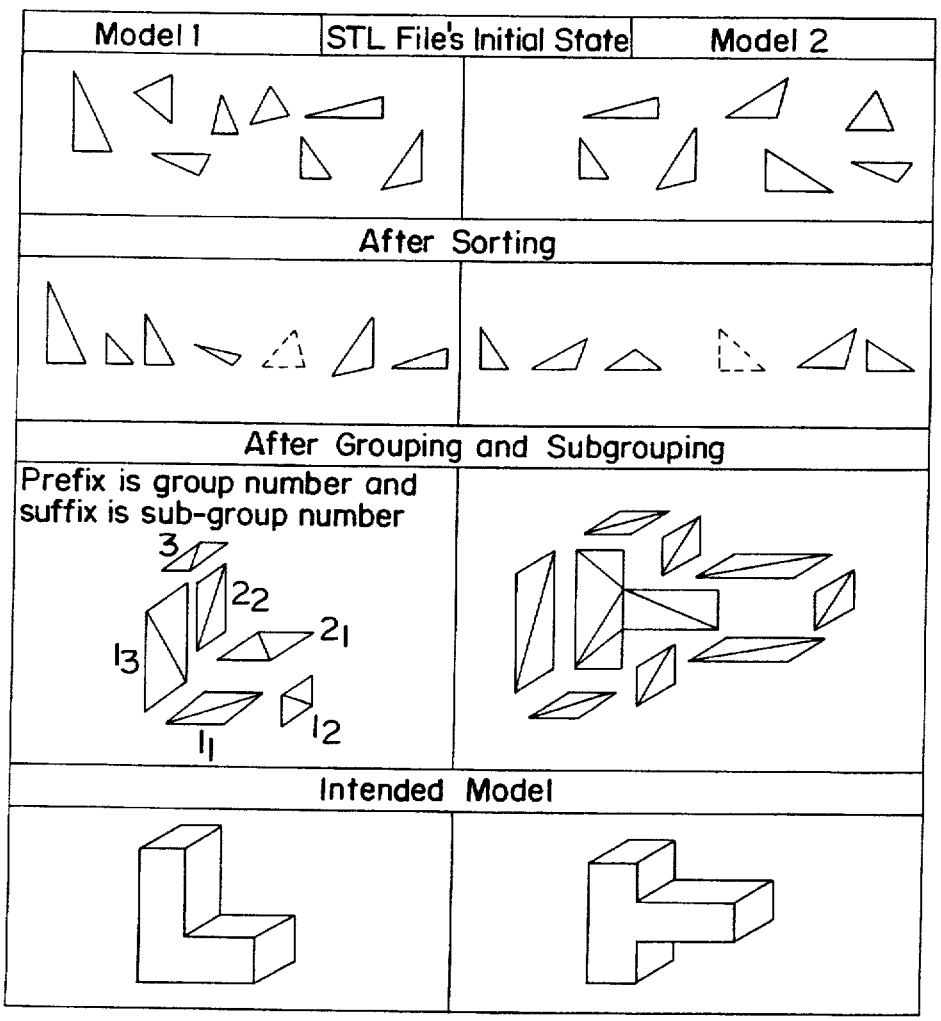
FIG. 11 is a schematic representation of the facets of two different intended models, each with its own shape, as a progression is made from the initial state in the STL file to the state after grouping and subgrouping.
Figure 10:
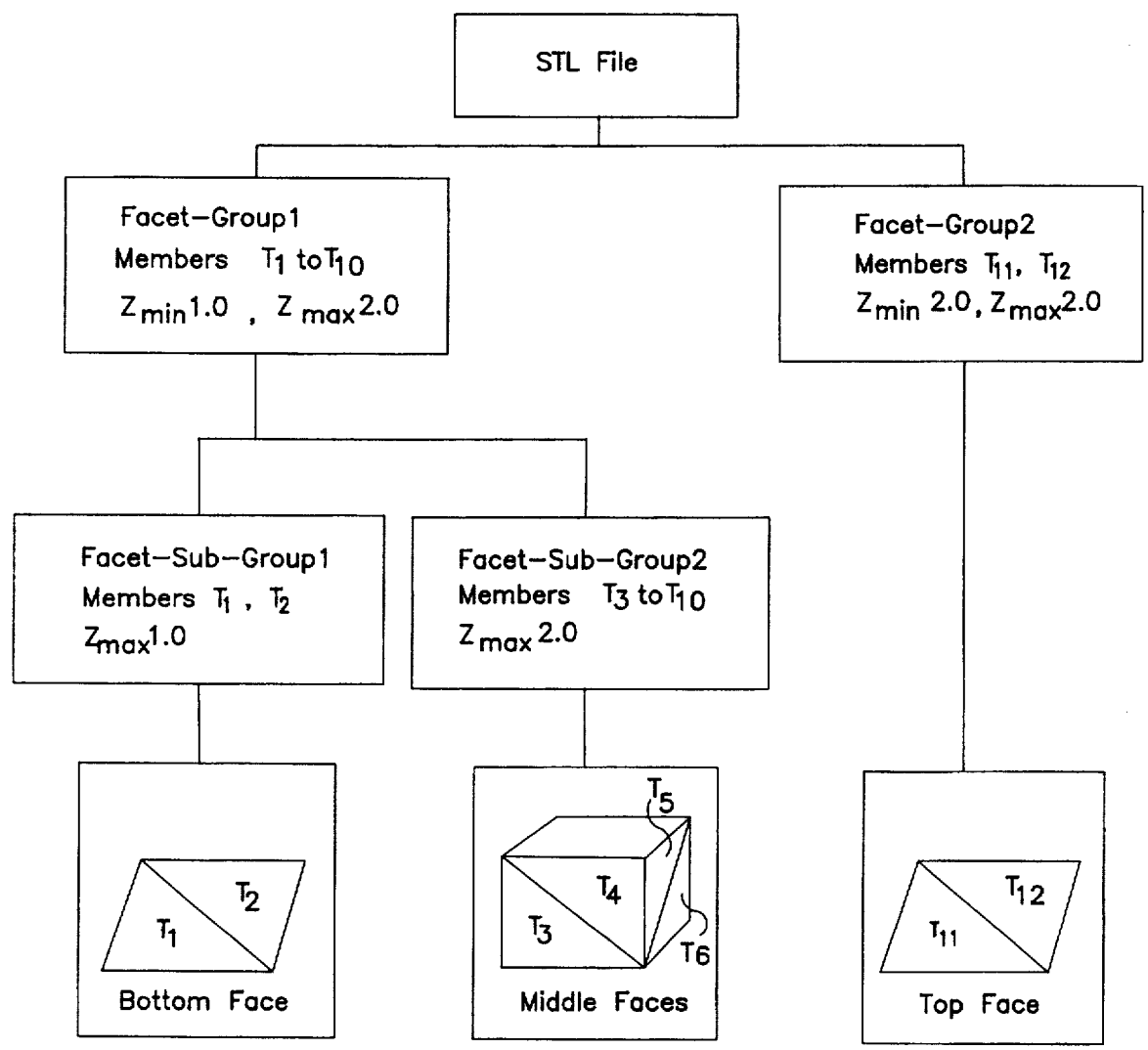
FIG. 10 is a schematic representation of the grouping and subgrouping of the facets of the cube shown in FIG. 9.

As schematically shown in FIG. 10 for cube 78 of FIG. 9, facets in facet group can be further divided into two subgroups based on the Z-max values. Facet subgroup1 will contain facets $T_1$ and $T_2$, which have the same Z-max value of 1.0, while facets $T_3$ through $T_{10}$ having a Z-max value of 2.0 will be in facet subgroup2. However, there will be no subgroups in facet group2, because it has only two facets $T_{11}$ and $T_{12}$ and both of these facets have the same Z-min value as well as the same Z-max value. Accordingly, the facets constituting the bottom face of cube 78 are in a first grouping in the form of facet subgroup, the facets constituting the middle faces are in a second grouping in the form of facet subgroup2, and the facets constituting the top face are in a third grouping in the form of facet group2. Similarly, FIG. 11 schematically illustrates the operation of the facet processor means on two more facet models, which are taken from their disordered initial states in the STL file to their more ordered states after sorting, grouping and subgrouping.

In each of the above examples, each facet group or subgroup represents either a vertical or a horizontal face of the model. If a feature is defined as any topologically significant entity, each face of the above models can be considered to satisfy this definition of a feature. Accordingly, the grouping methodology that results from sorting vertices and grouping according to Z-min and subgrouping according to Z-max, allows for easy identification of facets that represent a feature. This important offshoot of grouping will be exploited in key characteristic identification, described below.

Unlike sorting, grouping and subgrouping are bi-directional, because both Z-min and Z-max are considered to arrange the facets. As grouping follows sorting, identifying facets with the same Z-min or Z-max for the purpose of grouping becomes relatively simplified. Consequently, the additional time spent on grouping and subgrouping becomes insignificant.

The technique used by a stereolithography apparatus to produce a prototype differs fundamentally from the technique used by a computerized numerically controlled (CNC) milling machine to produce the same prototype. A stereolithography apparatus such as an SLA-250 utilizes an additive process for producing a prototype. A CNC milling machine adopts layered machining, which is a hybrid process for producing a prototype. Because of these fundamental differences in their techniques, the stereolithography apparatus has different needs with regards to feature recognition than the needs of a CNC milling machine with regards to feature recognition.

For Rapid Prototyping processes such as employed by an SLA-250, the emphasis in the area of feature recognition must be on recognition of the nature of the feature, protrusion or depression, and on the base faces of each feature. Distinguishing depressions from protrusions enables identification of areas that must be left unfilled (additive processes) or where material must be removed (substractive processes) so as to form a hole.

In addition, recognition of base faces is essential to improve tolerances of layered models. For example, FIG. 12 schematically illustrates the importance of retaining horizontal faces. In FIG. 12, layered models of a stepped block at different values of layer thickness $\Delta Z$ are schematically shown. At layer thicknesses of 0.4 and 0.6, models are considerably deviated from the intended object. In fact, at a layer thickness of 0.6, the layered model is out of shape, with one step completely eliminated. However, at a layer thickness of 0.5, which is a multiple of the step heights (0.5 and 1.0), there is no error. No error is shown at the top of the block, because it is assumed that all existing slicing engines can successfully retain both top and bottom surfaces of an object. This simple example demonstrates that the accuracy of the layered model of the intended object or target is a function of design features, dimensions, and layer thickness. Recognizing base faces eliminates this undesirable dependency. Thus, for Rapid Prototyping processes for example, it is adequate to identify the type of feature and the base of the feature. These two requirements can be met without a full scale feature recognition, and hence the term "key characteristics" has been adopted.

In contrast to Rapid Prototyping processes, layered machining performed by a CNC milling machine for example, demands a more comprehensive feature recognition than mere identification of the type of feature and the base faces of each feature of the intended object. Layered machining requires the dimensions, the geometric shape, and the orientation of each feature to be identified in addition to the type of feature and the base faces of each feature. This is mainly due to the fact that unlike other layered processes, the capabilities of layered machining are limited by the geometric complexity of the intended object. Features like threading, undercuts, grooves, and holes at an angle, are some of the constraints which demand retooling, refixturing or reorientation of the intended object. Identification of machining constraints is therefore an essential requirement for layered machining of a feature integrated design.

In accordance with the present invention, a Key Characteristic Indentifier (KCI) means is provided. The key characteristic indentifier means is configured to operate on a tesselated model with the result that the following key characteristics of the model of the intended object are identified: (1) the base faces of the model; (2) the type of features (protrusion or depression) of the model; (3) the geometric shape of the model's features; and (4) the orientation of the model's features. As schematically shown in FIG. 4, the key characteristic indentifier means 58 is configured to operate on the sorted facet file, the grouped facet file and the subgrouped facet file to produce or compose a key characteristic data file. Desirably, a computer is programmed to function as the KCI means. The KCI means is programmed conveniently on the same computer on which the facet sorting means and the rest of the facet processor means is programmed. As embodied herein, the KCI means is programmed in C language on a Sun Microsystem® work station. A presently preferred embodiment of such KCI means program is contained in pages 9–10 of the Appendix which forms a part of this patent application.

In accordance with the present invention, the key characteristic indentifier means provides slice-based feature recognition in the profile of the intended object. The key characteristic indentifier means is configured to employ a simple knowledge base that is supported by a few rules. The rules are mostly based on simple geometric and engineering principles, and derived by observation and logical reasoning. In fact, some of the ideas discussed below are applicable for any solid model regardless of whether the representational scheme is a tesselated model.

Top and bottom faces of any feature in the model of the intended object, including the overall object itself, may be termed as base faces. Since a polygon consists of only two basic entities, a point and a line, only combinations of one or more points with one or more lines will result in any topologically significant characteristic. Consequently, as schematically shown in FIG. 13, any solid 80 represented by planar polygons can have only three types of base faces: a horizontal face 81, a pointed horizontal edge 82, and a pointed end 83. FIG. 14 shows additional examples of pointed ends 83 and pointed horizontal edges 82.

Figure 15A:
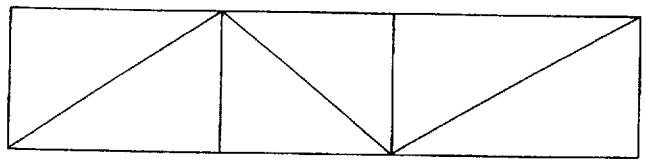
FIGS. 15(a) and 15(b) are a schematic representation of two different arrangements, (a) and (b), of multiple facets forming a horizontal face of an intended object.
Figure 15B:
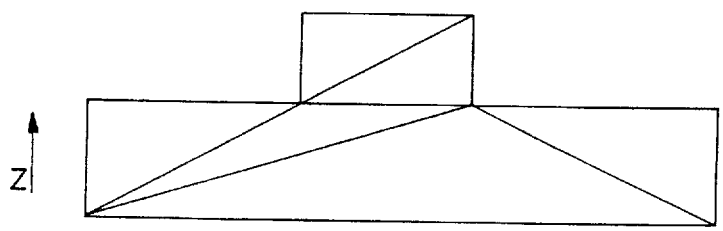

The key characteristic identifier means identifies a horizontal surface by applying the following test: A horizontal surface is represented by a single polygon disposed parallel to the slice plane or by multiple polygons disposed parallel to the slice plane. In the STL format that is of interest herein, the polygons will always be triangular facets. FIG. 15(a) shows a rectangular horizontal face composed of triangular facets and FIG. 15(b) shows an inverted T-shaped face composed of triangular facets.

The key characteristic identifier means identifies a pointed edge by applying the following test: When at least two non-coplanar polygons share an edge, the edge may be termed as a pointed edge. As schematically shown in FIG. 13, a block with v-grooves contains a number of pointed edges 82.

The key characteristic identifier means identifies a pointed end by applying the following test: When at least two non-coplanar polygons share a vertex, the vertex may be termed as a pointed end. As schematically shown in FIGS. 13 and 14, the tip of a cone and the corner of a block are examples of pointed ends 83.

For a layered manufacturing process, the existence of of each of the three types of base faces described above must be identified. Then the height of each base face must be determined so that the slice plane can be forced to assume that height. Identification of these three types of base faces from an STL model format is basically a searching operation. Horizontal surfaces can be identified by checking unit normals or ordinate values of facets. For example, if a unit normal of a facet describes 90° (or 270°) with the slice plane, there lies a horizontal surface with that facet contained in that surface. Alternately, if Z coordinate values of all the three vertices of a facet are equal, then that facet is part of a horizontal surface. However, if brute force approaches to searching horizontal facets are used, then computational costs will be tremendous as the facet count increases. Fortunately, the facet groupings performed in accordance with the present invention will greatly facilitate the searching process. In fact, from the cube example shown in FIGS. 9 and 10, it can be seen that during grouping in accordance with the present invention, all facets contained in a horizontal face are automatically stored in either a facet group by the facet grouping means or a facet subgroup by the facet subgrouping means.

With regards to implementation in a layered manufacturing process, the key characteristic identifier means applies further refinement of the above definition of an "edge" by following more elaborate rules. First, the key characteristic identifier means requires that none of the polygons sharing an edge should be horizontal. This is because horizontal faces are already identified, and the identification of a horizontal face means that the edges of such horizontal face have been determined. Second, the key characteristic identifier means requires that the common edge must be parallel to the slice plane, and then a separate effort is required for its retention in the sliced model. Thus, the key characteristic identifier means ignores an inclined edge, and only identifies horizontal edges. In STL format, any non-horizontal facet with two vertices having the same Z coordinate value is likely to form an edge provided the facet that shares these vertices (there will be only one such facet) is not in the same plane as the first facet and is non-horizontal. According to the grouping sequence implemented by the facet grouping means of the present invention, this facet will invariably lie in the current group or a group above or below the current group. Thus, the key characteristic identifier means limits the search to these three groups only, saving much computer time.

However, identifying two of a facet's vertices which have the same Z coordinate value, which is the very first step in identifying a pointed edge, demands searching virtually every vertex of all non-horizontal facets in the model. This again leads to high execution times. Finally, while the key characteristic identifier means can identify pointed ends from an STL file by looking for a single vertex shared by several non-coplanar facets, this calls for checking every vertex in the model for the number of facets that share it and their unit normals.

Clearly, identifying pointed ends and edges is a time intensive search operation. Isolation of the vertex that forms a pointed end or the edge that becomes a pointed edge demands a large scale search, and often that search must cover every facet of the model. This problem can be largely overcome by adopting a new strategy in accordance with the key characteristic identifier means of the present invention. This strategy is based on the fact that whenever there is a change in the number of contours in successive slices, there lies a base face of a feature.

Figure 16A:
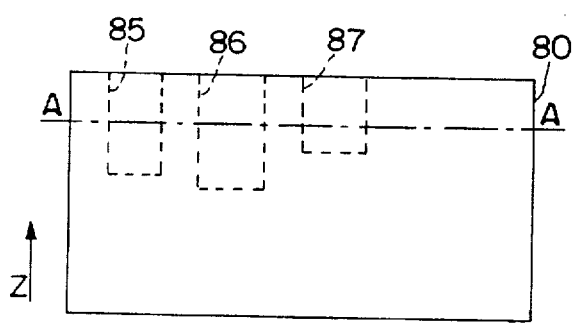
FIG. 16(a) is a front plant view of a block with differently shaped holes shown in phantom (dashed line) intersecting with a plane A—A, which is shown from a top plan view in FIG. 16(b) to illustrate multiple empty contours within a larger contour.
Figure 16B:
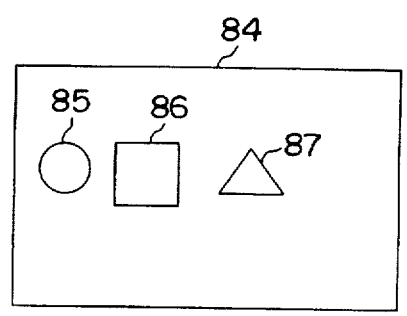

A contour is a line that is continuous and defines an interior and an exterior. A continuous contour is a contour that does not have a break. An empty contour is a contour that lacks a second contour in the interior of the empty contour. For example, as shown in FIG. 16(b), the rectangular contour designated 84 is not an empty contour. This is because within the interior of contour 84, there resides an empty closed contour 85 in the form of a circle, an empty closed contour 86 in the form of a square, and an empty closed contour 87 in the form of a triangle.

In accordance with the configuration of the key characteristic identifier means of the present invention, the exact location of the base face of the feature can be anywhere between the two slice planes or in the slice plane which has the greater number of contours. A similar approach is suggested by Dolenc and Makela (1993) to identify peaks. Once a change in the number of contours is observed by the key characteristic identifier means of the present invention, the key characteristic identifier means finds the exact location of the base face by considering facet groups in that region and applying the methods suggested above.

Protrusions are any projections on the object, such as pads, bosses, and mounds, while depressions are voids of any shape. The easiest way of finding a feature's type (protrusion or depression) is by studying the slices and the contours within each slice. The following rules, which are true for any solid, are embodied in the KCI means of the present invention and enable the KCI means to distinguish between protrusions and depressions.

Rule 2.1: When a solid is sliced by an imaginary plane, the resulting slice may contain single or multiple, non-intersecting, closed contours. This is true, regardless of the angle and the position of the slice.

Rule 2.2: If a single empty contour is surrounded by a single larger contour or multiple empty contours are surrounded by a single larger contour, each inner contour, i.e., each surrounded contour, represents a depression feature. As shown in FIGS. 16(a) and (b), each of closed contours 85, 86 and 87 is a depression feature.

Figure 17A:
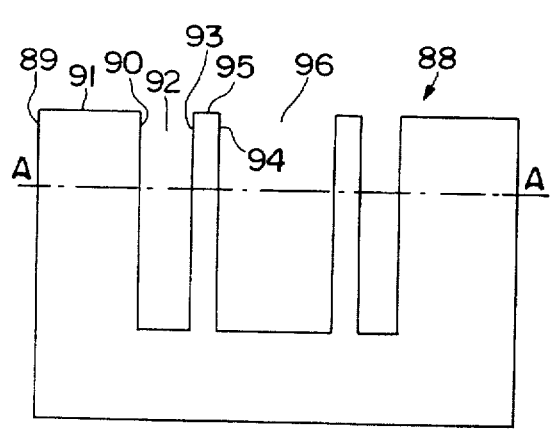
FIG. 17(a) is a schematic cross-sectional view of a cylinder within a cylinder intersected by a slice plane A—A, which is shown from a top plan view in FIG. 17(b) to illustrate multiple contours surrounding each other.
Figure 17B:
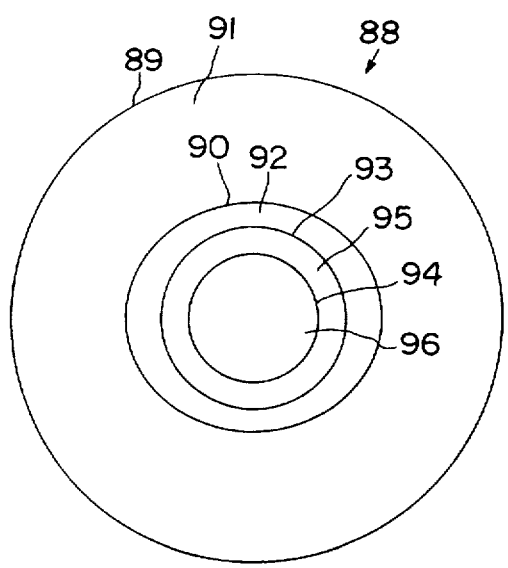

Rule 2.3: In general, if a contour is bounded by multiple non-intersecting contours, and each contour is numbered consecutively starting with the outermost contour as the first contour and each area between consecutive contours is also numbered consecutively starting with the outermost area, then the n'th area represents solid if "n" is odd and a void if "n" is even. Referring to FIG. 17 for example, a cross-sectional view of a cylindrical block 88 is shown in FIG. 17(a) in an axial plane, and a cross-sectional view of block 88 taken through transverse plane A—A is shown in FIG. 17(b). In FIG. 17, the first area 91 (the area between the two outermost contours 89 and 90) represents solid, the second area 92 (area between contours 90 and 93) represents a void, the third area 95 (area between contours 93 and 94) represents solid, and the fourth area 96 (area internal of contour 94) represents a void.

Figure 18A:
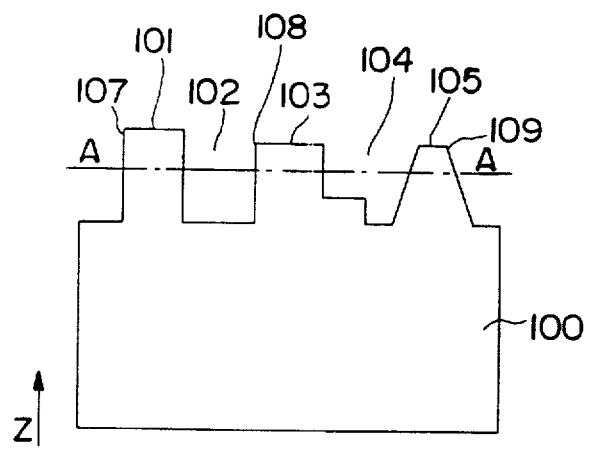
FIG. 18(a) is a front plan view of a complex three-dimensional object intersected by a slice plane A—A, which is shown in FIG. 18(b) to illustrate unbounded contours.
Figure 18B:
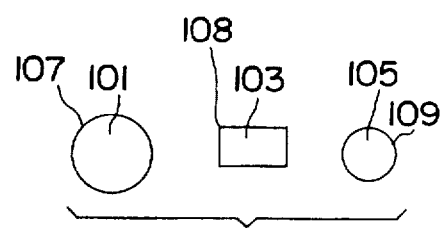

Rule 2.4: An unbounded contour is a contour that lacks a second contour surrounding the exterior of the unbounded contour. Any unbounded contour represents a protrusion feature. Referring to FIG. 18 for example, a cross-sectional view of a large solid block 100 is shown in FIG. 18(a) in an axial plane, and a cross-sectional view of block 100 taken through transverse plane A—A is shown in FIG. 18(b). As shown in FIG. 18, the first area 101 (the area within the empty contour 107) represents a solid protrusion, the second area 102 (area between empty contours 107 and 108) represents a void, the third area 103 (area within empty contour 108) represents a solid protrusion, the fourth area 105 (area between empty contours 108 and 109) represents a void, and the fifth area 105 (area within empty contour 109) represents a solid protrusion.

The KCI means is configured so that once it has determined the feature's type and location by employing the methods described above, the KCI means can obtain further details of the feature by analyzing the unit normals of the facets which compose the feature. The following example of an analysis of the unit normals of the facets which compose a feature of an intended model, assumes that the KCI means already has identified voids, projections, and base faces using the methods explained above.

Assuming that the KCI means has identified a particular feature as either a pad or a void using Rules 2.1 through 2.4, the KCI means applies the following tests to determine whether the pad or void is triangular in shape. If a feature comprising a pad or void is triangular, such feature is bounded by three faces where the sum of the included angles between the faces is exactly 180° and all three faces are perpendicular to a common plane. Moreover, if the feature has a fourth face that connects all of these three commonly perpendicular faces, then the triangular feature is closed at one end. Similarly, if the feature has a fifth face that also connects the three commonly perpendicular faces, then the triangular feature is closed at both ends. The KCI means is configured to determine the type of triangle by testing the included angle between the three faces that are pendicular to the common plane. The KCI means is configured to determine the orientation of the feature by testing the angle between the slice plane and one of the bounding faces.

Assuming that the KCI means has identified a particular feature as either a pad or a void using Rules 2.1 through 2.4, the KCI means is configured to determine whether that feature is rectangularly shaped by testing whether such feature is bounded by four faces wherein each face is perpendicular to each adjacent face and all four faces are perpendicular to a common plane. Moreover, if there is a fifth face that connects all of the four faces, the rectangular feature is closed at one end. Similarly, if a sixth face connects the first four faces, then the rectangular feature is closed at both ends.

The KCI means is configured to apply the following tests to identify whether a feature, which has been determined to be a pad or void, is pentagonal. Each pentagonal pad or void is bounded by five faces, where the sum of the included angles between the faces is exactly 450° and all five faces are perpendicular to a common plane. Moreover, if there is a sixth face that connects all of the five faces, the pentagonal feature is closed at one end. Similarly, if a seventh face also connects the first five faces, then the pentagonal feature is closed at both ends. The KCI means is configured to determine the type of pentagon (regular or irregular) by testing the included angle between adjacent faces. The KCI means is configured to determine the orientation of the pentagonal feature by testing the angle between the slice plane and one of the bounding faces. The foregoing logic can be extended to identify hexagonal or any higher order polygonal feature.

One limitation with slice-based feature recognition is that features parallel or at certain angles to the slice plane will be difficult to identify. In order for a comprehensive feature recognition, slicing may have to be done at different angles and the resulting slices studied independently and together. However, these difficult-to-identify features need not be identified for layered modeling techniques.

As noted in Chalasani and Bagchi (1992), one of the fundamental problems for better process planning and eventually for greater build efficiency (time versus quality) with all of the Rapid Prototyping technologies is the limitation of having to use a slice thickness that cannot be changed within the model. This aptly sums up the importance of adaptive slicing. Since the build time is directly proportional to the number of layers, the objective of any layered process must be to build superior quality parts with fewer layers.

As shown in FIG. 12, the stair stepping (SS) phenomenon introduces the concept of SS error, which is a function of the geometry of the object to be modeled and the thickness of the layers into which such object is resolved. As known, SS error is mainly responsible for the surface roughness of the model of the intended object and for the form error of the model from the intended object. Here a detailed analysis of SS error is done in order to arrive at methods for quantifying SS error. Then, the SS error so quantified is used by the thickness calculator means of the present invention as a criterion for determining how to vary the layer thickness to restrict the resulting model surface to a predetermined geometrical error that is acceptable for the application being used.

In accordance with the present invention, a thickness calculator means is provided for operating on the sorted facet file, the grouped facet file, the subgrouped facet file and the key characteristic data file, to calculate and select the layer thickness that achieves a predetermined surface roughness that is acceptable for the process being used. More particularly, the thickness calculator means is configured to calculate and select a thickness for each layer of the model of the desired profile represented by the STL file of the intended object such that the geometrical error between the desired profile of the intended object and the model profile of each layer having such layer thickness, remains no greater than a preselected geometrical error. The thickness calculator means is configured to produce a layer thickness data file containing such calculations. As schematically shown in FIG. 4, the thickness calclator means 60 is configured to operate on the sorted facet file, the grouped facet file, the subgrouped facet file, and the key characteristic data file to produce or compose a layer thickness data file. Desirably, a computer is programmed to function as the thickness calclator means. The thickness calclator means is programmed conveniently on the same computer on which the key characteristic identifier means and the facet processor means is programmed. As embodied herein, the thickness calclator means is programmed in C language on a Sun Microsystem® work station. A presently preferred embodiment of such thickness calclator means program is contained in pages 25–29 of the Appendix which forms a part of this patent application.

Figure 19A:
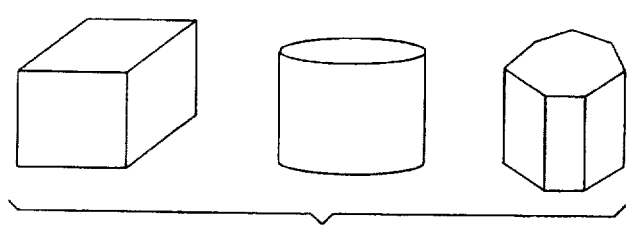
Figure 19B:
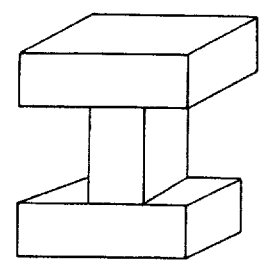
FIG. 19(B) illustrates a single example of a regular surface on a three dimensional block.

With regards to layered manufacturing, the thickness calculator means is configured to classify each surface of the model of the intended object into one of two broad categories. The first broad category is Regular Surfaces, which are surfaces that are not susceptible to the SS phenomenon. Examples of regular surfaces are shown at (A) in FIG. 19. The thickness calculator means is configured to classify intended objects with multiple regular surfaces as a regular surface, if as shown at (B) in FIG. 19 each of the multiple regular surfaces is separated from the other by a sudden slope discontinuity.

Figure 20:
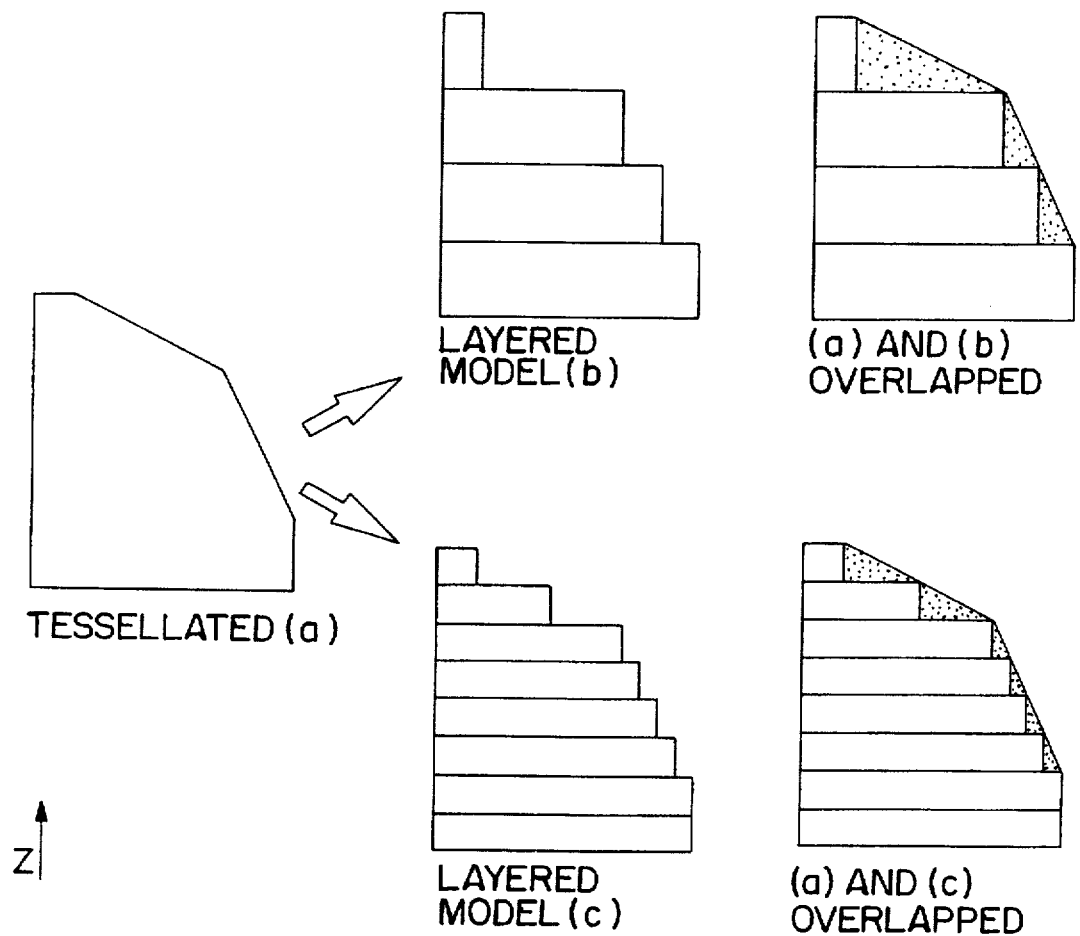
FIG. 20 schematically illustrates the effect of the slope and layer thickness on the error produced by stair stepping in a model of a tesselated intended object.

The second broad category is Non-Regular Surfaces, which are surfaces that are subject to the SS phenomenon. Surfaces featuring slopes with respect to the slice axis are prone to SS error because of an inevitable loss of information during slicing. The amount of lost information is related to the slope of the surface of the intended object and to the layer thickness of the model. FIG. 20 shows two layered models at (b) and (c) of a single tessellated model at (a) having multiple slopes. Each of the two layered models at (a) and (b) employs a different value of layer thickness. As shown in FIG. 20, for a given layer thickness, the magnitude of the SS error (indicated by the area encompassed by the stippled region between the boundary of the intended tessellated object and the boundary of the layered model superimposed on the intended tessellated object) increases with slope, and for a given slope, SS error increases with layer thickness.

In further accordance with the present invention, the thickness calculator means is configured to quantify a parameter known as "Surface Complexity," which relates the layer thickness and the slope of the profile of the surface of the intended object (in this case a tessellated object) to the SS error. The "Surface Complexity" is defined in Equation 2.1 in terms of the slope of the profile of the surface of the intended object obtained in a two-dimensional cross-section of the STL model of the intended object.

$$\text{Surface complexity} = \tan\Theta \tag{2.1}$$

The angle $\Theta$ defines the slope of the object's surface with respect to the slice axis along which the layers are "cut." According to Equation 2.1, the surface complexity of a surface that is perpendicular ($\Theta$ is 90 degrees) to the slice axis, a so-called "regular surface," is zero. For so-called "non-regular surfaces" in which the angle e between the surface and the slice axis varies between 90 degrees (perpendicularity) and zero degrees (parallel), the surface complexity increases with increasing slope (decreasing angle $\Theta$) until the surface complexity becomes infinite when $\Theta$ equals 90°. For example, if the slice axis is the Z-axis (vertical), then a horizontal surface (when Θ equals 90°) has an infinite surface complexity.

Figure 21:
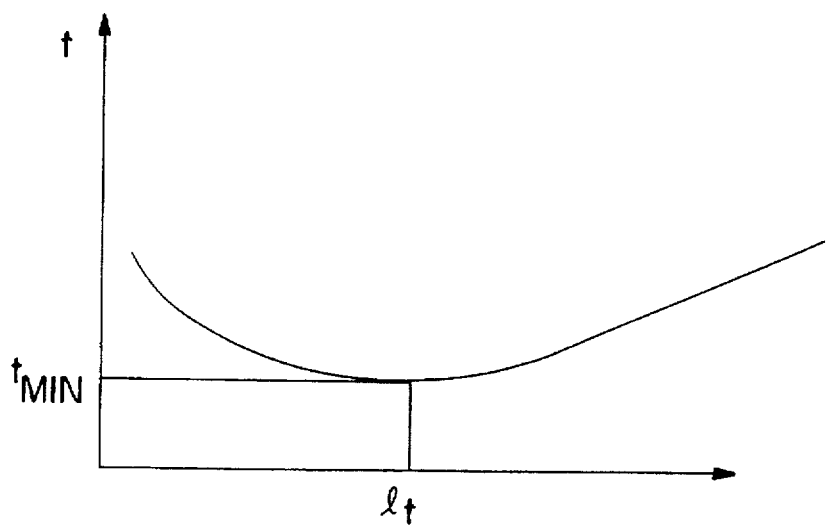
FIG. 21 is a graphical representation of the build time of an object created with an SLA as a function of the layer thickness wherein the layer thickness is "l" at the minimum build time "$t_{min}$"

Assuming ideal process conditions, surfaces with zero surface complexity can be precisely constructed by stacking layers appropriately. Theoretically, one layer should be enough to build all the intended objects shown at (A) in FIG. 19. However, in any practical application, the maximum layer thickness is limited by the process that is being carried out with respect to the intended object. For instance, the maximum layer thickness for a stereolithography apparatus is determined by the type of building material, the laser power, and other process parameters. Furthermore, as is known, a larger thickness for the slices or layers composing the model of the intended object does not automatically result in shorter process times. For example, in stereolithography, the laser scan velocity decreases exponentially with increased cure depth, which accounts for an increase in build time. FIG. 21 graphically depicts how the build time in a process employing a stereolithography apparatus varies as a function of the layer thickness. According to FIG. 21, at a time-optimized layer thickness of "$l_t$", build time "$t_{min}$" is minimum. Thus, even for zero complexity surfaces, the thickness calculator means of the present invention must be configured so as to select a layer thickness in such a way that the fastest process time can be achieved. The determination of such an optimum layer thickness depends on the process to which the layered modeling is applied.

In accordance with the present invention, selection of layer thickness for non-regular surfaces mainly depends on the desired quality of the surface of the intended object. This quality parameter is related to SS error, which in turn is related to the surface complexity and to the layer thickness. In the thickness calculator means of the present invention, the relationship between SS error, layer thickness and slope can be represented generally as in Equation 2.2 where "e" is the SS error and is a function of "l" (the layer thickness) and the angle "Θ" (defining the slope of the object's surface with respect to the slice axis along which the layers lie transversely, i.e., are "cut").

$$e=f(l, \Theta) \quad (2.2)$$

In accordance with the thickness calculator means of the present invention, a predetermined quality for the surface of the intended object is obtained by varying "l" for different "Θ" in order to control "e." This must be done by establishing a more specific relationship between "e", "l" and "Θ", which necessitates an investigation of various methods of quantifying the "SS error." Four methods of quantifying the "SS error" are discussed below. Before they are described, it may be noted that SS error can be either positive or negative. When each layer is slightly bigger than the intended cross-section of the object, the SS error is positive, otherwise it is negative. The following criteria can be applied for both positive and negative measures of the SS error.

Figure 22:
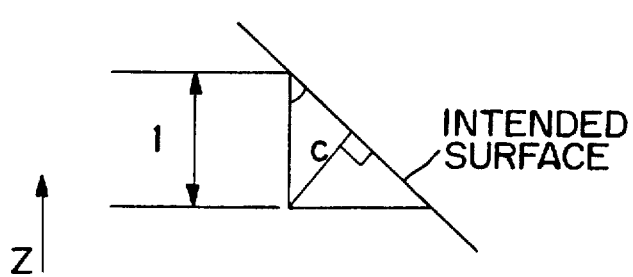
FIG. 22 is a graphical illustration of the cusp height "c" as a surface attribute wherein the Z direction is the vertical direction along which the layers of thickness "l" are sliced.

One alternative embodiment of a method of quantifying the "SS error" in accordance with the thickness calculator means of the present invention, relies on a parameter known as the "Cusp Height." As shown in an example in FIG. 22, the layer thickness "l" is determined such that the "cusp height," which is denoted by the lower case letter "c," is within a user-defined value represented by the notation "$C_{desired}$." Equation (2.3) relates the cusp height "c" to the layer thickness "l" and to the slope as follows.

$$c=l \sin \Theta (0<\Theta<90) \quad (2.3)$$

Figure 23:
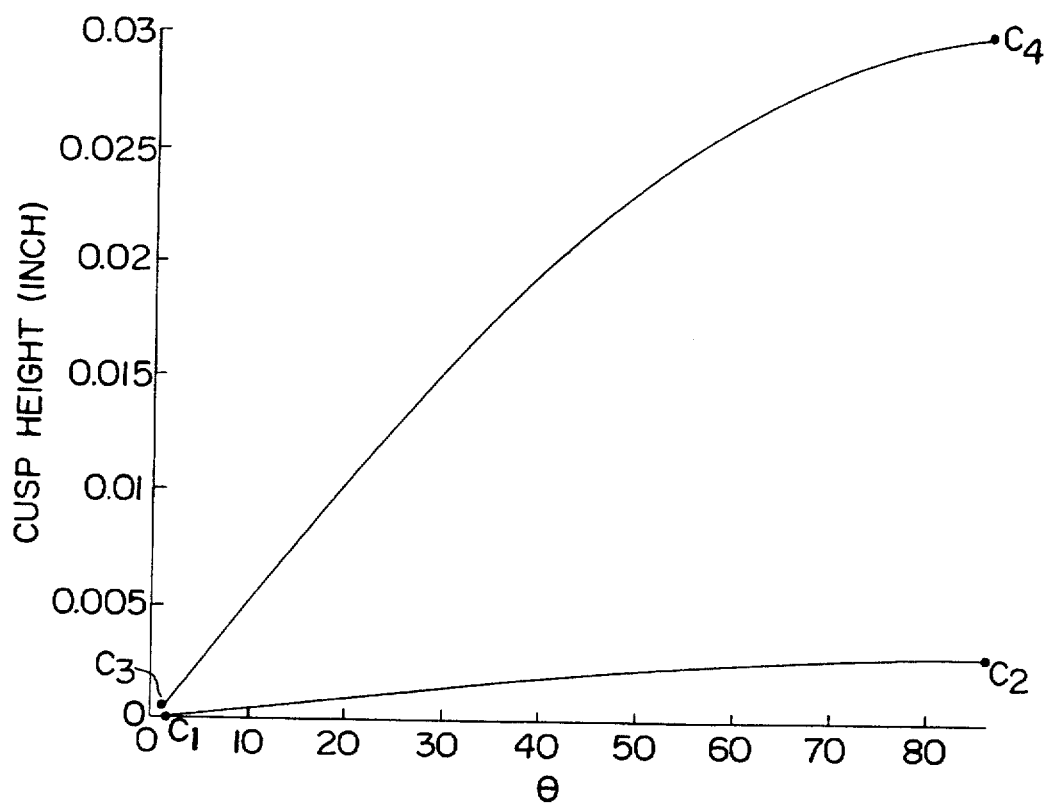
FIG. 23 is a graphical representation of the relationship between the cusp height "c" and the angle $\Theta$.

In accordance with the thickness calculator means of the present invention, the following constraints are considered in determining a desired cusp height "$c_{desired}$". Referring to FIG. 23, which plots the relationship between "c" and the angle theta (Θ) for various values of "l", the following observations can be made. According to a first constraint applied by the thickness calculator means of the present invention, when a uniform layer thickness of $l_n$ is used, the cusp height of the intended object varies from $c_1$ to $c_2$, where $c_1=l_{min}\sin \Theta_{min}$ and $c_2=l_{min}\sin \Theta_{max}$ and is shown by the bottom-most curve in FIG. 23. Similarly, when $l_{max}$ is the layer thickness throughout the intended object, the cusp height varies from $c_3$ to $c_4$, where $c_3=l_{max}\sin \Theta_{min}$ and $c_4=l_{max}\sin \Theta_{max}$ and is shown by the top-most curve in FIG. 23. In the plot, $c_1=c_2=0$, because $\Theta_{min}$ is zero. The constraint equation for the cusp height will then be $c_1 \leq C_{desired} \leq c_4$.

According to a second constraint applied by the thickness calculator means of the present invention, for all values of $c_{desired}$, where $c_{desired}<c_2$, the cusp height, at best, can be varied from $c_{desired}$ to $c_2$ by appropriately varying the layer thickness "l", then the minimum deviation that cannot be avoided is given by $c_2-c_{desired}$.

According to a third constraint applied by the thickness calculator means of the present invention, a constant cusp height throughout the intended object can be maintained for all values of $c_{desired}$ if $c_2 \leq c_{desired} \leq c_3$. This is possible only when $c_3>c_2$, which then becomes the condition for maintaining a uniform cusp height. As shown in FIG. 23, since $c_2<c_2$, a uniform cusp height cannot be achieved.

According to a fourth constraint applied by the thickness calculator means of the present invention, for all values of $c_{desired}$, where $c_{desired}>c_3$, there will be at least one layer having a cusp height that is less than $c_{desired}$ and the deviation from the desired value can be, at best, controlled to $c_{desired}-c_3$.

According to a fifth constraint applied by the thickness calculator means of the present invention, when theta (Θ) is zero (corresponding to a situation lacking any surface complexity), the cusp height "c" is zero for any layer thickness "l". Moreover, when theta is zero, any layer thickness "l" can be used without increasing the cusp height "c". When theta is 90° (corresponding to a situation of infinite surface complexity), the cusp height "c" equals the layer thickness "l".

Figure 24:
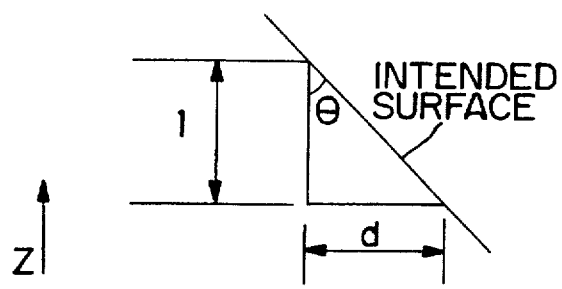
FIG. 24 is a schematic representation of the maximum deviation "d" as a surface attribute with the vertical direction indicated by the letter Z.

A second alternative embodiment of a method of quantifying the "SS error" in accordance with the thickness calculator means of the present invention, relies on a parameter known as the Maximum Deviation. As shown in FIG. 24, in a stair stepping triangle, the side "d" opposite the side equal to the layer thickness "l" indicates the maximum deviation of the layer from the intended surface, which is represented by the hypotenuse of the triangle. Equation 2.4 relates the maximum deviation "d" to the layer thickness "l" and to the slope of the profile as follows.

$$d=l \tan \Theta \quad \text{Equation (2.4)}$$

In this case, the layer thickness "l" is determined such that the maximum deviation "d" is within a value that is defined by the user. According to Equation (2.4), as Θ approaches 0°, "l" approaches infinity. This indicates that at Θ=0°, the surface complexity is zero and the thickness calculator means can select virtually any layer thickness "l" without losing accuracy. However, as explained earlier, the maximum layer thickness selected by the thickness calculator means is limited by the characteristics of the process.

Figure 25:
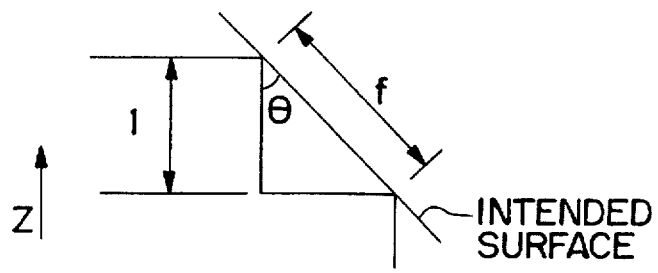
FIG. 25 is a schematic representation of the chord length "l" as a surface attribute with the vertical direction indicated by the letter Z.

Yet another alternative embodiment of a method of quantifying the "SS error" in accordance with the present invention, relies on a so-called "surface attribute parameter" known as the "Chord Length." As shown in FIG. 25, the layer thickness "l" is varied such that the chord length "f" is within a user defined value $f_{desired}$. Equation (2.5) relates the chord length "f" to the layer thickness "l" and to the slope as follows.

$$f = l/\cos\Theta \qquad \text{Equation (2.5)}$$

where, $$0 < \Theta < 90$$

Figure 26:
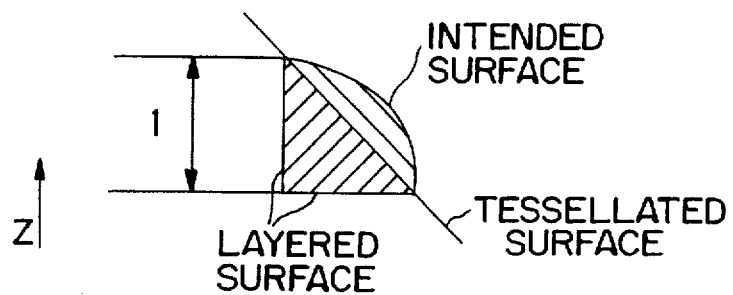
FIG. 26 is a schematic representation of the error between the three surfaces: intended surface, tesselated model of intended surface, and layered model of tessalated surface.

The constraint equation applied by the thickness calculator means of the present invention will be $$f_1 \leq f \leq f_2$$

where $f_1$ is not equal to $1_{min}/\cos\Theta_{min}$
and $f_2$ is not equal to $1_{min}/\cos\Theta_{max}$ When an intended object with a complexity level from $\Theta_{min}$ to $\Theta_{max}$ is considered by the thickness calculator means of the present invention, the chord length "f" at best can be varied from $f_1$ to $f_2$ when $f_1$ and $f_2$ are set to their respective lower limits. As illustrated in FIG. 26, these criteria are useful in an application in which it becomes necessary to compute the deviation of the layered model from not only the tessellated model but also from the original model.

A uniform value of "f" throughout the intended object can be achieved if and only if Equation (2.6) is true:

$$\frac{1_{max}}{\cos\Theta_{min}} \geq \frac{1_{min}}{\cos\Theta_{max}} \qquad \text{Equation (2.6)}$$

If Equation (2.6) is true, then the thickness calculator means of the present invention keeps the "surface attribute" "f" uniform by setting the value of "f" such that $$\frac{1_{max}}{\cos\Theta} \geq f \geq \frac{1_{min}}{\cos\Theta_{max}} \qquad \text{Equation (2.7)}$$

This is derived using a similar logic on which the condition for a uniform surface quality is based.

The fourth alternative embodiment of a method of quantifying the "SS error" in accordance with the thickness calculator means of the present invention, relies on a parameter known as the "Volumetric Error." However, the following volumetric analysis of layered and tessellated models is required before formulating the criteria for relating SS error to layer thickness "l" based on volumetric error.

Figure 27:
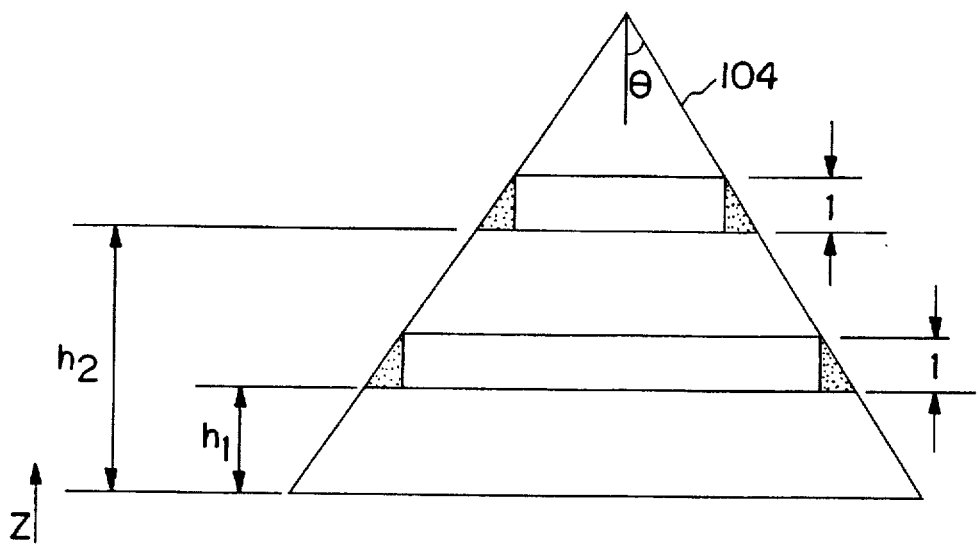
FIG. 27 is a schematic representation illustrating the volummetric loss in a layered model with the slice axis direction indicated by Z.

Typically, a layered model can lose or gain volume over the tessellated model based on whether the SS error is positive or negative. The following analysis is done assuming a negative SS error. However, the results of this analysis can be applied for either positive or negative values of SS error. Loss of volume in layered models of an intended object with a complexity level more than 0° is common and also inevitable (unless the process is modified). Volumetric loss is related not only to the layer thickness and to the surface complexity but also to the cross-sectional size of the layer. This is illustrated in FIG. 27 by considering two layers of the same thickness "l" but located at different heights $h_1$ and $h_2$ of the cone 104 shown in cross-section as the intended object. Due to the larger cross-section at $h_1$, the loss of volume at $h_1$ exceeds the loss of volume at $h_2$. Thus, the volumetric error is a function of the size of the cross-section in addition to e and "l" and can be represented as:

Loss of volume per layer=$f(\Theta, l, p)$ where "p" is the perimeter of the layer having thickness "l".

It will not be feasible to maintain a constant volumetric error from one layer to the next layer, because of large variations in the perimeter from layer to layer. Any attempt by the thickness calculator means of the present invention to maintain a constant volumetric error by varying the layer thickness is likely to lead to unacceptable form errors. One alternative to keeping the volumetric error constant from one layer to the next layer, could be the selection of an attribute "V" such as the volumetric loss per unit length and keeping such attribute constant. Equation (2.7a) presents this relationship in general.

$$V = \text{loss of volume/perimeter of layer} \qquad (2.7a)$$

Figure 28A:
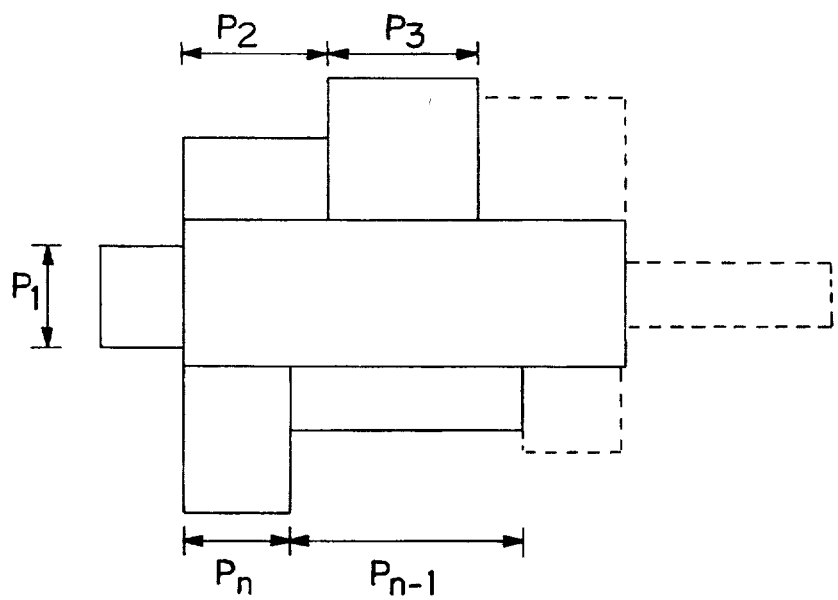
FIG. 28(a) schematically illustrates the volumetric error due to Stair Step (SS) error for a single layer of a layered model having "n" surface complexities and shown in a top plan view.
Figure 28B:
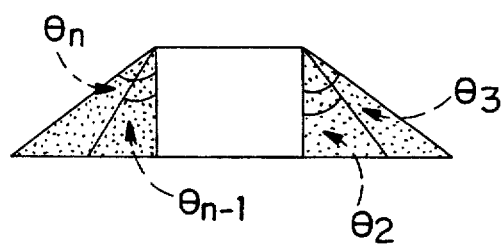
FIG. 28(b) schematically illustrates the volumetric error due to SS error for a single layer of a layered model having "n" surface complexities and shown in a side plan view.
Figure 28C:
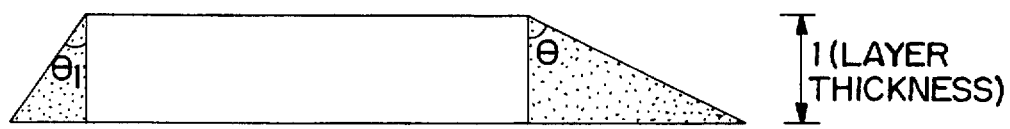
FIG. 28(c) schematically illustrates the volumetric error due to SS error for a single layer of a layered model having "n" surface complexities and shown in a front plan view.

For example, as shown in FIGS. 28(a), 28(b) and 28(c), consider a single layer that is bounded by "n" surfaces and has "n" levels of complexity. The stippled regions in FIGS. 28(b) and 28(c) schematically represent the volume that is lost due to SS error.

$$\text{Volumetric loss} = a_1 p_1 + a_2 p_2 \ldots + a_{n-1} p_{n-1} + a_n p_n$$

Where $a_1 - a_n$ are cross-sectional areas and $p_1 - p_n$ are perimeters. Thus, if V represents the volumetric loss per unit of length of the perimeter, then V can be expressed $$\underline{V} = \frac{(a_1 p_1 + a_1 p_2 \ldots + a_{n-1} p_{n-1} + a_n p_n)}{p_1 + p_2 \ldots + p_{n-1} + p_n}$$

which also can be expressed as $$\underline{V} = \frac{\sum_{i=1}^{n} a_i p_i}{\sum_{i=1}^{n} p_i}$$

Further, $$a_i = \frac{l^2 \tan\Theta_i}{2}$$

Therefore, $$\underline{V} = \frac{l^2 \sum_{i=1}^{n} \tan\Theta_i p_i}{2 \sum_{i=1}^{n} p_i} \qquad (2.8)$$

$$l = \sqrt{\frac{2 \sum_{n=1}^{n} p_i \underline{V}}{\sum_{i=1}^{n} \tan\Theta_i p_i}} \qquad (2.9)$$

Figure 29:
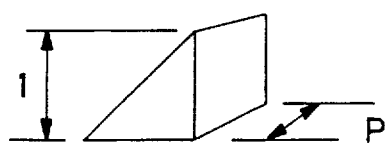
FIG. 29 is an elevated perspective view of three-dimensional strip of a layer having a thickness "l" measured in the Z direction (the slice axis) and a perimeter length "p" measured in a linear direction that is normal to the Z direction.

Assuming that "p" and $\Theta$ are constants for a given geometry, a suitable layer thickness "l" can be found for a V chosen by the user. For example, as shown in perspective in FIG. 29, a three-dimensional strip of a layer has a thickness "l" measured in the Z direction (the slice axis), and has a perimeter length "p" measured in a linear direction that is normal to the Z direction. The constraint equation for V can be obtained as follows:

$$\underline{V} = \frac{\text{Total Volume of the Strip}}{p} = \frac{l^2}{2} \tan\Theta_i$$

V can be minimized by setting "l" to $l_{min}$ $$\underline{V}_{min} = \frac{l^2_{min}}{2} \tan\Theta_i$$

For a part with a complexity from $\Theta_{min}$ to $\Theta_{max}$, v varies from $V_1$ to $V_2$ such that $$V_1 \leq V \leq V_2 \qquad (2.16)$$

Where, $V_1$ is not less than $$\frac{l_{min}^2}{2} \tan\theta_{min}$$

$V_2$ is not less than $$\frac{l_{min}^2}{2} \tan\theta_{max}$$

A uniform volumetric error per unit length of the perimeter (V) throughout the model can be achieved only if $$\frac{l_{min}^2}{2} \tan\theta_{min} \geq \frac{l_{min}^2}{2} \tan\theta_{max} \qquad (2.09)$$

If this condition (2.09) is true, the thickness calculator means of the present invention achieves a uniform V by setting V such that:

$$\frac{l_{min}^2}{2} \tan\theta_{min} \geq \underline{V} \geq \frac{l_{min}^2}{2} \tan\theta_{max} \qquad (2.10)$$

Constraint equation (2.10) has been obtained using a logic similar to the logic underlying the constraint equation for a uniform surface quality. Expressing the geometrical error in terms of volumetric error per unit of perimeter length is particularly useful in applications concerned with manufacturing parts for components of space vehicles or any portion of the payload carried by space vehicles. In such applications, space and weight are major constraints, and the V parameter enables the user to control these characteristics of the part to be manufactured.

In accordance with the present invention, the thickness calculator means varies the slice thickness "1" according to a strategy that is easy to implement and independent of other criteria. That is, this same strategy for varying the slice thickness "1" can be used for any criteria that the user might come up with in the future. As embodied herein and explained below, the strategy by which the thickness calculator means selects the slice thickness is successfully tested for three different criteria. In connection with these explanations, a few simple rules, based on observation and logical reasoning, are defined and act as tools that facilitate this adaptive slicing process. Such rules are explained as and when necessary.

The first such rule (Rule 3.1) to be observed by the thickness calculator means states that: Triangles which are either contained in or lying completely below the current slice plane, which is designated by $Z_{curr}$ and defines the slice plane for which intersection points are being computed, will not, in any way, influence the location of the slice plane immediately above. For instance, if a cone is mounted on a cube and the current slice plane is passing through the top face of the cube (intersection plane of cube and cone), only the triangles of the cone but not the triangles of the cube will affect the location of the next slice plane.

Once again, for the sake of simplifying the following explanation of the strategy by which the thickness calculator means selects the intersection of the next slice plane in accordance with the present invention, the slice axis is arbitrarily chosen to be the Z-axis. The first slice plane must always pass through the lowest Z-value of the object to ensure that the bottom face is retained in the sliced model. This step in the strategy of selecting the triangles for calculating the intersection with the slice plane is a step that applies to any desired object and serves as a good starting point for adaptive slicing of a model of the desired tesselated object. As noted above, $Z_{curr}$ indicates the height of the current slice plane. Now, to calculate the height of the next slice plane, $Z_{next}$, each of the triangles which satisfies the condition for intersection (which condition is explained below) with the current slice plane $Z_{curr}$ is taken into consideration by the thickness calculator means. This ensures that the triangles selected by the thickness calculator means are limited to those triangles which: (1) share either an edge or a vertex and lie above the current slice plane or (2) pass through the current slice plane. Any triangle which shares an edge or a vertex but lies below the current slice plane $Z_{curr}$ is eliminated from the group of triangles selected by the thickness calculator means. Of course, there will not be any triangles below the very first slice plane. This selection strategy employed by the thickness calculator means also eliminates from the group of selected triangles, horizontal triangles which lie in the current slice plane. Furthermore, all triangles which survive the elimination process employed by the thickness calculator means satisfy Rule 3.1. The intersection condition developed earlier, thus plays a dual role, (1) avoidance of redundancies and (2) selection of the group of triangles which satisfy Rule 2.1 for the purpose of calculating the thickness of the layer.

Because of the operation of the facet processor means, which has grouped the triangles according to Z-min and subgrouped the groups according to Z-max, the grouped data file and the subgrouped data file exist. Thus, the process employed by the thickness calculator means to select triangles to be used in determining the layer thickness does not require a triangle-by-triangle check. Instead, the thickness calculator means performs its checking by checking the grouped data file and the subgrouped data file. In accordance with the present invention, the checking occurs facet group-by-facet group rather than triangle-by-triangle, thus saving enormous computation time.

Figure 30:
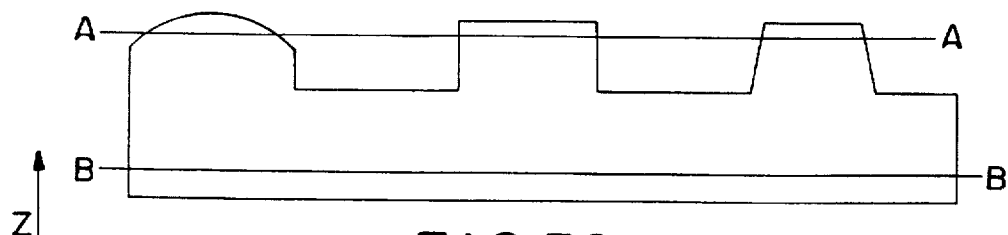
FIG. 30 schematically illustrates three protrusions in an object being intersected by the slice planes A—A and B—B.

There might be one or more facet groups which will have an intersection with the slice plane. Again, there might be one or more facet subgroups in each such facet group which will have an intersection with the slice plane. All such facet groups and facet subgroups intersecting the slice plane are identified by the thickness calculator means and then are merged by the thickness calculator means to form a single new group. Interestingly, all the triangles in that merged group produced by the thickness calculator means form either: (1) a single, non-intersecting continuous chain representing a closed surface or (2) multiple, non-intersecting continuous chains, wherein each such chain represents a closed surface. For instance, as shown in FIG. 30, the slice plane at B—B passes through a single, non-intersecting continuous chain of triangles, while the slice plane at A—A passes through multiple (three), non-intersecting continuous chains of triangles. The three chains intersected by slice A—A represent the three closed surfaces, the hemisphere, the rectangular block, and the truncated cone. This leads to the following important axiom (Rule 3.2) that is employed by the thickness calculator means: For any closed surface, there can be one and only one continuous chain of triangular facets per slice plane.

As discussed earlier, the surface complexity can vary in each layer, and in each layer there can be any number of levels of surface complexity. However, in accordance with the present invention, the worst case, i.e., the most complex surface, in each layer is selected by the thickness calculator means when determining how to vary the layer thickness. As embodied herein, the thickness calculator means identifies from the current chain or chains of triangles the controlling normal that represents the most complex surface.

In theory, there can be as many controlling normals as there are chains, and the thickness calculator means can vary the slice thickness for each chain separately. The procedure essentially remains the same. However, this most meticulous procedure is not implemented in the thickness calculator means embodiment presented in the Appendix.

Next, depending on the user defined criteria, any of the four equations (2.3; 2.4; 2.5; 2.10) derived earlier (or any new relationship for other criteria developed by the user) can be used to calculate the layer thickness "l". Then, $Z_{tmp}$, which is the height of the next probable (temporary, hence the "trap" subscript) slice plane, is simply the sum of $Z_{curr}$ and "l". In the thickness calculator means of the present invention, $Z_{tmp}$ still need not represent the height of the next slice plane $Z_{next}$, for two reasons. First, the thickness calculator means checks to determine whether there could be a key characteristic (KC) between $Z_{curr}$ and $Z_{tmp}$. If a KC does exist in this location, then the thickness calculator means employs a back tracking means to deal with this KC in order to retain this KC in the model. Second, the thickness calculator means checks to determine whether there could be a sudden change in the level of surface complexity between $Z_{curr}$ and $Z_{tmp}$. If a sudden change in the level of surface complexity does exist in this location, then the thickness calculator means employs a back tracking means (that is either a simple back tracking means or a repeated back tracking means) to deal with this sudden change in the level of surface complexity in order to retain this sudden change in the level of surface complexity in the model.

Figure 31A:
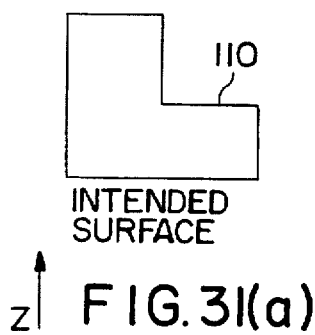
FIG. 31a–31c are a schematic representation of how the back tracking means of the present invention provides the ability to retain a key characteristic in a layered model of an intended object.
Figure 31B:
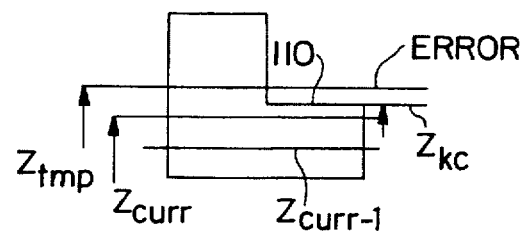

First, in explaining how the thickness calculator means deals with a KC, consider the presence of a KC in the form of a horizontal face indicated by the designating numeral 110 in FIG. 31(a). In accordance with the present invention, if the KCI means identifies a KC 110 located between $Z_{tmp}$ and $Z_{curr}$ as shown in FIG. 31(b), such KC would be in the key characteristic data file in the form of $Z_{KC}$, which represents the height of the KC and which is available to the thickness calculator means. As shown in FIG. 31(b), the "Error" is the distance along the Z-axis between $Z_{temp}$ and $Z_{KC}$.

Figure 31C:
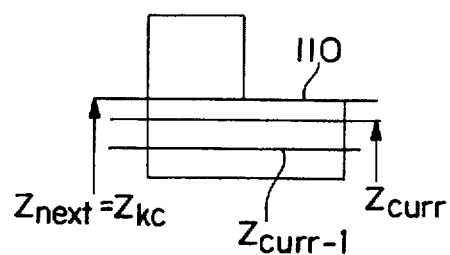

In accordance with the present invention, the thickness calculator means includes a means for back tracking the selection of the temporary slice plane at height $Z_{tmp}$ upon encountering a KC so that the temporary slice plane corresponds to the slice plane lying in the plane of the KC at height $Z_{KC}$. Desirably, a computer is programmed to function as the back tracking means. The back tracking means is programmed conveniently on the same computer on which the thickness calculator means, the key characteristic identifier means and the facet processor means is programmed. As embodied herein, the back tracking means is programmed in C language on a Sun Microsystem® work station. A presently preferred embodiment of such program for the back tracking means is contained in pages 25–29 of the Appendix which forms a part of this patent application. As shown in FIG. 31(c), the back tracking means assumes that $Z_{tmp}$ has the value of $Z_{KC}$, and chooses this value as $Z_{next}$.

Second, in accordance with the present invention, the thickness calculator means includes a means for accommodating the presence of a sudden change in the degree of surface complexity in the intended object. The means for accommodating the presence of a sudden change in the degree of surface complexity is complicated and thus merits the following detailed discussion. In accordance with the present invention, in order to ensure retention of a sudden change in the degree of surface complexity of the intended object, the thickness calculator means implements a back tracking strategy in the process of determining the intersection of the next layer in the model of the intended object. As the name suggests, the back tracking means adjusts the position (forward and backward) of the slice plane along the slice axis until a pre-selected attribute has been satisfied. Back tracking becomes desirable in an adaptive slicing process because the thickness of the next layer, and accordingly the height of next slice plane above the current slice plane, are not known beforehand.

When employing back tracking to ensure retention of a sudden change in the degree of surface complexity of the intended object, the thickness calculator means of the present invention ignores the notion that the thickness of the next layer depends on the current complexity level (or may be derived from the current chain of facets). Instead, when the thickness calculator of the present invention employs the back tracking to ensure retention of a sudden change in the degree of surface complexity of the intended object, the criteria used by the thickness calculator means to select the thickness ($l_{next}$) of the next layer are: (1) the number of changes in complexity that occur within a distance of $l_{max}$ from the current slice plane and (2) the effect of each change in complexity that occurs within the same distance $l_{max}$ from the current slice plane. If the number of changes in complexity within that distance $l_{max}$ from the current slice plane is "n," then the effect of each one of them must be considered by the back tracking means in order to determine $l_{next}$ in accordance with the present invention.

The back tracking means used by the thickness calculator means to ensure retention of a sudden change in the degree of surface complexity of the intended object, can be classified into two types: (1) simple back tracking and (2) repeated back tracking. In accordance with the present invention, the thickness calculator means employs a simple back tracking means for cases having only one change of complexity and is explained first. Desirably, a computer is programmed to function as the simple back tracking means. The simple back tracking means is programmed conveniently on the same computer on which the thickness calculator means, the key characteristic identifier means and the facet processor means are programmed. As embodied herein, the simple back tracking means is programmed in C language on a Sun Microsystem® work station. A presently preferred embodiment of such program for the simple back tracking means is contained in pages 25–29 of the Appendix which forms a part of this patent application.

Figure 33:
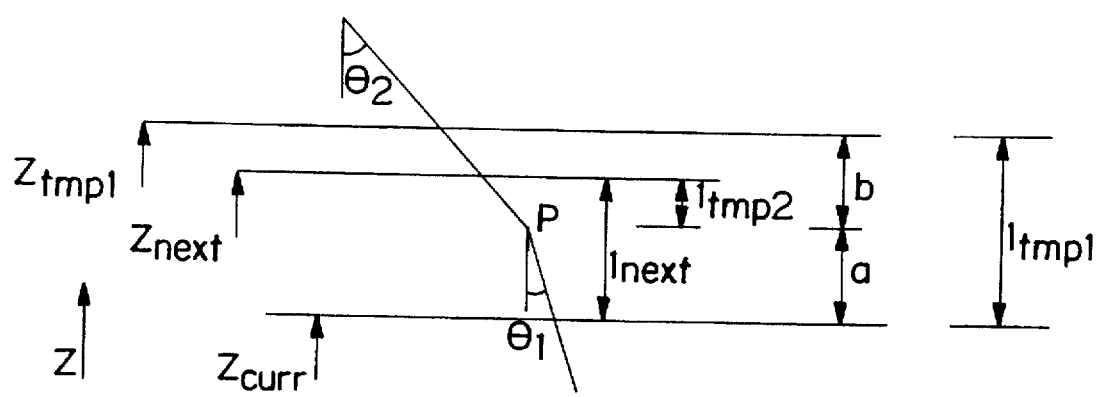
FIG. 33 is a schematic representation showing how the simple back tracking means of the present invention provides the ability to retain a change in the level of surface complexity in a layered model of an intended object.

To illustrate an example of simple back tracking, assume a surface with a one time slope discontinuity located at "P" immediately above the position $Z_{curr}$ of the current slice plane as shown in FIG. 33. The letter "P" designates the transition point between the two complexity levels, each complexity level being indicated by the respective slopes $\Theta_1$ and $\Theta_2$ of the cross-section of the desired object. In accordance with the present invention, whenever the complexity level of the profile increases when moving along the profile from a point just before P to a point just beyond P, the thickness calculator means uses the simple back tracking means to determine the position $Z_{next}$ of the next slice plane. In further accordance with the present invention, when the complexity level of the profile decreases when moving along the profile from a point just before P to a point just beyond P, the thickness calculator means forgoes employing simple back tracking to determine the position of the next slice plane. This can be proved mathematically as follows.

As shown in FIG. 33, the position of the current slice plane is denoted by $Z_{curr}$, the starting assumption for the thickness of the next layer is denoted by $l_{imp1}$, and the slope of the cross-section of the desired object that intersects the position $Z_{curr}$ of the current slice plane is indicated by $\Theta_1$. After reaching $Z_{curr}$, the initial assumption for the thickness of the next layer thickness $l_{imp1}$, the "temporary" thickness of the next layer so to speak, is calculated by the thickness calculator means with respect to $\Theta_1$. As can be seen, the location of P provides a convenient point of demarcation for dividing $l_{imp1}$ into two components "a" and "b." Component "a" is the portion of $l_{imp1}$ before the change of complexity from $\Theta_1$ to $\Theta_2$, and component "b" is the portion of $l_{imp1}$ after the change of complexity from $\Theta_1$ to $\Theta_2$. A second temporary assumption for the thickness of the next layer thickness is denoted in FIG. 33 by $l_{imp2}$, and $l_{imp2}$ is then calculated considering the new complexity $\Theta_2$. Note that $l_{imp2}$ is measured from P, the transition point between the two complexity levels $\Theta_1$ and $\Theta_2$.

In a first case, a decrease in the complexity level is indicated to the thickness calculator means if the slope of the cross-section of the surface of the intended object intersecting $Z_{curr}$ is greater than the slope of the cross-section of the surface of the intended object on the other side of P, i.e., $\Theta_1 > \Theta_2$. In this first case, since layer thickness increases as the complexity level decreases, $l_{imp2}$ will be more than $l_{imp1}$. Thus, the thickness calculator means need not consider $l_{imp2}$ for the simple reason that the surface attribute will exceed the allowable limit $l_{max}$ chosen by the user. In accordance with the present invention, the thickness calculator means does not employ the simple back tracking means to determine the location ($Z_{next}$) of the next slice plane because the location ($Z_{next}$) of the next slice plane is already calculated based on $l_{imp1}$. This corresponds to the case $Z_{next} = Z_{imp1}$.

In a second case, no change in complexity level is indicated to the thickness calculator means if the slope of the cross-section of the surface of the intended object intersecting $Z_{curr}$ equals the slope of the cross-section of the surface of the intended object on the other side of P, i.e., $\Theta_1 = \Theta_2$. In this second case, $l_{imp2}$ will be equal to $l_{imp1}$, and in accordance with the present invention, the thickness calculator means is configured so that it does not employ the simple back tracking means to determine the position $Z_{next}$ of the next slice plane. This again corresponds to the case $Z_{next} = Z_{imp1}$.

In a third case, an increase in complexity level is indicated to the thickness calculator means if the slope of the cross-section of the surface of the intended object intersecting $Z_{curr}$ is less than the slope of the cross-section of the surface of the intended object on the other side of P, i.e., $\Theta_1 < \Theta_2$. In this third case, which is shown in FIG. 33, since layer thickness decreases as the complexity level increases, $l_{imp2}$ will be less than $l_{imp1}$. Then if $l_{imp2} > b$ then $Z_{next} = Z_{imp}$, and in accordance with the present invention, the thickness calculator means does not employ the simple back tracking means to determine the location of the next slice plane (and accordingly the thickness of the next layer in the model of the intended object). Similarly, if $l_{imp2} = b$, then $Z_{next} = Z_{imp}$, and in accordance with the present invention, the thickness calculator means does not employ the simple back tracking means to determine the location of the next slice plane (and accordingly the thickness of the next layer in the model of the intended object). Finally, if $l_{imp2} < b$, then $Z_{next} = Z_{curr} + a + l_{imp2}$, and in accordance with the present invention, the thickness calculator means employs the simple back tracking means to back track the position $Z_{imp1}$ of the initial temporary slice plane to the position $Z_{curr} + a + l_{imp2}$.

Two important observations can be made from the above analysis. First, the thickness calculator means is configured so that it does not employ the simple back tracking means when there is a sudden decrease in complexity level. Second, the thickness calculator means is configured to employ the simple back tracking means only in those certain cases in which the complexity level increases suddenly. In accordance with the present invention, the thickness calculator means is configured to decide to employ the simple back tracking means based not only on the value of the new complexity level relative to the current complexity level but also based on the location of the current slice plane $Z_{curr}$ with respect to the transition point (P) denoting the change from the current complexity level to the new complexity level.

Figure 34:
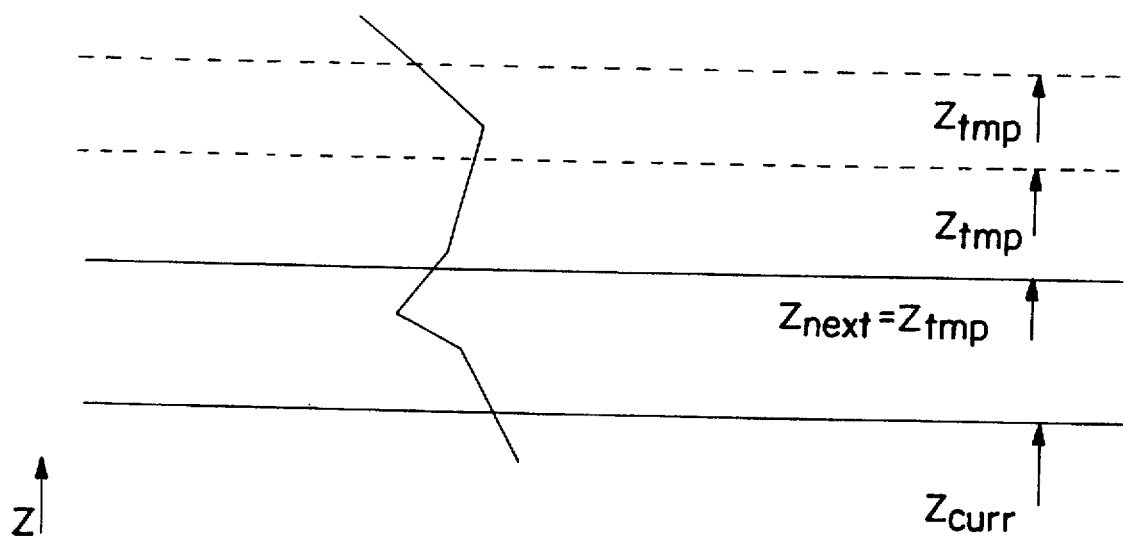
FIG. 34 is a schematic representation showing the usefulness of repeated back-tracking in accordance with the present invention in cases of multiple changes in the level of complexity between $Z_{curr}$ and $Z_{imp}$.

However, as illustrated in FIG. 34 for example, a thickness calculator means configured with a simple back tracking means as explained above, fails to retain sudden changes in the complexity level when determining the position of the next slice plane if multiple levels of complexity are encountered between the current slice plane $Z_{curr}$ and the initial temporary slice plane $Z_{imp1}$. Therefore, in accordance with the present invention, the thickness calculator means is configured to employ a repeated back tracking means to handle this fourth case of multiple levels of complexity disposed between the current slice plane $Z_{curr}$ and the initial temporary slice plane $Z_{imp1}$. The configuration of the repeated back tracking means employed by the thickness calculator means for handling this fourth case is based on the fact that there will be as many transition points $P_1$, $P_2$, $P_3$, ... $P_n$, as the number of complexity levels $\Theta_1$, $\Theta_2$, $\Theta_3$, ... $\Theta_n$. Desirably, a computer is programmed to function as the repeated back tracking means. The repeated back tracking means is programmed conveniently on the same computer on which the thickness calculator means, the key characteristic identifier means and the facet processor means are programmed. As embodied herein, the repeated back tracking means is programmed in C language on a Sun Microsystem® work station. A presently preferred embodiment of such program for the repeated back tracking means is contained in pages 26–27 of the Appendix which forms a part of this patent application.

In accordance with the present invention, after reaching $Z_{imp1}$, the thickness calculator means is configured to initiate a search to find any transition point P lying between the current slice plane $Z_{curr}$ and the initial temporary slice plane $Z_{imp1}$. If such search finds a transition point, the thickness calculator means is configured to initiate an additional procedure. According to this additional procedure, the thickness calculator means is configured to calculate the height of a new slice plane from the transition point $P_c$ that is closest to $Z_{curr}$. The transition point $P_c$ may be referred to as the lowest of all of the transition points. If the height of the new slice plane is more than or equal to $Z_{imp1}$, the thickness calculator means ignores this transition point $P_c$ closest to $Z_{curr}$ and focuses on the transition point $P_{c+1}$ immediately above $P_c$. The transition point $P_{c+1}$ is the second closest transition point to $Z_{curr}$. If the height of the new slice plane is less than $Z_{imp1}$, then the thickness calculator means replaces $Z_{imp1}$ with the new height. Then, the thickness calculator means considers the group of transition points between the current transition point ($P_c$ or $P_{c+1}$) and $Z_{imp1}$, and again employs the repeated back tracking means as described above until each transition point has been checked.

In accordance with the present invention, the thickness calculator means identifies transition points, which is the key to a successful implementation of this logic, by looking for new facet groups between $Z_{curr}$ and $Z_{imp1}$. Each new facet group corresponds to a possible change in the complexity level. When the thickness calculator means identifies facet groups between $Z_{curr}$ and $Z_{tmp1}$, the thickness calculator means first considers the facet group that is closest to $Z_{curr}$. The complexity level of the surface being represented by the new facet group is determined by the thickness calculator means from the new facet group's controlling normal, which is the normal that makes the greatest angle with the current slice plane $Z_{curr}$ and must belong to a facet through which the current slice plane $Z_{curr}$ is passing. If there is an increase in complexity, then the thickness calculator means employs the simple back tracking means to apply the procedure described above in the third case for $\Theta_1 < \Theta_2$. If back tracking is not necessary, then the thickness calculator means considers the facet group immediately above the earlier group and repeats the procedure.

However, when back tracking is performed by the thickness calculator means, then $Z_{tmp1}$ assumes a new value. Then, all groups lying between the current group and the new $Z_{tmp1}$ are considered by the thickness calculator means, which repeats the procedure until there are no more facet groups to be checked.

Figure 35:
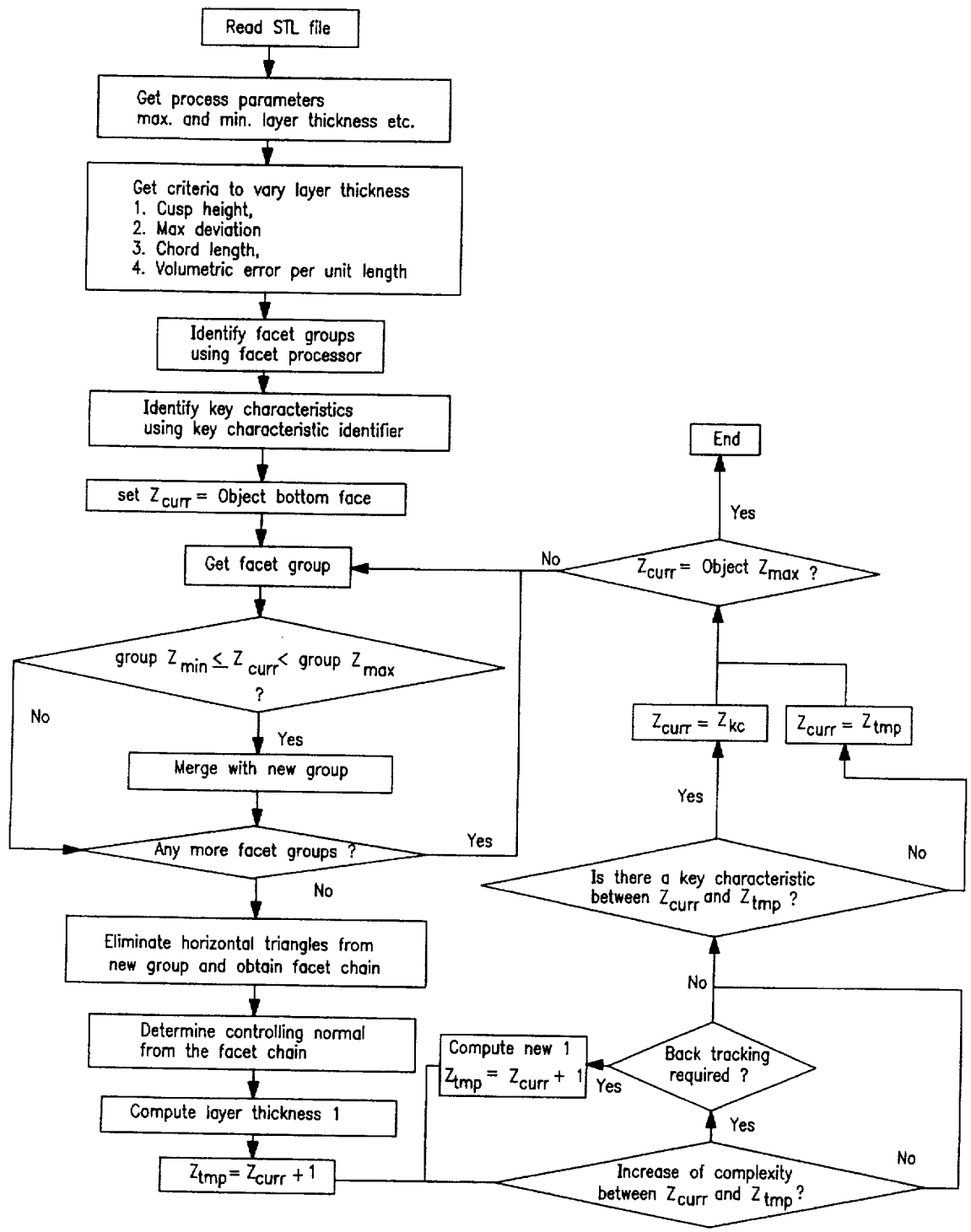
FIG. 35 is a schematic representation of a flow chart for adaptive slicing in accordance with the present invention.

These steps are followed by the thickness calculator means until the top of the intended object is reached. Since the top face of the intended object is considered a key characteristic (KC), the last slice plane inevitably passes through the top face of the intended object. This completes adaptive slicing of the model of the intended object. The flow chart shown in FIG. 35 schematically illustrates the various steps involved in adaptive slicing as performed by the thickness calculator means of the present invention.

In accordance with the present invention, a slicer means is provided for operating on the sorted facet file, the grouped facet file, the subgrouped facet file and the layer thickness data file to compute the intersection between each slice plane and each facet of the STL file at any given height and in the way that is least expensive, i.e., uses computer time most efficiently. In accordance with the present invention as shown schematically in FIG. 4, the thickness calculator means 60 feeds the heights ($Z_1$, $Z_2$, $Z_3$, etc.) in the layer thickness data file to the slicer means 62, and the facet processor means 56 feeds logically arranged facet groups and facet subgroups to the slicer means 62. The slicer means is configured to calculate the intersection of each slice plane disposed at a height above the previous slice plane by the thickness ($l_1$, $l_2$, $l_3$, etc.) calculated by the thickness calculator means for each layer of the model of the intended profile represented by the STL file and to produce a slice plane intersection data file. The slicer means is configured to be programmed on a computer. As embodied herein, the slicer means is programmed in C language on a Sun Microsystem® work station. A presently preferred embodiment of such slicer means program is contained in pages 31–41 of the Appendix which forms a part of this patent application. The working details of the slicer means are presented next.

Figure 36:
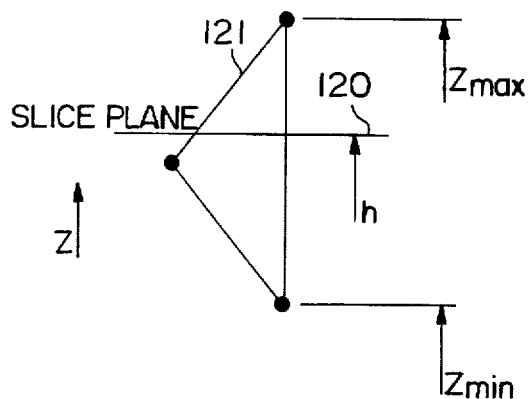
FIG. 36 is a schematic representation of the intersection of a slice plane and a simple triangle.

In an exemplary case shown in FIG. 36 for example, a slice plane 120 at a height "h" will have an intersection with a triangle 121 denoting a facet, if the following Condition (2.11) is satisfied.

$$Z_{min} \leq h \leq Z_{max} \qquad (2.11)$$

Figure 1C:
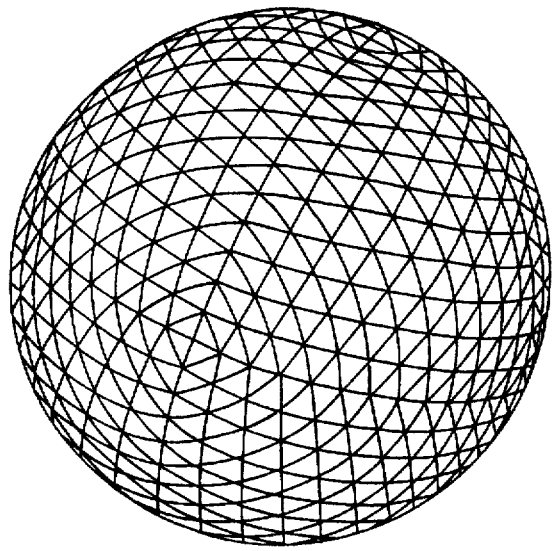
FIGS. 1A–1C are an elevated perspective view of three prior art tesselated representations of a sphere, wherein FIG. 1(a) employs 67 facets, FIG. 1(b) employs 450 facets, and FIG. 1(c) employs 1450 facets.
Figure 1B:
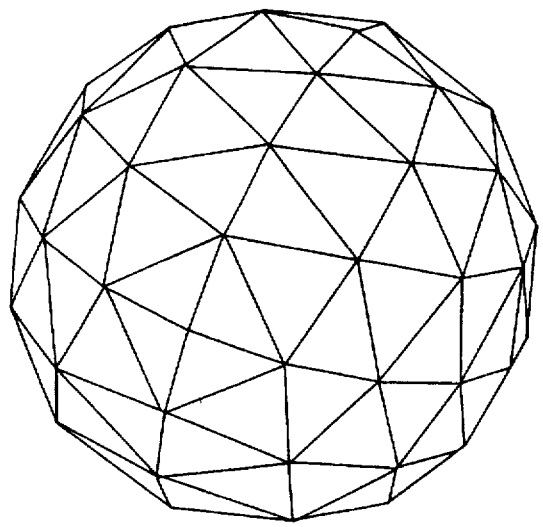
Figure 1A:
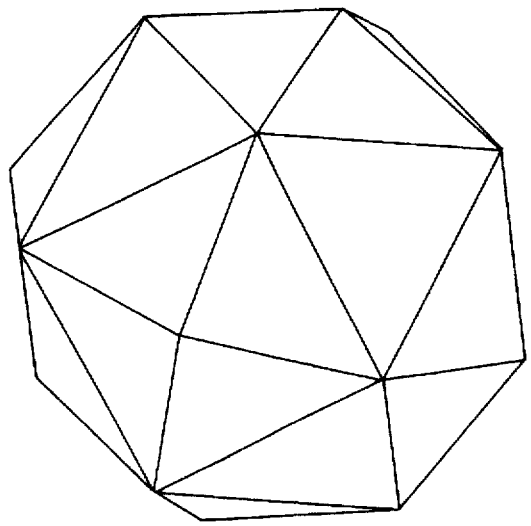
Figure 2:
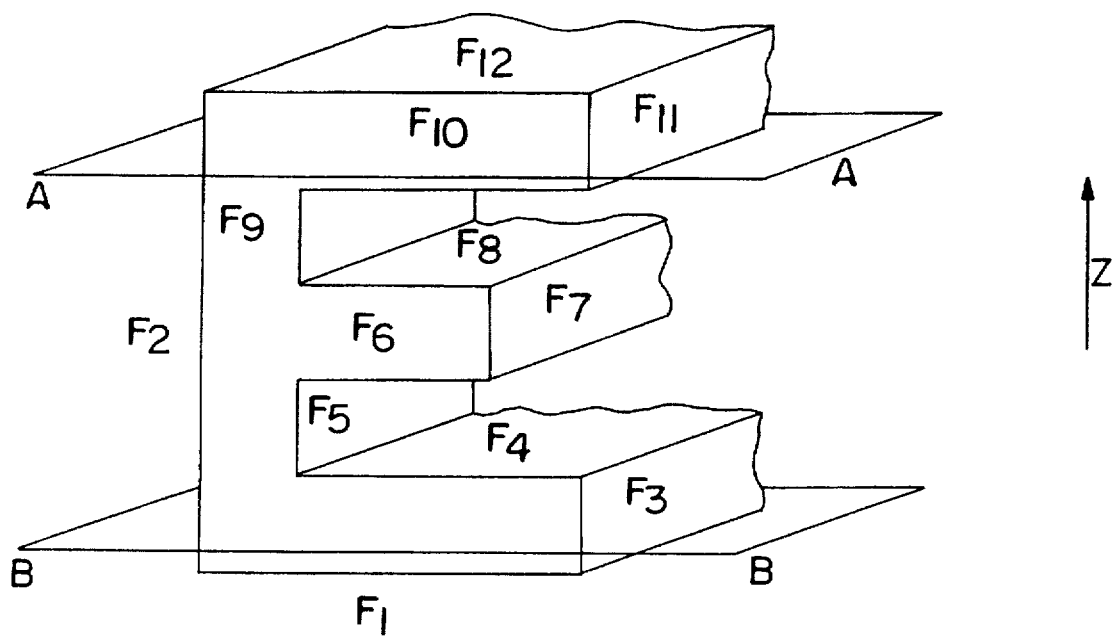
FIG. 2 is an elevated perspective view of an E-shaped block wherein each face has been assigned a separate designation, and two intersecting slice planes A—A and B—B are shown perpendicular to the vertical direction indicated by the arrow labeled "Z"
Figure 37:
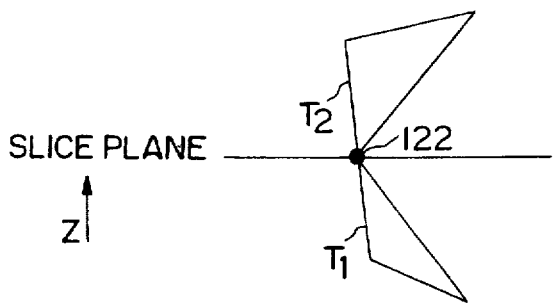
FIG. 37 is a schematic representation of a slice plane passing through a common vertex of two triangles.

However, the imposition of Condition (2.11) leads to redundancies. To illustrate how these redundancies might arise, recall the cube example described in FIGS. 1.8 and 1.9. As shown therein, a total of ten triangles, $T_3$ to $T_{10}$ of facet group1 and $T_{11}$ and $T_{12}$ of facet group2, meet at the top face and share vertices. When the slice plane passes through the top face of the cube, technically each of these 10 triangles will have an intersection. However, this leads to unnecessary and duplicate intersection points. In accordance with the present invention, the slicer means is configured to employ the following Rule 4.1 to avoid such redundancies. Rule 4.1: When a slice plane passes through a common vertex shared by two triangles and the common vertex forms the first vertex ($Z_{min}$) of the three vertices of one of the triangles and the last vertex of the three vertices of the other one of the triangles, for all computational purposes, the common vertex is considered to belong to the former triangle. Applying this Rule 4.1 shown in FIG. 37 for example, the common vertex 122 shared by triangle $T_1$ and triangle $T_2$ is the $Z_{min}$ vertex of triangle $T_2$, and accordingly the computation is performed by the slicer means under the assumption that the common vertex shared by triangle $T_1$ and triangle $T_2$ belongs to triangle $T_2$ only. Now the modified Condition (2.12) for an intersection will be $$Z_{min} \leq h \leq Z_{max} \qquad (2.12)$$

This Condition (2.12) can be applied to facet groups, to facet subgroups and to individual triangles.

Assume that "h" is the height at which the intended object is to be sliced by the thickness calculator means. There might be one or more facet groups which will have an intersection with a slice plane passing through the intended object at the height "h". Again, there might be one or more facet subgroups in each such facet group which will have an intersection with such slice plane. Applying the Condition (2.12) for intersection derived above, all such facet groups and facet subgroups are identified by the slicer means and merged to form a single new group. This new merged group defines a facet chain. All the facets in this merged group when properly ordered, will form a closed facet chain that is ordered according to a sequence determined by facets sharing common edges or common vertices.

According to the Slicing Axiom defined above, there will always be one continuous chain of triangles through which a slice plane passes. As explained previously, such chains are already obtained in accordance with the present invention by merging facet groups and facet subgroups. Now, the slicer means calculates intersections for each triangle in the chains by using basic analytic geometry. There are two types of intersections, a vertex intersection and an edge intersection, and each requires its own separate treatment by the slicer means in accordance with the present invention.

If the slice plane is passing through the vertex (active vertex) of a triangle (active triangle), the slicer means calculates the intersection point (which is nothing but the coordinates of the vertex) and stores the identity of the active triangle in the slice plane intersection data file in a manner so that the slicer means will not check this triangle for an intersection with the current slice plane a second time. When linked lists in C language are used, the active triangle can be dropped altogether, saving an enormous amount of computation time. For the next intersection, the first facet encountered that shares the active vertex is checked for intersection by the slicer means. This next facet to be checked by the slicer means must have at least one more vertex, other than the active vertex, or an edge through which the slice plane passes. (If not, it is a discontinuous chain, violating the slicing axiom. The STL file may be repaired, if necessary, before proceeding further). The intersection point is calculated by the slicer means and included in the slice plane intersection data file. This process is repeated until the chain of facets that intersect with the slice plane is complete.

If the slice plane is passing through the edge (active edge) of a triangle (active triangle), the slicer means calculates the intersection point and records the active triangle in the slice plane intersection data file in a manner so that the active triangle will not be checked a second time. There will be only one triangle in the chain that shares the active edge, and the slicer means identifies this one triangle by a simple comparison. The slicer means finds the triangle that shares an active edge by checking every triangle in the chain. This is necessary because the triangles are not in any order inside the chain. The slicer means terminates the search only when the slicer means finds the triangle which shares an active edge.

There still remains one more problem. Facets in each facet subgroup are not yet arranged in any geometrically coherent order. In other words, after the facets have been sorted, grouped and subgrouped, it still is not known whether facet $T_1$ is next to facet $T_2$ or next to facet $T_3$ and/or next to facet $T_5$. Referring to FIG. 10 for instance, it would be convenient to have facets $T_3$ through $T_{10}$ in "geometric order" so as to minimize the time needed to compute the intersection of each facet with the slicing plane (such as shown in FIG. 7).

Moreover, when there is a large number of triangles in the chain, the computation time used by the slicer means will be commensurately more than when the chain includes only a small number of triangles. However, the problems of lack of geometric order and of increasing computation time are addressed together. In accordance with the present invention, a marching means is provided to arrange in "geometric order," the facets which have been sorted, grouped and subgrouped. Desirably, the slicer means is provided with a marching means that generates an adjacency list for each facet (which is a triangle in the STL file) that is intersected by each slicing plane. Once the adjacency list is prepared, the facets of the model are said to be placed in geometric order. The marching means is configured to order the facets of the slice plane intersection data file so that the two neighboring facets of each facet in the slice plane intersection data file are identified as part of the adjacency list for that particular facet. The adjacency list becomes part of the slice plane intersection data file. Desirably, a computer is programmed to function as the marching means. The marching means is programmed conveniently on the same computer on which the slicer means is programmed. As embodied herein, the marching means is programmed in C language on a Sun Microsystem® work station. A presently preferred embodiment of such marching means program is contained in pages 35–41 of the Appendix which forms a part of this patent application.

As embodied herein, the marching means examines the first facet in a subgroup of the slice plane intersection data file, and begins preparing an adjacency list for each active triangle. Such adjacency list is prepared by the marching means of the present invention by exploiting one of the properties (noted above) of STL files. According to that property, any edge can be shared by exactly two triangles and no more. Thus, each triangle will have exactly three adjacent triangles, which are listed in each triangle's completed adjacency list. As the intersection points are being calculated, the adjacency list is also prepared by the marching means of the slicer means and updated simultaneously. Every time the slicer means performs a search for a triangle which shares an active edge or an active vertex, the slicer means first consults the adjacency list of the active triangles. If the slicer means finds a matching triangle in one of the adjacency lists of those active triangles, then the slicer means calculates the intersection point. If the slicer means fails to find a matching triangle in the adjacency lists of one of those active triangles, then the next active triangle is identified from the chain of triangles by simple comparison and the intersection point is calculated. Then, the adjacency list of each of the active triangles as well as the active triangle's adjacent triangles, is updated by the marching means. The slicer means repeats the procedure until the chain of triangles in the intersection with the slice plane is complete.

Figure 32:
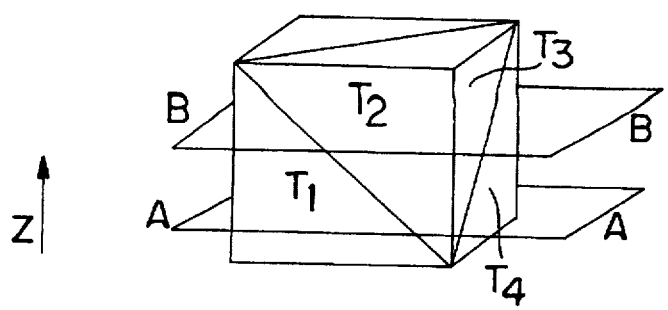
FIG. 32 is a schematic representation of a three dimensional object wherein successive slice planes A—A and B—B pass through the same facet chain.

In accordance with the present invention, the adjacency list generated and maintained by the marching means of the slicer means is particularly useful, in case of successive slice planes passing through chains which are similar or nearly similar in composition. For instance, consider two slice planes A—A and B—B as shown in FIG. 32. Both the slice planes are passing through exactly the same chain of triangles $T_1$ through $T_8$, which of course, are not in that order. While calculating intersections for slice plane A—A, an adjacency list is prepared simultaneously by the marching means. This adjacency list can be consulted by the slicer means while calculating intersections for slice plane B—B. Because the composition of chains at slice plane A—A and slice plane B—B is exactly the same, the need for checking every triangle until a match is found is eliminated in accordance with the procedure employed by the slicer means of the present invention. When the number of triangles in a chain runs into thousands, adjacency lists will be of immense help. In such cases, the computation time is often reduced by more than a factor of fifteen.

When triangles remain after the search employed by the slicer means returns to the first active edge or the first active vertex that triggered the search, it is an indication that there is at least one more chain, representing a protrusion or a depression. In such cases, the slicer means is configured as shown schematically in FIG. 35 to restart the search process for the remaining triangles. This is done until there are no more chains.

Figure 38:
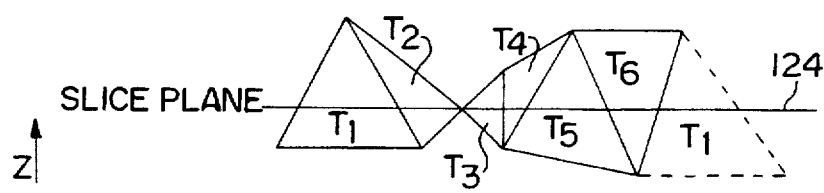
FIG. 38 is a schematic representation of a slice plane passing through a chain composed of six facets.
Figure 39A:
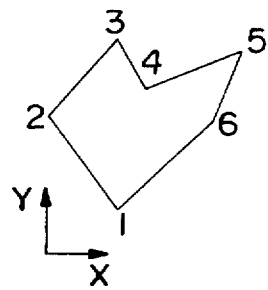
FIG. 39a–39d are a schematic representation of how the direction of a contour is found in accordance with the marching means of the present invention.
Figure 39B:
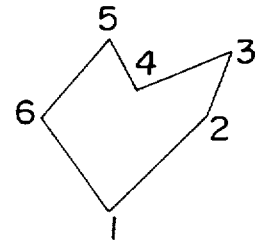
Figure 39C:
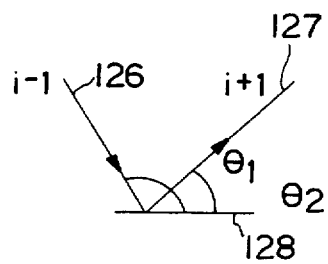
Figure 39D:
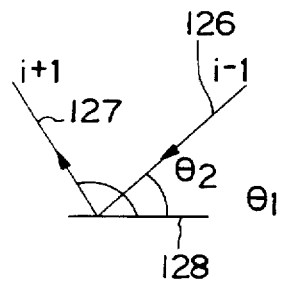

In accordance with the present invention, two important observations can be made from the above procedure adopted by the slicer means for calculating intersections. First, each triangle except the first triangle will have only one intersection per slice plane, and the first triangle will have two intersections. This can be seen from FIG. 38, where a chain with six (6) member triangles is broken and shown in extended form in relation to a slice plane 124. There are seven (7) intersections, for six (6) triangles, with the first triangle $T_1$ having two intersections. Thus, the slicer means of the present invention completely eliminates duplicate intersection points. Second, the slicer means of the present invention uses the marching means to march from one triangle to its adjacent triangle in calculating intersections between the triangle and the slice plane. Typically, the march starts at the first triangle of the chain, encompasses all the member triangles and ends again at the first triangle where it began. This marching attribute for this procedure justifies the name marching means for this aspect of the procedure employed by the slicer means.

The greatest advantage of the slicer means that employs a marching means, lies in the fact that intersection points are always calculated in the correct sequence and shape of the contour at any slice plane and can be obtained by joining the points of intersection in that order. Accordingly, the marching means enables the slicer means of the present invention to eliminate any need to determine the direction of vectors, etc. Moreover, because the intersections are calculated chain-after-chain for each slice plane, identifying protrusion and depression features becomes much easier. In addition, the marching means enables the slicer means to operate with a significant reduction in overall computation time.

Another interesting problem exists because the intersection points or vectors obtained using the slicer means with the marching means in accordance with the present invention, may be ordered in a clockwise (CW) or counterclockwise (CCW) direction and this direction may vary from contour to contour within a single slice. Accordingly, before the slice plane intersection data file is utilized to build physical models, the present invention employs a directional ordering means that imposes a uniform direction that is maintained. Desirably, a computer is programmed to function as the directional ordering means. The directional ordering means is programmed conveniently on the same computer on which the slicer means and the marching means is programmed. As embodied herein, the directional ordering means is programmed in C language on a Sun Microsystem® work station. A presently preferred embodiment of such directional ordering means program is contained in pages 42–46 of the Appendix which forms a part of this patent application.

As a first step, the directional ordering means obtains $Y_{min}$ (or $X_{min}$) of the data points of any contour. If the $i^{th}$ point represents $Y_{min}$ there will be at least two more points, one point (i−1) preceding the $i^{th}$ point and one point (i+1) following the $i^{th}$ point. This condition will never fail because a polygon does not exist without at least three non-co-linear points. As shown in FIGS. 39(a)-39d, if $\Theta_1$ is the angle subscribed by lines 126, 128 joining the $i-1_{th}$ point and the $i_{th}$ point, and $\Theta_2$ is the angle subscribed by lines 127, 128 joining the $i+1_{th}$ point and the $i_{th}$ point, then the conditions for determining the direction of the contour in accordance with the directional ordering means of the present invention are:

When $\Theta_1 > \Theta_2$ then the direction of the contour is CCW when $\Theta_1 < \Theta_2$ then the direction of the contour is CW when $\Theta_1 = \eta_2$ then point i−1, point i, and point i+1 are co-linear, meaning that there is an error in the data.

Once the directional ordering means employed by the slicer means of the present invention finds the direction of each contour by applying the above conditions, then the directional ordering means of the present invention makes whatever adjustment, if any, is necessary so that the direction of each contour remains the same, either CW or CCW. In other words, the directional ordering means finds the direction of each contour defining each intersection of each slice plane in the slice plane intersection data file and ensures uniformity of such direction (CW or CCW) with the direction of each other contour defining each other intersection of each other slice plane in the slice plane intersection data file. In the embodiment of the directional ordering means shown in pages 42–46 of the Appendix, the directional ordering means imposes the CW direction.

A few words about the software in the Appendix are appropriate. First, it is necessary that two programs "slice.c" and "reverse.c" be compiled. Both programs were written in C language. The "slice.c" program takes an STL file in ASCII format as input and stores the slice data as output in a file called "int_pts" file by default. The "reverse.c" program functions as the directional ordering means and so ensures that the line segments which form each contour are in CW order.

The commands to compile the programs are cc -g slice.c -lm -o slice cc -g reverse.c -lm -o reverse It is important to note that the name of the object code of "reverse.c" must be "reverse" as shown above. The reason being that "reverse" is invoked from inside the object code of "slice.c" and no other name will be recognized. However, the name of the object code of slice.c, called "slice" in this document, can be anything.

Before the slicing program can be executed, the STL file of the object being sliced must be in the current directory. This is a command driven program and the input provided by the user, including the STL file, is assumed to be correct and is not counterchecked by the program. Therefore any error in input either aborts the program or outputs garbage. A step by step tutorial on how to use the program is presented here. Underlined words indicate program commands which will be displayed on the console. Words/numerals in bold and within "<>" are examples.

At the command prompt type <slice name of the STL file> The STL file is an argument to the "slice" program and must be typed along with it. The two names should be separated by a white space.

Enter 1 to read sorted STL file, else enter any other number. <enter 2>

A sorted STL file will be created upon the use of "slice" and the file will be named "sorted.stl". This file contains exactly the same information as the original STL file with the difference being that the facets are sorted. Incidentally, "sorted.stl" file should be renamed since it is written over each time the slicing program is used.

Some information, like number of facets in the STL file, the dimensions of the object, etc., will appear on the console. For uniform slicing enter 1, for adaptive slicing enter any other number. <enter 2>

Enter the maximum slice thickness that you would prefer. <enter 0.005>

Choose a criteria by entering the appropriate number
1. Cusp height
2. Maximum deviation
3. Chord length <enter 1>

Four values c1, c2, c3, c4 of cusp height will be displayed on the screen. Enter a value for limiting cusp height based on these four values. You may take the help of cusp height Vs. theta plot. If you need help enter 911. <enter the value of c2>

The number of slices will be displayed and the program ends. A file named "int_pts", which contains the slice data, will appear in the current directory. The "int_pts" file, which is short for intersection points, contains intersections between slice plane and triangular facets in an STL file. The format of the "int_pts" file is as follows. The first line of the file will have two numbers which are Z-min and Z-max of the intended object. In each of the second line and subsequent lines of the "int_pts" file, there will be exactly five numbers in each line. The first two numbers are integers and the first number represents the slice number while the second number represents the island number. The next three numbers are x, y and z coordinates of the particular intersection point. An example "int_pts" file is shown below. Beneath each row of numbers, an explanation of such numbers is written within the parentheses.

```
0.50000  2.500000
(Z – min, Z – max)
0   0   2.784693000   1.911540000   2.50000000
(slice number 0, island number 0, x, y, z)
.
.
.
0   1   1.456797000   1.456797000   2.50000000
.
.
.
```

```
-continued
1  0  2.784693000    1.911540000    2.40000000
(slice number 1, island number 0, x, y, z)
  .
  .
  .
(End of the file.)
```

The slice data generated and stored in the form of "int_pts" file can be used to produce the desired object using any layered process. However, typically the interface means is required to postprocess the slice data, depending on the process chosen. For example, postprocessing of the slice data will be shown for CNC milling and stereolithography processes.

The slice data obtained above can be postprocessed using the CNC machining software in the appendix of U.S. application Ser. No. 08/156,321, now U.S. Pat. No. 5,432,704, to obtain the CNC code which can be used to produce the part on any 3-axis CNC milling machine. But, first it is necessary to convert the slice data stored in "int_pts" into a format compatible with the CNC machining software. An embodiment of the interface means capable of converting the slice data stored in "int_pts" into a format compatible with the CNC machining software is the program called "tata_to_vouze.c" (in Appendix pages 176–179). This "tata_to_vouze.c" program assumes that "int_pts" file is in the current directory and looks for it.

Compile "tata_to_vouze.c" as shown below.

cc -g tata_to_vouze.c -o tata_to_vouze

At the command prompt enter <tata_to_vouze>

A file named "vouze" will be created in the current directory, which contains the slice data in binary format and is the input to the CNC code generator in the appendix of U.S. application Ser. No. 08/156,321, now U.S. Pat. No. 5,432,704.

As noted above, the interface means desirably includes a computer that is programmed with software that converts the STL data file 64 output into a format compatible with the machine to be controlled. If the machine to be controlled is a SLA-250, a presently preferred embodiment of such component of the interface means program is contained in pages 96–175 of the Appendix which forms a part of this patent application. The slice data needs to be postprocessed to obtain a .sli file, which is necessary to produce the part on an SLA-250 . This includes hatching all of the closed contours. In order to obtain the .sli file, the following files are required to be in the current directory.

main.c (Appendix pages 96–97)

io.c (Appendix pages 98–116)

cides.h (Appendix pages 117–123)

3d_io.h (Appendix pages 124–126)

seg.h (Appendix page 127)

file.h (Appendix pages 128–129)

read_brdrpts.c (Appendix pages 130–132)

user_input.c (Appendix pages 133–135)

hatch_cal.c (Appendix pages 136–168)

new_sli.c (Appendix pages 169–174)

header (Appendix page 175)

The following command "cc -g main.c io.c -lm -o create_sli" can be used to compile the program. Next, at the command prompt, type in <create_sli >. The program assumes that the "int_pts" file is in the current directory. In the following step-by-step tutorial, underlined words indicate program commands that will be displayed on the computer console. Words/numerals in bold and within "<>" are examples.

For Clemson hatching style enter 1, else any other number E.g., <1>

Enter hatch Spacing for bottom and top most layers E.g., <0.05>

Enter number of hatch angles followed by their values E.g., <3 090 120>

Enter the number of different zones (Z heights) you would like to have for hatching. If you type in 1, there will be only one zone which includes all layers other than bottom and top layers. E.g., <2>

Enter hatch spacing for zone 1 which starts from second layer from bottom E.g., <0.1>

Enter number of hatch angles followed by their values for zone 1 E.g., <2 45 135>

Enter starting z-height for zone 2 E.g., <0.7> (Note: z_min and z_max of this part are 0.5 and 1.5. Compute z_height accordingly)

Enter hatch spacing for zone 2 E.g., <0.03>

Enter number of hatch angles followed by their values for zone 2 E.g., <3 10 40 70>This ends the execution of create sli file, and a file named "Clemson.sli" appears in the current directory. Clemson.sli can be used to produce the part on any SLA-250 .

In order to visualize sliced models, a separate program "visual_slice.c" was developed using HOOPS graphic routines. The following command compiles the program.

hcc -g visual_slice.c -o visual_slice

Note the usage of "hcc" for compiling HOOPS routines. Usage of "visual_slice" is the same as "slice" which is explained above.

APPENDIX PAGE 1

08/419711

```
/************************************************
       ADAPTIVE SLICING OF 3-D MODELS IN STL FORMAT

DEVELOPED BY

KAMESH M. TATA
                    MECHANICAL ENGINEERING
                  CLEMSON UNIVERSITY, SC 29631

*************************************************/

/* This program named "slice.c" is a program to
read .stl files and slice them adaptively as well as
uniformly.  This software recognizes horizontal
surfaces and retains them in the sliced model.  The
sliced contours are stored in int_pts (short for
intersection points) file, which is automatically
created.  This code is primarily written to establish
and prove the concept of adaptive slicing and is
completely research oriented.  Using quicksort
algorithm and double linked lists, the processing
speed of this program can be improved furhter.
HOWEVER, THE FUNDAMENTAL LOGIC, WHICH IS UNIQUE TO AND
STRENGTH OF THIS PROGRAM, REMAINS THE SAME. */ include <stdio.h>
include <math.h>
#define N 50000    /* Limiting the number of
                      triangles of each object to N */
#define M 1        /* Limiting the number of objects
                      to M */
#define O 40000    /* Limiting the number of groups
                      of triangle to O */
#define P 3000     /* Limiting the number of cutting
                      planes  to P */
#define Q 400      /* Limiting the number of islands
                      per plane to Q */
#define R 20000    /* Limiting the number of points
                      of intersec per island per plane
                      to R */
#define T 50000    /* Limiting the number of
                      triangles in one chain to T */

/*#define max_slice_thick 0.08. */ define DMEM_CONST  1000

/* note that tri is for triangle.  nor is for
normal.  ver is for vertex.  Declaration of point
structure with an array as its member. */
```

APPENDIX PAGE 2

```
struct point {
    double axis[3];
};

/* triangle is a structure with two member
structures "nor, *ver[3]. Both nor and *ver[3] are
structures of type "struct point". *ver[3] is a
pointer to struct ver[3]???. */ struct triangle {
    struct point nor;
    struct point *ver[3];
};

/* object is a structure with an array of
structures. *tri[N] pointing to its members normal
and *ver[]. */ struct object {
    struct triangle *tri[N];
};

/* obj[M] is a structure of type object. It is
not a pointer. Pointer is not necessary because this
program is not expected to sort objects. */ struct object obj[M];

/* "first" and "last" store the number of first
and last triangles in that group. "min" and "max"
store the min and max values of sl_axis co-ords in
that group of triangles. */

/* structure group[] to hold number of groups and
number of triangles in each group. */ struct gr {
    int first, last;
    double min,max} *group[O];

/* structure to draw the picture. Need not be
global. Check this. */ struct    {
    double x,y,z;
} poly[3];

/* With the following 3 structures you can access
say x coordinate of 20th intersection point of island
4 of cutting plane 2 by writing:
pln[2].isl[4].point[20][0]. structure to hold
intersection points for each island. */
```

APPENDIX PAGE 3

```c
struct islands {
    struct point *intpts };

/* structure to hold number of islands for each
cutting plane. */ struct plane {
    struct islands isl[Q];
};

/* structure to hold number of cutting planes. */ struct plane *pln;

double x_min,x_max,y_min,y_max,z_min,z_max,
highest_nor,max_slice_thick;
double curr_gr_min, curr_gr_max, curr_pln,
all_planes[P], act_pln;
int tri_num, obj_num=0,max_triangles[M], sl_axis,
ax1,ax2, total_num_groups;
int curr_pln_num, num, isl_num, isl_num1, curr_gr,
bad,read_sorted_file;
int curr_gr_first,curr_gr_last, eliminated[R],
curr_pln_num1;
char obj_type[20], obj_name[20];
int intersec[R][Q], intersec1[R][Q], islands[P];
int islands1[P], all_slices, tri_in_curr_pln,
new_gr[20000],
neighbours[T][3], success1, success2 ;
double max_slice_thick_for_ill, accuracy_req;
FILE *fp1;
double
min_slice_thick,uniform_slice_thick,machine_resolution
;
int uniform_slicing;

double lowest_theta, highest_theta;
int criteria,
there_is_a_vertical_wall,there_is_a_horizontal_wall;

float desired_cusp_height, desired_max_deviation,
desired_chord_length;

main(argc, argv)
int argc;
char **argv;
{
    FILE *fp;
```

APPENDIX PAGE 4

```
        if(argc == 2)
                fp = fopen(argv[1], "r");
        else
        {
                fprintf(stderr, "\nAlternate Usage : %s
<filename>\n\n", argv[0]);
                fp = stdin;
        } printf("\nYOU MUST HAVE reverse FILE IN CURRENT
DIRECTORY SO AS TO EXECUTE THIS PROGRAM ");

printf("\n\nENTER  1  TO READ SORTED STL FILE,
ELSE ENTER ANY OTHER NUMBER  ");
        scanf("%d", &read_sorted_file);

if(read_sorted_file==1)read_sorted_stl_file(fp);
        else read_stl_data(fp);
        printf("DATA SUCCESSFULLY READ.\n");

/* get_xyz_max_min() is to calculate max and min
values for auto scaling and other uses during
computations for intersections. */ get_xyz_max_min();
        put_pts_in_positive_space();
        theta_min_and_theta_max();

fp1= fopen("int_pts","w");
        fprintf(fp1,"\n%lf  %lf", z_min, z_max);
        get_slice_axis();
        if (read_sorted_file!=1) sort_vertices();

/* sort triangles in ascending order considering
the value of sl_axis co-ordinate of first vertex.  If
sl_axis is, say 1, y coordinate of first vertex is
considered for sorting. */ if(read_sorted_file!=1) sort_triangles();

/* all triangles with equal sl_axis coordinate of
first vertex (after sorting vertices) will be in one
group. */ group_triangles();

/* store_stl_data() is to store the data read in
a different file in a different format. */
```

APPENDIX PAGE 5

```
            if(read_sorted_file!=1) store_stl_data();
            multi_slicing();
            fprintf(fp1, "\n");
            fclose(fp1);
            system("reverse");

} read_stl_data(fp)
FILE *fp;

{
       int i,j;
       char dum1[20],p;

if(fp == stdin)
               fprintf(stderr, "WHERE IS THE .STL FILE
BOY");

/* Every object is identified by its type and
name in .stl file. (Type of object can be solid or
surface. Name of object can be sphere, cone etc.).
So, the condition !=2 is valid only at the end of file
or when the file is corrupt or not formatted. */ q1:
       if(fscanf(fp, "%s %s",obj_type, obj_name)!=2)
       {
               printf(" %s
%s",obj_type,obj_name);/*obj_num=obj_num-1;*/
               return;
       }
       while ((p= getc(fp)) != '\n');

/* to read all the characters in the first line
for each object. */ if(feof(fp))return;

/* dum1 is always "FACET" unless it encounters a
different object or end of file. Just when a new
object or end of file is encountered total number of
triangles in the earlier object is stored using
max_triangle[obj_num]. */ for(tri_num=0;feof(fp)==0;tri_num++)
       {
```

APPENDIX PAGE 6

```
            obj[obj_num].tri[tri_num] = (struct triangle
*)malloc(sizeof(struct triangle));

fscanf(fp,"%s",dum1);
            if((strcmp(dum1,"FACET")!=0) &&
(strcmp(dum1,"facet")!=0))
            {
                    max_triangles[obj_num]=tri_num-1;
                    return;
            }

/* Reads x,y,z values of normal vectors.
(obj[..].tri[..]) points to normal. This is indicated
by -> @@@@@ nor.axis[..] gives the value. */ if(fscanf(fp, " %*s %lf %lf %lf",

&(obj[obj_num].tri[tri_num]->nor.axis[0]),

&(obj[obj_num].tri[tri_num]->nor.axis[1]),

&(obj[obj_num].tri[tri_num]->nor.axis[2]))!=3)
            {
                    printf("CHECK NEAR TRIANGLE %d IN .STL
FILE",tri_num);
                    exit(0);
            }
            /*    printf("tri_num=%d nor=%lf %lf %lf
\n",tri_num, (obj[obj_num].tri[tri_num]->nor.axis[0]), (obj[obj_num].tri[tri_num]->nor.axis[1]), (obj[obj_num].tri[tri_num]->nor.axis[2]));*/

/* Ignores reading characters "OUTER LOOP" in
.stl file. */ fscanf(fp, "%*s %*s");

/* Reads x,y,z values of the three vertices of
each triangle. */ for(i=0; i<3;i++)
            {

/* malloc allocates enough memory required to
store "struct point". */ obj[obj_num].tri[tri_num]->ver[i] =
                            (struct point
```

APPENDIX PAGE 7

```
    *)malloc(sizeof(struct point));

fscanf(fp, "%*s");
                for(j=0; j<3;j++)
                    fscanf(fp, "%lf",
    &(obj[obj_num].tri[tri_num]->ver[i]->axis[j]));
                /*   printf("ver #%d =%lf %lf %lf \n",
    i, (obj[obj_num].tri[tri_num]->ver[i]->axis[0]), (obj[obj_num].tri[tri_num]->ver[i]->axis[1]), (obj[obj_num].tri[tri_num]->ver[i]->axis[2]));
    */
            }
            /* Ignores characters "ENDLOOP",
    "ENDFACET"*/ fscanf(fp, "%*s %*s");

}

}

/* reads stl_out file which is sorted. */
    read_sorted_stl_file(fp)
    FILE *fp;
    {
        int h,i,j;
        char nor[20];
        obj_num=0; /* this function works for one object
    files only. */ fscanf(fp,"%s %s", obj_type, obj_name);

for(h=0;h<=obj_num;h++)
            for(i=0;feof(fp)==0;i++)
            {
                obj[obj_num].tri[i] = (struct triangle
    *)malloc(sizeof(struct triangle));

/* skips the string TRIANGLE and reads the
    following number. */
```

APPENDIX PAGE 8

```
                fscanf(fp, "%*s %d",&i);
                fscanf(fp, " %s %lf %lf %lf",nor,
                    &(obj[h].tri[i]->nor.axis[0]),
                    &(obj[h].tri[i]->nor.axis[1]),
                    &(obj[h].tri[i]->nor.axis[2]));

for(j=0;j<3;j++)
                {
                        obj[obj_num].tri[i]->ver[j] =
                        (struct point
*)malloc(sizeof(struct point));

fscanf(fp, " %lf %lf %lf",
&(obj[h].tri[i]->ver[j]->axis[0]),
&(obj[h].tri[i]->ver[j]->axis[1]),
&(obj[h].tri[i]->ver[j]->axis[2]));

}
        }
    tri_num=i-1;
    max_triangles[obj_num] = i-2;
    fclose(fp);
}

/* outputs x,y,z values of the normal and the
three verices of each triangle to stl_out file. */
store_stl_data()
{
    FILE *fp;
    int h,i,j;

fp = fopen("sorted.stl", "w");
    fprintf(fp,"%s %s", obj_type, obj_name);

for(h=0;h<=obj_num;h++)
        for(i=0;i<tri_num;i++)
        {
                fprintf(fp, "\nTRIANGLE %d \n",i);
                fprintf(fp, "\t\t\tnor= %lf %lf %lf
\n",
                    (obj[h].tri[i]->nor.axis[0]),
                    (obj[h].tri[i]->nor.axis[1]),
```

APPENDIX PAGE 9

```
                              (obj[h].tri[i]->nor.axis[2]));
                    for(j=0;j<3;j++)
                         fprintf(fp, " %lf %lf %lf\n",
      obj[h].tri[i]->ver[j]->axis[0],
      obj[h].tri[i]->ver[j]->axis[1],
      obj[h].tri[i]->ver[j]->axis[2]);
                    } fclose(fp);
}

/* Code for KCI means begins. */ theta_min_and_theta_max()
{
        float rad_to_deg ;
        int h,i;

for(h=0;h<=obj_num;h++)
            for(i=0;i<tri_num;i++)
               {
                    rad_to_deg = 180*7/22;

highest_theta =0;

lowest_theta = 90;

for(i=0; i< tri_num; i++)
                    {
       if(obj[obj_num].tri[i]->nor.axis[2]<0)
       obj[obj_num].tri[i]->nor.axis[2] = -1 *
       obj[obj_num].tri[i]->nor.axis[2];
                         /*printf("asin%lf",
       asin(obj[obj_num].tri[i]->nor.axis[2]));*/ if(asin(obj[obj_num].tri[i]->nor.axis[2])>
```

APPENDIX PAGE 10

```
            highest_theta)
                        { if(asin(obj[obj_num].tri[i]->nor.axis[2])*180*7/22 <
90.00 && asin(obj[obj_num].tri[i]->nor.axis[2])*180*7/22 >
89.5)

there_is_a_horizontal_wall=1;
                        else
                                highest_theta =
asin(obj[obj_num].tri[i]->nor.axis[2]);
                        } if(asin(obj[obj_num].tri[i]->nor.axis[2])<
lowest_theta)
                        { if(asin(obj[obj_num].tri[i]->nor.axis[2])*180*7/22 ==
0)

there_is_a_vertical_wall=1;
                        else
                                lowest_theta =
asin(obj[obj_num].tri[i]->nor.axis[2]);

}
                } printf("\n\n");
                if(there_is_a_horizontal_wall==1)
                        printf("\nThere are horizontal
surfaces in this object.");

if(there_is_a_vertical_wall==1)
                        printf("\nThere are vertical
surfaces in this object.");

printf("\n\nhighest_theta=%lf
lowest_theta=%lf", rad_to_deg*highest_theta,
rad_to_deg*lowest_theta);
                printf("\nNote: Vertical and horizontal
walls %(0 and 90%) are not considered while
determining lowest and highest thetas.");
        }

}

/* Code for KCI means ends. */
```

APPENDIX PAGE 11

```
get_next_slice_thick(sl_thick)
double *sl_thick;
{
        double ratio;

if(highest_nor *180*7/22== 90)
            *sl_thick = 0;

else if(highest_nor *180*7/22== 0.0)
            *sl_thick = max_slice_thick;
        else
        { if(criteria==1)*sl_thick =
desired_cusp_height / sin( highest_nor);
            else if(criteria==2)*sl_thick =
desired_max_deviation / tan( highest_nor);
            else if(criteria==3)*sl_thick =
desired_chord_length * cos( highest_nor);

} if(*sl_thick>max_slice_thick)
*sl_thick=max_slice_thick;
        if(*sl_thick<min_slice_thick)
*sl_thick=min_slice_thick;

} get_slice_axis()
{
    /* for building parts on sla machine sl_axis is
always 2 */ sl_axis = 2;

printf("\n\nFOR UNIFORM SLICING ENTER 1, FOR
ADAPTIVE SLICING ANY OTHER NUMBER   ");
        scanf("%d", &uniform_slicing);
        if(uniform_slicing==1)
        {
            printf("\n \nENTER SLICE THICKNESS    ");
            scanf("%lf", &uniform_slice_thick);
        }
        else
        {
            printf("\n \nENTER MAXIMUM SLICE THICKNESS
```

APPENDIX PAGE                12

```
            THAT YOU WOULD PREFER ");
                scanf("%lf", &max_slice_thick);
                printf("\nENTER MINIMUM SLICE THICKNESS THAT
    YOU WOULD PREFER   ");
                scanf("%lf", &min_slice_thick);

printf("\nCHOOSE A CRITERIA BY ENTERING THE
    APPROPRIATE NUMBER");
                printf("\n1. CUSP HEIGHT");
                printf("\n2. MAXIMUM DEVIATION");
                printf("\n3. CHORD LENGTH          ");
                scanf("%d", &criteria);

if(criteria==1)
                { printf("\nc1 = %f, c2 = %f, c3 = %f, c4
    = %f", min_slice_thick*sin(lowest_theta),
    min_slice_thick*
                            sin(highest_theta),
                            max_slice_thick*sin(lowest_theta),
    max_slice_thick*sin(highest_theta));

printf("\nENTER A VALUE FOR LIMITING
    CUSP HEIGHT BASED ON THESE FOUR VALUES. YOU MAY TAKE
    THE HELP OF CUSP HEIGHT Vs. THETA PLOT. IF YOU NEED
    HELP ENTER 911.  ");
                    scanf("%f", &desired_cusp_height);

if(desired_cusp_height==911.0)
                    {
                        printf("\n1. If you choose a value
    equal to c1, layer thickness will be set to %f
    %(minimum thickness %) throughout the part.  Further,
    if a part is built using this slice data, cusp height
    of the physical part will vary from c1 to c2. \n2. If
    you choose c4, layer thickness will be set to %f
    %(maximum thickness %) throughout the part.  Further,
    if a part is built using this slice data, cusp height
    of the physical part will vary from c3 to c4. \n3. If
    you choose a value between c1 and c4, layer thickness
    will be appropriately varied to maintain cusp height
    within the value you have given.", min_slice_thick,
                            max_slice_thick);
                        printf("\n\nENTER A VALUE FOR
    LIMITING CUSP HEIGHT  ");
                        scanf("%f", &desired_cusp_height);
                    }
```

APPENDIX PAGE 13

```c
            } if(criteria==2)
            {
                    printf("\nd1 = %f, d2 = %f, d3 = %f, d4 = %f", min_slice_thick*tan(lowest_theta),
min_slice_thick*
                            tan(highest_theta),
                            max_slice_thick*tan(lowest_theta),
max_slice_thick*tan(highest_theta));

printf("\nENTER A VALUE FOR LIMITING MAX. DEVIATION BASED ON THESE FOUR VALUES. YOU MAY TAKE THE HELP OF MAX. DEVIATION Vs. THETA PLOT. IF YOU NEED HELP ENTER 911.  ");
                    scanf("%f", &desired_max_deviation);

if(desired_max_deviation==911.0)
                    {
                            printf("\n1. If you choose a value equal to d1, layer thickness will be set to %f %(minimum thickness %) throughout the part.  Further, if a part is built using this slice data, maximum deviation of the physical part will vary from d1 to d2. \n2. If you choose d4, layer thickness will be set to %f %(maximum thickness %) throughout the part. Further, if a part is built using this slice data, maximum deviation of the physical part will vary from d3 to d4. \n3. If you choose a value between d1 and d4, layer thickness will be appropriately varied to maintain maximum deviation within the value you have given.",
                                    min_slice_thick,
max_slice_thick);
                            printf("\n\nENTER A VALUE FOR LIMITING MAXIMUM DEVIATION  ");
                            scanf("%f",
&desired_max_deviation);
                    }

} if(criteria==3)
            {
                    printf("\nf1 = %f, f2 = %f, f3 = %f, f4 = %f", min_slice_thick/cos(lowest_theta),
min_slice_thick/
```

APPENDIX PAGE 14

```
                        cos(highest_theta),
                        max_slice_thick/cos(lowest_theta),
max_slice_thick/cos(highest_theta));
                        printf("\nENTER A VALUE FOR LIMITING
CHORD LENGTH BASED ON THESE FOUR VALUES. YOU MAY TAKE
THE HELP OF CUSP HEIGHT Vs. THETA PLOT. IF YOU NEED
HELP ENTER 911.  ");
                        scanf("%f", &desired_chord_length);

if(desired_chord_length==911.0)
                {
                        printf("\n1. If you choose a value
equal to f1, layer thickness will be set to %f
%(minimum thickness %) throughout the part.  Further,
if a part is built using this slice data, chord length
of the physical part will vary from f1 to f2. \n2. If
you choose f4, layer thickness will be set to %f
%(maximum thickness %) throughout the part.  Further,
if a part is built using this slice data, chord length
of the physical part will vary from f3 to f4. \n3. If
you choose a value between f1 and f4, layer thickness
will be appropriately varied to maintain chord length
within the value you have given.",
                        min_slice_thick,
max_slice_thick);
                        printf("\n\nENTER A VALUE FOR
LIMITING CHORD LENGTH  ");
                        scanf("%f",
&desired_chord_length);
                }

} uniform_slice_thick = max_slice_thick;

} /* end of else*/

/* sl_axis is short for slice axis. */
        /* when & does not precede sl_axis segmentation
fault occurs. */ if(sl_axis == 2) {
                ax1 = 0;
                ax2 = 1;
        }
```

APPENDIX PAGE 15

```
}

/* Code for facet processor means begins. */
        /* Code for facet sorting means begins. */
        /* sorts vertices of each triangle in ascending
order according to x, y or z co-ordinates.  If sl_axis
is, say 2, vertices will be sorted according to z
value. */ sort_vertices()
{
        struct point *temp;
        int i;

for (i=0;i<=max_triangles[obj_num];i++)

/* comparing element[0] and [1] and sorting in
ascending order. */

{ if(obj[obj_num].tri[i]->ver[0]->axis[sl_axis]> obj[obj_num].tri[i]->ver[1]->axis[sl_axis])
            {
                    temp = obj[obj_num].tri[i]->ver[0];
                    obj[obj_num].tri[i]->ver[0]=
obj[obj_num].tri[i]->ver[1];
                    obj[obj_num].tri[i]->ver[1]= temp;
            }

/* comparing element[1] and [2] and sorting in
ascending order. */ if(obj[obj_num].tri[i]->ver[1]->axis[sl_axis]>
     obj[obj_num].tri[i]->ver[2]->axis[sl_axis])
            {
                    temp = obj[obj_num].tri[i]->ver[1];
                    obj[obj_num].tri[i]->ver[1]=
obj[obj_num].tri[i]->ver[2];
                    obj[obj_num].tri[i]->ver[2]= temp;

if(obj[obj_num].tri[i]->ver[0]->axis[sl_axis]> obj[obj_num].tri[i]->ver[1]->axis[sl_axis])
            {
                    temp =
```

APPENDIX PAGE 16

```
            obj[obj_num].tri[i]->ver[0];
                    obj[obj_num].tri[i]->ver[0]=
obj[obj_num].tri[i]->ver[1];
                    obj[obj_num].tri[i]->ver[1]= temp;
                }
            }
        }
    } sort_triangles()
    {
        struct triangle *temp;
        int i,j;

for(i=0; i<max_triangles[obj_num];i++)
            for(j=i+1;j<=max_triangles[obj_num];j++)
            { if(obj[obj_num].tri[i]->ver[0]->axis[sl_axis]> obj[obj_num].tri[j]->ver[0]->axis[sl_axis])

{
                    temp = obj[obj_num].tri[i];
                    obj[obj_num].tri[i]=
obj[obj_num].tri[j];
                    obj[obj_num].tri[j]= temp;
                }
            }

}

/* Code for facet sorting means ends. */
        /* Code for facet grouping means begins. */ group_triangles()
    {
        /*"count1" is to assign values first, min etc.
only once for each group. "count2" gives number of
the group. "first" gives number of first triangle in
the group and "last" gives the last num. "min" gives
the minimum value of sl_axis coord of the first vertex
(which is equal for all triangles in that group).
"max" gives the maximum sl_axis co-ordinate in that
group */ int i, count1=0,count2=0;

group[0] = (struct gr *) malloc( sizeof(struct
gr) );
```

APPENDIX PAGE 17

```
    for(i=0;i<max_triangles[obj_num];i++)
    {
            if(count1==0)
            {
                    group[count2]->first = i;
                    group[count2]->min  =
obj[obj_num].tri[i]->ver[0]->axis[sl_axis];
                    group[count2]->max =
obj[obj_num].tri[i]->ver[2]->axis[sl_axis];
            } if(obj[obj_num].tri[i]->ver[0]->axis[sl_axis] == obj[obj_num].tri[i+1]->ver[0]->axis[sl_axis])
            { if(group[count2]->max<obj[obj_num].tri[i+1]->ver[2]->a
xis[sl_axis])

group[count2]->max=obj[obj_num].tri[i+1]->ver[2]->axis
[sl_axis];
                    count1 = count1 + 1;
            }
            else
            {
                    group[count2]->last = i;
                    count2 = count2 + 1;
                    group[count2] = (struct gr *) malloc(
sizeof(struct gr) );
                    count1 =0;
            }
            total_num_groups = count2;
    }
    /* check for the last triangle */
      if(obj[obj_num].tri[i]->ver[0]->axis[sl_axis] ==
            obj[obj_num].tri[i-1]->ver[0]->axis[sl_axis])
group[count2]->last = i;

else
      {
            group[count2]->first = group[count2]->last =
i;
            group[count2]->min  =
obj[obj_num].tri[i]->ver[0]->axis[sl_axis];
            group[count2]->max =
obj[obj_num].tri[i]->ver[2]->axis[sl_axis];
      }

/*
   for(i=0;i<=total_num_groups;i++)
```

APPENDIX PAGE 18

```
{
    printf("\ngroup_num=%d first=%d last=%d",
i,group[i]->first, group[i]->last);
    printf("min=%lf max=%lf",
group[i]->min,group[i]->max);
    }
*/
)

/* Code for facet grouping means temporarily
ends. */
    /* Code for facet processor means temporarily
ends. */ get_xyz_max_min()
{
    int count1,count2,vertex;

/* Initialization of xyz max and min variables */ x_max=obj[0].tri[0]->ver[0]->axis[0];
    x_min=obj[0].tri[0]->ver[0]->axis[0];
    y_max=obj[0].tri[0]->ver[0]->axis[1];
    y_min=obj[0].tri[0]->ver[0]->axis[1];
    z_max=obj[0].tri[0]->ver[0]->axis[2];
    z_min=obj[0].tri[0]->ver[0]->axis[2];

/*count1 is for incrementing obj_num .  "count2"
is for incrementing triangle number.  "vertex" is for
three vertices of each triangle. */ for(count1=0;count1<=obj_num;count1++)

for(count2=0;count2<max_triangles[obj_num];count2++)
            for(vertex=0;vertex<3;vertex++)
            { if(obj[count1].tri[count2]->ver[vertex]->axis[0]>x_max
)
                        x_max=
obj[count1].tri[count2]->ver[vertex]->axis[0];

if(obj[count1].tri[count2]->ver[vertex]->axis[0]<x_min
)
                        x_min=
obj[count1].tri[count2]->ver[vertex]->axis[0];

if(obj[count1].tri[count2]->ver[vertex]->axis[1]>y_max
)
```

APPENDIX PAGE 19

```
                            y_max=
        obj[count1].tri[count2]->ver[vertex]->axis[1];

if(obj[count1].tri[count2]->ver[vertex]->axis[1]<y_min
        )
                            y_min=
        obj[count1].tri[count2]->ver[vertex]->axis[1];

if(obj[count1].tri[count2]->ver[vertex]->axis[2]>z_max
        )
                            z_max=
        obj[count1].tri[count2]->ver[vertex]->axis[2];

if(obj[count1].tri[count2]->ver[vertex]->axis[2]<z_min
        )
                            z_min=
        obj[count1].tri[count2]->ver[vertex]->axis[2];

} printf("\nTOTAL NUMBER OF
        FACETS=%d",max_triangles[obj_num]);

/*
        printf("\n \nx_min=%lf x_max=%lf \ny_min=%lf y_max=%lf
        \nz_min=%lf z_max=%lf", x_min, x_max, y_min,y_max,
        z_min, z_max);
        */

}

/* to put the object in positive space */ put_pts_in_positive_space()
{ int h,i,j;

/* .1 .1 and .5 are selected because that is what
   is done in cides */ double x_add =0.0, y_add = 0.0, z_add = 0.0;

x_add = -x_min+0.1;
        y_add = -y_min+0.1;
        z_add = -z_min+0.5;
```

APPENDIX PAGE 20

```
    for(h=0;h<=obj_num;h++)
        for(i=0;i<tri_num;i++)
            for(j=0;j<3;j++)
            {
                    obj[h].tri[i]->ver[j]->axis[0] =
obj[h].tri[i]->ver[j]->axis[0]+x_add;
                    obj[h].tri[i]->ver[j]->axis[1] =
obj[h].tri[i]->ver[j]->axis[1]+y_add,
                        obj[h].tri[i]->ver[j]->axis[2]
= obj[h].tri[i]->ver[j]->axis[2]+z_add;
            } x_min = x_min+x_add;
    y_min = y_min+y_add;
    z_min = z_min+z_add;

x_max = x_max+x_add;
    y_max = y_max+y_add;
    z_max = z_max+z_add;

printf("\n \nx_min=%lf x_max=%lf \ny_min=%lf
y_max=%lf \nz_min=%lf z_max%lf", x_min, x_max,
y_min,y_max, z_min,
        z_max);

} get_everything()
{
    int ver_num,i,adj_tri, type, count,count1,j,
count10;
    bad=0;

get_new_group();
    /* for loop where i is incremented from the first
triangle to the last
        triangle of the curr_group(The new group
after merging dif.groups)*/ i = new_gr[0];

do
    {
            /*  if (num != 0) {
    if ( (num % DMEM_CONST) == 0 )
        pln[curr_pln_num].isl[isl_num].intpts = (struct
```

APPENDIX PAGE 21

```
       point *)
                 realloc( (char
  *)pln[curr_pln_num].isl[isl_num].intpts,
                 (num+DMEM_CONST)*sizeof(struct
  point) );

if (pln[curr_pln_num].isl[isl_num].intpts ==
NULL) {
          fprintf(stderr,"realloc : get_everything :
  out of memory. num= %d\n",num);
          exit(0);
      }
    }
*/ type= get_intersection_pt(i);
          eliminated[bad]=i;
          bad = bad+1;

/* type will be 0 or 1 or 2 when intersection is
through a vertex.  In other words, type gives vertex
num through which curr_pln is passing.  When type=10
intersection is with line passing through ver0 and
ver1, and when it is 30 line of intersection is ver1
and ver2.  When type = 20 intersection is with line
ver2 and ver0 */ if(type == 0 || type ==1 || type == 2)
          {
              adj_tri = get_adj_tri1(i,type);
          }
          else if(type == 10 || type==20 || type==30)
          {
              adj_tri = get_adj_tri2(i,type);
          }

/*
if(abs(i-adj_tri)>50 && adj_tri!= -1) {printf("\ni=%d
adj_tri=%d i-adj_tri=%d count10=%d",i,adj_tri,
i-adj_tri, count10); count10=0;}count10++;
*/ i = adj_tri;
          if(adj_tri == -1)
          {
              if(bad<tri_in_curr_pln)
              {
    /* going on to a new island */ i=get_tri_on_new_isl();
                  /*
```

APPENDIX PAGE 22

```
          pln[curr_pln_num].isl[isl_num].intpts = (struct point
*)
                    calloc( DMEM_CONST, sizeof(struct
point) );
          if (pln[curr_pln_num].isl[isl_num].intpts ==
NULL) {
                    fprintf(stderr,"calloc : get_everything
: out of memory. isl_num = %d\n", isl_num);
                    exit(0);
          }
                                                    */
                              }
                    else break;
          }

/*
   (printf("\nohohoh bad%d tri_in_curr_pln=%d",bad,
tri_in_curr_pln);)
*/
          /* in while loop curr_gr_lsat -
curr_gr_first gives the number of triangles (one less)
in curr_gr.  bad gives the number of triangles already
eliminated. */

}while(bad<= tri_in_curr_pln);

} get_tri_on_new_isl()
{
       int i,j,k=0,count;

for(k=0; k<=tri_in_curr_pln;k++)

{
             i = new_gr[k];
             for(j=0;j<bad;j++)
             {
                    if(eliminated[j]==i){
                           count=1;
                           break;
                    }
             }
             if(count==1){
                    count=0;
                    continue;
             }
             else
             {
```

APPENDIX PAGE 23

```
                intersec[curr_pln_num][isl_num]=num;
                isl_num=isl_num+1;
                num=0;
                islands[curr_pln_num]=isl_num;
            /*      printf("\nisl=%d
i=%d",isl_num,i);*/return(i);
            }
        }
)

get_plane()
{
    printf("\ncutting plane value=");
    scanf("%lf", &curr_pln);
    curr_pln_num = 0;
} multi_slicing()
{
    int i,j;
    double curr_pln_min, curr_pln_max, sl_thick_min;

for(i=0;i<T;i++)

neighbours[i][0]=neighbours[i][1]=neighbours[i][2] =
-1;

if(uniform_slicing!=1)
    {
        get_adaptive_planes();

printf(" \nNUMBER OF SLICES(varying
thickness)=%d",all_slices);

for(i=all_slices-1;i>=0;i--,curr_pln_num++)
        {
            curr_pln = all_planes[i];
            num=0;
            isl_num=0;
            islands[curr_pln_num]=0;
```

APPENDIX PAGE 24

```
              for(j=0;j<R;j++)
              {
                    eliminated[j]=-1;
              } get_everything();

intersec[curr_pln_num][isl_num] = num;
        }
        curr_pln_min = z_min;
        curr_pln_max = z_max;

curr_pln_num=0;
        sl_thick_min = uniform_slice_thick;

for(curr_pln=curr_pln_min;
curr_pln<curr_pln_max+sl_thick_min -0.000001 ;
              curr_pln =
curr_pln+sl_thick_min,curr_pln_num++)
        {
        }
    } /* end of while */ if(uniform_slicing==1)
    { curr_pln_min = z_min;
        curr_pln_max = z_max;
        curr_pln_num = 0;
        sl_thick_min = uniform_slice_thick;

for(curr_pln=curr_pln_max;
curr_pln>curr_pln_min-sl_thick_min +0.000001 ;
              curr_pln =
curr_pln-sl_thick_min,curr_pln_num++)
        {
              if(curr_pln<curr_pln_min)curr_pln =
curr_pln_min;
              num=0;
              isl_num=0;
              islands[curr_pln_num]=0;
```

APPENDIX PAGE 25

```
                for(i=0;i<R;i++)
                {
                        eliminated[i]=-1;
                } get_everything();
                intersec[curr_pln_num][isl_num] = num;

}
        printf(" \nNUMBER OF SLICES(uniform
thickness)=%d",curr_pln_num-1);

} /* end of while */
}

/* Code for thickness calculator means begins. */
    /* Code for simple back tracking means begins. */ get_adaptive_planes()
{
    int act_gr,i,j,k, count=0, count2;
    double sl_thick, possible_pln;
    double curr_pln_min, curr_pln_max;

if(sl_axis==0) {
        curr_pln_min = x_min;
        curr_pln_max = x_max;
    }
    else
        if(sl_axis==1) {
            curr_pln_min = y_min;
            curr_pln_max = y_max;
        }
        else
            if(sl_axis==2) {
                curr_pln_min = z_min;
                curr_pln_max = z_max;
            } all_planes[count]=curr_pln_min;
    count = count+1;
    act_pln = all_planes[0];

do
    {
```

APPENDIX PAGE 26

```
        for(act_gr=0;act_gr<total_num_groups;
act_gr++)
        {
                if(act_pln>group[act_gr]->max)
continue;
                if(act_pln >= group[act_gr]->min)
break;
        }

/* act_gr is the group number through or just
above which  curr_pln is passing through. */ get_highest_angle_nor(&act_gr);

get_next_slice_thick(&sl_thick);

possible_pln = act_pln + sl_thick;
        i = act_gr;
        count2=0;

/* to find how many groups the possible plane
crossed from group i*/ for(j=act_gr+1;j<total_num_groups;j++)
        {
                if(possible_pln<=group[j]->min) break;
        }

/* if j-act_gr= 1 possible plane still falls
in group[act_gr].  Same as curr_pln.  If j-act_gr is 2
possible plane is in group[act_gr+1]. */ if((j-act_gr) != 1)
        {

/* Code for repeated back tracking means begins.
*/
                i = i+1;
                do
                {
                        if(get_highest_angle_nor(&i)== -1)
{
                                i++;
                                continue;
                        }
                        get_next_slice_thick(&sl_thick);

if(act_pln> group[i]->min)
```

APPENDIX PAGE 27

```c
                {
    if(possible_pln>act_pln+sl_thick)
                        {
                                possible_pln =
act_pln+sl_thick;
                                i++;
                                continue;
                        } else {
                                i++;
                                continue;
                        }
                }
                        if(possible_pln>
group[i]->min+sl_thick)
                        {
                                possible_pln =
group[i]->min+sl_thick;
                                i++;
                                continue;
                        }
                        i++;

}while(i<j);

/* Code for repeated back tracking means ends. */

}
        act_pln = all_planes[count++] =
possible_pln;
                if(all_planes[count-1]-all_planes[count-2] <
min_slice_thick)
                        act_pln = all_planes[count-1] = all_planes[count-2]+min_slice_thick;

/* printf("nor=%lf pln=%lf\n count=%d",
highest_nor*180*7/22, act_pln, count);

*/       if(act_pln >
curr_pln_max)
                        {
                act_pln = all_planes[count-1]=
curr_pln_max ;
                        /*printf("pln=%lf", act_pln);*/
                }
```

APPENDIX PAGE 28

```
        )while(act_pln<curr_pln_max);

all_slices = count;

} get_highest_angle_nor(j)
int *j;
{
        double sl_thick;
        int remove=0,i,k, count;

/* normal that makes the highest angle to the
sl_axis.  Higher the angle of normal lower is slice
thickness. */

/* possible highest angle is 90 */ q10:
        for(i=group[*j]->first;i<=group[*j]->last;i++)
        {

/* there can be some triangles in each group
which may not have an intersection with the
curr_plane. Following condition eliminates such
triangles.  Eliminated triangle number is stored in
eliminate[]. */ if(act_pln>obj[obj_num].tri[i]->ver[2]->axis[sl_axis])
                {
                        eliminated[remove]=i;
                        remove = remove+1;
                        continue;
                }

/* when the above condition is not true then
there must be an intersection between curr_pln and
curr_tri (=i).  So this triangle need not be checked
further and can be eliminated after calculating the
intersection point. */
        } if(remove-1 == group[*j]->last -
group[*j]->first){
                remove=0;
                if(++*j>total_num_groups){
                        return(-1);
```

APPENDIX PAGE                  29

```
                }
                else goto q10;
        } highest_nor =0;

for(i=group[*j]->first; i<= group[*j]->last; i++)
        {
                for(k=0;k<=remove;k++)
                {
                        if(eliminated[k] == i) {
                                count=1;
                                break;
                        }
                }
                if(count==1){
                        count=0;
                        continue;
                } if(obj[obj_num].tri[i]->nor.axis[sl_axis]<0)
                        obj[obj_num].tri[i]->nor.axis[sl_axis]
= -1 *
obj[obj_num].tri[i]->nor.axis[sl_axis];
                /*printf("asin%lf",
asin(obj[obj_num].tri[i]->nor.axis[sl_axis]));*/ if(asin(obj[obj_num].tri[i]->nor.axis[sl_axis])>
highest_nor)
                        highest_nor =
asin(obj[obj_num].tri[i]->nor.axis[sl_axis]);

}
}

/* Code for thickness calculator means ends. */
        /* Code for back tracking means ends. */
/* get_next_slice_thick(sl_thick)
double *sl_thick;
{ double ratio;

highest_nor = highest_nor *180*7/22;
        ratio = (90-highest_nor)/90;
```

APPENDIX PAGE 30

```
*/     /* note pointer "*" and multiplication"*"    */
/*       *sl_thick= ratio * max_slice_thick;

if(highest_nor!=0 && highest_nor !=90)
{
        *sl_thick= ratio * max_slice_thick_for_ill;
}

}
*/

/* Code for facet processor means begins again.
*/
        /* Code for facet grouping means begins again. */ get_new_group()
{
        int i,j,k=0;

for(i=0; i<=total_num_groups; i++)
        { if(curr_pln<group[i]->min) break;
                if(i==total_num_groups)
                {
                        if(curr_pln >= group[i]->min &&
curr_pln <=group[i]->max)
                                for(j=group[i]->first;
j<=group[i]->last;j++)
                                {
if(curr_pln<=obj[obj_num].tri[j]->ver[2]->axis[sl_axis
])
                                        new_gr[k++] = j;
                                }
                } else if(curr_pln >= group[i]->min &&
curr_pln < group[i]->max)
                {
                        for(j=group[i]->first;
j<=group[i]->last;j++)
                        {
if(curr_pln<obj[obj_num].tri[j]->ver[2]->axis[sl_axis]
```

APPENDIX PAGE 31

```
                                                    )
                                                            new_gr[k++] = j;
                                        )
                            )
                tri_in_curr_pln = k-1;
    )

/* Code for facet grouping means ends again. */
        /* Code for facet processor means ends again. */

/* Code for slicer means begins. */

/* i is the triangle number for which the
intersection point is to be calculated. */ get_intersection_pt(i)
int i;
{ int j, common_ver= -1, common_line= -1;
        static double x1_old, y1_old, z1_old, x2_old,
y2_old, z2_old;
        double x_new, y_new, z_new, x1, y1, z1, x2, y2,
z2;
        static double x_old, y_old, z_old;

/* checking if curr_plane is passing through the
vertex j(0,1or 2) of i.  i is nothing but the current
triangle. */ for(j=0;j<3;j++)
        { if(obj[obj_num].tri[i]->ver[j]->axis[sl_axis] ==
curr_pln)
            {
        /* when the above condition is true curr_pln is
passing through vertex j.  Coordinates of intersection
are simply the coordinates of vertex j of triangle i.
*/

/*      z_new =
pln[curr_pln_num].isl[isl_num].intpts[num].axis[sl_axi
s]=
            obj[obj_num].tri[i]->ver[j]->axis[sl_axis];

x_new =
pln[curr_pln_num].isl[isl_num].intpts[num].axis[ax1]=
                obj[obj_num].tri[i]->ver[j]->axis[ax1];
```

APPENDIX PAGE 32

```
            y_new =
pln[curr_pln_num].isl[isl_num].intpts[num].axis[ax2]=
        obj[obj_num].tri[i]->ver[j]->axis[ax2];
*/ z_new =
obj[obj_num].tri[i]->ver[j]->axis[sl_axis];

x_new =
obj[obj_num].tri[i]->ver[j]->axis[ax1];

y_new =
obj[obj_num].tri[i]->ver[j]->axis[ax2];

/* following condition is necessary to
ensure that the new
        intersection point is not equal to the earlier
point */
            if(x_new == x_old && y_new == y_old &&
z_new == z_old)
                {
                    common_ver =j;
                    continue;
                }
                else
                {
                    x_old = x_new;
                    y_old = y_new;
                    z_old = z_new;
                }

/* loading the inter-section points into a
file. */
                fprintf(fp1,"\n%d  %d",
curr_pln_num, isl_num);
                fprintf(fp1,"  %lf  %lf  %lf",
x_new, y_new, z_new);

num = num +1;
        /* every intersection is identified by a
number given by "num".  sequence[num] gives the
triangle number for that intersection.  Each triangle
can have only one intersection.  sequence[num] = i;*/ return(j);  /* vertex num is
returned */
            }
        }
    }
```

APPENDIX PAGE 33

```
        /* this part of prog is executed only when
curr_pln does not pass through any of the vertices of
i or passes through a vertex which is equal to x_old,
y_old and z_old(in which case common_ver=j.  when
common_ver. */

/* to check if the curr_pln is passing through
one of the sides of i.*/ if(curr_pln >
obj[obj_num].tri[i]->ver[0]->axis[sl_axis] &&
            curr_pln <
obj[obj_num].tri[i]->ver[1]->axis[sl_axis]) j=0;
        else
q1:
            if(curr_pln >
obj[obj_num].tri[i]->ver[1]->axis[sl_axis] &&
                curr_pln <
obj[obj_num].tri[i]->ver[2]->axis[sl_axis]) j=1;
            else
q2:
                if(curr_pln >
obj[obj_num].tri[i]->ver[0]->axis[sl_axis] &&
                    curr_pln <
obj[obj_num].tri[i]->ver[2]->axis[sl_axis]) j=2;
                else
                {
                        if(common_line== -1)
return(common_ver);
                        else return(common_line);
                }

/* when above condition is true curr_pln is
passing through line joining ver0 and ver1.  Else it
is passing through the other two lines. */

/* calculate of point of intersection. */
        /*
pln[curr_pln_num].isl[isl_num].intpts[num].axis[sl_axi
s]= curr_pln;
*/
        /* for the sake of convenience following code is
written.  x_new need not always represent x coordinate
of intersection point.  Similarly, y and z.
Similarly, x1,y1 etc. it is true only when sl_axis is
2 (ie. z). */ x1 =  obj[obj_num].tri[i]->ver[j]->axis[ax1];
        y1 =  obj[obj_num].tri[i]->ver[j]->axis[ax2];
        z1 =  obj[obj_num].tri[i]->ver[j]->axis[sl_axis];
```

APPENDIX PAGE 34

```
      if(j==2) j=-1;
      x2 = obj[obj_num].tri[i]->ver[j+1]->axis[ax1];
      y2 = obj[obj_num].tri[i]->ver[j+1]->axis[ax2];
      z2 =
obj[obj_num].tri[i]->ver[j+1]->axis[sl_axis];
      if(j== -1) j=2;

if((x1_old == x1 && y1_old == y1 && z1_old == z1
&&
          x2_old == x2 && y2_old == y2 && z2_old == z2)
||
          (x2_old == x1 && y2_old == y1 && z2_old == z1
&&
          x1_old == x2 && y1_old == y2 && z1_old ==
z2))
      {
            common_line = 10*(j+(j+1));
            if(j==0) goto q1;
            if(j==1) goto q2;
            if(j==2) return(common_line);
      } else
      {
            x1_old = x1;
            y1_old = y1;
            z1_old = z1;
            x2_old = x2;
            y2_old = y2;
            z2_old = z2;
      }

/* x_new, y_new and z_new represent coordinates
of intersection. */

/*z_new =
pln[curr_pln_num].isl[isl_num].intpts[num].axis[sl_axi
s]=
            curr_pln;

x_new =
pln[curr_pln_num].isl[isl_num].intpts[num].axis[ax1]=
            x1 + ((z_new - z1) * (x2 - x1) / (z2 - z1));

y_new =
pln[curr_pln_num].isl[isl_num].intpts[num].axis[ax2]=
            y1 + ((z_new - z1) * (y2 - y1) / (z2 - z1));
*/ z_new =   curr_pln;

x_new = x1 + ((z_new - z1) * (x2 - x1) / (z2 -
```

APPENDIX PAGE                 35

```
        z1));

y_new = y1 + ((z_new - z1) * (y2 - y1) / (z2 -
z1));

fprintf(fp1,"\n%d   %d", curr_pln_num,isl_num);
        fprintf(fp1,"   %lf   %lf   %lf", x_new, y_new,
z_new);

num = num+1;
        /*if intersection is with line ver0 and ver1
(0+1)*10 is returned.  if intersection is with ver1
and ver2 (1+2)*10 is returned.  intersection with ver2
and ver0 (2+0)*10.  Multiplication with 10 is
necessary form the value returned it will be easy to
identify type of intersection. */ if(j==2) return(20);
        return(10*(j+(j+1)));
}

/* Code for marching means begins. */

/*curr_tri is the triangle for which adjacent
triangle is to be found out.  Note that curr_tri is
already in the eliminated list.  ver_num is the number
of vertex of curr_tri through which plane passes
through. */ get_adj_tri1(curr_tri,ver_num)
int curr_tri, ver_num;
{
        int count,i,j,k=0;

for(k=0; k<3;k++)
            if(neighbours[curr_tri][k]!=-1)
            {
                i=neighbours[curr_tri][k];
                for(j=0;j<=bad;j++)
                {
                    if(eliminated[j] == i) {
                        count=1;
                        break;
                    }
                }
            }
        /* when count =1 that triangle need not be
checked for adjacency.  That triangle is already in
eliminated list.  So loop continues */
```

APPENDIX PAGE 36

```
            if(count==1){
                count=0;
                continue;
            }

/* comparing the three coordinates of curr_tri
with three coordinates of each vertex of triangle "i".
When there is a match "i" will be one of the adjacent
triangles which share the same vertex. */ for(j=0;j<3;j++)
            { if(obj[obj_num].tri[curr_tri]->ver[ver_num]->axis[0]
== obj[obj_num].tri[i]->ver[j]->axis[0] && obj[obj_num].tri[curr_tri]->ver[ver_num]->axis[1] == obj[obj_num].tri[i]->ver[j]->axis[1] && obj[obj_num].tri[curr_tri]->ver[ver_num]->axis[2] == obj[obj_num].tri[i]->ver[j]->axis[2])
                    {
                            return(i);
                    }
            }
        } for(k=0; k<=tri_in_curr_pln;k++)
        {
            i=new_gr[k];
            for(j=0;j<=bad;j++)
            {
                if(eliminated[j] == i) {
                    count=1;
                    break;
                }
            }
            /* when count =1 that triangle need not be
checked for adjacency.  That triangle is already in
eliminated list.  So loop continues. */ if(count==1){
                count=0;
```

APPENDIX PAGE 37

```
                    continue;
            }

/* comparing the three coordinates of curr_tri
    with three coordinates of each vertex of triangle "i".
    When there is a match "i" will be one of the adjacent
    triangles which share the same vertex. */ for(j=0;j<3;j++)
            { if(obj[obj_num].tri[curr_tri]->ver[ver_num]->axis[0]
    == obj[obj_num].tri[i]->ver[j]->axis[0] && obj[obj_num].tri[curr_tri]->ver[ver_num]->axis[1] == obj[obj_num].tri[i]->ver[j]->axis[1] && obj[obj_num].tri[curr_tri]->ver[ver_num]->axis[2] == obj[obj_num].tri[i]->ver[j]->axis[2]) return(i);
            }
        }
        return(-1);

}

/*curr_tri is the triangle for which adjacent
triangle is to be found out. Note that curr_tri is
already in the eliminated list. vers gives which two
vertices which form the line. We have to find a
triangle that shares same line with curr_tri. */ get_adj_tri2(curr_tri,vers)
int curr_tri, vers;
{
    int count,i,j,k, ver1, ver2, match,h,count11=0;

for(k=0;k<3;k++)
        if(neighbours[curr_tri][k]!= -1)
        {
            i = neighbours[curr_tri][k];

for(h=0;h<bad;h++)
```

APPENDIX PAGE 38

```
            {
                if(eliminated[h] == i) {
                    count=1;
                    break;
                }
            }
            if(count==1) {
                count=0;
                continue;
            } if(vers==10){
                ver1 = 0;
                ver2 = 1;
            }
            else
                if(vers==20){
                    ver1 = 2;
                    ver2 = 0;
                }
                else
                    if(vers==30){
                        ver1 = 1;
                        ver2 = 2;
                    } for(j=0;j<3;j++)
            {
                if(obj[obj_num].tri[curr_tri]->ver[ver1]->axis[0] ==
                obj[obj_num].tri[i]->ver[j]->axis[0] && obj[obj_num].tri[curr_tri]->ver[ver1]->axis[1] ==
                obj[obj_num].tri[i]->ver[j]->axis[1] && obj[obj_num].tri[curr_tri]->ver[ver1]->axis[2] ==
                obj[obj_num].tri[i]->ver[j]->axis[2]) {
                    match=1;
                    break;
                }
            }
            if(match==1)
            {
                for(j=0;j<3;j++)
                {
```

APPENDIX PAGE                39

```
        if(obj[obj_num].tri[curr_tri]->ver[ver2]->axis[0] ==
        obj[obj_num].tri[i]->ver[j]->axis[0] && obj[obj_num].tri[curr_tri]->ver[ver2]->axis[1] ==
        obj[obj_num].tri[i]->ver[j]->axis[1] && obj[obj_num].tri[curr_tri]->ver[ver2]->axis[2] ==
        obj[obj_num].tri[i]->ver[j]->axis[2])
                         {
                                match=2;
                                /* if(success1 % 100
==0)printf("S1=%d", success1++); */
                                return(i);
                         }
                      }
                 }
              match=0;
           } for(k=0;k<=tri_in_curr_pln;k++)
        {
            i = new_gr[k];
            for(j=0;j<bad;j++)
            {
                if(eliminated[j] == i) {
                    count=1;
                    break;
                }
            }

/* when count =1 that triangle need not be
checked for adjacency.  That triangle is already in
eliminated list.  So loop continues. */ if(count==1){
                  count=0;
                  continue;
            }

/* comparing the three coordinates of curr_tri
with three coordinates of each vertex of triangle "i".
```

APPENDIX PAGE 40

```
        When there is a match "i" will be one of the adjacent
        triangles which share the same vertex. */ if(vers==10){
                         ver1 = 0;
                         ver2 = 1;
                    }
                    else
                         if(vers==20){
                              ver1 = 2;
                              ver2 = 0;
                         }
                         else
                              if(vers==30){
                                   ver1 = 1;
                                   ver2 = 2;
                              } for(j=0;j<3;j++)
                    {
if(obj[obj_num].tri[curr_tri]->ver[ver1]->axis[0] == obj[obj_num].tri[i]->ver[j]->axis[0] && obj[obj_num].tri[curr_tri]->ver[ver1]->axis[1] == obj[obj_num].tri[i]->ver[j]->axis[1] && obj[obj_num].tri[curr_tri]->ver[ver1]->axis[2] == obj[obj_num].tri[i]->ver[j]->axis[2]) {
                              match=1;
                              break;
                         }
                    }
                    if(match==1)
                    {
                         for(j=0;j<3;j++)
                         {
if(obj[obj_num].tri[curr_tri]->ver[ver2]->axis[0] == obj[obj_num].tri[i]->ver[j]->axis[0] &&
```

APPENDIX PAGE 41

```
            obj[obj_num].tri[curr_tri]->ver[ver2]->axis[1] ==
            obj[obj_num].tri[i]->ver[j]->axis[1] && obj[obj_num].tri[curr_tri]->ver[ver2]->axis[2] ==
            obj[obj_num].tri[i]->ver[j]->axis[2])
                            {
                                    match=2;
                                    for(h=0;h<3;h++)
                                    {
if(neighbours[curr_tri][h] ==i) break;
if(neighbours[curr_tri][h] == -1)
                                            {
neighbours[curr_tri][h]=i;
                                                    break;
                                            }
                                    }
                                    for(h=0;h<3;h++)
                                    {
                                            if(neighbours[i][h] ==
curr_tri) break;
                                            if(neighbours[i][h] ==
-1)
                                            {
neighbours[i][h]=curr_tri;
                                                    break;
                                            }
                                    }
                                    return(i);
                            }
                    }
            }
            match=0;
    }
    return(-1);
}

/* Code for marching means ends. */
    /* Code for slicer means ends. */
```

APPENDIX PAGE 42

```c
        /* This program called "reverse.c" ensures that
the line segments that form each contour are in
clockwise order. */ include <stdio.h>
include <math.h>
int   curr_pln_num, curr_isl_num, earlier_pln_num,
earlier_isl_num, cw;
int y_min_is_here;

double x[30000], y[30000], z[30000];

FILE *fp1, *fp2;
/* yes will be 0 and no will be 1 bec. of
enumeration*/
enum {
      yes=1, no};

main()
{ fp1 = fopen("int_pts", "r");
      fp2 = fopen("new_int_pts", "w");

read_pts();
      fclose(fp1);
      fclose(fp2);

system("mv new_int_pts int_pts");

} read_pts()
{
      int i, first_time = 1 ;
      double  z_min, z_max, y_min;

fscanf(fp1, "%lf %lf", &z_min, &z_max);
      fprintf(fp2, "%lf %lf", z_min, z_max);

for(i=0; feof(fp1)==0; i++)
      {
            if(fscanf(fp1, "%d %d", &curr_pln_num,
&curr_isl_num)!=2)break;
            if(first_time==yes)
```

APPENDIX PAGE 43

```
        {
                earlier_pln_num = curr_pln_num;
                earlier_isl_num = curr_isl_num;
        } else
                if(earlier_pln_num != curr_pln_num ||
                   earlier_isl_num != curr_isl_num)
                { chk_pts_for_direction(i-1);
                        rewrite_pts(i-1);

earlier_pln_num = curr_pln_num;
                        earlier_isl_num = curr_isl_num;
                        first_time = yes;
                        i = 0;
                }

/*      allocating memory for x and y
        x = (double *) malloc(sizeof(double));
        y = (double *) malloc(sizeof(double));

if(x == NULL || y = NULL)
        {
                printf("Could not allocate memory for x or y
in function   read_pts in reverse.c");
                exit(-1);
        }
*/ fscanf(fp1, " %lf %lf %lf", &x[i], &y[i],
&z[i]);

/* when curr point is identical to prev
point it is skipped */
        if(x[i] == x[i-1] &&
           y[i] == y[i-1] &&
           z[i] == z[i-1])
        {
                i = i-1;
                continue;
        } if(first_time == yes)
        {
```

APPENDIX PAGE                    44

```
                y_min = y[i];
                y_min_is_here = i;
                first_time = no;
            }

/* finding y_min and its number */
            else if(y[i] < y_min)
            {
                y_min = y[i];
                y_min_is_here = i;
            }

} chk_pts_for_direction(i-1);
        rewrite_pts(i-1);
    }

/* i is num of points in curr_island of curr_plane */
chk_pts_for_direction(i)
int i;
{
    double next_x, next_y, prev_x, prev_y, theta_in,
theta_out;

/* there should be atleast 3 points in a contour.
so if i is less
        than 2 for the time being cw is selected */
    if(i<2) return(cw=yes);

/* when y_min_is_here is last point (=i) or first
point (=0) special
        conditions are required */ if(y_min_is_here == 0)
    {
        prev_x = x[i];
        prev_y = y[i];
    }
    else
    {
        prev_x = x[y_min_is_here-1];
        prev_y = y[y_min_is_here-1];
    }
```

APPENDIX PAGE 45

```
        if(y_min_is_here == i)
        {
              next_x = x[0];
              next_y = y[0];
        }
        else
        {
              next_x = x[y_min_is_here+1];
              next_y = y[y_min_is_here+1];
        } if(prev_x == next_x && prev_y == next_y)
        {
              printf("at %d point in %d island of %d prev
        and next points are identical.", y_min_is_here,
        curr_isl_num,
                    curr_pln_num);
              cw=yes;
        } theta_in = atan((prev_y -
y[y_min_is_here])/(prev_x - x[y_min_is_here]));
        theta_out = atan((next_y -
y[y_min_is_here])/(next_x - x[y_min_is_here]));

/* converting into degrees */
        theta_in = theta_in * (180*7)/(2*22);
        theta_out = theta_out * (180*7)/(2*22);

if(prev_x< x[y_min_is_here]) theta_in =
theta_in+180;
        if(next_x< x[y_min_is_here])theta_out =
theta_out+180;

if(theta_in < theta_out) return(cw=yes);
        else return(cw = no);

}
```

APPENDIX PAGE 46

```
rewrite_pts(last_pt)
int last_pt;
{
    int j;

if(cw == no)
    {
        for(j=last_pt; j>=0; j--)
            fprintf( fp2,"\n%d %d %12.9f %12.9f %12.9f", earlier_pln_num,earlier_isl_num, x[j], y[j], z[j]);

} if(cw == yes)
    {
        for(j=0; j<=last_pt; j++)
            fprintf( fp2,"\n%d %d %12.9f %12.9f %12.9f", earlier_pln_num,earlier_isl_num, x[j], y[j], z[j]);

} fprintf(fp2, "\n");
}
```

APPENDIX PAGE 47

```
/****************************************************
         ADAPTIVE SLICING OF 3-D MODELS IN STL FORMAT

DEVELOPED BY

KAMESH M. TATA
                 MECHANICAL ENGINEERING
                CLEMSON UNIVERSITY, SC 29631

*****************************************************/
     /* This program called "visual_slice.c" is used
to display the sliced model obtained from the program
called "slice.c". */ include <stdio.h>
include <math.h>
#define N 50000 /* Limiting the number of triangles of
each object to N */
#define M 1    /* Limiting the number of objects to M
*/
#define O 40000  /* Limiting the number of groups of
triangle to O */
#define P 5000   /* Limiting the number of cutting
planes to P */
#define Q 120     /* Limiting the number of islands per
plane to Q */
#define R 10000   /* Limiting the number of points of
intersec per island per
plane to R */
#define T 50000 /* value of numerator that decides the
slice thickness */
/*#define max_slice_thick 0.08
*/
#define DMEM_CONST  500

/* note that tri is for triangle. nor is for normal.
ver
           is for vertex. */

/* declaration of point structure with an array as its
member */
struct point {
     double axis[3];
};

/* triangle is a structure with two member structures
"nor, *ver[3]
        Both nor and *ver[3] are structures of type
"struct point". *ver[3]
           is a pointer to  struct ver[3]??? */
```

APPENDIX PAGE 48

```c
struct triangle {
    struct point nor;
    struct point *ver[3];
};

/* object is a structure with an array of structures
*tri[N] pointing
       to its members normal and *ver[] */
struct object {
    struct triangle *tri[N];
};

/* obj[M] is a structure of type object. It is not a
pointer. Pointer
       is not necessary bec this program is not
expected to sort objects */
struct object obj[M];
/* first and last store the number of first and last
triangles in that
       group. min and max store the min and max
values of sl_axis co-ords
       in that group of triangles */

/* structure group[] to hold number of groups and
number of triangles in
       each group */
struct gr {
    int first, last;
    double min,max} *group[O];

/* structure to draw the picture. need not be global.
check this*/
struct   {
    double x,y,z;
} poly[3];

/* with the following 3 structures you can access say
x coord of 20th
       intersection point of island 4 of cutting
plane 2 by writing
       pln[2].isl[4].point[20][0] */
/* structure to hold intersection points for each
island */
struct islands {
    struct point *intpts };

/* structure to hold number of islands for each
cutting plane */
struct plane {
    struct islands isl[Q];
};
```

APPENDIX PAGE 49

```c
/* structure to hold number of cutting planes */
struct plane *pln;

double x_min,x_max,y_min,y_max,z_min,z_max,
highest_nor,max_slice_thick;
double curr_gr_min, curr_gr_max, curr_pln,
all_planes[P], act_pln;
int tri_num, obj_num=0,max_triangles[M], sl_axis,
ax1,ax2, total_num_groups;
int curr_pln_num, num, isl_num, isl_num1, curr_gr,
bad;
int curr_gr_first,curr_gr_last, eliminated[R],
curr_pln_num1;
char obj_type[20], obj_name[20];
int intersec[R][Q], intersec1[R][Q], islands[P];
int islands1[P], all_slices, tri_in_curr_pln,
new_gr[20000],
neighbours[T][3], success1, success2,read_sorted_file
;
double max_slice_thick_for_ill, min_slice_thick,
accuracy_req, uniform_slice_thick;

double lowest_theta, highest_theta;
int criteria,
there_is_a_vertical_wall,there_is_a_horizontal_wall;

float desired_cusp_height, desired_max_deviation,
desired_chord_length;

main(argc, argv)
int argc;
char **argv;
{
    FILE *fp;

if(argc == 2)
        fp = fopen(argv[1], "r");
    else
    {
        fprintf(stderr, "\nAlternate Usage : %s
<filename>\n\n", argv[0]);
        fp = stdin;
    } printf("\nENTER 1 TO READ SORTED STL FILE, ELSE
```

APPENDIX PAGE 50

```
    ENTER ANY OTHER NUMBER  ");
        scanf("%d", &read_sorted_file);

if(read_sorted_file==1)read_sorted_stl_file(fp);
        else read_stl_data(fp);

printf("After read.\n");

/* get_xyz_max_min() is to calculate max and min
values for
                auto scaling and other uses during
computations for
                    intersections. */
        get_xyz_max_min();
        theta_min_and_theta_max();

get_slice_axis();
        sort_vertices();

/* sort triangles in ascending order considering
the value of
                sl_axis co-ordinate of first vertex. If
sl_axis is, say 1,
                y coordinate of first vertex is
considered for sorting */
        sort_triangles();

/* all triangles with equal sl_axis cord of first
vertex (after
                sorting vertices) will be in one group */
        group_triangles();

/* store_stl_data() is to store the data read in
a different
                file in a different format. */
        /*  store_stl_data();
*/ multi_slicing();

create_menu_window();
        create_picture_window_and_picture();
        user_interaction_control();
        HC_Pause();
    }
```

APPENDIX PAGE 51

```
    /* BODY OF THE FUNCTION create_menu_window()    */ create_menu_window()
{
    HC_Open_Segment("?Picture/menu");
    HC_Set_Window(0.75,1.0,-1.0,1.0);
    HC_Set_Text_Size(0.7);

/* THE FOLLWING WINDOWS ARE CONTAINED IN THE
ABOVE WINDOW */ small_menu_window("rotate-x",-1.0,1.0,0.75,1.0);

/* DO NOT WRITE UPPER CASE LETTERS. ROTATE-X IS
NOT ACCEPTABLE
          (NO ERROR MESSAGE IS DISPLAYED) ONLY
rotate_x is right. */ small_menu_window("rotate-y",-1.0,1.0,0.5,0.75);
    small_menu_window("rotate-z",-1.0,1.0,0.25,0.5);

small_menu_window("rotate-xyz",-1.0,1.0,0.0,0.25);
    small_menu_window("scale",-1.0,1.0,-0.25,0.0);
    small_menu_window("move",-1.0,1.0,-0.5,-0.25);
    small_menu_window("plane",-1.0,1.0,-0.75,-0.5);
    small_menu_window("quit",-1.0,1.0,-1.0,-0.75);
    HC_Close_Segment();
}

/* BODY OF THE FUNCTION  small_menu_window()    */ small_menu_window(name, xmin, xmax, ymin, ymax)

char *name;
float xmin, xmax, ymin, ymax;

{
    HC_Open_Segment(name);
    HC_Set_Window(xmin, xmax, ymin, ymax);
    HC_Insert_Text(0.0,0.0,0.0,name);
    HC_Close_Segment();
}

/* BODY OF THE FUNCTION  create_picture_window_and
_picture()    */
```

APPENDIX PAGE 52

```
create_picture_window_and_picture()
{
      HC_Open_Segment("?Picture/scene");
      HC_Set_Window(-1.0,0.75,-1.0,1.0);     /* OPEN
WINDOW X */
      HC_Set_Color("face=yellow, edge= red");
      HC_Close_Segment();
      HC_Define_Alias("?scene", "?Picture/scene");

HC_Open_Segment("?scene/textwin1");
      HC_Set_Window(-1.0,0.0,-1.0,-0.9);
      HC_Set_Text_Size(0.5);
      HC_Insert_Text(-0.6,0.0,0.0,"ADAPTIVELY SLICED
MODEL");
      HC_Close_Segment();

HC_Open_Segment("?scene/textwin2");
      HC_Set_Window(0.0,1.0,-1.0,-0.9);
      HC_Set_Text_Size(0.5);
      HC_Insert_Text(-0.6,0.0,0.0,"UNIFORMLY SLICED
MODEL");
      HC_Close_Segment();

/* FRONT VIEW */

HC_Open_Segment("?scene/front view");
      HC_Set_Window(-1.0,0.0,-0.9, 1.0);
      HC_Open_Segment("object");
      HC_Set_Color("face=yellow, edge= red");
      set_camera();
      draw_variable_slice();
      HC_Close_Segment();
      HC_Close_Segment();    /* CLOSE WINDOW X */

HC_Define_Alias("?front view","?scene/front
view");

HC_Open_Segment("?scene/toolpath top view");
      HC_Set_Window(0.0,1.0,-0.9, 1.0);
      HC_Open_Segment("object");
      HC_Set_Color("face=yellow, edge= red");

set_camera();
      draw_uniform_slice();
      HC_Close_Segment();
      HC_Close_Segment();

HC_Open_Segment("?scene/axiswin1");
```

APPENDIX PAGE                 53

```
        HC_Set_Window(-0.15,0.15,0.7,1.0);
        draw_axis();
        HC_Close_Segment();

/*
        HC_Open_Segment("?scene/toolpath iso view");
        HC_Set_Window(-1.0,1.0,-0.1,0.8);
        HC_Open_Segment("object");
        HC_Set_Color("face=yellow, edge= red");

set_camera_for_iso();
        draw_variable_slice();
        HC_Close_Segment();
        HC_Close_Segment();
*/
        /*
        HC_Open_Segment("?scene/object iso view");
        HC_Set_Window(0.0,1.0,-0.1,0.8);
        HC_Open_Segment("object");
        color_setting();
        set_camera_for_iso();
        insert_polygon();
        HC_Close_Segment();
        HC_Close_Segment();

*/

} draw_axis()
{
        HC_Insert_Line(-0.9,-0.9,0.0,0.9,-0.9,0.0);
        HC_Insert_Line(-0.9,-0.9,0.0,-0.9,0.9,0.0);
        HC_Set_Text_Size(0.5);
        HC_Insert_Text(0.8,-0.8,0.0,"X");

if(sl_axis==2)HC_Insert_Text(-0.8,0.8,0.0,"Z");
        else
                HC_Insert_Text(-0.8,0.8,0.0,"Y");

}

/* BODY OF THE FUNCTION user_interaction_control */ define  streq(a,b)  (strcmp(a,b) == 0)
```

APPENDIX PAGE 54

```c
/* NOTICE THAT THERE IS NO SEMI COLON HERE */ user_interaction_control()
{
        char    segment[50];
        float   anglex, angley, anglez, scale, movex,
movey, movez;

HC_Open_Segment("?Picture/scene");

/* OPENING THE SEGMENT picture WHERE THE MAIN
PICTURE IS
              DRAWN */ for(; ;)
        {
                HC_Get_Selection(segment);   /* GET MOUSE
SELECTION    */ if((strcmp(segment, "rotate-x")==0))
                {
                        printf("\nPLEASE TYPE IN ANGLE OF
ROTATION ABOUT \"X\" (DEGREES)=");
                        scanf("%f", &anglex);
                        HC_Rotate_Object(anglex,0.0,0.0);
                } if(streq(segment, "rotate-y")) /* streq is
DEFINEd as strcmp(a,b)==0 */
                {
                        printf("\nPLEASE TYPE IN ANGLE OF
ROTATION ABOUT \"Y\" (DEGREES)=");
                        scanf("%f", &angley);
                        HC_Rotate_Object(0.0,angley,0.0);
                } else if(streq(segment, "rotate-z"))
                {
                        printf("\nPLEASE TYPE IN ANGLE OF
ROTATION ABOUT \"Z\" (DEGREES) =");
                        scanf("%f", &anglez);
                        HC_Rotate_Object(0.0,0.0,anglez);
                } else if(streq(segment, "rotate-xyz"))
                {
                        printf("\nPLEASE TYPE IN ANGLE OF
ROTATION ABOUT \"X\"(DEGREES)=\n");
```

APPENDIX PAGE 55

```
                scanf("%f", &anglex);

printf("\nTYPE IN ANGLE OF ROTATION
     ABOUT \"Y\" (DEGREES)=");
                scanf("%f", &angley);

printf("\nTYPE IN ANGLE OF ROTATION
     ABOUT \"Z\" (DEGREES)=");
                scanf("%f", &anglez);
                HC_Rotate_Object(anglex,angley,anglez);
            } else if(streq(segment, "scale"))
            {
                printf("\nTYPE IN THE SCALE FACTOR");
                scanf("%f", &scale);
                HC_Scale_Object(scale,scale,scale);
            } else if(streq(segment, "move"))
            {
                printf("\nTYPE IN THE DISTANCE TO MOVE
     IN \"X\"=");
                scanf("%f", &movex);

printf("\nTYPE IN THE DISTANCE TO MOVE
     IN \"Y\"=");
                scanf("%f", &movey);

printf("\nTYPE IN THE DISTANCE TO MOVE
     IN \"Z\"=");
                scanf("%f", &movez);

HC_Translate_Object(movex,movey,movez);

} else if(streq(segment,"quit")) break;

}

HC_Close_Segment();
        /* YOU WILL HAVE PROBLEMS IF HC-Close_Segment()
     IS PLACED
                INSIDE THE FOR LOOP. */
    } read_stl_data(fp)
```

APPENDIX PAGE 56

```
FILE *fp;

{
    int i,j;
    char dum1[20];

if(fp == stdin)
        fprintf(stderr, "WHERE IS THE .STL FILE BOY");

/* Every object is identified by its type and name in .stl
       file. (Type of object can be solid or surface. Name
       of object can be sphere, cone etc.).So, the condition !=2
                is valid only at the end of file
                or when the file is corrupt or not formatted */
q1:
    if(fscanf(fp, "%s %s",obj_type, obj_name)!=2)
    {
        printf(" %s %s",obj_type,obj_name);/*obj_num=obj_num-1;*/
        return;
    }
    while (getc(fp) != '\n'); /* to read all the characters in the first line
                                 for each object */

/* dum1 is always "FACET" unless it encounters a different
                object or end of file. Just when a new object
                or end of file is encountered total number of triangles in
                the earlier object is stored using max_triangle[obj_num] */
       for(tri_num=0;feof(fp)==0;tri_num++)
       {
           obj[obj_num].tri[tri_num] = (struct triangle *)malloc(sizeof(struct triangle));

fscanf(fp,"%s",dum1);
           if((strcmp(dum1,"FACET")!=0) && (strcmp(dum1,"facet")!=0))
           {
               max_triangles[obj_num]=tri_num-1;
               return;
           }
```

APPENDIX PAGE 57

```
            /* Reads x,y,z values of normal vectors.
(obj[..].tri[..]) points to
            nor this is indicated by -> @@@@@ nor.axis[..]
gives the value */
            if(fscanf(fp, " %*s %lf %lf %lf", &(obj[obj_num].tri[tri_num]->nor.axis[0]), &(obj[obj_num].tri[tri_num]->nor.axis[1]), &(obj[obj_num].tri[tri_num]->nor.axis[2]))!=3)
            {
                    printf("CHECK NEAR TRIANGLE %d IN .STL
FILE",tri_num);
            }
            /*    printf("nor=%lf %lf %lf \n", (obj[obj_num].tri[tri_num]->nor.axis[0]), (obj[obj_num].tri[tri_num]->nor.axis[1]), (obj[obj_num].tri[tri_num]->nor.axis[2]));

*/      /* Ignores reading characters "OUTER LOOP"
in .stl file*/
            fscanf(fp, "%*s %*s");

/* Reads x,y,z values of the three verices
of each triangle */
            for(i=0; i<3;i++)
            {
                    /* malloc allocates enough memory
required to store "struct point" */
                    obj[obj_num].tri[tri_num]->ver[i] =
                        (struct point
*)malloc(sizeof(struct point));

fscanf(fp, "%*s");
                    for(j=0; j<3;j++)
                            fscanf(fp, "%lf",
&(obj[obj_num].tri[tri_num]->ver[i]->axis[j]));
            /*    printf("ver #%d =%lf %lf %lf \n",
i, (obj[obj_num].tri[tri_num]->ver[i]->axis[0]), (obj[obj_num].tri[tri_num]->ver[i]->axis[1]), (obj[obj_num].tri[tri_num]->ver[i]->axis[2]));
*/
            }
            /* Ignores characters "ENDLOOP",
```

APPENDIX PAGE                58
    "ENDFACET"*/
            fscanf(fp, "%*s %*s");

}

}

/* reads stl_out file which is sorted */
read_sorted_stl_file(fp)
FILE *fp;
{
    int h,i,j;
    char nor[20];
    obj_num=0; /* this function works for one object files only */ fscanf(fp,"%s %s", obj_type, obj_name);

for(h=0;h<=obj_num;h++)
            for(i=0;feof(fp)==0;i++)
            {
                obj[obj_num].tri[i] = (struct triangle *)malloc(sizeof(struct triangle));

/* skips the string TRIANGLE and reads the following number*/
                fscanf(fp, "%*s %d",&i);
                fscanf(fp, " %s %lf %lf %lf",nor,
                    &(obj[h].tri[i]->nor.axis[0]),
                    &(obj[h].tri[i]->nor.axis[1]),
                    &(obj[h].tri[i]->nor.axis[2]));

for(j=0;j<3;j++)
                {
                    obj[obj_num].tri[i]->ver[j] =
                        (struct point *)malloc(sizeof(struct point));

fscanf(fp, " %lf %lf %lf",
                        &(obj[h].tri[i]->ver[j]->axis[0]),
                        &(obj[h].tri[i]->ver[j]->axis[1]),

APPENDIX PAGE                59

```
            &(obj[h].tri[i]->ver[j]->axis[2]));
                    }
                }
        tri_num=i-1;
        max_triangles[obj_num] = i-1;
        fclose(fp);
}

/* outputs x,y,z values of the normal and the three verices of
                    each triangle to stl_out file */
store_stl_data()
{
        FILE *fp;
        int h,i,j;

fp = fopen("stl_out", "w");
        fprintf(fp,"%s %s\n", obj_type, obj_name);

for(h=0;h<=obj_num;h++)
            for(i=0;i<tri_num;i++)
                {
                    fprintf(fp, "\nTRIANGLE %d \n",i);
                    fprintf(fp, "\t\t\tnor=%lf %lf %lf \n",
                        (obj[h].tri[i]->nor.axis[0]),
                        (obj[h].tri[i]->nor.axis[1]),
                        (obj[h].tri[i]->nor.axis[2]));

for(j=0;j<3;j++)
                        fprintf(fp, " %lf %lf %lf\n",
obj[h].tri[i]->ver[j]->axis[0],
obj[h].tri[i]->ver[j]->axis[1],
obj[h].tri[i]->ver[j]->axis[2]);
                } fclose(fp);
}
```

APPENDIX PAGE 60

```
theta_min_and_theta_max()
{
    float rad_to_deg ;
    int h,i;

for(h=0;h<=obj_num;h++)
        for(i=0;i<tri_num;i++)
        {
            rad_to_deg = 180*7/22;

highest_theta =0;

lowest_theta = 90;

for(i=0; i< tri_num; i++)
            {
if(obj[obj_num].tri[i]->nor.axis[2]<0)

obj[obj_num].tri[i]->nor.axis[2] = -1 * obj[obj_num].tri[i]->nor.axis[2];

/*printf("asin%lf",
asin(obj[obj_num].tri[i]->nor.axis[2]));*/ if(asin(obj[obj_num].tri[i]->nor.axis[2])>
            highest_theta)
                            { if(asin(obj[obj_num].tri[i]->nor.axis[2])*180*7/22 <
            90.00 && asin(obj[obj_num].tri[i]->nor.axis[2])*180*7/22 >
            89.5)

there_is_a_horizontal_wall=1;
                                else
                                        highest_theta =
            asin(obj[obj_num].tri[i]->nor.axis[2]);
                            } if(asin(obj[obj_num].tri[i]->nor.axis[2])<
            lowest_theta)
                            {
```

APPENDIX PAGE 61

```
        if(asin(obj[obj_num].tri[i]->nor.axis[2])*180*7/22 ==
0)

there_is_a_vertical_wall=1;
                        else
                                lowest_theta =
asin(obj[obj_num].tri[i]->nor.axis[2]);

}
                } printf("\n\n");
                if(there_is_a_horizontal_wall==1)
                        printf("\nThere are horizontal
surfaces in this object.");

if(there_is_a_vertical_wall==1)
                        printf("\nThere are vertical
surfaces in this object.");

printf("\n\nhighest_theta=%lf
lowest_theta=%lf", rad_to_deg*highest_theta,
rad_to_deg*lowest_theta);
                printf("\nNote: Vertical and horizontal
walls %(0 and 90%) are not considered while
determining lowest and highest thetas.");
        }

} get_next_slice_thick(sl_thick)
double *sl_thick;
{ double ratio;

if(highest_nor *180*7/22 == 90)
                *sl_thick = 0;

else if(highest_nor *180*7/22 == 0.0)
                *sl_thick = max_slice_thick;

else
        { if(criteria==1)*sl_thick =
desired_cusp_height / sin( highest_nor);
                else if(criteria==2)*sl_thick =
desired_max_deviation / tan( highest_nor);
```

APPENDIX PAGE 62

```
              else if(criteria==3)*sl_thick =
desired_chord_length * cos( highest_nor);

} if(*sl_thick>max_slice_thick)
*sl_thick=max_slice_thick;
    if(*sl_thick<min_slice_thick)
*sl_thick=min_slice_thick;

} get_slice_axis()
{ int change;

/* for building parts on sla machine sl_axis is
always 2 */
    sl_axis = 2;

printf("\n \nENTER MAXIMUM SLICE THICKNESS THAT
YOU WOULD PREFER ");
    scanf("%lf", &max_slice_thick);
    printf("\nENTER MINIMUM SLICE THICKNESS THAT YOU
WOULD PREFER ");
    scanf("%lf", &min_slice_thick);

printf("\nCHOOSE A CRITERIA BY ENTERING THE
APPROPRIATE NUMBER");
    printf("\n1. CUSP HEIGHT");
    printf("\n2. MAXIMUM DEVIATION");
    printf("\n3. CHORD LENGTH       ");
    scanf("%d", &criteria);

if(criteria==1)
    { printf("\nc1 = %f, c2 = %f, c3 = %f, c4 =
%f", min_slice_thick*sin(lowest_theta),
min_slice_thick*
            sin(highest_theta),
            max_slice_thick*sin(lowest_theta),
max_slice_thick*sin(highest_theta));
```

APPENDIX PAGE 63

```
            printf("\nENTER A VALUE FOR LIMITING CUSP
HEIGHT BASED ON THESE FOUR VALUES. YOU MAY TAKE THE
HELP OF CUSP HEIGHT Vs. THETA PLOT. IF YOU NEED HELP
ENTER 911.  ");
            scanf("%f", &desired_cusp_height);

if(desired_cusp_height==911.0)
            {
                    printf("\n1. If you choose a value
equal to c1, layer thickness will be set to %f
%(minimum thickness %) throughout the part.  Further,
if a part is built using this slice data, cusp height
of the physical part will vary from c1 to c2. \n2. If
you choose c4, layer thickness will be set to %f
%(maximum thickness %) throughout the part.  Further,
if a part is built using this slice data, cusp height
of the physical part will vary from c3 to c4. \n3. If
you choose a value between c1 and c4, layer thickness
will be appropriately varied to maintain cusp height
within the value you have given.", min_slice_thick,
                        max_slice_thick);
                    printf("\n\nENTER A VALUE FOR LIMITING
CUSP HEIGHT  ");
                    scanf("%f", &desired_cusp_height);
            } uniform_slice_thick = desired_cusp_height /
sin(highest_theta);
            printf("\nTo produce a similar quality part,
uniformly sliced model will have a slice thickness of
%f", uniform_slice_thick);
            printf("\nIF YOU WANT TO CHANGE THIS VALUE
ENTER 1, ELSE ENTER ANY OTHER NUMBER  ");
            scanf("%d", &change);
            if(change==1)
            {
                    printf("\nENTER THICKNESS FOR UNIFORM
SLICING  ");
                    scanf("%lf", &uniform_slice_thick);
            }

} if(criteria==2)
       {
            printf("\nd1 = %f, d2 = %f, d3 = %f, d4 =
%f", min_slice_thick*tan(lowest_theta),
min_slice_thick*
```

APPENDIX PAGE 64

```
                tan(highest_theta),
            max_slice_thick*tan(lowest_theta),
max_slice_thick*tan(highest_theta));

printf("\nENTER A VALUE FOR LIMITING MAX.
DEVIATION BASED ON THESE FOUR VALUES. YOU MAY TAKE THE
HELP OF MAX. DEVIATION Vs. THETA PLOT. IF YOU NEED
HELP ENTER 911.   ");
            scanf("%f", &desired_max_deviation);

if(desired_max_deviation==911.0)
            {
                    printf("\n1. If you choose a value
equal to d1, layer thickness will be set to %f
%(minimum thickness %) throughout the part.  Further,
if a part is built using this slice data, maximum
deviation of the physical part will vary from d1 to
d2. \n2. If you choose d4, layer thickness will be set
to %f %(maximum thickness %) throughout the part.
Further, if a part is built using this slice data,
maximum deviation of the physical part will vary from
d3 to d4. \n3. If you choose a value between d1 and
d4, layer thickness will be appropriately varied to
maintain maximum deviation within the value you have
given.",
                    min_slice_thick, max_slice_thick);
            printf("\n\nENTER A VALUE FOR LIMITING
MAXIMUM DEVIATION   ");
            scanf("%f", &desired_max_deviation);
            } uniform_slice_thick = desired_max_deviation
/ tan(highest_theta);
            printf("\nTo produce a similar quality part,
uniformly sliced model will have a slice thickness of
%f", uniform_slice_thick);
            printf("\nIF YOU WANT TO CHANGE THIS VALUE
ENTER 1, ELSE ENTER ANY OTHER NUMBER   ");
            scanf("%d", &change);
            if(change==1)
            {
                    printf("\nENTER THICKNESS FOR UNIFORM
SLICING   ");
            scanf("%lf", &uniform_slice_thick);
            }

}
```

APPENDIX PAGE 65

```
        if(criteria==3)
        {
            printf("\nf1 = %f, f2 = %f, f3 = %f, f4 =
%f", min_slice_thick/cos(lowest_theta),
min_slice_thick/
            cos(highest_theta),
            max_slice_thick/cos(lowest_theta),
max_slice_thick/cos(highest_theta));
            printf("\nENTER A VALUE FOR LIMITING CHORD
LENGTH BASED ON THESE FOUR VALUES. YOU MAY TAKE THE
HELP OF CUSP HEIGHT Vs. THETA PLOT. IF YOU NEED HELP
ENTER 911.   ");
            scanf("%f", &desired_chord_length);

if(desired_chord_length==911.0)
            {
                printf("\n1. If you choose a value
equal to f1, layer thickness will be set to %f
%(minimum thickness %) throughout the part.  Further,
if a part is built using this slice data, chord length
of the physical part will vary from f1 to f2. \n2. If
you choose f4, layer thickness will be set to %f
%(maximum thickness %) throughout the part.  Further,
if a part is built using this slice data, chord length
of the physical part will vary from f3 to f4. \n3. If
you choose a value between f1 and f4, layer thickness
will be appropriately varied to maintain chord length
within the value you have given.",
                    min_slice_thick, max_slice_thick);
                printf("\n\nENTER A VALUE FOR LIMITING
CHORD LENGTH   ");
                scanf("%f", &desired_chord_length);

} uniform_slice_thick = desired_chord_length *
cos(highest_theta);
            printf("\nTo produce a similar quality part,
uniformly sliced model will have a slice thickness of
%f", uniform_slice_thick);
            printf("\nIF YOU WANT TO CHANGE THIS VALUE
ENTER 1, ELSE ENTER ANY OTHER NUMBER   ");
            scanf("%d", &change);
            if(change==1)
            {
                printf("\nENTER THICKNESS FOR UNIFORM
SLICING   ");
                scanf("%lf", &uniform_slice_thick);
            }
```

APPENDIX PAGE 66

```
        }

/* sl_axis is short for slice axis. */
        /* when & does not precede sl_axis segmentation
fault occurs */
        if(sl_axis == 2) {
              ax1 = 0;
              ax2 = 1;
        }

}

/* sorts vetrices of each triangle in ascending order
                according to x, y or z co-ordinates.
if sl_axis is, say 2,
                vertices will be sorted according to z
value */ sort_vertices()
{ struct point *temp;
        int i;

for (i=0;i<=max_triangles[obj_num];i++)
        /* compering element[0] and [1] and sorting in
ascending order */
             { if(obj[obj_num].tri[i]->ver[0]->axis[sl_axis]> obj[obj_num].tri[i]->ver[1]->axis[sl_axis])
             {
                    temp = obj[obj_num].tri[i]->ver[0];
                    obj[obj_num].tri[i]->ver[0]=
obj[obj_num].tri[i]->ver[1];
                    obj[obj_num].tri[i]->ver[1]= temp;
             }

/* comparing element[1] and [2] and sorting
in ascending order */ if(obj[obj_num].tri[i]->ver[1]->axis[sl_axis]>
```

APPENDIX PAGE 67

```
                obj[obj_num].tri[i]->ver[2]->axis[sl_axis])
            {
                    temp = obj[obj_num].tri[i]->ver[1];
                    obj[obj_num].tri[i]->ver[1]=
obj[obj_num].tri[i]->ver[2];
                    obj[obj_num].tri[i]->ver[2]= temp;

if(obj[obj_num].tri[i]->ver[0]->axis[sl_axis]> obj[obj_num].tri[i]->ver[1]->axis[sl_axis])
                    {
                            temp =
obj[obj_num].tri[i]->ver[0];
                            obj[obj_num].tri[i]->ver[0]=
obj[obj_num].tri[i]->ver[1];
                            obj[obj_num].tri[i]->ver[1]= temp;
                    }
                }
        }
} sort_triangles()
{
    struct triangle *temp;
    int i,j;

for(i=0; i<max_triangles[obj_num];i++)
        for(j=i+1;j<=max_triangles[obj_num];j++)
        { if(obj[obj_num].tri[i]->ver[0]->axis[sl_axis]> obj[obj_num].tri[j]->ver[0]->axis[sl_axis])

{
                        temp = obj[obj_num].tri[i];
                        obj[obj_num].tri[i]=
obj[obj_num].tri[j];
                        obj[obj_num].tri[j]= temp;
                }
        }
} group_triangles()
{
```

APPENDIX PAGE 68

```
      /*"count1" is to assign values first, min etc.
only once foreach
            group. count2 gives number of the group.
"first" gives number
            of first triangle in the group and "last"
gives the last num.
            "min" gives the minimum value of sl_axis
coord of the first
            vertex (which is equal for all
triangles in that group)
            "max" gives the maximum sl_axis
co-ordinate in that group */ int i, count1=0,count2=0;

group[0] = (struct gr *) malloc( sizeof(struct
gr) );

for(i=0;i<max_triangles[obj_num];i++)
      {
            if(count1==0)
            {
                  group[count2]->first = i;
                  group[count2]->min =
obj[obj_num].tri[i]->ver[0]->axis[sl_axis];
                  group[count2]->max =
obj[obj_num].tri[i]->ver[2]->axis[sl_axis];
            } if(obj[obj_num].tri[i]->ver[0]->axis[sl_axis] == obj[obj_num].tri[i+1]->ver[0]->axis[sl_axis])
            {
if(group[count2]->max<obj[obj_num].tri[i+1]->ver[2]->a
xis[sl_axis])

group[count2]->max=obj[obj_num].tri[i+1]->ver[2]->axis
[sl_axis];
                  count1 = count1 + 1;
            }
            else
            {
                  group[count2]->last = i;
                  count2 = count2 + 1;
                  group[count2] = (struct gr *) malloc(
sizeof(struct gr) );
                  count1 =0;
            }
            total_num_groups = count2;
      }
```

APPENDIX PAGE 69

```
        /* check for the last triangle */
        if(obj[obj_num].tri[i]->ver[0]->axis[sl_axis] ==
            obj[obj_num].tri[i-1]->ver[0]->axis[sl_axis])
    group[count2]->last = i;

else
        {
                group[count2]->first = group[count2]->last =
i;
                group[count2]->min =
obj[obj_num].tri[i]->ver[0]->axis[sl_axis];
                group[count2]->max =
obj[obj_num].tri[i]->ver[2]->axis[sl_axis];
        }

/*
    for(i=0;i<=total_num_groups;i++)
    {
    printf("\ngroup_num=%d first=%d last=%d",
i,group[i]->first, group[i]->last);
    printf("min=%lf max=%lf",
group[i]->min,group[i]->max);
    }
    */
} get_xyz_max_min()
{
    int count1,count2,vertex;

/* Initialization of xyz max and min variables */
    x_max=obj[0].tri[0]->ver[0]->axis[0];
    x_min=obj[0].tri[0]->ver[0]->axis[0];
    y_max=obj[0].tri[0]->ver[0]->axis[1];
    y_min=obj[0].tri[0]->ver[0]->axis[1];
    z_max=obj[0].tri[0]->ver[0]->axis[2];
    z_min=obj[0].tri[0]->ver[0]->axis[2];

/*count1 is for incrementing obj_num
          count2 is for incrementing triangle
number.
          vertex is for three vertices of each
triangle */
      for(count1=0;count1<=obj_num;count1++)

for(count2=0;count2<max_triangles[obj_num];count2++)
                for(vertex=0;vertex<3;vertex++)
                {
```

APPENDIX PAGE 70

```c
            if(obj[count1].tri[count2]->ver[vertex]->axis[0]>x_max
)
                            x_max=
obj[count1].tri[count2]->ver[vertex]->axis[0];

if(obj[count1].tri[count2]->ver[vertex]->axis[0]<x_min
)
                            x_min=
obj[count1].tri[count2]->ver[vertex]->axis[0];

if(obj[count1].tri[count2]->ver[vertex]->axis[1]>y_max
)
                            y_max=
obj[count1].tri[count2]->ver[vertex]->axis[1];

if(obj[count1].tri[count2]->ver[vertex]->axis[1]<y_min
)
                            y_min=
obj[count1].tri[count2]->ver[vertex]->axis[1];

if(obj[count1].tri[count2]->ver[vertex]->axis[2]>z_max
)
                            z_max=
obj[count1].tri[count2]->ver[vertex]->axis[2];

if(obj[count1].tri[count2]->ver[vertex]->axis[2]<z_min
)
                            z_min=
obj[count1].tri[count2]->ver[vertex]->axis[2];

}
        printf("\nTOTAL NUMBER OF
FACETS=%d",max_triangles[obj_num]);

printf("\n \nx_min=%lf x_max=%lf \ny_min=%lf
y_max=%lf \n z_min=%lf z_max=%lf", x_min, x_max,
y_min,y_max, z_min,
            z_max);

}
```

APPENDIX PAGE 71

```
draw_variable_slice()
{
    int count1,count2,count3, count4;
    printf("\nOBJECT SUCCESSFULLY SLICED BOTH
UNIFORMLY AND ADAPTIVELY\n\n");
    for(count2=0;count2<curr_pln_num1;count2++)
    {
        for(count4=0;count4<=islands1[count2];
count4++)
        { for(count1=0;count1<intersec1[count2][count4];count1++
)
            {
q1:

HC_Insert_Ink(pln[count2].isl[count4].intpts[count1].a
xis[0], pln[count2].isl[count4].intpts[count1].axis[1], pln[count2].isl[count4].intpts[count1].axis[2]);
                if(count3==1) {
                    count3=0;
                    goto q2;
                }
if(count1==intersec1[count2][count4]-1){
                    count3=1;
                    count1=0;
                    goto q1;
                }

}
q2:
                HC_Restart_Ink();
        }
q3:
            HC_Restart_Ink();
    }
} draw_uniform_slice()
{
    int count1,count2,count3, count4;
    for(count2=0;count2<curr_pln_num;count2++)
    {
        for(count4=Q/2;count4<=islands[count2];
count4++)
```

APPENDIX PAGE 72

```
            {
    for(count1=0;count1<intersec[count2][count4];count1++)
            {
q1:
    HC_Insert_Ink(pln[count2].isl[count4].intpts[count1].axis[0], pln[count2].isl[count4].intpts[count1].axis[1], pln[count2].isl[count4].intpts[count1].axis[2]);
                    if(count3==1) {
                        count3=0;
                        goto q2;
                    }
    if(count1==intersec[count2][count4]-1){
                        count3=1;
                        count1=0;
                        goto q1;
                    }

}
q2:
            HC_Restart_Ink();
        }
q3:
        HC_Restart_Ink();
    }
} insert_polygon()
{
    int count1,count2,vertex;

/* count1 is to increment object number
            count2 is for incrementing triangle num.
in each object */
    for(count1=0;count1<=obj_num;count1++)

for(count2=0;count2<=max_triangles[count1];count2++)
            {
    poly[0].x=obj[count1].tri[count2]->ver[0]->axis[0];

poly[0].y=obj[count1].tri[count2]->ver[0]->axis[1];

poly[0].z=obj[count1].tri[count2]->ver[0]->axis[2];
```

APPENDIX PAGE 73

```
        poly[1].x=obj[count1].tri[count2]->ver[1]->axis[0];

poly[1].y=obj[count1].tri[count2]->ver[1]->axis[1];

poly[1].z=obj[count1].tri[count2]->ver[1]->axis[2];

poly[2].x=obj[count1].tri[count2]->ver[2]->axis[0];

poly[2].y=obj[count1].tri[count2]->ver[2]->axis[1];

poly[2].z=obj[count1].tri[count2]->ver[2]->axis[2];

HC_Insert_Polygon(3,poly);
                }
} set_camera()
{
        if(sl_axis==2){
                HC_Rotate_Object(-90.0,0.0,0.0);

HC_Set_Camera_By_Volume("orthographic",x_min-0.5,x_max
+0.5,z_min-0.5,z_max+0.5);
                /* HC_Orbit_Camera(45.0,45.0);*/
        }
                else{

HC_Set_Camera_By_Volume("orthographic",x_min-0.2,x_max
+0.2,y_min-0.2,y_max+0.2);
                /*HC_Orbit_Camera(45.0,45.0);*/    }

} set_camera_for_iso()
{
        if(sl_axis==2){
                HC_Rotate_Object(-90.0,0.0,0.0);

HC_Set_Camera_By_Volume("orthographic",x_min-0.5,x_max
+0.5,z_min-0.5,z_max+0.5);
                HC_Orbit_Camera(45.0,45.0);
        }
```

APPENDIX PAGE 74

```
        else{

HC_Set_Camera_By_Volume("orthographic",x_min-0.2,x_max
    +0.2,y_min-0.2,y_max+0.2);
            HC_Orbit_Camera(45.0,45.0);
        }

} create_ps_file()
    {

HC_Open_Segment("?driver/postscript/pcspline.ps");
        HC_Include_Segment("?picture");
        HC_Update_Display();
        HC_Close_Segment();

HC_Delete_Segment("?driver/postscript/pcspline.ps");

} color_setting()
    {

HC_Set_Color("edge= red");

/* BLUE LIGHT */

/*      HC_Open_Segment("blue light");
            HC_Insert_Distant_Light(1.0,0.0,-1.0);
              HC_Set_Color("light=red");
                HC_Close_Segment();
    */
        /* GREEN LIGHT */
        /*
           HC_Open_Segment("green light");
         HC_Insert_Distant_Light(-1.0,0.0,-1.0);
              HC_Set_Color("light=green");
                HC_Close_Segment();
    */
    }

/* INSERTING TWO LINES REPRESENTING X AND Y AXIS
    RESPECTIVELY */
```

APPENDIX PAGE                75

```
insert_axes()
{
HC_Insert_Line(x_min-3.0,y_min-3.0,0.0,x_max+5.0,y_min
-3.0,0.0);

HC_Insert_Line(x_min-3.0,y_min-3.0,0.0,x_min-3.0,y_max
+5.0,0.0);
} insert_text()
{
    HC_Set_Line_Weight(1.0);
    /* SETS WIDTH OF THE MARGIN TO TWICE THE DEFAULT
WIDTH   */
    HC_Set_Text_Size(.6);
    HC_Insert_Text(x_max,y_min-4.0,0.0,"X");
    HC_Insert_Text(x_min-4.0,y_max,0.0,"Y");
    HC_Insert_Text(x_max-5.0,y_max+4.0,0.0,"KAMESH M.
TATA");
    HC_Insert_Text(x_max-5.0,y_max-8.0,0.0,"EG 823
#1");
    HC_Insert_Text(x_max-5.0,y_max-20.0,0.0,"4 POINT
PC CURVE");

} get_everything()
{
    int ver_num,i,adj_tri, type, count,count1,j,
count10;
    bad=0;

get_new_group();
    /* for loop where i is incremented from the first
triangle to the last
          triangle of the curr_group(The new group
after merging dif.groups)*/ i = new_gr[0];

do
    {
        if (num != 0) {
            if ( (num % DMEM_CONST) == 0 )
```

APPENDIX PAGE  76

```
    pln[curr_pln_num].isl[isl_num].intpts = (struct point
*)
                        realloc( (char
*)pln[curr_pln_num].isl[isl_num].intpts,
                        (num+DMEM_CONST)*sizeof(struct
point) );

if
(pln[curr_pln_num].isl[isl_num].intpts == NULL) {
                    fprintf(stderr,"realloc :
get_everything : out of memory. num= %d\n",num);
                    exit(0);
            }
        } type= get_intersection_pt(i);
        eliminated[bad]=i;
        bad = bad+1;

/* type will be 0 or 1 or 2 when
intersection is through a vertex. in
        other words type gives vertex num through
which curr_pln is passing
        when type=10 intersection is with line passing
through ver0 and ver1
        and when it is 30 line of intersection is
ver1 and ver2. when
        type = 20 intersection is with line ver2 and
ver0 */ if(type == 0 || type ==1 || type == 2)
        {
            adj_tri = get_adj_tri1(i,type);
        }
        else if(type == 10 || type==20 || type==30)
        {
            adj_tri = get_adj_tri2(i,type);
        }

/*
if(abs(i-adj_tri)>50 && adj_tri!= -1) {printf("\ni=%d
adj_tri=%d i-adj_tri=%d count10=%d",i,adj_tri,
i-adj_tri, count10); count10=0;}count10++;
*/ i = adj_tri;
        if(adj_tri == -1)
        {
            if(bad<tri_in_curr_pln)
            {
```

APPENDIX PAGE 77

```
                        /* going on to a new island */
                        i=get_tri_on_new_isl();

pln[curr_pln_num].isl[isl_num].intpts = (struct point
*)
                        calloc( DMEM_CONST,
sizeof(struct point) );
                        if
(pln[curr_pln_num].isl[isl_num].intpts == NULL) {
                        fprintf(stderr,"calloc :
get_everything : out of memory. isl_num = %d\n",
isl_num);
                        exit(0);
                        }
                }
                else break;
        }

/*
(printf("\nohohoh bad%d tri_in_curr_pln=%d",bad,
tri_in_curr_pln);)
*/
        /* in while loop curr_gr_lsat -
curr_gr_first gives the number of
        triangles (one less) in curr_gr. bad gives the
number of triangles
        already eliminated */
     }while(bad<= tri_in_curr_pln);

} get_tri_on_new_isl()
{
    int i,j,k=0,count;

for(k=0; k<=tri_in_curr_pln;k++)

{
        i = new_gr[k];
        for(j=0;j<bad;j++)
        {
            if(eliminated[j]==i){
                count=1;
                break;
            }
        }
        if(count==1){
            count=0;
            continue;
```

APPENDIX PAGE 78

```
            }
            else
            {
                    intersec[curr_pln_num][isl_num]=num;
                    isl_num=isl_num+1;
                    num=0;
                    islands[curr_pln_num]=isl_num;
            /*      printf("\nisl=%d
i=%d",isl_num,i);*/return(i);
            }
    }
} get_plane()
{
    printf("\ncutting plane value=");
    scanf("%lf", &curr_pln);
    curr_pln_num = 0;
} multi_slicing()
{
    int i,j;
    double curr_pln_min, curr_pln_max, sl_thick_min;

for(i=0;i<T;i++)

neighbours[i][0]=neighbours[i][1]=neighbours[i][2] =
-1;

get_adaptive_planes();
    pln = (struct plane *) calloc( all_slices,
sizeof(struct plane) );
    if (pln == NULL) {
        fprintf(stderr,"multi_slicing(): planes :
out of memory.\n");
        exit(0);
    } printf(" \nNUMBER OF SLICES(varying
thickness)=%d",all_slices);
```

APPENDIX PAGE 79

```
        for(i=0;i<all_slices;i++,curr_pln_num++)
        {
                curr_pln = all_planes[i];
                num=0;
                isl_num=0;
                islands[curr_pln_num]=0;
                for(j=0;j<R;j++)
                {
                        eliminated[j]=-1;
                } pln[i].isl[0].intpts = (struct point
*)calloc(DMEM_CONST, sizeof(struct point));
                if (pln[i].isl[0].intpts == NULL) {
                        fprintf(stderr,"multi_slicing(): intpts
: out of memory.\n");
                        exit(0);
                } get_everything();

intersec[curr_pln_num][isl_num] = num;
        }
        curr_pln_num1=curr_pln_num;
        isl_num1 = isl_num;

for(j=0;j<=curr_pln_num;j++)
                islands1[j] = islands[j];

for(i=0;i<all_slices;i++)
                for(j=0;j<=islands[i];j++)
                        intersec1[i][j] = intersec[i][j];

if(sl_axis==0) {
                curr_pln_min = x_min;
                curr_pln_max = x_max;
        }
        else
                if(sl_axis==1) {
                        curr_pln_min = y_min;
                        curr_pln_max = y_max;
                }
                else
                        if(sl_axis==2) {
                                curr_pln_min = z_min;
                                curr_pln_max = z_max;
                        }
```

APPENDIX PAGE 80

```
        curr_pln_num=0;
        sl_thick_min = uniform_slice_thick;

for(curr_pln=curr_pln_min;
curr_pln<curr_pln_max+sl_thick_min -0.000001 ;
        curr_pln =
curr_pln+sl_thick_min,curr_pln_num++)
        {
                if(curr_pln>curr_pln_max)curr_pln =
curr_pln_max;
            num=0;
            isl_num= Q/2;
            islands[curr_pln_num]=Q/2;
            for(i=0;i<R;i++)
            {
                    eliminated[i]=-1;
            } pln[curr_pln_num].isl[isl_num].intpts =
                    (struct point *) calloc(DMEM_CONST,
sizeof(struct point));
            if (pln[curr_pln_num].isl[isl_num].intpts ==
NULL) {
                    fprintf(stderr,"multi_slicing():
uniform : out of memory.\n");
                    exit(0);
            } get_everything();
            intersec[curr_pln_num][isl_num] = num;

}
    printf(" \nNUMBER OF SLICES(uniform
thickness)=%d",curr_pln_num-1);

} get_adaptive_planes()
{
    int act_gr,i,j,k, count=0, count2;
    double sl_thick, possible_pln;
    double curr_pln_min, curr_pln_max;

if(sl_axis==0) {
        curr_pln_min = x_min;
        curr_pln_max = x_max;
    }
    else
```

APPENDIX PAGE                        81

```
            if(sl_axis==1) {
                curr_pln_min = y_min;
                curr_pln_max = y_max;
            }
            else
                if(sl_axis==2) {
                    curr_pln_min = z_min;
                    curr_pln_max = z_max;
                } all_planes[count]=curr_pln_min;
        count = count+1;
        act_pln = all_planes[0];

do
        {
                for(act_gr=0;act_gr<total_num_groups; act_gr++)
                {
                        if(act_pln>group[act_gr]->max) continue;
                        if(act_pln >= group[act_gr]->min) break;
                }

/* act_gr is the group number through or just above which  curr_pln is
                    passing through */ get_highest_angle_nor(&act_gr);

get_next_slice_thick(&sl_thick);

possible_pln = act_pln + sl_thick;
                i = act_gr;
                count2=0;

/* to find how many groups the possible plane crossed from group i */
                for(j=act_gr+1;j<total_num_groups;j++)
                {
                        if(possible_pln<=group[j]->min) break;
                }

/* if j-act_gr= 1 possible plane still falls in group[act_gr].  same as
                    curr_pln. if j-act_gr is 2 possible plane is in group[act_gr+1] */
```

APPENDIX PAGE 82

```
              if((j-act_gr) != 1)
              {
                    i = i+1;
                    do
                    {
                            if(get_highest_angle_nor(&i)== -1)
      {
                                    i++;
                                    continue;
                            }
                            get_next_slice_thick(&sl_thick);

if(act_pln> group[i]->min)
                            {
if(possible_pln>act_pln+sl_thick)
                                    {
                                            possible_pln =
act_pln+sl_thick;
                                            i++;
                                            continue;
                                    } else {
                                            i++;
                                            continue;
                                    }
                            }
                            if(possible_pln>
group[i]->min+sl_thick)
                            {
                                    possible_pln =
group[i]->min+sl_thick;
                                    i++;
                                    continue;
                            }
                            i++;

}while(i<j);

}
              act_pln = all_planes[count++] =
possible_pln;
                    if(all_planes[count-1]-all_planes[count-2] <
min_slice_thick)
                            act_pln = all_planes[count-1] =
all_planes[count-2]+min_slice_thick;

/*
```

APPENDIX PAGE 83

```
        printf("nor=%lf\n count=%d", highest_nor,
count);
*/
        if(act_pln > curr_pln_max) act_pln =
all_planes[count-1]= curr_pln_max;

}while(act_pln<curr_pln_max);

all_slices = count;

} get_highest_angle_nor(j)
int *j;
{ double  sl_thick;
    int remove=0,i,k, count;
    /* normal that makes the highest angle to the
sl_axis.
            highertha angle of normal lower is
slice thickness */
    /* possible highest angle is 90 */ q10:
    for(i=group[*j]->first;i<=group[*j]->last;i++)
    {
        /* there can be some triangles in each group
which may not have an
         intersection with the curr_plane. Following
condition eliminates
        such triangles.eliminated triangle number is
stored in eliminate[]*/ if(act_pln>obj[obj_num].tri[i]->ver[2]->axis[sl_axis])
        {
                eliminated[remove]=i;
                remove = remove+1;
                continue;
        }

/* when the above condition is not true then
there must be an
        intersection between curr_pln and curr_tri
(=i). so this triangle
        need not be checked further and can be
eliminated after
        calculating the intersection point */
    }
```

APPENDIX PAGE 84

```
        if(remove-1 == group[*j]->last -
group[*j]->first){
                remove=0;
                if(++*j>total_num_groups){
                        return(-1);
                }
                else goto q10;
        } highest_nor =0;

for(i=group[*j]->first; i<= group[*j]->last; i++)
        {
                for(k=0;k<=remove;k++)
                {
                        if(eliminated[k] == i) {
                                count=1;
                                break;
                        }
                }
                if(count==1){
                        count=0;
                        continue;
                } if(obj[obj_num].tri[i]->nor.axis[sl_axis]<0)
                        obj[obj_num].tri[i]->nor.axis[sl_axis]
= -1 *
obj[obj_num].tri[i]->nor.axis[sl_axis];
                /*printf("asin%lf",
asin(obj[obj_num].tri[i]->nor.axis[sl_axis]));*/ if(asin(obj[obj_num].tri[i]->nor.axis[sl_axis])>
highest_nor)
                        highest_nor =
asin(obj[obj_num].tri[i]->nor.axis[sl_axis]);

}
} get_new_group()
{
        int i,j,k=0;

for(i=0; i<=total_num_groups; i++)
```

APPENDIX PAGE 85

```
        {
                if(curr_pln<group[i]->min) break;
                if(curr_pln >= group[i]->min && curr_pln <
        group[i]->max)
                {
                        for(j=group[i]->first;
        j<=group[i]->last;j++)
                        { if(curr_pln<obj[obj_num].tri[j]->ver[2]->axis[sl_axis]
        )
                                new_gr[k++] = j;
                        }
                }
        }
        tri_in_curr_pln = k-1;
}

/* i is the triangle num for which intersection point
is to be cal..*/
get_intersection_pt(i)
int i;
{
        int j, common_ver= -1, common_line= -1;
        static double x1_old, y1_old, z1_old, x2_old,
y2_old, z2_old;
        double x_new, y_new, z_new, x1, y1, z1, x2, y2,
z2;
        static double x_old, y_old, z_old;

/* checking if curr_plane is passing through the
vertex j(0,1or 2) of i.
                i is nothing but the current triangle */
        for(j=0;j<3;j++)
        { if(obj[obj_num].tri[i]->ver[j]->axis[sl_axis] ==
curr_pln)
                {
                        /* when the above condition is true
curr_pln is passing through
        vertex j. cooords of intersection are simply
the coords of vertex j
        of triangle i */
                        z_new =
pln[curr_pln_num].isl[isl_num].intpts[num].axis[sl_axi
s]=
```

APPENDIX PAGE 86

```
                obj[obj_num].tri[i]->ver[j]->axis[sl_axis];

x_new =
pln[curr_pln_num].isl[isl_num].intpts[num].axis[ax1]= obj[obj_num].tri[i]->ver[j]->axis[ax1];

y_new =
pln[curr_pln_num].isl[isl_num].intpts[num].axis[ax2]= obj[obj_num].tri[i]->ver[j]->axis[ax2];

/* following condition is necessary to
ensure that the new
        intersection point is not equal to the earlier
point */
                if(x_new == x_old && y_new == y_old &&
z_new == z_old)
                {
                        common_ver =j;
                        continue;
                }
                else
                {
                        x_old = x_new;
                        y_old = y_new;
                        z_old = z_new;
                        /*printf("\n vertex inter
x_new=%lf y_new=%lf z_new=%lf", x_new, y_new, z_new);
                */      num = num +1;
                /* every intersection is
identified by a number given by "num".
        sequence[num] gives the triangle number for
that intersection. Each
        triangle can have only one intersection
sequence[num] = i;*/
                        return(j); /* vertex num is
returned */
                }
        }
}

/* this part of prog is executed only when
curr_pln does not pass
        through any of the vertices of i or passes
through a vertex
        which is equal to x_old, y_old and z_old(in
which case
        common_ver=j. when common_ver */

/* to check if the curr_pln is passing through
```

APPENDIX PAGE                87 one of the sides of i.*/

```
     if(curr_pln >
obj[obj_num].tri[i]->ver[0]->axis[sl_axis] &&
          curr_pln <
obj[obj_num].tri[i]->ver[1]->axis[sl_axis]) j=0;
     else
q1:
          if(curr_pln >
obj[obj_num].tri[i]->ver[1]->axis[sl_axis] &&
             curr_pln <
obj[obj_num].tri[i]->ver[2]->axis[sl_axis]) j=1;
          else
q2:
               if(curr_pln >
obj[obj_num].tri[i]->ver[0]->axis[sl_axis] &&
                  curr_pln <
obj[obj_num].tri[i]->ver[2]->axis[sl_axis]) j=2;
               else
               {
                    if(common_line== -1)
return(common_ver);
                    else return(common_line);
               }
```

/* when above condition is true curr_pln is passing through line
     joining ver0 and ver1. else it is passing through the other
     two lines */

/* cal.. of point of intersection */

```
pln[curr_pln_num].isl[isl_num].intpts[num].axis[sl_axis]= curr_pln;
```

/* for the sake of convenience following code is written. x_new
     need not always rpresent x coord of intersection point. similarly
     y and z . similarly x1,y1 etc. it is true only when sl_axis is 2
     (ie. z)*/

```
x1 = obj[obj_num].tri[i]->ver[j]->axis[ax1];
y1 = obj[obj_num].tri[i]->ver[j]->axis[ax2];
z1 = obj[obj_num].tri[i]->ver[j]->axis[sl_axis];

if(j==2) j=-1;
x2 = obj[obj_num].tri[i]->ver[j+1]->axis[ax1];
```

APPENDIX PAGE 88

```
        y2 =  obj[obj_num].tri[i]->ver[j+1]->axis[ax2];
        z2 =
obj[obj_num].tri[i]->ver[j+1]->axis[sl_axis];
        if(j== -1) j=2;

if((x1_old == x1 && y1_old == y1 && z1_old == z1
&&
            x2_old == x2 && y2_old == y2 && z2_old == z2)
||
            (x2_old == x1 && y2_old == y1 && z2_old == z1
&&
            x1_old == x2 && y1_old == y2 && z1_old ==
z2))
        {
            common_line = 10*(j+(j+1));
            if(j==0) goto q1;
            if(j==1) goto q2;
            if(j==2) return(common_line);
        } else
        {
            x1_old = x1;
            y1_old = y1;
            z1_old = z1;
            x2_old = x2;
            y2_old = y2;
            z2_old = z2;
        }

/* x_new, y_new and z_new represent coords of
intersection */ z_new =
pln[curr_pln_num].isl[isl_num].intpts[num].axis[sl_axi
s]=
            curr_pln;

x_new =
pln[curr_pln_num].isl[isl_num].intpts[num].axis[ax1]=
            x1 + ((z_new - z1) * (x2 - x1) / (z2 - z1));

y_new =
pln[curr_pln_num].isl[isl_num].intpts[num].axis[ax2]=
            y1 + ((z_new - z1) * (y2 - y1) / (z2 - z1));

/*
printf("\n line inter x_new=%lf y_new=%lf z_new=%lf",
x_new, y_new, z_new);
printf("\n sl_axis=%d ax1=%d ax2=%d isl=%d", sl_axis,
ax1, ax2, isl_num);
```

APPENDIX PAGE 89

```
*/
    num = num+1;
    /*if intersection is with line ver0 and ver1
(0+1)*10 is returned. if
        intersection is with ver1 and ver2 (1+2)*10 is
returned. intersection
        with ver2 and ver0 (2+0)*10. multiplication
with 10 is
        necessary form the value returned it will be
easy to identify
        type of intersection*/
    if(j==2) return(20);
    return(10*(j+(j+1)));
}

/*curr_tri is the triangle for which adjascent
triangle is to be found
    out. note that curr_tri is already in the
eliminated list. ver_num is
    the number of vertex of curr_tri through which
plane passes through */
get_adj_tri1(curr_tri,ver_num)
int curr_tri, ver_num;
{
    int count,i,j,k=0;

for(k=0; k<3;k++)
        if(neighbours[curr_tri][k]!=-1)
        {
            i=neighbours[curr_tri][k];
            for(j=0;j<=bad;j++)
            {
                if(eliminated[j] == i) {
                    count=1;
                    break;
                }
            }
            /* when count =1 that triangle need not
be checked for adjascency.
    that triangle is already in eliminated list.
so loop continues */
            if(count==1){
                count=0;
                continue;
            }

/* comparing the three coords of
curr_tri with three coords of each
```

APPENDIX PAGE 90

```
           vertex of triangle "i". when there is a match
"i" will be one of the
           adjascent triangles which share the same
vertex */
                for(j=0;j<3;j++)
                { if(obj[obj_num].tri[curr_tri]->ver[ver_num]->axis[0]
== obj[obj_num].tri[i]->ver[j]->axis[0] && obj[obj_num].tri[curr_tri]->ver[ver_num]->axis[1] == obj[obj_num].tri[i]->ver[j]->axis[1] && obj[obj_num].tri[curr_tri]->ver[ver_num]->axis[2] == obj[obj_num].tri[i]->ver[j]->axis[2])
                        {
                                return(i);
                        }
                }
        } for(k=0; k<=tri_in_curr_pln;k++)
        {
                i=new_gr[k];
                for(j=0;j<=bad;j++)
                {
                        if(eliminated[j] == i) {
                                count=1;
                                break;
                        }
                }
                /* when count =1 that triangle need not be
checked for adjascency.
           that triangle is already in eliminated list.
so loop continues */
                if(count==1){
                        count=0;
                        continue;
                }
```

APPENDIX PAGE 91

```
            /* comparing the three coords of curr_tri
with three coords of each
        vertex of triangle "i". when there is a match
"i" will be one of the
        adjascent triangles which share the same
vertex */
            for(j=0;j<3;j++)
            { if(obj[obj_num].tri[curr_tri]->ver[ver_num]->axis[0]
== obj[obj_num].tri[i]->ver[j]->axis[0] && obj[obj_num].tri[curr_tri]->ver[ver_num]->axis[1] == obj[obj_num].tri[i]->ver[j]->axis[1] && obj[obj_num].tri[curr_tri]->ver[ver_num]->axis[2] == obj[obj_num].tri[i]->ver[j]->axis[2]) return(i);
            }
    }
    return(-1);

}

/*curr_tri is the triangle for which adjacent
triangle is to be found
        out. note that curr_tri is already in the
eliminated list. vers gives
        which two vertices which form the line. we have
to find a tri that
        shares same line with curr_tri   */
get_adj_tri2(curr_tri,vers)
int curr_tri, vers;
{
    int count,i,j,k, ver1, ver2, match,h,count11=0;

for(k=0;k<3;k++)
        if(neighbours[curr_tri][k]!= -1)
        {
            i = neighbours[curr_tri][k];

for(h=0;h<bad;h++)
            {
```

APPENDIX PAGE 92

```
                    if(eliminated[h] == i) {
                        count=1;
                        break;
                    }
                }
                if(count==1) {
                    count=0;
                    continue;
                } if(vers==10){
                    ver1 = 0;
                    ver2 = 1;
                }
                else
                    if(vers==20){
                        ver1 = 2;
                        ver2 = 0;
                    }
                    else
                        if(vers==30){
                            ver1 = 1;
                            ver2 = 2;
                        } for(j=0;j<3;j++)
                {
if(obj[obj_num].tri[curr_tri]->ver[ver1]->axis[0] ==
obj[obj_num].tri[i]->ver[j]->axis[0] && obj[obj_num].tri[curr_tri]->ver[ver1]->axis[1] ==
obj[obj_num].tri[i]->ver[j]->axis[1] && obj[obj_num].tri[curr_tri]->ver[ver1]->axis[2] ==
obj[obj_num].tri[i]->ver[j]->axis[2]) {
                        match=1;
                        break;
                    }
                }
                if(match==1)
                {
                    for(j=0;j<3;j++)
                    {
if(obj[obj_num].tri[curr_tri]->ver[ver2]->axis[0] ==
```

APPENDIX PAGE 93

```
            obj[obj_num].tri[i]->ver[j]->axis[0] && obj[obj_num].tri[curr_tri]->ver[ver2]->axis[1] == obj[obj_num].tri[i]->ver[j]->axis[1] && obj[obj_num].tri[curr_tri]->ver[ver2]->axis[2] == obj[obj_num].tri[i]->ver[j]->axis[2])
                            {
                                    match=2;
                                    /* if(success1 % 100
==0)printf("S1=%d", success1++); */
                                    return(i);
                            }
                    }
                }
                match=0;
            }
```

```
        for(k=0;k<=tri_in_curr_pln;k++)
        {
            i = new_gr[k];
            for(j=0;j<bad;j++)
            {
                if(eliminated[j] == i) {
                    count=1;
                    break;
                }
            }

/* when count =1 that triangle need not be
    checked for adjascency.
            that triangle is already in eliminated list.
    so loop continues */
            if(count==1){
                count=0;
                continue;
            }

/* comparing the three coords of curr_tri
    with three coords of each
            vertex of triangle "i". when there is a match
```

APPENDIX PAGE 94

```
       "i" will be one of the
                adjascent triangles which share the same
       vertex */ if(vers==10){
                        ver1 = 0;
                        ver2 = 1;
                }
                else
                        if(vers==20){
                                ver1 = 2;
                                ver2 = 0;
                        }
                        else
                                if(vers==30){
                                        ver1 = 1;
                                        ver2 = 2;
                                } for(j=0;j<3;j++)
                {
if(obj[obj_num].tri[curr_tri]->ver[ver1]->axis[0] ==
obj[obj_num].tri[i]->ver[j]->axis[0] && obj[obj_num].tri[curr_tri]->ver[ver1]->axis[1] ==
obj[obj_num].tri[i]->ver[j]->axis[1] && obj[obj_num].tri[curr_tri]->ver[ver1]->axis[2] ==
obj[obj_num].tri[i]->ver[j]->axis[2]) {
                                match=1;
                                break;
                        }
                }
                if(match==1)
                {
                        for(j=0;j<3;j++)
                        {
if(obj[obj_num].tri[curr_tri]->ver[ver2]->axis[0] ==
```

APPENDIX PAGE 95

```
            obj[obj_num].tri[i]->ver[j]->axis[0] && obj[obj_num].tri[curr_tri]->ver[ver2]->axis[1] ==
        obj[obj_num].tri[i]->ver[j]->axis[1] && obj[obj_num].tri[curr_tri]->ver[ver2]->axis[2] ==
        obj[obj_num].tri[i]->ver[j]->axis[2])
                        {
                                match=2;
                                for(h=0;h<3;h++)
                                {
        if(neighbours[curr_tri][h] ==i) break;
        if(neighbours[curr_tri][h] == -1)
                                        {
        neighbours[curr_tri][h]=i;
                                                break;
                                        }
                                }
                                for(h=0;h<3;h++)
                                {
                                        if(neighbours[i][h] ==
curr_tri) break;
                                        if(neighbours[i][h] ==
-1)
                                        {
neighbours[i][h]=curr_tri;
                                                break;
                                        }
                                }
                                return(i);
                        }
                }
            }
            match=0;
        }
        return(-1);
}
```

APPENDIX PAGE 96

```c
/* This program is called "main.c" and assumes that:
BORDER POINTS SHOULD BE IN CW ORDER.  PLANE NUMBER
STARTS FROM 1 BUT NOT ZERO. */ include <stdio.h>
include <math.h>
#include "seg.h"
#include "file.h"
#include "read_brdrpts.c"
#include "user_input.c"
#include "hatch_cal.c"
#include "new_sli.c"

/*
extern read_brdrpts(), get_user_input(),
get_slifile_ptr_details(), do_hatching();
*/ main()
{
    fp1 = fopen("int_pts", "r");
/*  printf("TYPE IN NAME OF FILE TO STORE BOARDER
POINTS & HATCH POINTS");
    scanf("%s", file_name);
    fp2 = fopen(file_name, "w");
*/
    read_brdrpts();
     get_user_input();
      get_slifile_ptr_details();

do_hatching();
/*    print_sli();
*/
    write_sli(mysli);

fclose(fp1);
/*   fclose(fp2);
*/} print_sli()
{
    SLIVECTORS *ptr_sli_vector;
    int count1 = 0;

printf("******************SLI FILE CONTENTS
*************");
```

APPENDIX PAGE              97

```
        printf("\nFile      :%s", mysli->filename);
        printf("\nheader    :%s",mysli->header);
        printf("z_value     :%d",
mysli->layers->layer_num);

ptr_sli_vector = mysli->layers->vect_list;
        while(ptr_sli_vector != NULL)
        {
                printf("\nvector_type    :%d",
ptr_sli_vector->vector_type);
                printf("\nvector_count   :%d",
ptr_sli_vector->vector_count);
                count1 = 0;
                while(count1<ptr_sli_vector->vector_count)
                {
                        printf("\nvect_count=%d x1=%d y1=%d
x2=%d y2=%d",
                                ptr_sli_vector->vector_count,
ptr_sli_vector->vectors[count1].p[0].x,
ptr_sli_vector->vectors[count1].p[0].y,
ptr_sli_vector->vectors[count1].p[1].x,
ptr_sli_vector->vectors[count1].p[1].y);
                        count1++;
                } ptr_sli_vector =
ptr_sli_vector->next_vectors;
        }
}
```

APPENDIX PAGE 98

```c
/* This program is called "io.c".  1.29 9/12/91 - All
file I/O is handled here. */ ifndef lint
static char sccsid[] = "@(#)io.c   1.29 9/12/91 CIDES
Editor";
endif include "cides.h"

include <fcntl.h>
#include <ctype.h>
#include <sys/file.h>
#include <sys/uio.h>

/* #define SLI_IO  /* .sli debugging output? */
/* #define STL_IO  /* .stl debugging output? */
/* #define V_IO    /* .v debugging output? */ define SWAP4(x) { \
    register char *p1, *p2; \
    unsigned long tmp; \
    p1 = (char *)&x; \
    tmp = ( *((unsigned long *)p1) ); \
    p2 = ((char *)&tmp) + 3; \
    *p1++ = (*p2--); \
    *p1++ = (*p2--); \
    *p1++ = (*p2--); \
    *p1 = (*p2); \
    } define SWAP2(x) { \
    register char tmp,*p1,*p2; \
    p1=(char *)&x; \
    p2=p1+1; \
    tmp=(*p1); \
    *p1=(*p2); \
    *p2=tmp; \
    } define MKSHORT(x) ((unsigned short)(x[1]<<8 | x[0]))
define STSHORT(d,s) {d[0]=s&0xff; d[1]=s>>8;} define APROX_FACETS 1000

/* forward stuff */
OBJECT *read_binary_stl(), *read_ascii_stl();

/* STL file digestion */
```

APPENDIX PAGE          99

```
    STLFILE *read_stl(filename)
    char *filename;
    {
      OBJECT *objs;
      STLFILE *file;
      char type_buf[513], *tp;
      int stl_fd, bytes;

if((stl_fd = open(filename,O_RDONLY)) < 0)
        return((STLFILE *)NULL);

/* build us a file structure */
      if((file = (STLFILE *) malloc(sizeof(STLFILE))) ==
    NULL)
        return(file);
      strcpy(file->filename,filename);
      file->modified = 0;
      file->objs = (OBJECT *)NULL;
      file->next_file = (STLFILE *) NULL;

/* attempt to figure out the file type */
      type_buf[512] = '\0';
      bytes=read(stl_fd, type_buf, sizeof(type_buf));
      for(tp=type_buf; tp < type_buf+bytes-12 &&
    strncasecmp("facet normal",tp,12);)
        tp++;
      lseek(stl_fd, (off_t) 0, L_SET);
      if(tp < type_buf+bytes-12)
        file->objs=read_ascii_stl(stl_fd);
      else
        file->objs=read_binary_stl(stl_fd);
      close(stl_fd);
      if(file->objs == NULL)
      {
        free(file);
        file = (STLFILE *) NULL;
      }
      return(file);
    }

OBJECT *read_ascii_stl(stl_fd)
    int stl_fd;
    {
      FILE *stl_fp;
      OBJECT *head_obj, *prev_obj, *obj;
      FACET *f_ptr, *n_facets;
      char line[80], *in;
      int i, facets_allocated;

head_obj = prev_obj = (OBJECT *) NULL;

if((stl_fp = fdopen(stl_fd,"r")) == NULL)
```

APPENDIX PAGE                    100

```
        return(NULL);
   for(;1;prev_obj=obj)
   {
     /* spin looking for solid keyword */
     while(in=fgets(line,sizeof(line),stl_fp))
     {
       while(isspace(*in)) in++;
       if(strncasecmp(in,"solid ",6) == NULL)
         break;
     }

/* blow out if we have run out of file */
     if(!in) break;

/* make a new object structure to fill in */
     if((obj = (OBJECT *) malloc(sizeof(OBJECT))) ==
NULL)
        return(obj);
     obj->facet_count = 0;
     obj->adj = (ADJACENCY *)NULL;
     obj->next_obj = (OBJECT *) NULL;

/* maintain the linked list */
     if(head_obj == (OBJECT *) NULL) head_obj = obj;
     if(prev_obj != (OBJECT *) NULL) prev_obj->next_obj
= obj;

facets_allocated = APROX_FACETS;
     obj->facets = f_ptr = (FACET *)
calloc(APROX_FACETS,sizeof(FACET));

/* check for memory allocation failure */
     if(obj->facets == NULL)
     {
#ifdef STL_IO
        printf("read_ascii_stl: unable to allocate
memory for %d facets.\n",
           facets_allocated);
#endif STL_IO
        obj->facet_count = -1;
        return(head_obj);
     }

/* parse down the info line */
     sscanf(in,"solid %[^\n]",obj->info);

/* spin thru the object until we see endsolid */
   for(;in=fgets(line,sizeof(line),stl_fp);f_ptr++,obj->f
acet_count++)
     {
        if(obj->facet_count >= facets_allocated)
```

APPENDIX PAGE                101

```
        {
            facets_allocated += APROX_FACETS;
            n_facets = (FACET *) realloc(obj->facets,
facets_allocated*sizeof(FACET));
            /* check for memory allocation failure */
            if(n_facets == NULL)
            {
#ifdef STL_IO
                printf("read_ascii_stl: unable to allocate memory for %d facets.\n",
                    facets_allocated);
#endif STL_IO
                free(obj->facets);
                obj->facets = NULL;
                obj->facet_count = -1;
                return(head_obj);
            } obj->facets = n_facets;
            f_ptr = obj->facets + obj->facet_count;
        }
        while(isspace(*in)) in++;
        if(strncasecmp(in,"end solid",8) == NULL)
          break;
        sscanf(in,"facet normal %e %e %e",&f_ptr->norm.x,&f_ptr->norm.y,
            &f_ptr->norm.z);
        if(!(in=fgets(line,sizeof(line),stl_fp)))
          break;
        while(isspace(*in)) in++;
        if(strncasecmp(in,"outer loop",10) != NULL)
          break;
        for(i=0; i < 3; i++)
            fscanf(stl_fp," vertex %e %e %e\n",&f_ptr->tri.p[i].x,
                &f_ptr->tri.p[i].y, &f_ptr->tri.p[i].z);
        if(!(in=fgets(line,sizeof(line),stl_fp)))
          break;
        while(isspace(*in)) in++;
        if(strncasecmp(in,"endloop",7) != NULL)
          break;
        if(!(in=fgets(line,sizeof(line),stl_fp)))
          break;
        while(isspace(*in)) in++;
        if(strncasecmp(in,"endfacet",7) != NULL)
          break;
    }
    if(obj->facet_count)
      obj->facets=(FACET *)realloc(obj->facets,obj->facet_count*sizeof(FACET));
    else
```

APPENDIX PAGE 102

```
      {
        /* ignore zero facets */
#ifdef STL_IO
        printf("stripping zero facet count object\n");
#endif STL_IO
        free(obj->facet_count);
        free(obj);
        if(prev_obj)
          prev_obj->next_obj = NULL;
        obj = prev_obj;
      }
  }
  fclose(stl_fp);
  return(head_obj);
}

OBJECT *read_binary_stl(stl_fd)
int stl_fd;
{
  OBJECT *head_obj, *prev_obj, *obj;
  FACET *f_ptr;
  int i,j;
  short foo;
  struct bin_stl_hdr hdr;
  struct bin_stl_facet facet;
  struct iovec iov[2];

iov[0].iov_base = (caddr_t) &facet;
  iov[0].iov_len = sizeof(facet);
  iov[1].iov_base = (caddr_t) &foo;
  iov[1].iov_len = sizeof(foo);
  head_obj = prev_obj = (OBJECT *) NULL;
  for(;read(stl_fd,&hdr,sizeof(hdr)) == sizeof(hdr);
prev_obj = obj)
    {
    SWAP4(hdr.facet_count);

/* skip objects with no facets */
    if(hdr.facet_count == 0)
      {
#ifdef STL_IO
      printf("stripping zero facet count object\n");
#endif STL_IO
      continue;
      }

/* allocate a new object and init it properly */
    if((obj = (OBJECT *) malloc(sizeof(OBJECT))) ==
NULL)
      return(head_obj);
    obj->facet_count = 0;
    obj->facets = (FACET *) NULL;
```

APPENDIX PAGE 103

```
      obj->adj = (ADJACENCY *)NULL;
      obj->next_obj = (OBJECT *) NULL;
      if(head_obj == (OBJECT *) NULL) head_obj = obj;
      if(prev_obj != (OBJECT *) NULL) prev_obj->next_obj
 = obj;

memcpy(obj->info,hdr.hdr_info,STL_INFO_LEN);
      obj->facet_count = hdr.facet_count;
      obj->facets = f_ptr = (FACET
*)calloc(hdr.facet_count,sizeof(FACET));

/* check for memory allocation failure usually
caused by a bogus file */
      if(obj->facets == NULL)
      {
#ifdef STL_IO
        printf("read_binary_stl: unable to allocate
memory for %d facets.\n",
          obj->facets);
#endif STL_IO
        obj->facet_count = -1;
        return(head_obj);
      } ifdef STL_IO
      printf("header info: %s (facets
%d)\n",hdr.hdr_info,hdr.facet_count);
      printf("solid\n");
#endif STL_IO
      for(i=0; i < hdr.facet_count; i++, f_ptr++)
      {
        /* read facet information */
        if(readv(stl_fd,iov,2) == -1)
        {
          free(obj->facets);
          obj->facet_count = -1;
          obj->facets = (FACET *) NULL;
          return(head_obj);
        }
        /* byte swap the normal */
        SWAP4(facet.norm.x);
        SWAP4(facet.norm.y);
        SWAP4(facet.norm.z);
        memcpy(&f_ptr->norm,&facet.norm,sizeof(VECTOR));
#ifdef STL_IO
        printf("  facet normal %f %f
%f\n",facet.norm.x,facet.norm.y,facet.norm.z);
endif STL_IO /* byte swap the triangle */
ifdef STL_IO
        printf("   outer loop\n");
```

APPENDIX PAGE 104

```
#endif STL_IO
      for(j=0; j < 3; j++)
         {
         SWAP4(facet.tri.p[j].x);
         SWAP4(facet.tri.p[j].y);
         SWAP4(facet.tri.p[j].z);
#ifdef STL_IO
         printf("    vertex  %f %f %f\n",
facet.tri.p[j].x,facet.tri.p[j].y,facet.tri.p[j].z);
#endif STL_IO
         }
ifdef STL_IO
      printf("  end loop\n");
#endif STL_IO
      memcpy(&f_ptr->tri,&facet.tri,sizeof(TRIANGLE));
#ifdef STL_IO
      printf(" endfacet\n");
#endif STL_IO
      }
ifdef STL_IO
    printf("endsolid\n");
#endif STL_IO
    }
  return(head_obj);
} int write_stl(filename,file,ascii)
char *filename;
STLFILE *file;
int ascii;
{
  int stl_fd, ret_code;

if((stl_fd=open(filename,O_CREAT|O_TRUNC|O_WRONLY,0666
)) < 0)
    return(-1);
  if(ascii)
    ret_code = write_ascii_stl(stl_fd,file->objs);
  else
    ret_code = write_binary_stl(stl_fd,file->objs);
  close(stl_fd);
  return(ret_code);
} int write_binary_stl(fd,objs)
int fd;
OBJECT *objs;
{
  OBJECT *obj;
  FACET *f_ptr;
```

APPENDIX PAGE 105

```c
      int i,j;
      short zero=0;
      struct bin_stl_hdr hdr;
      struct bin_stl_facet facet;
      struct iovec iov[2];

iov[0].iov_base=(caddr_t) &facet;
      iov[0].iov_len=sizeof(facet);
      iov[1].iov_base=(caddr_t) &zero;
      iov[1].iov_len=sizeof(zero);

for(obj=objs; obj != NULL; obj = obj->next_obj)
      {
        /* build binary stl header & write it out */
        memcpy(hdr.hdr_info,obj->info,STL_INFO_LEN);
        hdr.facet_count = obj->facet_count;
        SWAP4(hdr.facet_count);
        if(write(fd,&hdr,sizeof(hdr)) != sizeof(hdr))
          return(-1);
        f_ptr=obj->facets;
        for(i=0 ; i < obj->facet_count; i++, f_ptr++)
        {
          /* build up a facet for disk & write it */
          memcpy(&facet.norm,&f_ptr->norm,sizeof(VECTOR));
          SWAP4(facet.norm.x);
          SWAP4(facet.norm.y);
          SWAP4(facet.norm.z);
          memcpy(&facet.tri,&f_ptr->tri,sizeof(TRIANGLE));
          for(j=0; j < 3; j++)
          {
            SWAP4(facet.tri.p[j].x);
            SWAP4(facet.tri.p[j].y);
            SWAP4(facet.tri.p[j].z);
          }
          if(writev(fd,iov,2) == -1)
            return(-1);
        }
      }
      return(0);
} int write_ascii_stl(fd,objs)
int fd;
OBJECT *objs;
{
  FILE *fp;
  OBJECT *obj;
  FACET *f_ptr;
  int i,j;

if((fp = fdopen(fd,"w")) == NULL)
    return(-1);
```

APPENDIX PAGE 106

```
    for(obj=objs; obj != NULL; obj = obj->next_obj)
    {
      fprintf(fp,"solid %s\n",obj->info);
      f_ptr=obj->facets;
      for(i=0; i < obj->facet_count; i++, f_ptr++)
      {
        fprintf(fp,"  facet normal %e %e
%e\n",f_ptr->norm.x,f_ptr->norm.y,
          f_ptr->norm.z);
        fprintf(fp,"    outer loop\n");
        for(j=0; j < 3; j++)
          fprintf(fp,"      vertex   %e %e
%e\n",f_ptr->tri.p[j].x,
            f_ptr->tri.p[j].y, f_ptr->tri.p[j].z);
        fprintf(fp,"    endloop\n");
        fprintf(fp,"  endfacet\n");
      }
      fprintf(fp,"endsolid %s\n",obj->info);
    }
    fclose(fp);
    return(0);
}

/* SLI file digestion */

SLIFILE *read_sli(filename)
char *filename;
{
  SLIFILE *sli;
  SLILAYER *cur_layer, *prev_layer;
  SLIVECTORS *cur_vects, *prev_vects;
  char sli_header[512], start_found=FALSE;
  unsigned short vectors;
  int sli_fd,i, len;
  struct bin_sli_hdr hdr;
  struct bin_sli_vector vector;

cur_layer = prev_layer = NULL;
  cur_vects = prev_vects = NULL;

if((sli_fd=open(filename,O_RDONLY)) < 0)
  {
#ifdef SLI_IO
    printf("ERROR: could not open .sli file
%s.\n",filename);
#endif
    return(NULL);
  } if((sli=(SLIFILE *)malloc(sizeof(SLIFILE))) == NULL)
    return(NULL);
```

APPENDIX PAGE                107

```
      strcpy(sli->filename,filename);
      sli->max_x = sli->max_y =  0;
      sli->min_x = sli->min_y = -0;
      sli->max_layer = sli->min_layer = sli->total_layers
= 0;
      sli->layers = NULL;
      sli->next_file = NULL;

/* skip over header info spooge */
      do
      { if((len=read(sli_fd,sli_header,sizeof(sli_header))) <=
0)
       {
#ifdef SLI_IO
        printf("ERROR: could not find data start in file
%s.\n",filename);
#endif
        free_sli(sli);
        return(NULL);
       }
      for(i=0; i < len-4 && !start_found; i++)
        if(strncmp(SLI_DATA_START,sli_header+i,6) ==
NULL)
          start_found = TRUE;
   } while(!start_found);

/* park the file pointer at the right place */
   lseek(sli_fd, (off_t)(i-len+6), L_INCR);

while(TRUE)
   {
     while((len=read(sli_fd,&hdr,sizeof(hdr))) ==
sizeof(hdr))
     {
       /* swap the byte ordering to be the normal way
around */
       vectors=MKSHORT(hdr.sli_vectors);
       if(hdr.sli_type > 15)
       {
#ifdef SLI_IO
         printf("  Vector type: %u  out of
range\n",hdr.sli_type);
#endif SLI_IO
         free_sli(sli);
      return(NULL);
       }
       if(hdr.sli_type == layer_start)
       {
#ifdef SLI_IO
         printf("START LAYER: %d \n",vectors);
```

APPENDIX PAGE 108

```
#endif SLI_IO
        prev_layer = cur_layer;
        if((cur_layer=(SLILAYER
*)malloc(sizeof(SLILAYER))) == NULL)
        {
           free_sli(sli);
        return(NULL);
        }
        cur_layer->layer_num = vectors;
        cur_layer->vect_list = NULL;
        cur_layer->next_layer = NULL;
        cur_layer->prev_layer = prev_layer;
        if(prev_layer == NULL)
      sli->layers = cur_layer;
      else
        prev_layer->next_layer = cur_layer;
        prev_vects = cur_vects = NULL;
        sli->total_layers++;
    continue;
    }
    else
    {
        vectors = vectors / 4;
#ifdef SLI_IO
        printf(" Vector type: %u
(%d)\n",hdr.sli_type,vectors);
#endif SLI_IO
        prev_vects = cur_vects;
        cur_vects = (SLIVECTORS *)
malloc(sizeof(SLIVECTORS));
        cur_vects->vector_type = hdr.sli_type;
        cur_vects->vector_count = vectors;
        cur_vects->next_vectors = NULL;
        if(prev_vects == NULL)
           cur_layer->vect_list = cur_vects;
        else
           prev_vects->next_vectors = cur_vects;
        cur_vects->vectors = (struct bin_sli_vector
*)calloc(vectors,
           sizeof(struct bin_sli_vector));

if(read(sli_fd,cur_vects->vectors,sizeof(struct
bin_sli_vector)*vectors)
        != sizeof(struct bin_sli_vector) * vectors)
        {
#ifdef SLI_IO
           printf("ERROR: reading vector\n");
#endif SLI_IO
           free_sli(sli);
           return(NULL);
        }
        for(i=0; i < vectors; i++)
```

APPENDIX PAGE          109
```
              {
                SWAP2(cur_vects->vectors[i].p[0].x);
                SWAP2(cur_vects->vectors[i].p[0].y);
                SWAP2(cur_vects->vectors[i].p[1].x);
                SWAP2(cur_vects->vectors[i].p[1].y);
#ifdef SLI_IO
                printf("      (%u,%u) -
(%u,%u)\n",cur_vects->vectors[i].p[0].x,
                    cur_vects->vectors[i].p[0].y,
cur_vects->vectors[i].p[1].x,
                    cur_vects->vectors[i].p[1].y);
#endif SLI_IO
                if(cur_vects->vectors[i].p[0].x < sli->min_x)
                    sli->min_x=cur_vects->vectors[i].p[0].x;
                if(cur_vects->vectors[i].p[1].x <
sli->min_x)
                    sli->min_x=cur_vects->vectors[i].p[1].x;
                if(cur_vects->vectors[i].p[0].y <
sli->min_y)
                    sli->min_y=cur_vects->vectors[i].p[0].y;
                if(cur_vects->vectors[i].p[1].y <
sli->min_y)
                    sli->min_y=cur_vects->vectors[i].p[1].y;
                if(cur_vects->vectors[i].p[0].x >
sli->max_x)
                    sli->max_x=cur_vects->vectors[i].p[0].x;
                if(cur_vects->vectors[i].p[1].x >
sli->max_x)
                    sli->max_x=cur_vects->vectors[i].p[1].x;
                if(cur_vects->vectors[i].p[0].y >
sli->max_y)
                    sli->max_y=cur_vects->vectors[i].p[0].y;
                if(cur_vects->vectors[i].p[1].y >
sli->max_y)
                    sli->max_y=cur_vects->vectors[i].p[1].y;
              }
          }
      }
      if(len != sizeof(hdr))
        break;
    } if(cur_layer)
      {
#ifdef SLI_IO
      printf("SLI file min: (%u,%u) max:
(%u,%u)\n",sli->min_x,sli->min_y,
         sli->max_x,sli->max_y);
endif SLI_IO sli->max_layer = cur_layer->layer_num;
      sli->min_layer = sli->layers->layer_num;
```

APPENDIX PAGE 110

```
      }
    else
      {
#ifdef SLI_IO
    printf("SLI file EMPTY\n");
endif SLI_IO free_sli(sli);
      sli = NULL;
      } return(sli);
  } write_sli(sli)
SLIFILE *sli;
{
  SLILAYER *layer;
  SLIVECTORS *vect;
  int sli_fd, i, h_len;
  struct bin_sli_hdr bsh;
  struct bin_sli_vector *vects;
  unsigned short vect_sz;

if((sli_fd=open(sli->filename,
O_WRONLY|O_CREAT|O_TRUNC,0666)) < 0)
    {
#ifdef SLI_IO
    printf("write_sli(): could not open
%s.\n",sli->filename);
#endif SLI_IO
    return(-1);
    }

/* write header info */
  if(write(sli_fd, sli->header,
h_len=strlen(sli->header)) != h_len)
    {
#ifdef SLI_IO
    printf("write_sli(): could not write header.\n");
#endif SLI_IO
    close(sli_fd);
    return(-1);
    } if(write(sli_fd,SLI_DATA_START,7) != 7)
    {
#ifdef SLI_IO
    printf("write_sli(): could not write data start
marker.\n");
#endif SLI_IO
    close(sli_fd);
```

APPENDIX PAGE 111

```
    return(-1);
}
for(layer=sli->layers; layer;
layer=layer->next_layer)
    {
    /* write out layer start info */
    bsh.sli_type = layer_start;
    STSHORT(bsh.sli_vectors,layer->layer_num);
    if(write(sli_fd,&bsh,sizeof(bsh)) != sizeof(bsh))
        {
#ifdef SLI_IO
        printf("write_sli(): could not write layer start header.\n");
#endif SLI_IO
        close(sli_fd);
        return(-1);
        } for(vect=layer->vect_list; vect;
vect=vect->next_vectors)
        {
        /* write out vector header */
        bsh.sli_type = vect->vector_type;
        vect_sz = vect->vector_count * 4;
        STSHORT(bsh.sli_vectors,vect_sz)
        if(write(sli_fd,&bsh,sizeof(bsh)) != sizeof(bsh))
            {
#ifdef SLI_IO
            printf("write_sli(): could not write vector header.\n");
#endif SLI_IO
            close(sli_fd);
            return(-1);
            }

/* lets do the byte swap again, its just a ...
*/
        if((vects = (struct bin_sli_vector *)
calloc(vect->vector_count,
            sizeof(struct bin_sli_vector))) == NULL)
            {
#ifdef SLI_IO
            printf("write_sli(): could not allocate memory for vectors.\n");
#endif SLI_IO
            close(sli_fd);
            return(-1);
            }
        for(i=0; i < vect->vector_count; i++)
            {
            STSHORT(((unsigned char *)
```

APPENDIX PAGE                    112

```
        &vects[i].p[0].x),vect->vectors[i].p[0].x);
            STSHORT(((unsigned char *)
        &vects[i].p[0].y),vect->vectors[i].p[0].y);
            STSHORT(((unsigned char *)
        &vects[i].p[1].x),vect->vectors[i].p[1].x);
            STSHORT(((unsigned char *)
        &vects[i].p[1].y),vect->vectors[i].p[1].y);
        }

/* write them vectors out */ if(write(sli_fd,vects,vect->vector_count*sizeof(struct
bin_sli_vector))
        != vect->vector_count*sizeof(struct
bin_sli_vector))
        {
#ifdef SLI_IO
        printf("write_sli(): could not write
vectors.\n");
#endif SLI_IO
        free(vects);
        close(sli_fd);
        return(-1);
        }

/* release that memory */
        free(vects);
      }
    }
    close(sli_fd);
    return(0);
}

VFILE *read_v(filename)
char *filename;
{
  VFILE *v;
  VLAYER *cur_layer, *prev_layer;
  VVECTORS *cur_vects, *prev_vects;
  char ignore;
  int i,v_fd;
  struct v_hdr v_header;

if((v_fd=open(filename,O_RDONLY)) < 0)
    {
#ifdef V_IO
     printf("ERROR: could not open .v file
%s.\n",filename);
#endif V_IO
     return(NULL);
    }
```

APPENDIX PAGE               113

```
    /* read zero byte at beginning of file */
    if(read(v_fd, &ignore, sizeof(ignore)) !=
sizeof(ignore) || ignore != 0)
    {
#ifdef V_IO
    printf("ERROR: %s is not a .v file (ignore byte =
%x).\n",filename,ignore);
#endif V_IO
      close(v_fd);
      return(NULL);
    }

/* allocate VFILE structure */
    if((v=(VFILE *)malloc(sizeof(VFILE))) == NULL)
    {
      close(v_fd);
      return(NULL);
    }
    strcpy(v->filename,filename);
    v->max_x = v->max_y =  0;
    v->min_x = v->min_y = ~0;
    v->max_layer = v->min_layer = v->total_layers = 0;
    v->layers = NULL;
    v->next_file = NULL;

prev_layer = cur_layer = NULL;
    while(read(v_fd,&v_header,sizeof(v_header)) ==
sizeof(v_header))
    {
      SWAP2(v_header.layer);
      SWAP4(v_header.vectors);

if(v_header.vectors == 0)
      {
        /* layer start */
#ifdef V_IO
    printf("Layer Start: %d  File: %d  Type: %d\n",
v_header.layer,
        v_header.file_no,v_header.type);
#endif V_IO
      prev_layer = cur_layer;
      if((cur_layer=(VLAYER *)malloc(sizeof(VLAYER)))
== NULL)
      {
         free_v(v);
         close(v_fd);
      return(NULL);
      }
      cur_layer->file = v_header.file_no;
      cur_layer->layer_num = v_header.layer;
      cur_layer->vect_list = NULL;
      cur_layer->next_layer = NULL;
```

APPENDIX PAGE 114

```
            cur_layer->prev_layer = prev_layer;
            if(prev_layer == NULL)
          v->layers = cur_layer;
            else
               prev_layer->next_layer = cur_layer;
            prev_vects = cur_vects = NULL;
            v->total_layers++;
         }
         else
         {
            /* load vector block */
#ifdef V_IO
            printf("  Vector Block: %d  File: %d  Type: %d
Vectors: %d\n",
v_header.layer,v_header.file_no,v_header.type,v_header
.vectors);
#endif V_IO
            prev_vects = cur_vects;
            cur_vects = (VVECTORS *)
malloc(sizeof(VVECTORS));
            cur_vects->vector_type = v_header.type;
            cur_vects->vector_count = v_header.vectors;
            cur_vects->next_vectors = NULL;
            if(prev_vects == NULL)
               cur_layer->vect_list = cur_vects;
            else
               prev_vects->next_vectors = cur_vects;
            cur_vects->vectors = (struct v_vector
*)calloc(v_header.vectors,
               sizeof(struct v_vector));
            if(read(v_fd,cur_vects->vectors,sizeof(struct
v_vector)*v_header.vectors)
               != sizeof(struct v_vector)*v_header.vectors)
            {
#ifdef V_IO
               printf("ERROR: reading vector\n");
#endif V_IO
               free_v(v);
               close(v_fd);
               return(NULL);
            }
            for(i=0; i < v_header.vectors; i++)
            {
               SWAP2(cur_vects->vectors[i].p[0].x);
               SWAP2(cur_vects->vectors[i].p[0].y);
               SWAP2(cur_vects->vectors[i].p[1].x);
               SWAP2(cur_vects->vectors[i].p[1].y);
#ifdef V_IO
               printf("     (%u,%u) -
(%u,%u)\n",cur_vects->vectors[i].p[0].x,
                  cur_vects->vectors[i].p[0].y,
```

APPENDIX PAGE                     115

```
        cur_vects->vectors[i].p[1].x,
                cur_vects->vectors[i].p[1].y);
    #endif V_IO
            if(cur_vects->vectors[i].p[0].x < v->min_x)
                v->min_x=cur_vects->vectors[i].p[0].x;
            if(cur_vects->vectors[i].p[1].x < v->min_x)
                v->min_x=cur_vects->vectors[i].p[1].x;
            if(cur_vects->vectors[i].p[0].y < v->min_y)
                v->min_y=cur_vects->vectors[i].p[0].y;
            if(cur_vects->vectors[i].p[1].y < v->min_y)
                v->min_y=cur_vects->vectors[i].p[1].y;
            if(cur_vects->vectors[i].p[0].x > v->max_x)
                v->max_x=cur_vects->vectors[i].p[0].x;
            if(cur_vects->vectors[i].p[1].x > v->max_x)
                v->max_x=cur_vects->vectors[i].p[1].x;
            if(cur_vects->vectors[i].p[0].y > v->max_y)
                v->max_y=cur_vects->vectors[i].p[0].y;
            if(cur_vects->vectors[i].p[1].y > v->max_y)
                v->max_y=cur_vects->vectors[i].p[1].y;
        }
      }
    }

/* record min and max layer numbers */
    v->max_layer = cur_layer->layer_num;
    v->min_layer = v->layers->layer_num;

close(v_fd);
    return(v);
}

/* free up memory associated with an STLFILE */ free_stl(stl)
STLFILE *stl;
{
  OBJECT *obj, *nobj;

for(obj=stl->objs; obj; obj = nobj)
  {
    nobj = obj->next_obj;
    if(obj->facets)
      free(obj->facets);
    free(obj);
  }
  free(stl);
}

/* free up memory associated with an SLIFILE */ free_sli(sli)
SLIFILE *sli;
```

APPENDIX PAGE                116

```
{
  SLILAYER *layer, *nlayer;
  SLIVECTORS *vect, *nvect;

for(layer=sli->layers; layer; layer = nlayer)
  {
    nlayer = layer->next_layer;
    for(vect=layer->vect_list; vect; vect = nvect)
    {
      nvect = vect->next_vectors;
      if(vect->vectors)
        free(vect->vectors);
      free(vect);
    }
    free(layer);
  }
  free(sli);
}

/* free up memory associated with an VFILE */ free_v(v)
VFILE *v;
{
  VLAYER *layer, *nlayer;
  VVECTORS *vect, *nvect;

for(layer=v->layers; layer; layer = nlayer)
  {
    nlayer = layer->next_layer;
    for(vect=layer->vect_list; vect; vect = nvect)
    {
      nvect = vect->next_vectors;
      if(vect->vectors)
        free(vect->vectors);
      free(vect);
    }
    free(layer);
  }
  free(v);
}
```

APPENDIX PAGE 117

```c
/* This program is called "cides.h".  1.49 9/12/91 -
contains the definitions for the various sizes,
structures, and such. */ include <stdio.h>
include <string.h>
#include <math.h>
#include <sys/types.h>
include <sys/param.h>

/* #define SGI /* For compiling on SGI machines */
/* booleans */ define TRUE  1
define FALSE 0

/* These define the size of the window, and are HOOPS
constants. */
#define MAXX   1.0
#define MINX  -1.0
#define MAXY   1.0
define MINY  -1.0 define MAX_SEG_LEN 256
define PI  3.141592654      /* value of pi */

/*
          HOOP screen segmentation layout (-1.0,1.0)
     +===================================+ (1.0,1.0)
     |                 menu_seg          |
       (-1.0,0.7)
     |-----------------------------------| (1.0,0.7)
                       message_seg
       (-1.0,0.6)
     |-----------------------------------| (1.0,0.6)
     |                                   |
     |                                   |
     |             object_seg            |
     |                                   |
     |                                   |
       (-1,1)
     +===================================+ (1,1)
*/
```

APPENDIX PAGE 118

```c
/* menu segment window dimensions */
#define MENU_LEFT    (-1.0)
#define MENU_RIGHT   1.0
#define MENU_TOP     1.0
#define MENU_BOTTOM  0.7

/* message segment window dimensions */
#define MESSAGE_LEFT    (-1.0)
#define MESSAGE_RIGHT   1.0
#define MESSAGE_TOP  0.7
#define MESSAGE_BOTTOM  0.5

/* object segment window dimensions */
#define OBJECT_LEFT (-1.0)
#define OBJECT_RIGHT    0.7
#define OBJECT_TOP   0.5
#define OBJECT_BOTTOM   (-1.0)

/* immediate menu segment window dimensions */
#define NOW_LEFT    0.7
#define NOW_RIGHT   1.0
#define NOW_TOP             0.5
#define NOW_BOTTOM  (-1.0)

/* These are for the horizontal menu windows. */
#define MENU1_LOWER  0.5
#define MENU1_STEP   0.25
#define MENU2_LOWER  0.0
#define MENU2_STEP   0.2
#define MENU3_LOWER  (-0.5)

/* These are for the vertical listing menu windows */
#define LIST_LEFT    (-1.0)
#define LIST_TOP     0.0
#define LIST_STEP    0.5
#define LIST_WIDTH   0.25
#define LIST_BOTTOM  (-1.0)
#define LIST_MAX_DISP    16

/* effective origin offsets */
#define X_ORGOFF    0.1
#define Y_ORGOFF    0.1
#define Z_ORGOFF    0.5

/* set up some useful data types */ typedef struct /* 2d vector */
{
  unsigned short x,y;
} VECTOR2;
```

APPENDIX PAGE 119

```c
typedef struct /* 3d vector */
{
  float x,y,z;
} VECTOR;

typedef struct /* a 3d triangle */
{
  VECTOR p[3];
} TRIANGLE;

typedef struct facet /* a 3d facet */
{
  VECTOR norm;              /* the facet normal */
  TRIANGLE tri;             /* the triangle facet */
  long key;        /* key for putzing with
graphics */
} FACET;

typedef struct adj
{
  int a[3];
} ADJACENCY;

#include "3d_io.h"  /* file formats */
/*#include "slice.h"  /* mostly int stuff for slicing
speed */ typedef struct obj /* The structure of an SLA object
read from a .stl file */
{
  char info[80];    /* ascii info about the object */
  int facet_count;  /* number of facets for this
object */
  FACET *facets;    /* an array of the facets */
  ADJACENCY *adj;        /* pointer to adjacency
linkings, for checks */
  struct obj *next_obj; /* the next object in this
file */
} OBJECT;

typedef struct stlfl
{
  char filename[MAXPATHLEN];  /* the actual path name
*/
  char modified;         /* have the contents of objs
been changed */
  OBJECT *objs;              /* linked list of
objects in this file */
  struct stlfl *next_file;   /* next file in the list
*/
```

APPENDIX PAGE 120

```c
} STLFILE;

/* These next 3 types are important! */ typedef struct slivectors
{
  enum sli_hdr_types vector_type;
  unsigned int vector_count;
  struct bin_sli_vector *vectors;
  struct slivectors *next_vectors;
} SLIVECTORS;

typedef struct slilayer
{
  unsigned short layer_num;
  SLIVECTORS *vect_list;
  struct slilayer *prev_layer;
  struct slilayer *next_layer;
} SLILAYER;

typedef struct slifl
{
  char filename[MAXPATHLEN];
  unsigned short max_x, min_x, max_y, min_y;
  unsigned short max_layer, min_layer, total_layers;
  unsigned char *header;
  SLILAYER *layers;
  struct slifl *next_file;
} SLIFILE;  /* <---- This is what I will pass you ! 
*/ typedef struct vvectors
{
  enum sli_hdr_types vector_type;
  unsigned int vector_count;
  struct v_vector *vectors;
  struct vvectors *next_vectors;
} VVECTORS;

typedef struct vlayer
{
  short file;
  unsigned short layer_num;
  VVECTORS *vect_list;
  struct vlayer *prev_layer;
  struct vlayer *next_layer;
} VLAYER;

typedef struct vfl
{
  char filename[MAXPATHLEN];
  unsigned short max_x, min_x, max_y, min_y;
```

APPENDIX PAGE 121

```c
    unsigned short max_layer, min_layer, total_layers;
    VLAYER *layers;
    struct vfl *next_file;
} VFILE;

typedef struct text
{
  int segnum;
  char segname[8], descr[30];
  float value;
} TEXT;

typedef struct toggle
{
  int segnum, choice;
  char strings[2][20], segname[8];
} TOGGLE;

/* forward function definitions */
STLFILE *read_stl();
SLIFILE *read_sli();
VFILE *read_v();
char **dir_read(), *open_menu();
VECTOR find_normal();
int check_integrity();

/** External Variables **/
/* head of stl file list */
extern STLFILE *stl_file_head;

/* rooted segment names */
extern char *menu_seg,*message_seg,*object_seg,
*now_menu_seg, *hilite_seg;

/* root segment expansion */
extern char root_segment[MAX_SEG_LEN];

extern char *vector_colors[];    /* list of vector colors */
extern unsigned char quick_draw; /* whether to use Z-sort for hidden surface */
extern float theta, phi, roll;   /* camera angle */

/* macros */ define STREQ(a,b) (!strcmp(a,b))

/* compare 2 VECTORS */
#define VCMP(v1, v2) ((v1).x == (v2).x && (v1).y == (v2).y && (v1).z == (v2).z)
```

APPENDIX PAGE 122

```
#define VCOMP_EPS(a,b,eps)\
            (((a).x-(b).x) < eps && ((b).x-(a).x) < eps &&\
             ((a).y-(b).y) < eps && ((b).y-(a).y) < eps &&\
             ((a).z-(b).z) < eps && ((b).z-(a).z) < eps)

#define VECT2_COMP(a,b,eps)\
            (((int)(a).x-(int)(b).x) < eps && ((int)(b).x-(int)(a).x) < eps &&\
             ((int)(a).y-(int)(b).y) < eps && ((int)(b).y-(int)(a).y) < eps)

/* Copy 1 vector to another.  Faster than bcopy. */
#define VCOPY(v1, v2) (\
                (v2).x = (v1).x; \
                (v2).y = (v1).y; \
                (v2).z = (v1).z; \
                )

/* Copy 1 vector to another, with offset.  Faster
than bcopy. */
#define VCOPY_OFF(v1, v2, off) (\
                (v2).x = (v1).x; \
                (v2).y = (v1).y; \
                (v2).z = (v1).z + off;\
                )

/* add 2 vectors together */
#define VADD(v, v1, v2) \
            ( \
                (v).x = (v1).x + (v2).x; \
                (v).y = (v1).y + (v2).y; \
                (v).z = (v1).z + (v2).z; \
            )

/* subtract 2 vectors */
#define VSUB(vr, v1, v2) \
        ( \
            (vr).x = (v1).x - (v2).x;\
            (vr).y = (v1).y - (v2).y;\
            (vr).z = (v1).z - (v2).z;\
        )

/* Yep, you guessed, multiply 2 vectors */
#define VMULT(a,b,c)\
        (\
            (a).x = (b).x * (c).x;\
            (a).y = (b).y * (c).y;\
            (a).z = (b).z * (c).z;\
        )
```

APPENDIX PAGE 123

```
#define ASSIGN_VECT(vect, x1, y1, z1)\
      (\
            vect.x = (float) (x1);\
            vect.y = (float) (y1);\
            vect.z = (float) (z1);\
      )

#define MATMULT3X1(p, r, tot) \
         (\
            tot.x = (p).x * r[0][0]+ (p).y * r[1][0] +
(p).z * r[2][0];\
            tot.y = (p).x * r[0][1]+ (p).y * r[1][1] +
(p).z * r[2][1];\
            tot.z = (p).x * r[0][2]+ (p).y * r[1][2] +
(p).z * r[2][2];\
            )
```

APPENDIX PAGE 124

```
/* This program is called "3d_io.h". 1.4 4/17/91 - 3d
Systems file format descriptions and definitons. */

/*
  .STL binary file format:

#1st object
  struct bin_stl_hdr
    struct bin_stl_facet # facet 1
      .
      .
    struct bin_stl_facet # facet
bin_stl_hdr.facet_count
  #2nd object
  struct bin_stl_hdr
    struct bin_stl_facet # facet 1
      .
      .
    struct bin_stl_facet # facet
bin_stl_hdr.facet_count
    .
    .
  [continues until EOF]
*/ define STL_INFO_LEN 80 struct bin_stl_hdr
{
  char hdr_info[STL_INFO_LEN];
  unsigned facet_count;
};

struct bin_stl_facet
{
  VECTOR norm;
  TRIANGLE tri;
};

/*
  .SLI binary file format:

Arbitrary length descriptive header terminated by
"\001\002\003\004"
  #info for first layer
  struct bin_sli_hdr (type = layer_start)
    struct bin_sli_hdr (type = < any sli_hdr_types
except layer_start >)
      struct bin_sli_vector #vector 0
        .
```

APPENDIX PAGE 125

```
            .
            struct bin_sli_vector #vector
    bin_sli_hdr.vectors
        struct bin_sli_hdr (type = < any sli_hdr_types
    except layer_start >)
            struct bin_sli_vector #vector 0
            .
            .
            struct bin_sli_vector #vector
    bin_sli_hdr.vectors
        .
        .
        [continues until struct bin_sli_hdr.type =
    layer_start]
      #info for second layer
      struct bin_sli_hdr (type = layer_start)
        struct bin_sli_hdr (type = < any sli_hdr_types
    except layer_start >)
            struct bin_sli_vector #vector 0
            .
            .
            struct bin_sli_vector #vector
    bin_sli_hdr.vectors
        struct bin_sli_hdr (type = < any sli_hdr_types
    except layer_start >)
            struct bin_sli_vector #vector 0
            .
            .
            struct bin_sli_vector #vector
    bin_sli_hdr.vectors
        .
        .
        [continues until struct bin_sli_hdr.type =
    layer_start]
     .
     .
     [continues until EOF]
*/ define SLI_DATA_START "\001\002\001\002\003\004"

/* Dietmar - These are the important lines !
*************************/ enum sli_hdr_types
(layer_start,lb,lh,nfub,nfuh,nfuf,nfdb,nfdh,nfdf,fdb,
              fdh,fdf,fub,fuh,fuf);

struct bin_sli_hdr
(
```

APPENDIX PAGE 126

```c
  u_char sli_type;
  u_char sli_vectors[2];
};

struct bin_sli_vector
{
  VECTOR2 p[2];
};

/*********************************************/

/*
  .V file format:

0 #first byte of file is zero.

#start of layer 1st
  v_hdr # v_hdr.vectors == 0 indicating start of new
layer
     #start of vector block 1st
     v_hdr # v_hdr.layer != 0
       v_vector # vector 1
         .
         .
       v_vector # vector v_hdr.vectors
     #start of vector block 2nd
     v_hdr # v_hdr.layer != 0
       v_vector # vector 1
         .
         .
       v_vector # vector v_hdr.vectors
     .
     .
  #start of layer 2nd
  v_hdr # v_hdr.vectors == 0 indicating start of new
layer
    .
    .
  #end of file
  v_hdr # v_hdr.layer == 0 indicating no more vectors
*/ struct v_hdr
{
  char type;          /* vector block type */
  char file_no;       /* source file number */
  unsigned short layer;  /* cad z-layer number */
  unsigned vectors;   /* vector count */
};

#define v_vector bin_sli_vector
```

APPENDIX PAGE 127

```
/* This program is called "seg.h".

#include <stdio.h>
include <math.h>
#include <string.h>
#include <sys/types.h>
include <sys/param.h> include "cides.h"
```

APPENDIX PAGE 128

```c
/* This program is called "file.h". */

SLIFILE *mysli;
SLILAYER *curr_layer, *bottom_layer_ptr;
SLIVECTORS *curr_vect_list, *bottom_vect_list_ptr;
struct bin_sli_vector *curr_vect_ptr;

#define P 5000   /* Limiting the number of cutting planes to P */
#define Q 200    /* Limiting the number of islands per plane to Q */
#define R 9000   /* Limiting the number of boarder points per island per
                    plane to R */ define A 5000   /* Limiting the number of hatch lines per plane */
define B 500    /* Limiting the number of hatch points per hatch line per pln */
define C 50     /* Limiting the number of different hatch spacings */ define D 50     /* Limiting the number of hatch angles per pln */ define DMEM_CONST 100 struct point{short axis[3];};

/* with the following 3 structures you can access say x coord of 20th
       shortersection poshort of island 4 of cutting plane 2 by writing
       pln[2].isl[4].poshort[20][0] */
    /*  structure to hold intersection points for each island */
struct islands {struct point *boarder_pts };

/* structure to hold number of islands for each cutting plane */
 struct plane {struct islands isl[Q]; };

/* structure to hold number of cutting planes */
  struct plane *pln;

int isl_num=0, curr_pln_num=0;
char file_name[20];
FILE *fp1, *fp2;

short x_resolution, y_resolution, z_resolution;
short z_max, z_min, hatch_heights[50];
```

APPENDIX PAGE 129

```
short total_num_layers=50;
short isls_per_pln[P], brdrpts_per_pln_per_isl[P][Q];
short  islx_max[Q], islx_min[Q], isly_max[Q],
       isly_min[Q], plnx_max[P], plnx_min[P],
plny_max[P],
       plny_min[P], brdr_x[Q][R], brdr_y[Q][R];

short angle0_islx_max[P][Q], angle0_islx_min[P][Q],
angle0_isly_min[P][Q], angle0_isly_max[P][Q];
short  angle0_plnx_max[P],
angle0_plny_max[P],angle0_plnx_min[P],angle0_plny_min[
P];

float curr_hatch_angle, hatch_angle[C][D];

int  hatch_spacing[C], curr_hatch_spacing,
num_of_hatch_angles[C], zone_starting_height[C],
show_this_pln, num1, num2, num_of_zones;

short ii, line_type, prev_line_type,seq_num,
hatch_x[A][B], hatch_y[A], new_hatch_y[A][B]; /*
perhaps hatch_y[] can be replaced by new_hatch_y[][]
*/
short curr_hatch_y;
short max_seq_num, min_seq_num,first_time;
char sli_filename[20];
short vec_num_per_hatch_y[9000];
int special_hatching;
```

APPENDIX PAGE 130

```c
/* This program is called "read_brdrpts.c".

/*
#include <stdio.h>
include <math.h>
#include "seg.h"
#include "kkk.h"
*/ read_brdrpts()
{
short i,j,k, count1=0,earlier_pln_num=-1;
int factor=5000;
double temx, temy, temz, tem_zmax, tem_zmin;

/*
    printf("\nTYPE IN MULTIPLICATION FACTOR");
      scanf("%d", &factor);
*/
    fscanf(fp1, " %lf %lf", &tem_zmin, &tem_zmax);
     z_max = tem_zmax * factor;
      z_min = tem_zmin * factor;

pln = (struct plane *) calloc(P, sizeof(struct
plane) );
       if (pln == NULL)
        {
         fprintf(stderr,"read_boarder_pts(): planes :
out of memory.\n");
          exit(0);
          } for(;feof(fp1)==0;)
     {
      fscanf(fp1, "%d %d", &curr_pln_num, &isl_num);
       if(feof(fp1)!=0)break;
        if(earlier_pln_num != curr_pln_num ||
            isls_per_pln[curr_pln_num] != isl_num)
    {
         count1=0;
           isls_per_pln[curr_pln_num] = isl_num;
             earlier_pln_num=curr_pln_num;
     }
```

APPENDIX PAGE 131

```
        if(count1 == 0)
        { pln[curr_pln_num].isl[isl_num].boarder_pts =
             (struct point *) calloc(DMEM_CONST,
sizeof(struct point));

if
(pln[curr_pln_num].isl[isl_num].boarder_pts == NULL)
              {
                 printf("read_boarder_pts(): calloc  : out
of memory.\n");
                 exit(0);
              }
        } if(count1 != 0)
        if( (count1 % DMEM_CONST) == 0)
        {
           pln[curr_pln_num].isl[isl_num].boarder_pts =
             (struct point *) realloc( (char *)
              pln[curr_pln_num].isl[isl_num].boarder_pts,
              (count1+DMEM_CONST)* sizeof(struct point));

if
(pln[curr_pln_num].isl[isl_num].boarder_pts == NULL)
              {
                 printf("read_boarder_pts(): realloc : out
of memory.\n");
                 exit(0);
              }
        } fscanf(fp1, "%lf %lf %lf", &temx, &temy, &temz);

pln[curr_pln_num].isl[isl_num].boarder_pts[count1].axi
s[0] = temx * factor;

pln[curr_pln_num].isl[isl_num].boarder_pts[count1].axi
s[1] = temy * factor;

pln[curr_pln_num].isl[isl_num].boarder_pts[count1].axi
s[2] = temz * factor;
```

APPENDIX PAGE 132

```
            brdrpts_per_pln_per_isl[curr_pln_num][isl_num]=count1
;
            count1++;

}
            total_num_layers = curr_pln_num;

/*
for(i=0;i<=total_num_layers;i++)
        for(j=0;j<=isls_per_pln[j];j++)

for(k=0;k<=boarder_pts_per_pln_per_isl[i][j];k++)
            printf("\n%d %d %d %d %d %d", i,j, k,
              pln[i].isl[j].boarder_pts[k].axis[0],
               pln[i].isl[j].boarder_pts[k].axis[1],
                pln[i].isl[j].boarder_pts[k].axis[2]);

*/

}
```

APPENDIX PAGE 133

```
/* This program is called "user_input.c".
/*
#include <stdio.h>
include <math.h>
#include "seg.h"
#include "kkk.h"
*/
/* multiplication factor is assumed to be 5000 and
used in this program*/
get_user_input()
{
int i=0,k=0;
float starting_height, tem_hatch_spacing;

hatch_spacing[0]=1000;
     hatch_spacing[1] = 1000;
      hatch_spacing[2] = 1000;

hatch_angle[1][0] = 0;
     hatch_angle[1][1]= 90;
      hatch_angle[1][2] = 45;
       hatch_angle[1][3] = 135;

hatch_heights[0] = 200;
     hatch_heights[1] = 5000;

x_resolution = 2500;
     y_resolution = 2500;

printf("\nNOTE: UNITS ARE SAME AS THE CAD MODEL");

printf("\n\nFOR CLEMSON HATCHING STYLE ENTER 1, ELSE
ANY OTHER NUMBER  ");
    scanf("%d", &special_hatching);

if(special_hatching == 1)
{
    printf("\nENTER HATCH SPACING FOR BOTTOM AND TOP
MOST LAYERS  ");
    scanf("%f", &tem_hatch_spacing);
    hatch_spacing[0] = tem_hatch_spacing * 5000;
    printf("\nENTER NUMBER OF HATCH ANGLES FOLLOWED BY
THEIR VALUES  ");
    scanf("%d", &num_of_hatch_angles[0]);

while(k<num_of_hatch_angles[0])
            scanf("%f", &hatch_angle[0][k++]);

k=0;
    printf("\nENTER THE NUMBER OF DIFFERENT ZONES (Z
HEIGHTS) YOU WOLUD LIKE TO HAVE FOR HATCHING. IF YOU
```

APPENDIX PAGE 134

```
     TYPE IN 1 THERE WILL BE ONLY ONE ZONE WHICH INCLUDES
ALL LAYERS OTHER THAN BOTTOM AND TOP LAYERS  ");
        scanf("%d", &num_of_zones);

for(i=1; i<=num_of_zones; i++)
        {
          if(i==1)
          {
              printf("\nENTER HATCH SPACING FOR ZONE 1
WHICH STARTS FROM SECOND LAYER FROM BOTTOM  ");
              scanf("%f", &tem_hatch_spacing);
              hatch_spacing[1] = tem_hatch_spacing * 5000;
              printf("\nENTER NUMBER OF HATCH ANGLES
FOLLOWED BY THEIR VALUES FOR ZONE 1  ");
              scanf("%d", &num_of_hatch_angles[1]);

while(k<num_of_hatch_angles[1])
                  scanf("%f", &hatch_angle[1][k++]);
              k=0;

} else
          {
              printf("\nENTER STARTING Z-HEIGHT FOR ZONE
%d  ", i);
              printf("\n %(NOTE: Z_MIN AND Z_MAX OF THIS
PART ARE %f and %f . COMPUTE Z_HEIGHT ACCORDINGLY%)
", (float) z_min/5000, (float) z_max/5000);
              scanf("%f", &starting_height);
              zone_starting_height[i] = starting_height *
5000;

printf("\nENTER HATCH SPACING FOR ZONE %d
", i);
              scanf("%f", &tem_hatch_spacing);
                  hatch_spacing[i] = tem_hatch_spacing *
5000;

printf("\nENTER NUMBER OF HATCH ANGLES
FOLLOWED BY THEIR VALUES FOR ZONE %d  ", i);
              scanf("%d", &num_of_hatch_angles[i]);

while(k<num_of_hatch_angles[i])
                  scanf("%f", &hatch_angle[i][k++]);
                k=0;

}
        }
```

APPENDIX PAGE                  135

```
        } else
                { printf("\nENTER HATCH SPACING   ");
                        scanf("%f", &tem_hatch_spacing);
                        hatch_spacing[0]= tem_hatch_spacing * 5000;

printf("\nENTER NUMBER OF HATCH ANGLES
        FOLLOWED BY THEIR VALUES   ");
                        scanf("%d", &num_of_hatch_angles[0]);

k=0;
                        while(k<num_of_hatch_angles[0])
                            scanf("%f", &hatch_angle[0][k++]);

}

/*    printf("\nTYPE NAME OF SLI FILE");

while(sli_filename[0] == '\0')
        gets(sli_filename);
        */
                strcpy(sli_filename, "Clemson.sli");

}
```

APPENDIX PAGE 136

```c
/* This program is called "hatch_cal.c". */
/*
#include <stdio.h>
include <math.h>
#include "seg.h"
#include "kkk.h"
*/ do_hatching()
{
int i=0;

/* curr_pln_num starts from 1 because that is how
int_pts file is written */ for(curr_pln_num=1; curr_pln_num< total_num_layers;
curr_pln_num++)
    { if(special_hatching==1) get_hatching_details();
      else
      {
    num1 = 0;
      num2 = 0;
      } get_new_sequence_of_hatch_angles();

get_slilayers_ptr_details();

i=0;

while(i< num_of_hatch_angles[num1])
    {
     curr_hatch_angle= hatch_angle[num1][i++];
       curr_hatch_spacing = hatch_spacing[num2];
         rotate_brdrpts_in_opposite_direction();
           get_xy_max_min();
             get_hatchpts_for_curr_angle();
              put_hatchpts_in_sliformat();

}
    put_brdrpts_in_sliformat();

}
}
```

APPENDIX PAGE                137

```
    get_hatching_details()
    {
    int k;
        if(curr_pln_num < 2 || curr_pln_num >=
    total_num_layers-1)
        {
            num1 = 0;
             num2 = 0;
        } else
        { for(k=1; k<=num_of_zones;k++)
          { if(pln[curr_pln_num].isl[0].boarder_pts[0].axis[2]>=
               zone_starting_height[k])
            {
            num1 = k;
             num2 = k;
            }
         }

}

}

/* control comes here once for each plane and
    sequence of angles gets
          changed each time*/
    get_new_sequence_of_hatch_angles()
    {
    short i, k;

/* storing first angle in k */
        k = hatch_angle[num1][0];

/* num_of_hatch_angles is 4 if there are 4
    angles. not 3. ie.
          count is started from 1 not 0 */
        for(i=0; i<num_of_hatch_angles[num1]-1; i++)
         hatch_angle[num1][i] = hatch_angle[num1][i+1];
```

APPENDIX PAGE 138

```
        /* earlier first angle becomes last angle now */
        hatch_angle[num1][i] = k;

} rotate_brdrpts_in_opposite_direction()
{
short i;
double sine_theta, cos_theta;

sine_theta = sin(-curr_hatch_angle*22.0/7.0/180.0);
  cos_theta = cos(-curr_hatch_angle*22.0/7.0/180.0);

for(isl_num=0; isl_num<=isls_per_pln[curr_pln_num];
isl_num++)

for(i=0; i<=
brdrpts_per_pln_per_isl[curr_pln_num][isl_num];i++)
 {

/* when angle is 0 it is x hatching. brdrpts need
not be rotated */ if(curr_hatch_angle==0)
    {
      brdr_x[isl_num][i] =
pln[curr_pln_num].isl[isl_num].boarder_pts[i].axis[0];

brdr_y[isl_num][i] =
pln[curr_pln_num].isl[isl_num].boarder_pts[i].axis[1];

}

/* when angle is 90 it is y hatching. newx
becomes old y and
         newy is -oldx . Now you rotate back by 90 (ie
```

APPENDIX PAGE                139

```
           -90) and get hatch points.
                   then rotate them back*/
              else if(curr_hatch_angle==90)
              { brdr_y[isl_num][i] =

-1*(pln[curr_pln_num].isl[isl_num].boarder_pts[i].axis
             [0]);

brdr_x[isl_num][i] = pln[curr_pln_num].isl[isl_num].boarder_pts[i].axis[1];

}
                 /* -curr_hatch_angle is to rotate back */
              else
              {

/* applying rotation formula   newx =
             oldx*cos_theta - oldy*sine_theta */
                  brdr_x[isl_num][i] = cos_theta *
                         (
             pln[curr_pln_num].isl[isl_num].boarder_pts[i].axis[0])
             -
                      sine_theta *

(pln[curr_pln_num].isl[isl_num].boarder_pts[i].axis[1]
             );

/* applying rotation formula  newy =
             oldx*sine_theta + oldy*cos_theta */
                  brdr_y[isl_num][i] = sine_theta *
                         (
             pln[curr_pln_num].isl[isl_num].boarder_pts[i].axis[0])
             +
                      cos_theta *

(pln[curr_pln_num].isl[isl_num].boarder_pts[i].axis[1]
             );
                }
              }

}

/* to get xy max and min of each island after
      rotation */
```

APPENDIX PAGE 140

```
get_xy_max_min()
{
short count3;

/* count1 is for incrementing pln_num
           count2 is for incrementing isl_num
             count3 is for incrementing boarder_pts */

/* Initialization of xy max and min variables */ plnx_max[curr_pln_num] = brdr_x[0][0];
   plnx_min[curr_pln_num] = brdr_x[0][0];
    plny_max[curr_pln_num] = brdr_y[0][0];
     plny_min[curr_pln_num] = brdr_y[0][0];

for(isl_num=0; isl_num<=isls_per_pln[curr_pln_num];
isl_num++)
{
islx_max[isl_num] = brdr_x[isl_num][0];
   islx_min[isl_num] =  brdr_x[isl_num][0];
    isly_max[isl_num]=   brdr_y[isl_num][0];
     isly_min[isl_num] =  brdr_y[isl_num][0];

for(count3=0;count3<=brdrpts_per_pln_per_isl[curr_pln_
num][isl_num];count3++)
        {
if(brdr_x[isl_num][count3] > islx_max[isl_num])
         islx_max[isl_num] =
brdr_x[isl_num][count3];

if(islx_max[isl_num] > plnx_max[curr_pln_num])
              plnx_max[curr_pln_num] =
islx_max[isl_num];

if(brdr_x[isl_num][count3] < islx_min[isl_num])
         islx_min[isl_num] =
brdr_x[isl_num][count3];

if(islx_min[isl_num] < plnx_min[curr_pln_num])
              plnx_min[curr_pln_num] =
islx_min[isl_num];
```

APPENDIX PAGE 141

```
        if(brdr_y[isl_num][count3] > isly_max[isl_num])
                isly_max[isl_num] =
        brdr_y[isl_num][count3];

if(isly_max[isl_num] > plny_max[curr_pln_num])
                    plny_max[curr_pln_num] =
        isly_max[isl_num];

if(brdr_y[isl_num][count3] < isly_min[isl_num])
                isly_min[isl_num] =
        brdr_y[isl_num][count3];

if(isly_min[isl_num] < plny_min[curr_pln_num])
                    plny_min[curr_pln_num] =
        isly_min[isl_num];

}
    } for(isl_num=0; isl_num<=isls_per_pln[curr_pln_num];
    isl_num++)
            {
             if(curr_hatch_angle == 0)
             {
              angle0_islx_max[curr_pln_num][isl_num] =
    islx_max[isl_num];
                angle0_islx_min[curr_pln_num][isl_num] =
    islx_min[isl_num];
              angle0_isly_max[curr_pln_num][isl_num] =
    isly_max[isl_num];
                angle0_isly_min[curr_pln_num][isl_num]=
    isly_min[isl_num];

angle0_plnx_max[curr_pln_num] =
    plnx_max[curr_pln_num];
                angle0_plnx_min[curr_pln_num] =
    plnx_min[curr_pln_num];
                   angle0_plny_max[curr_pln_num] =
    plny_max[curr_pln_num];
                   angle0_plny_min[curr_pln_num] =
    plny_min[curr_pln_num];
             }
         }

/*
 for(isl_num=0; isl_num<=isls_per_pln[curr_pln_num];
 isl_num++)

printf("\npln=%d isl=%d angle=%fix_mx=%d ix_min=%d
 iy_max=%d iy_min=%d", curr_pln_num,
 isl_num,curr_hatch_angle,
```

APPENDIX PAGE 142

```
        islx_max[isl_num],islx_min[isl_num],
            isly_max[isl_num],isly_min[isl_num]);
*/
}

/* to calculate hatch points for one angle for
all the islands in a pln*/ get_hatchpts_for_curr_angle()
{
int i,j, tem_x;
unsigned short total_hatch_ys;

get_num_of_hatch_ys_for_curr_pln(&total_hatch_ys);

/* initialization of hatch_x[][] and
new_hatch_y[][] to -111. this
           bad programming practice of initializing
should be eliminated*/
        for(i=0;i<= total_hatch_ys;i++)
          hatch_x[i][0] =  -111;

/* initialization of hatch_y[] to -111 */
          for(i=0; i<=total_hatch_ys; i++)
            hatch_y[i] = -111;

/* initialization of hatch_x[][] and
new_hatch_y[][] to -111 */
/*   for(i=0;i<=A;i++)
       for(j=0;j<=B;j++)
         hatch_x[i][j] =  -111;
*/

/* initialization of hatch_y[] to -111 */
/*     for(i=0; i<A; i++)
         hatch_y[i] = -111;
*/
    for(isl_num=0; isl_num<=isls_per_pln[curr_pln_num];
isl_num++)
     {

/* last line connects fist point and last point
of the contour
         as it takes more time to write this condition
in the
         program one first point is again written next
```

APPENDIX PAGE 143

```
          to the last point */ brdr_x[isl_num][brdrpts_per_pln_per_isl[curr_pln_num][
     isl_num]+1]=
              brdr_x[isl_num][0];

brdr_y[isl_num][brdrpts_per_pln_per_isl[curr_pln_num][
     isl_num]+1]=
              brdr_y[isl_num][0];

get_seq_num_and_hatch_y();

/* ii is the glogal variable to count brdrpts */
         for(ii=0;
     ii<=brdrpts_per_pln_per_isl[curr_pln_num][isl_num];ii+
     +)
            {

/* this function returns -1 when ii and ii+1
     points are identical */
           if(get_upper_or_lower_or_parallel() == -1)
     continue;
            chk_for_possible_intersection();
            }

}
         /* when angle is 0.0 no rotation is necessary */
     /*
     if(curr_hatch_angle!=0.0)rotate_again_to_get_hatch_pts
     ();
     */
         rotate_again_to_get_hatch_pts();

/* by keeping this draw function here you can
     draw hatch lines
             for different angles without storing them in
     different arrays.
             in a way you are using HOOPS memory ?? */

}

/* this function is to get number of hatch ys
     for current plane */
     get_num_of_hatch_ys_for_curr_pln(total_hatch_ys)
     unsigned short *total_hatch_ys;
     {
       int distance;
        static short earlier_hatch_ys;
```

APPENDIX PAGE 144

```
            distance = plny_max[curr_pln_num] -
plny_min[curr_pln_num];
            *total_hatch_ys = distance /
curr_hatch_spacing;
            if(earlier_hatch_ys > *total_hatch_ys)
                        *total_hatch_ys =
earlier_hatch_ys;
            else
            earlier_hatch_ys = *total_hatch_ys;

}

/* this function used only once for each
island. to find nearest
        hatch line and its seq_num wrt to the first
brdr line ii=0, ii=1*/
get_seq_num_and_hatch_y()
{
  int distance, mod;

seq_num = 0;

/* to get the y value of the bottom most hatch
line .  when mod is
zero
        it will through plane y minimum. else it
will be slightly above
*/
        mod =
abs(plny_min[curr_pln_num])%curr_hatch_spacing;

/* hatch_y[0] will be equal to plane y min or
slightly more. */
        hatch_y[0] = plny_min[curr_pln_num] + mod;

if(brdr_y[isl_num][0] ==
plny_min[curr_pln_num]
                   || brdr_y[isl_num][0] <= hatch_y[0])
            {
                seq_num = 0;
                curr_hatch_y = hatch_y[0];
            } else
            {

/* distance is calculated from hatch_y[0] (
obtained above ) and
```

APPENDIX PAGE 145

```
                to brdr_y[0] and it should be always
positive.. hatch_y[0] will               never be more
than brdr_y[isl_num][0] bec. of  <= used above*/ distance = brdr_y[isl_num][0]- hatch_y[0];
            mod = distance % curr_hatch_spacing;

/* seq_num is the hatch line number. Its count
starts from 0 */
            seq_num = (distance - mod) /
curr_hatch_spacing ;

/* finding the nearest hatch line to ii=0,
ii=1 brdr line. Its
            seq_num is found above */ hatch_y[seq_num] = brdr_y[isl_num][0]
- mod;
            curr_hatch_y = hatch_y[seq_num];
        }

/* it is necessary to initialize hatch_x[][] to
-111 to break for loops
          later in the program. here == 0 indicates
that there are no values         in them that belong
to earlier islands. also ==0 condition will
          work only when there is no x coordinate
which is zero. this should
          be true bec. minimum x always 0.1*/
                if(hatch_x[seq_num][0] == 0)
hatch_x[seq_num][0] = -111;
                if(hatch_x[seq_num+1][0] == 0)
hatch_x[seq_num][0] = -111;
if(seq_num > 0 && hatch_x[seq_num-1][0] == 0)

hatch_x[seq_num-1][0]= -111;

}

/* this function used only once for each island.
to find nearest
        hatch line and its seq_num wrt to the first
brdr line ii=0, ii=1*/
old_get_seq_num_and_hatch_y()
{
```

APPENDIX PAGE 146

```c
    int distance, mod;

/* distance is to be positive always */
        distance = brdr_y[isl_num][0] -
plny_min[curr_pln_num];

mod = distance % curr_hatch_spacing;

/* seq_num is the hatch line number. Its count
starts from 0 */
        seq_num = (distance - mod) /
curr_hatch_spacing -1;

/* finding the nearest hatch line to ii=0, ii=1
brdr line. Its
        seq_num is found above */
        hatch_y[seq_num] = plny_min[curr_pln_num]+
                (seq_num + 1) *
curr_hatch_spacing;
        curr_hatch_y = hatch_y[seq_num];

} get_upper_or_lower_or_parallel()
{
    /* line_type 1 upper bound, 2 lower bound, 3
parallel */
  prev_line_type = line_type;
    /* previous line for the first line is last line
of the contour.
        so when ii=0 prev_line_type should be obtained
from the
        last line */
  if(ii==0)
  {
    /* see difficulty in writing last point of
contour */ if(brdr_y[isl_num][brdrpts_per_pln_per_isl[curr_pln_nu
m][isl_num]] <
        brdr_y[isl_num][ii]) prev_line_type=1;
    else
if(brdr_y[isl_num][brdrpts_per_pln_per_isl[curr_pln_nu
m][isl_num]] >
        brdr_y[isl_num][ii]) prev_line_type=2;
    else prev_line_type=3;
  }

/* when the boarder line is upper bound this
```

APPENDIX PAGE 147

```
        condition is true */
    if( brdr_y[isl_num][ii] <  brdr_y[isl_num][ii+1])
 return(line_type = 1);

/* when the boarder line is lower bound this
condition is true */
    if( brdr_y[isl_num][ii] >  brdr_y[isl_num][ii+1])
 return(line_type = 2);

/* control comes here when brdr_y[][ii] =
brdr_y[][ii+1] which is
        the condition for a parallel line. but then if
x cords are also
        equal it is no line at all. then both the
points are identical
        and one point is redundant*/
    if( brdr_x[isl_num][ii] ==  brdr_x[isl_num][ii+1])
 return(-1);

/* control reaches here only when x coords are
not equal but y coords
        are equal */
    return(line_type = 3);
} chk_for_possible_intersection()
{

/* parallel lines are parallel to x axis.*/
    if(line_type ==1)all_upper_bound_lines();
     else if(line_type ==2)all_lower_bound_lines();
      else if(line_type ==3)all_parallel_lines();

else printf("ARE YOU CRAZY? CHK line_type. IT CAN
BE 1,2 OR 3 ONLY");

}

/* puts x points in ascending order for each
hatch line. this
        also gives max and min seq_num. note that
minimum seq_num need
        not be zero and seq_num need not be
continuous. ie it need not
        be 3,4,5,6 etc. it can be 3,4,8,9.
discontinuity can be there
```

APPENDIX PAGE 148

```
                when hatching multiple islands */
put_hatch_x_in_order(tem_x)
int tem_x;
{
int value=0, j, k1, k2;
static int first;

for(j=0; hatch_x[seq_num][j] != -111; j++)
    {
        if(hatch_x[seq_num][j] < tem_x)
        {
          value = 1;
           continue;
        } else
        {
          if(value !=2)
          {
          value = 2;
           k1 = hatch_x[seq_num][j];
            hatch_x[seq_num][j] = tem_x;
          } k2 = hatch_x[seq_num][j+1];
            hatch_x[seq_num][j+1] = k1;
           k1 = k2;
        }

}
    if(value !=2) hatch_x[seq_num][j] = tem_x;

/* to find max_seq_num and min_seq_num */
   if(first!=-1)
   {
     max_seq_num = seq_num;
      min_seq_num = seq_num;
       first = -1;
   } if(max_seq_num < seq_num) max_seq_num = seq_num;
     if(min_seq_num > seq_num) min_seq_num = seq_num;

/* to avoid initialization of hatch_x[][]
everytime following code
         is written. hatch_x[][j+1] is initialized as a
precaution.   ==0
           condition will work only when x min of
object is >0 */
```

APPENDIX PAGE                149

```
            if(hatch_x[max_seq_num+1]==0)
    hatch_x[max_seq_num+1][0] = -111;
            if(min_seq_num > 0 &&
    hatch_x[min_seq_num-1][0]==0)

hatch_x[min_seq_num-1][0] = -111;
            hatch_x[seq_num][j+1] = -111;
             hatch_x[seq_num][j+2] = -111;

/*
        for(j=0; hatch_x[seq_num][j]!=-111;j++)
            printf("seq=%d x=%d", seq_num,
    hatch_x[seq_num][j]);
            printf("max_seq=%d min_seq=%d", max_seq_num,
    min_seq_num);
    */

} all_upper_bound_lines()
    {
    int tem_x;

/* when hatch line passes through bottom point of
    upward bound line */
        if(curr_hatch_y == brdr_y[isl_num][ii])
        {
         if(upper_chk_validity_of_intersection()== 2)
         {
           tem_x = brdr_x[isl_num][ii];
           put_hatch_x_in_order(tem_x);

/*   printf("\n1isl_num=%d ii=%d ii+1=%d seq_num=%d
    curr_hatch_y=%d hatch_x=%d",isl_num, ii, ii+1,
    seq_num, curr_hatch_y, tem_x);
    */    }

/* whether the above condition is true or not
    while loop is executed.
            Note simple formula used to get x co-ord*/ while(upper_chk_for_another_intersection(1)==
      2)
```

APPENDIX PAGE 150

```
        {
                tem_x =
                (curr_hatch_y - brdr_y[isl_num][ii])*
                        (brdr_x[isl_num][ii+1] -
brdr_x[isl_num][ii])/
                        (brdr_y[isl_num][ii+1] -
brdr_y[isl_num][ii]) +
                        brdr_x[isl_num][ii];

put_hatch_x_in_order(tem_x);
/*    printf("\n22isl_num=%d ii=%d ii+1=%d seq_num=%d
curr_hatch_y=%d hatch_x=%d",isl_num, ii, ii+1,
seq_num, curr_hatch_y, tem_x);
*/      } return;
    }

/* when curr_hatch_y is below the current contour
line */
    if(curr_hatch_y < brdr_y[isl_num][ii])
    {

/* ASSUPTION IS ONE ADDITION IS ENOUGH TO REACH
ii ii+1 LINE. OK?? */
    /* add one hatch spacing to current position.
then it may 1. equal
        y[ii] or 2. be in the middle of y[ii and
y[ii+1] 3. equal y[ii+1]
           4. or go above the line. Cases 3 and 4 will
not result in an
        intersection */

/* case1: when hatch line equals y[ii] after
addition*/
        if(curr_hatch_y + curr_hatch_spacing ==
brdr_y[isl_num][ii])
        {
            if(upper_chk_validity_of_intersection() == 2)
            {
             seq_num = seq_num + 1;
              curr_hatch_y = curr_hatch_y +
curr_hatch_spacing;
             hatch_y[seq_num] = curr_hatch_y;
               tem_x = brdr_x[isl_num][ii];
        put_hatch_x_in_order(tem_x);

/*    printf("\n33isl_num=%d ii=%d ii+1=%d seq_num=%d
curr_hatch_y=%d hatch_x=%d",isl_num, ii, ii+1,
```

APPENDIX PAGE 151

```
                seq_num, curr_hatch_y, tem_x);
*/

}
        }
                /*while loop is to chk for other
intersections with same line*/ while(upper_chk_for_another_intersection(1)== 2)
                {
                        tem_x =
                          (curr_hatch_y - brdr_y[isl_num][ii])*
                                (brdr_x[isl_num][ii+1] -
brdr_x[isl_num][ii])/
                                (brdr_y[isl_num][ii+1] -
brdr_y[isl_num][ii]) +
                                        brdr_x[isl_num][ii];

put_hatch_x_in_order(tem_x);

/*        printf("\n44isl_num=%d ii=%d ii+1=%d
seq_num=%d curr_hatch_y=%d hatch_x=%d",isl_num, ii,
ii+1, seq_num, curr_hatch_y, tem_x);
*/
                } return;

}

/* when hatch line passes through top point of
upward bound line */
        if(curr_hatch_y == brdr_y[isl_num][ii+1])
        {
        /* no intersection is recorded when hatch line
equals top point.
                while loop checks for another intersection */ while(upper_chk_for_another_intersection(-1)==
2)
                {
                        tem_x =
                          (curr_hatch_y - brdr_y[isl_num][ii])*
                                (brdr_x[isl_num][ii+1] -
brdr_x[isl_num][ii])/
                                (brdr_y[isl_num][ii+1] -
brdr_y[isl_num][ii]) +
                                        brdr_x[isl_num][ii];
        put_hatch_x_in_order(tem_x);
```

APPENDIX PAGE 152

```
/*      printf("\n55isl_num=%d ii=%d ii+1=%d
seq_num=%d curr_hatch_y=%d hatch_x=%d",isl_num, ii,
ii+1, seq_num, curr_hatch_y, tem_x);
*/      } return;
   }

/* when curr_hatch_y is above the current contour
line */ if(curr_hatch_y > brdr_y[isl_num][ii+1])
    {
        /* ASSUPTION IS ONE SUBTRACTION IS ENOUGH TO
REACH ii, ii+1 LINE. OK??*/

/* subtract one hatch spacing from current
position. then it may 1.equal
        y[ii+1] or 2. be in the middle of y[ii and
y[ii+1] 3. equal y[ii]
        4. or go below the line. Cases 1 and 4 will
not result in an
        intersection */

/* case1: when hatch line equals y[ii+1] after
addition*/
        if(curr_hatch_y - curr_hatch_spacing ==
brdr_y[isl_num][ii+1])
        {
            /* no intersection is recorded. only seq_num
etc ate updated */ seq_num = seq_num - 1;
            curr_hatch_y = curr_hatch_y -
curr_hatch_spacing;
            hatch_y[seq_num] = curr_hatch_y;
        }
        /*while loop is to chk for other
intersections with same line*/ while(upper_chk_for_another_intersection(-1)== 2)
        {
            tem_x =
             (curr_hatch_y - brdr_y[isl_num][ii])*
                (brdr_x[isl_num][ii+1] -
brdr_x[isl_num][ii])/
                    (brdr_y[isl_num][ii+1] -
brdr_y[isl_num][ii]) +
```

APPENDIX PAGE 153

```
                                brdr_x[isl_num][ii];
        put_hatch_x_in_order(tem_x);

/*      printf("\n66isl_num=%d ii=%d ii+1=%d
seq_num=%d curr_hatch_y=%d hatch_x=%d",isl_num, ii,
ii+1, seq_num, curr_hatch_y, tem_x);
*/       } return;
    }

/* when current hatch line is in the middle of
current contour line */
    if(curr_hatch_y> brdr_y[isl_num][ii] && curr_hatch_y
< brdr_y[isl_num][ii+1])
    {

/* ASSUMPTION IS THERE ARE NO INTERSECTIONS
TOWARDS ii POINT */ tem_x =
                (curr_hatch_y - brdr_y[isl_num][ii])*
                    (brdr_x[isl_num][ii+1] -
brdr_x[isl_num][ii])/
                    (brdr_y[isl_num][ii+1] -
brdr_y[isl_num][ii]) +
                    brdr_x[isl_num][ii];
        put_hatch_x_in_order(tem_x);

/*      printf("\n77isl_num=%d ii=%d ii+1=%d seq_num=%d
curr_hatch_y=%d hatch_x=%d",isl_num, ii, ii+1,
seq_num, curr_hatch_y, tem_x);
*/

/*while loop is to chk for other intersections
with same line*/ while(upper_chk_for_another_intersection(1)== 2)
        {
            tem_x =
              (curr_hatch_y - brdr_y[isl_num][ii])*
                    (brdr_x[isl_num][ii+1] -
brdr_x[isl_num][ii])/
                    (brdr_y[isl_num][ii+1] -
brdr_y[isl_num][ii]) +
                    brdr_x[isl_num][ii];
```

APPENDIX PAGE 154

```
        put_hatch_x_in_order(tem_x);

/*    printf("\n88isl_num=%d ii=%d ii+1=%d seq_num=%d
curr_hatch_y=%d hatch_x=%d",isl_num, ii, ii+1,
seq_num, curr_hatch_y, tem_x);
*/        } return;
    } printf("IT APPEARS THAT SOMETHING WENT WRONG WITH
UPPER BOUND LINE i=%d i+1=%d", ii, ii+1);

}

/* control come to this function only when hatch
line passes through
        bottom point of an upward bound line */ upper_chk_validity_of_intersection()
{

/* when hatch line passes through bottom point of
ii, ii+1 line and
        the previous line is lower bound then that
intersection is invalid */
        if(prev_line_type==2) return(-1);

/* when hatch line passes through bottom point of
ii, ii+1 line and
        the previous line is upper bound then that
intersection is valid */
        if(prev_line_type == 1) return(2);

/* control comes here onlr if previous line is
parallel */
        if(ii !=0)
        {
        /* when hatch line passes through bottom point of
ii, ii+1 line and
        the previous line is parallel brdr_x[ii-1]
should be < brdr_x[isl_num][ii]*/
            if(brdr_x[isl_num][ii-1] < brdr_x[isl_num][ii])
return(2);
        }
        else if(ii == 0)
```

APPENDIX PAGE 155

```
    {
        /* see the difficulty in getting the last
point of island */
    if(brdr_x[isl_num][brdrpts_per_pln_per_isl[curr_pln_nu
m][isl_num]] <
                            brdr_x[isl_num][ii])
                                return(2);
    }

}

/* control comes here when hatch line is on the
current contour line */ upper_chk_for_another_intersection(j)
int j;
{
    /* when j=1 intersections are checked from top to
bottom of
        the current upper bound line */
    if(j==1)
    {

/* add one hatch spacing to current position.
then it may
        1. be in the middle of y[ii and y[ii+1] 2.
equal y[ii+1]
        3. or go above the line. Cases 2 and 3 will
not result in an
        intersection */

/* case 1 */
        if(curr_hatch_y + curr_hatch_spacing <
brdr_y[isl_num][ii+1])
        {
            seq_num = seq_num + 1;
            curr_hatch_y = curr_hatch_y +
curr_hatch_spacing;
            hatch_y[seq_num] = curr_hatch_y;
            return(2);
        }

}

/* when j=-1 intersections are checked from
bottom to top of
        the current upper bound line */
```

APPENDIX PAGE 156

```
     else if(j== -1)
     {

/* subtract one hatch spacing from current
position. then it may
          1. be in the middle of y[ii and y[ii+1] 2. or
equal y[ii]
          3. or go below the line. Case 3 will not
result in an
          intersection */

/* case 1 */
     if(curr_hatch_y - curr_hatch_spacing >
brdr_y[isl_num][ii])
     {
          seq_num = seq_num - 1;
          curr_hatch_y = curr_hatch_y -
curr_hatch_spacing;
          hatch_y[seq_num] = curr_hatch_y;
           return(2);
     }

/* case 2 */
     if(curr_hatch_y - curr_hatch_spacing ==
brdr_y[isl_num][ii])
     {
        if(upper_chk_validity_of_intersection()==2)
        { seq_num = seq_num - 1;
         curr_hatch_y = curr_hatch_y -
curr_hatch_spacing;
          hatch_y[seq_num] = curr_hatch_y;
           return(2);
        }
     }

}

}
```

APPENDIX PAGE 157

```
all_lower_bound_lines()
{ int tem_x;
    /* when hatch line passes through top point
(ii)of lower bound line */
    if(curr_hatch_y == brdr_y[isl_num][ii])
    {
      if(lower_chk_validity_of_intersection()== 2)
      {
                  tem_x = brdr_x[isl_num][ii];
                  put_hatch_x_in_order(tem_x);

/*   printf("\n99isl_num=%d ii=%d ii+1=%d seq_num=%d
curr_hatch_y=%d hatch_x=%d",isl_num, ii, ii+1,
seq_num, curr_hatch_y, tem_x);
*/
      }

/* whether the above condition is true or not
while loop is executed.
       Note simple formula used to get x co-ord*/ while(lower_chk_for_another_intersection(-1)==
2)
      {
         tem_x =
             (curr_hatch_y - brdr_y[isl_num][ii])*
                 (brdr_x[isl_num][ii+1] -
brdr_x[isl_num][ii])/
                 (brdr_y[isl_num][ii+1] -
brdr_y[isl_num][ii]) +
                 brdr_x[isl_num][ii];
          put_hatch_x_in_order(tem_x);

/*   printf("\n1010isl_num=%d ii=%d ii+1=%d seq_num=%d
curr_hatch_y=%d hatch_x=%d",isl_num, ii, ii+1,
seq_num, curr_hatch_y, tem_x);
*/     } return;
    }

/* when curr_hatch_y is above the current lower
bound line */
    if(curr_hatch_y > brdr_y[isl_num][ii])
```

APPENDIX PAGE 158

```
        {
        /* ASSUPTION IS ONE SUBTRACTION IS ENOUGH TO
REACH ii ii+1 LINE. OK?? */
        /* subtract one hatch spacing to current
position. then it may 1. equal
            y[ii] or 2. be in the middle of y[ii and
y[ii+1] 3. equal y[ii+1]
            4. or go above the line. Cases 3 and 4 will
not result in an
            intersection */

/* case1: when hatch line equals y[ii] after
subtraction*/
        if(curr_hatch_y - curr_hatch_spacing ==
brdr_y[isl_num][ii])
            {
            if(lower_chk_validity_of_intersection(1) ==
2)
            {
              seq_num = seq_num - 1;
              curr_hatch_y = curr_hatch_y -
curr_hatch_spacing;
              hatch_y[seq_num] = curr_hatch_y;
                tem_x = brdr_x[isl_num][ii];

put_hatch_x_in_order(tem_x);

/*   printf("\n1111isl_num=%d ii=%d ii+1=%d seq_num=%d
curr_hatch_y=%d hatch_x=%d",isl_num, ii, ii+1,
seq_num, curr_hatch_y, tem_x);
*/

}
        }
        /*while loop is to chk for other
intersections with same line*/ while(lower_chk_for_another_intersection(-1)== 2)
            {
                tem_x =
                (curr_hatch_y - brdr_y[isl_num][ii])*
                    (brdr_x[isl_num][ii+1] -
brdr_x[isl_num][ii])/
                        (brdr_y[isl_num][ii+1] -
brdr_y[isl_num][ii]) +
                        brdr_x[isl_num][ii];
        put_hatch_x_in_order(tem_x);

/*   printf("\n1212isl_num=%d ii=%d ii+1=%d seq_num=%d
curr_hatch_y=%d hatch_x=%d",isl_num, ii, ii+1,
```

APPENDIX PAGE 159

```
            seq_num, curr_hatch_y, tem_x);
*/
                }
                return;

}

/* when hatch line passes through bottom point
(ie. ii+1) of lower
                bound line */
        if(curr_hatch_y == brdr_y[isl_num][ii+1])
        {
            /* no intersection is recorded when hatch line
equals bottom point.
                while loop checks for another intersection */ while(lower_chk_for_another_intersection(1)==
2)
                {
                    tem_x =
                        (curr_hatch_y - brdr_y[isl_num][ii])*
                            (brdr_x[isl_num][ii+1] -
brdr_x[isl_num][ii])/
                            (brdr_y[isl_num][ii+1] -
brdr_y[isl_num][ii]) +
                                brdr_x[isl_num][ii];
                    put_hatch_x_in_order(tem_x);

/*      printf("\n1313isl_num=%d ii=%d ii+1=%d seq_num=%d
curr_hatch_y=%d hatch_x=%d",isl_num, ii, ii+1,
seq_num, curr_hatch_y, tem_x);
*/          } return;
        }

/* when curr_hatch_y is below the current lower
bound line */ if(curr_hatch_y < brdr_y[isl_num][ii+1])
        {
            /* ASSUPTION IS ONE ADDITION IS ENOUGH TO REACH
ii, ii+1 LINE. OK??*/

/* add one hatch spacing to current position.
then it may 1.equal
                y[ii+1] or 2. be in the middle of y[ii and
y[ii+1] 3. equal y[ii]
```

APPENDIX PAGE 160

```
        4. or go above the line. Cases 1 and 4 will
not result in an
        intersection */

/* case1: when hatch line equals y[ii+1] after
addition*/
    if(curr_hatch_y + curr_hatch_spacing ==
brdr_y[isl_num][ii+1])
      {
            /* no intersection is recorded. only seq_num
etc ate updated */ seq_num = seq_num + 1;
            curr_hatch_y = curr_hatch_y +
curr_hatch_spacing;
            hatch_y[seq_num] = curr_hatch_y;
      }
            /*while loop is to chk for other
intersections with same line*/ while(lower_chk_for_another_intersection(1)== 2)
            {
                tem_x =
                  (curr_hatch_y - brdr_y[isl_num][ii])*
                    (brdr_x[isl_num][ii+1] -
brdr_x[isl_num][ii])/
                    (brdr_y[isl_num][ii+1] -
brdr_y[isl_num][ii]) +
                    brdr_x[isl_num][ii];
            put_hatch_x_in_order(tem_x);

/*   printf("\n1414isl_num=%d ii=%d ii+1=%d seq_num=%d
curr_hatch_y=%d hatch_x=%d",isl_num, ii, ii+1,
seq_num, curr_hatch_y, tem_x);
*/          } return;
    }

/* when current hatch line is in the middle of
current contour line */
    if(curr_hatch_y< brdr_y[isl_num][ii] && curr_hatch_y
> brdr_y[isl_num][ii+1])
    {

/* ASSUMPTION IS THERE ARE NO INTERSECTIONS
TOWARDS ii POINT */
```

APPENDIX PAGE 161

```
            tem_x =
              (curr_hatch_y - brdr_y[isl_num][ii])*
                  (brdr_x[isl_num][ii+1] -
brdr_x[isl_num][ii])/
                  (brdr_y[isl_num][ii+1] -
brdr_y[isl_num][ii]) +
                  brdr_x[isl_num][ii];
          put_hatch_x_in_order(tem_x);

/*   printf("\n1515isl_num=%d ii=%d ii+1=%d seq_num=%d
curr_hatch_y=%d hatch_x=%d",isl_num, ii, ii+1,
seq_num, curr_hatch_y, tem_x);
*/

/*while loop is to chk for other intersections
with same line*/ while(lower_chk_for_another_intersection(-1)== 2)
          {
            tem_x =
              (curr_hatch_y - brdr_y[isl_num][ii])*
                  (brdr_x[isl_num][ii+1] -
brdr_x[isl_num][ii])/
                  (brdr_y[isl_num][ii+1] -
brdr_y[isl_num][ii]) +
                  brdr_x[isl_num][ii];
          put_hatch_x_in_order(tem_x);

/*   printf("\n1616isl_num=%d ii=%d ii+1=%d seq_num=%d
curr_hatch_y=%d hatch_x=%d",isl_num, ii, ii+1,
seq_num, curr_hatch_y, tem_x);
*/         } return;
     } printf("IT APPEARS THAT SOMETHING WENT WRONG WITH
LOWER BOUND LINE i=%d i+1=%d", ii, ii+1);

}

/* control come to this function only when hatch
line passes through
         top point of lower bound line ii */ lower_chk_validity_of_intersection()
```

APPENDIX PAGE 162

```c
{
    /* when hatch line passes through top point (ii)
oflower bound line and
    the previous line is upper bound then that
intersection is invalid */
    if(prev_line_type==1) return(-1);

/* when hatch line passes through top point (ii)
of lower boundline and
    the previous line is lower bound then that
intersection is valid */
    if(prev_line_type == 2) return(2);

/* control comes here only if previous line is
parallel */
    if(ii !=0)
    {
    /* when hatch line passes through top point (ii)
of lowerbound line and
    the previous line is parallel brdr_x[ii-1]
should be > brdr_x[isl_num][ii]*/
        if(brdr_x[isl_num][ii-1] > brdr_x[isl_num][ii])
return(2);
    }
    else if(ii == 0)
    {
        /* see the difficulty in getting the last
point of island */ if(brdr_x[isl_num][brdrpts_per_pln_per_isl[curr_pln_nu
m][isl_num]] >
                    brdr_x[isl_num][ii])
                        return(2);
    }

}

/* control comes here when hatch line is on the
current contour line */ lower_chk_for_another_intersection(j)
int j;
{
```

APPENDIX PAGE 163

```
        /* when j=1 intersections are checked from bottom
to top of
           the current lower bound line ie. from ii+1
to ii*/
      if(j==1)
      {

/* add one hatch spacing to current position.
then it may
           1. be in the middle of y[ii and y[ii+1] 2.
equal y[ii]
           3. or go above the line. Case 3 will not
result in an
           intersection */

/* case 1 */
        if(curr_hatch_y + curr_hatch_spacing <
brdr_y[isl_num][ii])
        {
              seq_num = seq_num + 1;
              curr_hatch_y = curr_hatch_y +
curr_hatch_spacing;
              hatch_y[seq_num] = curr_hatch_y;
              return(1);
        }

/* case 2 */
        if(curr_hatch_y + curr_hatch_spacing ==
brdr_y[isl_num][ii])
        {
            if(lower_chk_validity_of_intersection()== 2)
            { seq_num = seq_num + 1;
              curr_hatch_y = curr_hatch_y +
curr_hatch_spacing;
              hatch_y[seq_num] = curr_hatch_y;
              return(2);
            }
        }

}

/* when j=-1 intersections are checked from top
to bottom of
           the current lower bound line (ie. ii to
ii+1) */
      else if(j== -1)
      {

/* subtract one hatch spacing from current
```

APPENDIX PAGE 164

```
        position. then it may
                1. be in the middle of y[ii and y[ii+1] 2. or
        equal y[ii+1]
                3. or go below the line. Case 2 and 3 will not
        result in an
                intersection */

/* case 1 */
            if(curr_hatch_y - curr_hatch_spacing >
        brdr_y[isl_num][ii+1])
                {
                    seq_num = seq_num - 1;
                    curr_hatch_y = curr_hatch_y -
        curr_hatch_spacing;
                    hatch_y[seq_num] = curr_hatch_y;
                      return(2);
                }

}

} all_parallel_lines()
    { int tem_x;
        /* when hatch line passes through the parallel
    line */
        if(curr_hatch_y == brdr_y[isl_num][ii])
           {
            if(parallel_chk_validitity_of_intersection()== 2)
             {
               tem_x = brdr_x[isl_num][ii];
                   put_hatch_x_in_order(tem_x);

/*   printf("\n1717isl_num=%d ii=%d ii+1=%d seq_num=%d
    curr_hatch_y=%d hatch_x=%d",isl_num, ii, ii+1,
    seq_num, curr_hatch_y, tem_x);
    */    } return;
         }

/* when curr_hatch_y is below the current
    parallel line */
        if(curr_hatch_y < brdr_y[isl_num][ii])
            {

/*ASSUPTION IS ONE ADDITION IS ENOUGH TO REACH
```

APPENDIX PAGE 165

```
    OR OVERSHOOT LINE. OK?*/

/* add one hatch spacing to current position.
then it may 1. equal
        y[ii] or 2. go above the line. case 2 is not
required*/

/* case1: when hatch line equals y[ii] after
addition*/
      if(curr_hatch_y + curr_hatch_spacing ==
brdr_y[isl_num][ii])
      {
        if(parallel_chk_validitity_of_intersection()
== 2)
        {
         seq_num = seq_num + 1;
          curr_hatch_y = curr_hatch_y +
curr_hatch_spacing;
           hatch_y[seq_num] = curr_hatch_y;
            tem_x = brdr_x[isl_num][ii];
           put_hatch_x_in_order(tem_x);

/*    printf("\n1818isl_num=%d ii=%d ii+1=%d seq_num=%d
curr_hatch_y=%d hatch_x=%d",isl_num, ii, ii+1,
seq_num, curr_hatch_y, tem_x);
*/
           return;
         }
      }

}

/* when curr_hatch_y is above the current
parallel line */
      if(curr_hatch_y > brdr_y[isl_num][ii])
      {

/*ASSUPTION IS ONE SUBTRACTION IS ENOUGH TO
REACH OR OVERSHOOT LINE.OK?*/

/*subtract one hatch spacing from current
position. then it may 1.equal
        y[ii] or 2. go below the line. case 2 is not
required*/

/* case1: when hatch line equals y[ii] after
subtraction*/
      if(curr_hatch_y - curr_hatch_spacing ==
brdr_y[isl_num][ii])
      {
```

APPENDIX PAGE 166

```c
            if(parallel_chk_validitity_of_intersection()
== 2)
            {
              seq_num = seq_num - 1;
              curr_hatch_y = curr_hatch_y -
curr_hatch_spacing;
                hatch_y[seq_num] = curr_hatch_y;
                 tem_x = brdr_x[isl_num][ii];
              put_hatch_x_in_order(tem_x);

/*   printf("\n1919isl_num=%d ii=%d ii+1=%d seq_num=%d
curr_hatch_y=%d hatch_x=%d",isl_num, ii, ii+1,
seq_num, curr_hatch_y, tem_x);
*/
                return;
              }
         }

}
} parallel_chk_validitity_of_intersection()
{

/* if previous line is also parallel which means
line is colinear
         with current parallel line intersection is
invalid */
    if(prev_line_type==3) return(-1);

if(prev_line_type == 2)
    {
        if(brdr_x[isl_num][ii] < brdr_x[isl_num][ii+1])
return(2);
         else return(-1);
    }

/* control comes here only if prev_line_type is 1
*/
       if(brdr_x[isl_num][ii] > brdr_x[isl_num][ii+1])
return(2);

}

/* this is to rotate newly calculated points to
get hatch points. this
         is not requied when angle of rotation is zero.
```

APPENDIX PAGE 167

```
        also note that
                this rotation is done only after all the
        points are caculated for
                all the islands of current plane this
        function is invoked every
                time the plane is rotated by an angle*/
        rotate_again_to_get_hatch_pts()
        {
        short i, j, tem_x, tem_y;
        double sine_theta, cos_theta;

sine_theta = sin(curr_hatch_angle*22.0/7.0/180.0);
          cos_theta = cos(curr_hatch_angle*22.0/7.0/180.0);

for(i=min_seq_num;i<=max_seq_num ; i++)
        {
          if(hatch_x[i][0]==-111) continue;

for(j=0; hatch_x[i][j]!=-111; j++)
         {

/* this is necessary bec. earlier in the prog
        hatch_y is one dim array */
           if(curr_hatch_angle == 0)
             new_hatch_y[i][j] = hatch_y[i];

/* when angle is 90  newx becomes -old y and
                newy is oldx . Now you are rotating back by
        +90 */
            else if(curr_hatch_angle==90)
            {
        /*
        printf("\nBFi=%d j=%d hatch_x=%d hatch_y=%d", i, j,
        hatch_x[i][j], hatch_y[i]);
        */ tem_x = hatch_x[i][j];
              hatch_x[i][j] = -hatch_y[i];
               new_hatch_y[i][j] = tem_x;

/*   printf("\nAFi=%d j=%d hatch_x=%d hatch_y=%d", i,
        j, hatch_x[i][j], tem_x); */

}

/*   when angle is not zero nor 90    */
           else
           {
```

APPENDIX PAGE 168

```
        /* applying rotation formula   newx =
oldx*cos_theta - oldy*sine_theta */
        tem_x = cos_theta * hatch_x[i][j] - sine_theta
*hatch_y[i];

/* applying rotation formula newy =
oldx*sine_theta + oldy*cos_theta */
        tem_y = sine_theta * hatch_x[i][j] + cos_theta
*hatch_y[i];

hatch_x[i][j] = tem_x;
         new_hatch_y[i][j] = tem_y;

}
   }
vec_num_per_hatch_y[i] = j-1;
}

}
```

APPENDIX PAGE 169

```
/* This program is called "new_sli.c". */ get_slifile_ptr_details()
{
    mysli = (SLIFILE *) malloc(sizeof(SLIFILE));
    if(mysli == NULL)
    {
printf("could not allocate memory for mysli in
function get_myslifile_ptr_details");
        exit(-1);
    } mysli->next_file = NULL;
    strcpy(mysli->filename, sli_filename);

mysli->header = (unsigned char*)strdup("!3DSYS SLA-1
SLICE FILE\n!SLICE=-VER 3.64 -RES 5000.000000 HX 0 -HY
0 -HFX 0 -HFY 0 -HA 0 -MSA 0 -MIA 0 -SCL 1.0000 -ZS 8
-B -DELTA 0.05\n\032");

mysli->max_layer = z_max;
    mysli->min_layer = z_min;
    mysli->total_layers = total_num_layers;

} get_slilayers_ptr_details()
{ static short first_time=0;

curr_layer = (SLILAYER *)
malloc(sizeof(SLILAYER));
    if(curr_layer == NULL)
    {
printf("could not allocate memory for curr_layer in
get_myslilayers_ptr_details function");
        exit(-1);
    } curr_layer->layer_num =
pln[curr_pln_num].isl[0].boarder_pts[0].axis[2];

if(first_time==0)
        {
```

APPENDIX PAGE 170

```
                curr_layer->prev_layer = NULL;
                curr_layer->vect_list = NULL;
                  mysli->layers = curr_layer;
                    bottom_layer_ptr = mysli->layers;
                  curr_layer->next_layer = NULL;
                    first_time = 1;
        } else
        {
                bottom_layer_ptr->next_layer =
curr_layer;
                curr_layer->next_layer = NULL;
                curr_layer->prev_layer =
bottom_layer_ptr;
                    bottom_layer_ptr = curr_layer;
                curr_layer->vect_list = NULL;
        } curr_vect_list = NULL;
         curr_layer->vect_list = NULL;
} get_slivectors_ptr_details()
{
  SLIVECTORS *new_vect_list;

new_vect_list = (SLIVECTORS *)
malloc(sizeof(SLIVECTORS));
        if(new_vect_list == NULL)
        {
printf("could not allocate memory for curr_vect_list
in function get_myslivectors_ptr_details");
            exit(-1);
        } if(curr_vect_list != NULL)
     {
            curr_vect_list->next_vectors =
new_vect_list;
     } curr_vect_list = new_vect_list;

}
```

APPENDIX PAGE 171

```
put_brdrpts_in_sliformat()
{ short brdrpt_num, isl_num, first_time = 1;

for(isl_num=0;
isl_num<=isls_per_pln[curr_pln_num]; isl_num++)
     {
          get_slivectors_ptr_details();
          curr_vect_list->vector_count =
brdrpts_per_pln_per_isl[curr_pln_num][isl_num]+1;
          curr_vect_list->vector_type = 1b;

curr_vect_ptr =(struct bin_sli_vector *)
calloc(curr_vect_list->vector_count, sizeof(struct
bin_sli_vector));

if( curr_vect_ptr== NULL)
        {
            printf("could not allocate memory for
curr_vect_ptr");
            exit(-1);
        } for(brdrpt_num=0; brdrpt_num <=
brdrpts_per_pln_per_isl[curr_pln_num][isl_num];
brdrpt_num++)
     {
        curr_vect_ptr[brdrpt_num].p[0].x = pln[curr_pln_num].isl[isl_num].boarder_pts[brdrpt_num]
.axis[0];

curr_vect_ptr[brdrpt_num].p[0].y = pln[curr_pln_num].isl[isl_num].boarder_pts[brdrpt_num]
.axis[1];

/* to ensure last point is joined with the first
point */
   if(brdrpt_num<
brdrpts_per_pln_per_isl[curr_pln_num][isl_num])
   {
       curr_vect_ptr[brdrpt_num].p[1].x = pln[curr_pln_num].isl[isl_num].boarder_pts[brdrpt_num+
```

APPENDIX PAGE                172

```
1].axis[0];

curr_vect_ptr[brdrpt_num].p[1].y =
pln[curr_pln_num].isl[isl_num].boarder_pts[brdrpt_num+
1].axis[1];
    }

/* control reaches here when brdrpt_num is the
last point. then
    as there is no brdrpt_num+1 next point is again
0 point */
    else
    { curr_vect_ptr[brdrpt_num].p[1].x =
pln[curr_pln_num].isl[isl_num].boarder_pts[0].axis[0];

curr_vect_ptr[brdrpt_num].p[1].y =
pln[curr_pln_num].isl[isl_num].boarder_pts[0].axis[1];
    }

}  /* End for each border pt */ curr_vect_list->vectors = curr_vect_ptr;

/*    if(first_time==1) */
        if(curr_layer->vect_list == NULL)
    {
        curr_vect_list->next_vectors = NULL;
          curr_layer->vect_list = curr_vect_list;
        bottom_vect_list_ptr = curr_vect_list;
        first_time =0;
    } else
    {
        bottom_vect_list_ptr->next_vectors =
curr_vect_list;
        curr_vect_list->next_vectors = NULL;
        bottom_vect_list_ptr = curr_vect_list;

}

}  /* End for each Island */

}
```

APPENDIX PAGE 173

```c
    /* this function is invoked for each hatch angle
for each plane */
put_hatchpts_in_sliformat()
{
short count=0, i, j;
short first_time=1;

for(i=min_seq_num, count=0;i<=max_seq_num;i++)
 {
    count += vec_num_per_hatch_y[i]+1;
 }
            get_slivectors_ptr_details();
              curr_vect_list->vector_count = count;
              curr_vect_list->vector_type = lh;

curr_vect_ptr =(struct bin_sli_vector *)
calloc(curr_vect_list->vector_count,sizeof(struct
bin_sli_vector));

if( curr_vect_ptr== NULL)
            {
printf("could not allocate memory for curr_vect_ptr in
function put_hatchpts_in_sliformat");
            exit(-1);
            } for(i=min_seq_num, count=0;i+1<=max_seq_num;i=i+2)
 {
       if(hatch_x[i][0] == -111) continue;

for(j=0; hatch_x[i][j+1]!=-111; j=j+2)
       { curr_vect_ptr[count].p[0].x = hatch_x[i][j];
    curr_vect_ptr[count].p[0].y = new_hatch_y[i][j];

curr_vect_ptr[count].p[1].x = hatch_x[i][j+1];
    curr_vect_ptr[count].p[1].y =
new_hatch_y[i][j+1];

count++;

} /* End of for loop for vectors for each y */
```

APPENDIX PAGE 174

```
      /* this for loop is to have the laser move
backward */
        if(hatch_x[i+1][0] == -111) continue;

for(j=vec_num_per_hatch_y[i+1];j-1>=0;j=j-2)
        { curr_vect_ptr[count].p[0].x = hatch_x[i+1][j];
      curr_vect_ptr[count].p[0].y =
new_hatch_y[i+1][j];

curr_vect_ptr[count].p[1].x = hatch_x[i+1][j-1];
      curr_vect_ptr[count].p[1].y =
new_hatch_y[i+1][j-1];

count++;

} /* End of for loop for vectors for each y */

} /* End of for loop for current hatch angle for
current plane*/ curr_vect_list->vectors = curr_vect_ptr;
      curr_vect_list->vector_count = count; /* This is
_wrong_ */

/*    if(first_time==1) */
        if(curr_layer->vect_list == NULL)
    {
         curr_vect_list->next_vectors = NULL;
          curr_layer->vect_list = curr_vect_list;
         bottom_vect_list_ptr = curr_vect_list;
          first_time = 0;
    } else
      {
         bottom_vect_list_ptr->next_vectors =
curr_vect_list;
          curr_vect_list->next_vectors = NULL;
          bottom_vect_list_ptr = curr_vect_list;

}

}
```

APPENDIX PAGE 175

```
/* This program is called "header". */ sli->header =  sprintf(sli->header,"!3DSYS SLA-1 SLICE
FILE\n!SLICE= -VER 3.64 -RES %.6f -HX %.0f -HY %.0f
-HFX %.0f -HFY %.0f -HA %.0f -MSA %.0f -MIA %i -SCL
%.4f -ZS 50 -B -DELTA 0.05\n\032", RESOLUTION,
HATCH1*RESOLUTION, HATCH2*RESOLUTION,
 FILL1*RESOLUTION,FILL2*RESOLUTION, HATCH3*RESOLUTION,

MSA, 0, SCALE);
```

APPENDIX PAGE 176

```c
/* This program is called "tata_to_vouze.c". */ include <stdio.h>
include <math.h> double x[1500], y[500], z[500],earlier_z;

int count=0;
char filename[80];

typedef struct
{
    int type;
    double z;
    double x1, y1;
    short ref1, flag1;
    double x2, y2;
    short ref2, flag2;
    double cx, cy;
    double r;
    int d;
    double offset;
} entity;
entity list[50000];

FILE *fp1, *fp2, *file, *fopen();

main()
{ read_int_pts_file();

} read_int_pts_file()
{ int i, earlier_isl_num, curr_isl_num;
    fp1 = fopen("int_pts", "r");
    fscanf(fp1, "%*f %*f");
    fscanf(fp1, "%*d %*d %lf %lf %lf", &x[0], &y[0],
&z[0]);

earlier_z = z[0];
             earlier_isl_num =0;
q1: i=0;
    do
```

APPENDIX PAGE 177

```
        {
                i++;
                 fscanf(fp1, "%*d %d  %lf %lf %lf",
                            &curr_isl_num, &x[i],&y[i],&z[i]);

}while(earlier_z == z[i] &&
                    earlier_isl_num == curr_isl_num &&
feof(fp1)==0);

if(earlier_z != z[i] || earlier_isl_num!=
curr_isl_num || feof(fp1)==1)
           { if(i>=3)
            {
                write_into_file(i-1);
            } x[0] = x[i];
            y[0] = y[i];
              z[0] = z[i];
                if(earlier_z!=z[i])
                {
                        earlier_z = z[i];
                         earlier_isl_num=curr_isl_num=0;
                } if(earlier_isl_num!=curr_isl_num)
earlier_isl_num=curr_isl_num;
                if(feof(fp1)==0) goto q1;

} write_file();

} write_into_file(j)
int j;
{
int temp_count=0;

list[count].type = 0;
        list[count].z = j+1;
        list[count].d = j;
        list[count].flag1 = 1;
```

APPENDIX PAGE 178

```
        list[count].ref1 = 0;

do
   { temp_count++;
    count++;

list[count].type = 1;
    list[count].offset = 1.;
    list[count].ref1 = 0;
    list[count].flag1 = 0;
    list[count].ref2 = 0;
    list[count].flag2 = 0;
    list[count].d = 1;
    list[count].z = z[0];

list[count].x1 = x[temp_count-1];
    list[count].y1 = y[temp_count-1];

if(temp_count == j+1)
    {
            list[count].x2 = x[0];
            list[count].y2 = y[0];
    } else
    { list[count].x2 = x[temp_count];
    list[count].y2 = y[temp_count];
    }

}while(temp_count<j+1);

count++;

/*
        i = 0;
   while (i < (int) list[0].z)
   {
        fwrite(&list[i],sizeof(entity),1,file);
        i++;
   }

*/
```

APPENDIX PAGE 179

```
    } write_file()
    {
    int i;
        strcpy(filename, "vouze");
        file = fopen(filename, "w");

i = 0;
        while (i < count)
        {
            fwrite(&list[i],sizeof(entity),1,file);
            i++;

}

}
```

What is claimed is:

1. A device for effecting automatic operation of a stereolithography apparatus (SLA) with respect to a part to be built by the SLA, the part having a desired profile characterized by at least one key characteristic and at least two local complexity levels, wherein the operation of the SLA is controlled based on a two-dimensional sliced model of the local profile of the cross-section of the part to be built with each slice plane disposed transversely with respect to and along a slice axis of the part, which is represented by a tesselated model of the part and provided as an input to the device in the form of an STL file specifying triangular facets obeying the vertex-to-vertex rule, the device comprising:

a programmable computer;

a facet processor means for operating on the STL file input to produce a processed facet file, said facet processor means being programmed on said computer, said facet processor means including a facet sorting means, said facet sorting means being configured to sort the facets of the STL file according to the slice axis to produce a sorted facet file;

said facet processor means including a facet grouping means for operating on said sorted facet file to produce a grouped facet file, said facet grouping means being configured to group the facets of said sorted facet file according to facets having common minimum vertex values with respect to the slice axis and to produce a grouped facet file;

said facet processor means including a facet subgrouping means for operating on said grouped facet file to produce a subgrouped facet file, said facet subgrouping means being configured to subgroup the facets of said grouped facet file according to facets having common maximum vertex values with respect to the slice axis and to produce a subgrouped facet file;

a key characteristic identifier means for operating on said sorted facet file, said grouped facet file and said subgrouped facet file, said key characteristic identifier means being programmed on said computer, said key characteristic identifier means being configured to identify key characteristics of the profile represented by the STL file and to produce a key characteristic data file from said key characteristics of the profile represented by the STL file;

a thickness calculator means for operating on said sorted facet file, said grouped facet file, said subgrouped facet file and said key characteristic data file, said thickness calculator means being programmed on said computer, said thickness calculator means being configured to calculate a thickness for each layer of the model of the desired profile represented by the STL file of the part such that the geometrical error between the desired profile of the part and said model profile of each said layer having said layer thickness, remains no greater than a preselected geometrical error and to produce a layer thickness data file containing the results of such calculations;

a slicer means for operating on said sorted facet file, said grouped facet file, said subgrouped facet file and said layer thickness data file, said slicer means being programmed on said computer, said slicer means being configured to calculate the intersection of each slice plane disposed at a height above the previous slice plane by said thickness calculated by said thickness calculator means for each layer of the model of the intended profile represented by the STL file and to produce a slice plane intersection data file;

a directional ordering means for finding the direction of each contour defining each intersection of each slice plane and ensuring uniformity of such direction with the direction of each other contour defining each other intersection of each other slice plane;

a model generating means for using said layer thickness data file and said slice plane intersection data file to generate at least a portion of a model of the part wherein said portion of said model of the part includes a plurality of successive layers wherein the cross-section of each layer in a plane of view is defined by the intersection with said plane of view, of a pair of parallel planes and a model profile connecting said parallel planes, and wherein for each layer the minimum distance separating its pair of parallel planes defines the thickness of said layer; and an interface means for controlling the operation of the machine based on said portion of a model of the part.

2. An apparatus for effecting automatic operation of a machine with respect to an intended object having a desired profile characterized by at least one key characteristic and at least two local complexity levels, wherein the intended object is represented by a tesselated model of the intended object oriented with respect to a slice axis and provided as an input to the apparatus in the form of an STL file specifying triangular facets obeying the vertex-to-vertex rule, the apparatus comprising:

a programmable computer;

a facet processor means for operating on the STL file input to produce a processed facet file, said facet processor means being programmed on said computer, said facet processor means including a facet sorting means, said facet sorting means being configured to produce said sorted facet file by sorting the facets of the STL file according to the slice axis; and said facet processor means including a facet grouping means for operating on said sorted facet file to produce a grouped facet file, said facet grouping means being configured to produce said grouped facet file by grouping the facets of said sorted facet file according to facets having one of the following characteristics: common minimum vertex values with respect to the slice axis and common maximum vertex values with respect to the slice axis.

3. An apparatus as in claim 2, further comprising:

a facet subgrouping means for operating on said grouped facet file to produce a subgrouped facet file, said facet subgrouping means being programmed on said computer and configured to subgroup the facets of said grouped facet file according to facets having the other of: common minimum vertex values with respect to the slice axis and common maximum vertex values with respect to the slice axis.

4. An apparatus as in claim 2, further comprising:

a thickness calculator means for operating on at least said sorted facet file and said grouped facet file to produce a layer thickness data file defining the profile of the tesselated model in terms of at least two stacked layers, said thickness calculator means being programmed on said computer.

5. An apparatus as in claim 4, wherein:

said thickness calculator means being configured to produce said layer thickness data file by calculating a thickness for each layer defining the tesselated model of the desired profile represented by the STL file of the intended object such that the geometrical error between the desired profile of the intended object and said model profile of each said layer having said layer thickness, remains no greater than a preselected geometrical error.

6. An apparatus as in claim 4, further comprising:

a slicer means for operating on at least said sorted facet file, said grouped facet file, and said layer thickness data file to produce a slice plane intersection data file, said slicer means being programmed on said computer, said slicer means being configured to produce a slice plane intersection data file by calculating the intersection of each slice plane disposed at a height above the previous slice plane by said thickness calculated for each layer defining the tesselated model of the intended profile represented by the STL file.

7. An apparatus as in claim 6, further comprising:

an interface means for controlling the operation of the machine based on a two-dimensional sliced model of the local profile of the cross-section of the intended object with each slice plane disposed transversely with respect to and along the slice axis.

8. An apparatus as in claim 5, wherein said thickness calculator means includes a simple back tracking means for determining the thickness of the next layer while retaining a single change in complexity level in the local profile.

9. An apparatus as in claim 5, wherein said thickness calculator means includes a repeated back tracking means for determining the thickness of the next layer while retaining more than a single change in complexity level in the local profile.

10. An apparatus as in claim 4, wherein said thickness calculator means includes a means for selecting the thickness of the next layer based on a predetermined geometrical parameter relating the selected thickness of the next layer to the profile of the intended object in the vicinity of the next layer, said predetermined geometrical parameter being the volumetric error per unit of perimeter.

11. An apparatus as in claim 6, further comprising:

a marching means for ordering at least said grouped facet file to produce a geometrically ordered facet file, said marching means being programmed on said computer and configured to geometrically order the facets of at least said group           file to produce a continuous chain of facet           each facet in said continuous chain intersec           slice planes.

12. An apparatus            11, wherein said marching means is configured            an adjacency list for each facet that is intersected           one slice plane.

13. An apparatus as in            2, further comprising:

a key characteristic identifier means for operating on at least said sorted facet file and said grouped facet file, said key characteristic identifier means being programmed on said computer, said key characteristic identifier means being configured to identify key characteristics of the profile represented by the STL file and to produce a key characteristic data file from said key characteristics of the profile represented by the STL file.

14. An apparatus as in claim 4, wherein said thickness calculator means includes a back tracking means for determining the thickness of the next layer while retaining at least one key characteristic in the local profile.

15. An apparatus as in claim 6, further comprising:

a model generating means for using said layer thickness data file and said slice plane intersection data file to generate at least a portion of a model of the intended object wherein said portion of said model of the intended object includes a plurality of successive layers wherein the cross-section of each layer in a plane of view is defined by the intersection with said plane of view, of a pair of parallel planes and a model profile connecting said parallel planes, and wherein for each layer the minimum distance separating its pair of parallel planes defines the thickness of said layer.

16. An apparatus as in claim 18, further comprising:

an interface means for converting said generated portion of said model of the intended object in a format for operating the machine with respect to at least a corresponding portion of the intended object in successive steps with each said step based on a separate one of said layers of said generated portion of said model of the intended object.

17. A method involving automatic operation of a machine with respect to an intended three-dimensional object having a desired profile characterized by at least two local complexity levels, wherein the operation of the machine is controlled based on a two-dimensional sliced model of the profile of the cross-section of the intended object along a slice axis of the intended object, which is representated by a three-dimensional tesselated model of the three-dimensional intended object and provided as an input in the form of an STL file specifying triangular facets obeying the vertex-to-vertex rule, the method comprising:

using a computer to sort the facets of the STL file according to the slice axis;

using a computer to group said sorted facets according to facets having one of common minimum vertex values with respect to the slice axis and common maximum vertex values with respect to the slice axis;

generating at least a portion of a model of the object, said portion of said model including a plurality of successive layers wherein the cross-section of each layer in a plane of view is defined by the intersection with said plane of view, of a pair of parallel planes and a model profile connecting said parallel planes, and wherein for each layer the distance separating its pair of parallel planes defines the thickness of said layer; and operating the machine with respect to at least a portion of the object in successive steps with each said step based on a separate one of said layers.

18. A method as in claim 17, further comprising:

using a computer to subgroup said grouped facets according to facets having the other of common minimum vertex values with respect to the slice axis and common maximum vertex values with respect to the slice axis.

19. A method as in claim 17, wherein said step of generating at least said portion of said model of said object includes selecting each layer thickness such that the geometrical error between the desired profile of said portion of said object and said model profile of said layer with said layer thickness, remains no greater than a preselected geometrical error;

wherein more than one layer thickness is selected during said step of generating at least said portion of said object.

20. A method as in claim 17, further comprising:

before the step of generating at least said portion of the model of the object, identifying each key characteristic in the intended object and using a back tracking means for retaining in said portion of said model each said identified key characteristic of said portion of said model.

21. A method as in claim 17, further comprising:

before the step of generating at least said portion of the model of the object, identifying each change in complexity level in the local profile in the intended object and using a back tracking means for retaining in said portion of said model each said identified change in complexity level of said portion of said model.

22. A method involving automatic operation of a machine with respect to an intended three-dimensional object having a desired profile characterized by at least two local complexity levels, wherein the operation of the machine is controlled based on a two-dimensional sliced model of the profile of the cross-section of the intended object along a slice axis of the intended object, which is representated by a three-dimensional tesselated model of the three-dimensional intended object and provided as an input in the form of an STL file specifying triangular facets obeying the vertex-to-vertex rule, the method comprising:

producing from the STL file input a sorted facet file that is sorted according to the slice axis;

producing from said sorted facet file a grouped facet file that is grouped according to facets having one of the following: common minimum vertex values with respect to said slice axis and common maximum vertex values with respect to said slice axis;

producing from said grouped facet file a subgrouped facet file that is subgrouped according to facets having the other of the following: common minimum vertex values with respect to said slice axis and common maximum vertex values with respect to said slice axis;

identifying from said grouped facet file and said subgrouped facet file at least one key characteristic of the profile represented by the STL file and producing a key characteristic data file containing each key characteristic so identified;

using said grouped facet file, said subgrouped facet file and said key characteristic data file to calculate a thickness for each layer of the model of the desired profile represented by the STL file of the intended object such that the geometrical error between the desired profile of the intended object and said model profile of each said layer having said layer thickness, remains no greater than a preselected geometrical error and producing a layer thickness data file containing the result of each such calculation;

using said grouped facet file, said subgrouped facet file and said layer thickness data file to calculate the intersection of each slice plane disposed at a height above the previous slice plane by said thickness calculated for each layer of the model of the intended profile represented by the STL file and producing a slice plane intersection data file;

using said layer thickness data file and said slice plane intersection data file to generate at least a portion of a model of the intended object, said portion of said model including a plurality of successive layers wherein the cross-section of each layer in a plane of view is defined by the intersection with said plane of view, of a pair of parallel planes and a model profile connecting said parallel planes, and wherein for each layer the minimum distance separating its pair of parallel planes defines the thickness of said layer;

wherein more than one layer thickness is selected during said step of generating at least said portion of said model of the intended object; and operating the machine with respect to at least a portion of the intended object in successive steps with each said step based on a separate one of said layers of said model of said intended object.

* * * * *